US012792082B1

(12) United States Patent
Hasan

(10) Patent No.: US 12,792,082 B1
(45) Date of Patent: Nov. 10, 2026

(54) CONDITION-ADAPTIVE HARDWARE PROCESSING ARCHITECTURES

(71) Applicant: Salim A. Hasan, Burr Ridge, IL (US)

(72) Inventor: Salim A. Hasan, Burr Ridge, IL (US)

(73) Assignee: Certior Core LLC, Burr Ridge, IL (US)

( * ) Notice: Subject to any disclaimer, the term of this patent is extended or adjusted under 35 U.S.C. 154(b) by 0 days.

(21) Appl. No.: 19/553,168

(22) Filed: Feb. 27, 2026

(51) Int. Cl.
*G06F 1/08* (2006.01)

(52) U.S. Cl.
CPC .................................... *G06F 1/08* (2013.01)

(58) Field of Classification Search
CPC .................................... G06F 1/04; G06F 1/08
See application file for complete search history.

(56) References Cited

U.S. PATENT DOCUMENTS 7,571,198 B2 8/2009 Sato et al.
9,286,137 B2 3/2016 Betts et al.
10,232,510 B2 3/2019 Mottram et al.
10,419,024 B2 9/2019 Xiong et al.
11,537,859 B2 12/2022 Cassidy et al.
11,829,187 B2 11/2023 Tran
11,886,359 B2 1/2024 Bhoja et al.
11,930,392 B2 3/2024 Gebert et al.
12,001,848 B2 6/2024 Tran
12,079,155 B2 9/2024 Ray et al.
12,112,172 B2 10/2024 Tran
12,211,100 B2 1/2025 Gorham et al.
12,231,304 B2 2/2025 Illikkal et al.
12,260,223 B2 3/2025 Bhoja et al.
12,386,774 B2 8/2025 Balachandran et al.
12,443,412 B2 10/2025 Tran
2006/0150185 A1 7/2006 McKenney et al.
2007/0168645 A1* 7/2007 Grabner ................ G06F 9/3853
712/E9.071

(Continued)

OTHER PUBLICATIONS

Costan et al., "Intel SGX Explained," IACR Cryptol., 118 Pages (2016).

(Continued)

*Primary Examiner* — Mohammad Ali
*Assistant Examiner* — Vincent W Chang

(57) ABSTRACT

Hardware processing architectures adapt processing behavior to runtime conditions while maintaining execution timing that is predetermined for each parameter set. In some embodiments, measurement circuitry computes condition values from input data or system state, selection circuitry selects among a plurality of parameter sets stored in random-access memory based on the computed condition values, and processing circuitry of fixed topology processes input data using parameters from the selected parameter set. Each stage, including condition measurement, parameter set selection, parameter access, and data processing, can complete in a fixed number of clock cycles independent of which conditions were measured, which parameter set was selected, or which input data values were processed. Applications include, but are not limited to, e.g., financial market data processing, radar signal processing, wireless baseband processing, power system protection, robotic control, satellite communication, audio signal processing, and network packet processing.

30 Claims, 11 Drawing Sheets

(56) References Cited

U.S. PATENT DOCUMENTS

| | | | | |
|---|---|---|---|---|
| 2008/0170051 | A1* | 7/2008 | Zhan | G09G 5/366 345/204 |
| 2008/0310460 | A1 | 12/2008 | Bargauan | |
| 2012/0203419 | A1 | 8/2012 | Tucker et al. | |
| 2015/0215237 | A1 | 7/2015 | Finn et al. | |
| 2016/0118089 | A1* | 4/2016 | Ebeling | H03K 19/17764 711/109 |
| 2020/0293870 | A1 | 9/2020 | Isikdogan et al. | |
| 2020/0364146 | A1* | 11/2020 | Roberts | G06F 12/10 |
| 2021/0257972 | A1* | 8/2021 | Ma | G05B 13/0265 |
| 2024/0048259 | A1 | 2/2024 | Pscheidl et al. | |
| 2025/0292823 | A1* | 9/2025 | Pohlmann | G06F 1/04 |
| 2025/0390408 | A1* | 12/2025 | Di Gregorio | G06F 11/3409 |

OTHER PUBLICATIONS

Debouk, "Overview of the Second Edition of ISO 26262: Functional Safety-Road Vehicles," Journal of System Safety, 55(1): 13-21 (2019).
Jouppi et al., "In-Datacenter Performance Analysis of a Tensor Processing Unit," 44th International Symposium on Computer Architecture, 17 pages (2017).
Kirschner et al., "MultiVic: A Time-Predictable RISC-V Multi-Core Processor Optimized for Neural Network Inference," arXiv: 12 pages (2026).
Kocher et al., "Spectre Attacks: Exploiting Speculative Execution," Presented at 2019 IEEE Symposim on Security and Privacy, 19 pages (2010).
Liu et al., "A PRET Microarchitecture Implementation with Repeatable Timing and Competitive Performance," IEEE 30th International Conference on Computer Design: 87-93 (2012).
Reinwardt et al., "CVA6-VMRT: A Modular Approach Towards Time-Predictable Virtual Memory in a 64-Bit Application Class RISC-V Processor," Proceedings of the 22nd ACM International Conference on Computing Frontiers: 116-123 (2025).
Schoeberl et al., "T-CREST: Time-Predictible Multi-Core Architecture for Embedded Systems," Journal of Systems Architecture, 61(9): 449-471 (2015).
Yu et al., "NLI: Non-Uniform Linear Interpolation Approximation of Nonlinear Operations for Efficient LLMs Inference," arXiv: 18 pages (2026).
Aptivize Technologies, "Classic vs Adaptive AUTOSAR Explained," pp. 1-7 (2025) [accessed on Feb. 15, 2025 at url—https://aptivizetechnologies.com/2025/09/22/classic-vs-adaptive-autosar-explained-2/].
AUTOSAR, "Explanations of Adaptive Platform Design," 706, Adaptive Platform Release [17-03]: pp. 1-31 (2017).
AUTOSAR, "Recommended Methods and Practices for Timing Analysis and Design within the AUTOSAR Development Process," 645, Adaptive Platform Release [4.3.1]: pp. 1-118 (2017).
AUTOSAR, "Timing Analysis and Design," 645, Adaptive Platform Release [R23-11]: pp. 1-240 (2023).
Benmachiche, et al., "Adaptive Real-Time Scheduling Algorithms for Embedded Systems," Presented at the Second National Conference on Artificial Intelligence and Information Technologies, 5 pages (2025).
Laplante, et al., Real-Time Systems Design and Analysis, 4th ed., IEEE Press, Table of Contents (pp. vii-xiii), Chapters 2 (pp. 27-77), and Chapter 7 (pp. 379-415) (2012).
Liu, et al., "Minimizing Partial Reconfiguration Overhead with Fully Streaming DMA Engines and Intelligent ICAP Controller," Microsoft Research: pp. 1-33 (2009).
Liu, et al., "Reducing FPGA Reconfiguration Time Overhead using Virtual Configurations," Presented at Proceedings of the 5th International Workshop on Reconfigurable Communication Centric Systems-on-Chip, 4 pages (2010).
Mavridis, et al., "Real-Time Hybrid System Identification with Online Deterministic Annealing," arXiv: 13 pages (2024).
Papadimitriou, et al., "Performance of Partial Reconfiguration in FPGA Systems: A Survey and a Cost Model," ACM TRETS, 4(4): pp. 1-24 (2011).
Pezzarossa, et al., "Using Dynamic Partial Reconfiguration of FPGAs in Real-Time Systems," Microprocessors and Microsystems, 61: pp. 198-206 (2018).
Uyttersprot, Michael, "FPGA vs GPU vs CPU vs MCU—Hardware Options for AI Applications," AVNET Silica, pp. 1-6 (2026) [accessed on Feb. 15, 2026 at url—https://my.avnet.com/silica/resources/article/fpga-vs-gpu-vs-cpu-hardware-options-for-ai-applications/].
Yugesh, Anne, "Ensuring Real-Time Determinism in Complex Embedded Robotic Systems," Sch J Eng Tech, 13 (11): pp. 855-859 (2025).
Zheng, Yi, "Architectures for ISO 26262 Systems with Multiple ASIL Requirements," eeNews Europe: pp. 1-11 (2015) [accessed on Mar. 30, 2026, at url—https://www.eenewseurope.com/en/architectures-for-iso-26262-systems-with-multiple-asil-requirements/].

* cited by examiner

| Item | P | M | C | K | Total |
|---|---|---|---|---|---|
| N | $P_1$ | 4 | 2 | 24 | 30 |
| N+1 | $P_2$ | 4 | 2 | 18 | 24 |

CONDITION-ADAPTIVE HARDWARE PROCESSING ARCHITECTURES

BACKGROUND

The present disclosure relates to hardware processing architectures for data processing in environments where operating conditions may change during operation. In many systems, data processing occurs in environments where the conditions affecting processing, such as signal characteristics, environmental states, or system operating conditions, vary over time.

In some of these environments, the processing system may benefit from adjusting its processing behavior in response to changing conditions, because the processing behavior that is appropriate for one set of conditions may differ from the processing behavior that is appropriate for a different set of conditions. In some of these environments, the processing system is also subject to timing constraints that specify how quickly processing completes.

Such timing constraints may arise from, for example, physical phenomena, communication protocols, safety requirements, or other domain-specific factors, and in some cases these timing constraints do not relax when conditions change. In certain prior processing architectures, mechanisms used to implement adaptation, including software-mediated decision logic, memory hierarchies with variable access latency, and data-dependent control flow, introduce execution-time variability because their completion time depends on runtime values, scheduling state, or memory location.

In certain environments, both condition-driven adaptation and strict timing constraints are to be satisfied concurrently, creating architectural tension between runtime flexibility and deterministic execution.

The foregoing description of challenges and considerations in hardware processing architectures is provided for context only. Nothing in the Background constitutes an admission that any particular approach, system, technique, or architecture described or referenced therein is prior art, is known in the art, is representative of the state of the art, or is available as a reference against any claim of the present application. No statement in this Background should be construed as an acknowledgment or concession regarding the existence, content, or relevance of any particular prior art. The problems and considerations identified herein are set forth to provide background context for the reader and are not intended to define or limit the scope of the invention.

BRIEF SUMMARY

Embodiments of the disclosure provide a hardware processing architecture in which runtime condition measurement (for conditions that arise and change during operation), parameter selection, memory access, and computational processing are integrated on a single integrated circuit. Total execution time per input data item is predetermined and does not vary as a function of runtime condition values or selected parameter sets. In this architecture, adaptation to runtime conditions occurs through parameter selection rather than through reconfiguration of computational topology or through software-mediated control flow, such that switching between parameter sets does not introduce execution-time variability, pipeline stalls, or timing degradation. In accordance with embodiments of the disclosure, a parameter (or parameter value) refers to an individual numerical value within a parameter set. Parameters are distinguished from input data, which is the data processed by processing circuitry, and from configuration data such as FPGA bitstreams or hardware description language files that define the circuit topology itself.

Execution timing (the time from when input data arrives to when processed output data is available) is therefore predetermined for each parameter set and remains independent of runtime condition values. This structural integration permits systems operating under strict timing constraints to adjust processing parameters responsively while maintaining deterministic end-to-end latency. Processing systems in many fields operate under conditions that change during operation (for example, signal characteristics, environmental states, sensor measurements, network traffic patterns, system load conditions, or operational modes), and in certain prior processing architectures, mechanisms used to implement adaptation, including software-based decision logic, cache-dependent memory access, and data-dependent control flow, have completion times that depend on the particular values being processed or the particular configuration being selected.

In some embodiments, a processing system using these architectures changes which parameters govern its operation for every input data item, in response to conditions measured during operation, without that change affecting how long processing takes. In some embodiments, the architecture selects a potentially different parameter set for each successive input data item based on runtime-measured condition values, and the total number of clock cycles from input data arrival to output data availability is predetermined for each parameter set and does not vary based on which conditions were measured, which parameter set was selected, or which input data values were processed. A parameter set, as used herein, refers to a collection of numerical values (such as, for example, coefficients, thresholds, weights, lookup table contents, quantization values, error correction code parameters, or other configuration constants) that together define how the processing circuitry operates for a particular set of conditions. The architecture stores a plurality of such parameter sets in dedicated memory on the integrated circuit so that each parameter set is available for immediate retrieval without access to external systems.

A clock cycle is the fundamental timing interval of a digital circuit, determined by the circuit's clock frequency, and all operations within the architectures described herein are measured in whole numbers of clock cycles. In accordance with some aspects of the disclosure, the architecture measures runtime conditions and selects among the plurality of stored parameter sets based on those conditions. The architecture processes input data using the selected parameters in a total number of clock cycles that is predetermined for each parameter set regardless of, for example, which conditions were measured, which parameter set was selected, or which input data values were processed.

Because timing is predetermined for each parameter set rather than variable across operating conditions, the worst-case execution time for each parameter set is known at design time. Worst-case execution time is the longest possible processing duration for that parameter set across all admissible operating conditions and does not require statistical characterization or runtime monitoring to determine.

In some embodiments, these architectures achieve predetermined execution timing because each stage of the processing pipeline, that is, the sequence of hardware stages through which data flows from input to output, is implemented through circuitry whose completion time in clock cycles does not depend on the runtime values flowing through that stage. In certain implementations, measurement circuitry computes condition values, that is, numerical measurements of the current operating environment such as signal levels, environmental readings, error rates, processing load metrics, temperature, or other system state indicators, through hardware circuits with fixed propagation delay, such that the measurement circuitry completes in the same number of clock cycles regardless of what values are measured. Selection circuitry identifies a parameter set through dedicated hardware selection logic that completes in the same number of clock cycles regardless of which parameter set is selected or what condition values are presented. Parameter sets are stored in memory structures where read access latency (the time between requesting data from memory and receiving it) is bounded by a predetermined number of clock cycles. Access latency does not vary based on, for example, cache residency (whether the requested data happens to reside in fast intermediate storage), access history, or speculative prefetch outcomes (whether hardware predictions about future data needs were correct). Processing circuitry has fixed topology, such that the arrangement and interconnection of processing elements, the control flow, and the memory access pattern remain the same across all parameter sets, with only the numerical parameter values changing from one parameter set to another. In other embodiments, deterministic timing at each stage is achieved through other structural mechanisms that provide bounded execution timing, such as, for example, dedicated processors providing bounded execution timing or deterministic memory controllers providing fixed-latency access, provided that the resulting stage-level timing is independent of runtime condition values and input data values.

In some implementations, the timing of each stage is quantifiable through a decomposition in which condition measurement completes in (M) clock cycles, parameter set selection completes in (C) clock cycles, and data processing completes in (K) clock cycles. M, C, and K are each positive integers measured in whole clock cycles. K is predetermined for each parameter set and includes, for example, time to access the selected parameter set from memory. Total latency from input data arrival to output data availability can be modeled as, for example, M+C+K clock cycles for each parameter set, where M and C are independent of runtime condition values and K does not vary with runtime condition values or input data values.

In some embodiments, different parameter sets may have different predetermined values of K, because, for example, different processing configurations may involve different numbers of computational steps, but for any given parameter set, K remains fixed across all admissible runtime condition values and input data values. M, as used herein, refers to the number of clock cycles consumed by measurement circuitry to compute at least one condition value from a single measurement event, where M is a structural property of the measurement pipeline determinable from the circuit design at design time, and where M is invariant across all admissible measured values and all admissible operating conditions. C, as used herein, refers to the number of clock cycles consumed by selection circuitry to select one of the plurality of parameter sets based on the computed condition values, where C is a structural property of the selection pipeline determinable from the circuit design at design time, and where C is invariant across all admissible condition values and all admissible selection outcomes. K, as used herein, refers to the number of clock cycles consumed by processing circuitry to process a single input data item using parameters from a given parameter set, including time to access the selected parameter set from memory, where K is a structural property of the processing pipeline for that parameter set determinable from the circuit design at design time, and where K is invariant across all admissible input data values, all admissible condition values, and all admissible parameter values within that parameter set. M, C, and K are each positive integers, each determinable through static timing analysis of the hardware design, and each independently verifiable as described herein.

In keeping with some implementations, these architectures eliminate the need for architectural separation, that is, the conventional practice of assigning timing-critical processing and adaptive processing to separate processors or separate platforms that communicate with each other. The architecture performs condition measurement, parameter selection, and data processing within a single integrated circuit, without, for example, transferring tasks between processing units, without, for example, suspending or halting any processing resources such as pipeline stages, arithmetic units, or memory interfaces during parameter set transitions, and without, for example, requiring separate processors, separate operating systems, or separate middleware, that is, separate software layers that manage communication between system components, for adaptive and deterministic functions.

In some embodiments, parameter set transitions occur during continuous processing operation. The architecture selects potentially different parameter sets for consecutive input data items without requiring a reconfiguration interval, that is, a period during which the circuit ceases processing while new configuration data is loaded, a non-operative phase, or a bitstream loading operation in which new circuit-level configuration data is written into programmable hardware.

In some embodiments, the structural integration of these stages achieves a result that is not achievable through any proper subset of such structural properties, that is, through any combination that includes fewer than all of such properties, because each of these capabilities depends on the others. If some stages exhibit value-independent timing but at least one stage has timing that varies with runtime values, then execution time variation is reintroduced through that stage. For example, if measurement circuitry, selection circuitry, and processing circuitry each individually exhibit value-independent timing, but parameter access relies on memory with variable latency such as cache memory (intermediate storage that keeps recently accessed data close to the processor for faster retrieval, where the time to retrieve data depends unpredictably on whether the requested data is present in the cache, which is fast, or must be retrieved from slower main memory, which is slow), then execution time variation is reintroduced in the memory access phase through this unpredictable difference in retrieval time. If, for example, parameter access latency is bounded and processing timing is fixed, but condition measurement is performed through mechanisms subject to scheduling variability, such as software tasks whose execution timing depends on operating system scheduling decisions, then execution time variation is reintroduced in the measurement phase.

If, for example, measurement and parameter access timing are fixed but configuration selection is performed through mechanisms subject to data-dependent timing variability, such as software branch instructions whose execution timing depends on which branch path the processor predicts and whether that prediction is correct, then execution time variation is reintroduced in the selection phase.

In some embodiments, when all stages exhibit value-independent timing through their respective structural properties, total execution time remains predetermined for each parameter set across all operating conditions, and the architecture provides both runtime adaptation to changing conditions and execution timing that is deterministic, that is, predictable and repeatable, for each parameter set.

In some embodiments, these capabilities are applicable across a range of application domains in which runtime conditions change during operation, and the processing system adapts its behavior in response, and yet the timing of that processing is subject to constraints that do not relax when conditions change. In financial market data processing, for example, market regime conditions such as price volatility, order flow characteristics, liquidity metrics, or technical indicator values shift continuously, and trade setup evaluation adapts to these regime shifts, but latency variation between trading strategy configurations can cause adverse selection in which a market participant systematically receives unfavorable executions during slower processing cycles. In the architectures described herein, trade setup evaluation adapts to these regime shifts while maintaining deterministic evaluation latency across all trading strategy configurations, such that timing does not vary between strategy selections. In radar signal processing, for example, threat environment conditions such as clutter, jamming, and target density change during operation, and waveform parameters adapt accordingly, but all return processing for a given angular position completes within an antenna dwell time allocation that does not extend when threat conditions change.

In the architectures described herein, waveform parameters adapt to changing threat conditions while return processing completes within the antenna dwell time allocation regardless of which waveform parameter set is selected. In wireless baseband processing, for example, channel conditions such as interference, signal quality, and traffic type vary on a per-transmission-time-interval basis, and modulation, coding, and beamforming parameters adapt to these channel conditions, but baseband processing completes within a slot-boundary timing requirement determined by the wireless standard.

According to embodiments described herein, modulation, coding, and beamforming parameters adapt on a per-transmission-time-interval basis while baseband processing completes within the slot-boundary timing requirement regardless of which baseband parameter set is selected. In power system protection, for example, grid conditions such as fault currents, frequency deviations, and distributed generation states change as loads shift and topology changes through switching operations, and protection parameters adapt to these grid states, but trip commands issue within a protection relay timing class that does not relax during grid disturbances. In the architectures described herein, protection parameters adapt to changing grid states while trip commands issue within the protection relay timing class regardless of which protection parameter set is selected.

In robotic control, for example, operational conditions such as proximity, contact force, and task phase change during operation, and control parameters adapt to these conditions, but control computation completes within a fieldbus control cycle budget synchronized to deterministic fieldbus timing. In the architectures described herein, control parameters adapt to changing operational conditions while control computation completes within the fieldbus control cycle budget regardless of which control parameter set is selected. In satellite communication processing, for example, link conditions such as atmospheric fade, Doppler shift, and elevation angle vary continuously, and modulation and coding scheme parameters adapt to these link conditions, but modem processing completes within a frame timing budget determined by the communication standard's frame structure. In the architectures described herein, modulation and coding scheme parameters adapt to changing link conditions while modem processing completes within the frame timing budget regardless of which modem parameter set is selected.

In audio signal processing, for example, acoustic conditions such as noise floor, source type, and acoustic environment change during operation, and audio processing parameters adapt to these conditions, but sample-accurate timing is maintained regardless of which processing parameters are selected. In the architectures described herein, audio processing parameters adapt to changing acoustic conditions while sample-accurate timing is maintained regardless of which audio processing parameter set is selected.

In network packet processing, for example, network conditions such as congestion, traffic mix, and quality of service compliance status fluctuate during operation. Traffic management parameters adapt to these conditions, but per-packet processing time remains deterministic regardless of which traffic management parameters are selected. In the architectures described herein, traffic management parameters adapt to changing network conditions while per-packet processing time remains deterministic regardless of which traffic management parameter set is selected.

In these domains and in other domains, approaches that allow processing parameters to change during operation have introduced execution timing variability as a consequence. For example, software-based selection introduces branch prediction variability (timing differences that arise when the processor guesses which instruction path to execute next, and the guess is sometimes correct and fast and sometimes incorrect and slow). Cache-dependent parameter access introduces latency variability from cache misses (occasions when requested data is not present in fast intermediate storage and must be retrieved from slower main memory at an unpredictably variable timing cost). Data-dependent control flow introduces execution time variability from input-sensitive code paths (software instruction sequences whose length or composition changes depending on the particular data values being processed). Operating system scheduling introduces execution time variability from scheduling decisions (occasions when the operating system determines which software task executes next and for how long, where the time between requesting execution and receiving processor access varies depending on what other tasks are competing for the processor and what interrupt requests arrive during the scheduling interval). Approaches that fix processing parameters at design time or configuration time can achieve deterministic timing for those fixed parameters, but do not adapt to changing runtime conditions, such that a single set of parameters is used regardless of whether conditions have changed.

Some conventional architectures have addressed these two objectives by assigning them to separate hardware or software platforms, executing deterministic functions (processing tasks with fixed timing requirements) on dedicated processors or platforms and adaptive functions (processing tasks that adjust their behavior based on changing conditions) on separate processors or platforms, as described in further detail herein.

In other conventional architectures, processing circuitry implemented in programmable hardware can provide deterministic timing within each individual hardware configuration, but transitions between configurations require loading new configuration data into the programmable logic fabric, introducing periods during which the circuitry ceases processing input data, as described in further detail herein. The architectures described herein provide both adaptation and timing determinism within a single hardware architecture through the structural integration described above.

The processing system adapts its behavior to changing conditions on every input data item, selecting potentially different parameter sets for each successive item, while the total processing time for each parameter set remains the same regardless of which conditions were measured or which parameter set was selected. This combination is distinct from adaptation with variable execution timing and from timing determinism with fixed configuration that does not adapt to runtime conditions.

In some embodiments, an integrated circuit implements an architecture where the random-access memory provides identical non-speculative access latency (memory retrieval timing that does not depend on hardware predictions about which data will be needed and therefore does not vary when such predictions are wrong), independent of which parameter set is accessed. The random-access memory excludes cache memory, and the selection circuitry operates without instruction fetch, program counter, or stored-program execution (the mechanisms used in general-purpose processors to retrieve and sequence software instructions).

According to some embodiments, integrated circuits for the application domains described above and for other application domains implement such an architecture with deterministic access latency in the random-access memory. In further embodiments, such architectures are realized in acceleration cards, network interface cards, computer systems, processing appliances, and systems-on-chip. Related embodiments include hardware-implemented methods for processing data using such architectures, computer-implemented methods for designing such circuits, and non-transitory computer-readable media storing configuration data that, when synthesized or programmed into hardware, produces circuits having these structural and timing properties. In some embodiments employing dedicated access paths, bank conflicts are structurally precluded by the predetermined address sequence, e.g., in that the address generation hardware produces addresses that access different memory banks on consecutive clock cycles, and no two concurrent accesses target the same bank within the same clock cycle.

Thus, in an aspect, an integrated circuit includes measurement circuitry on the integrated circuit that measures at least one condition value (e.g., temperature, signal quality, error rate, processing load, or bandwidth availability) in a first fixed number of clock cycles independent of measured values. Selection circuitry selects one of a plurality of parameter sets based on the at least one condition value in a second fixed number of clock cycles independent of condition values and selection. The selection circuitry operates without instruction fetch, program counter, or stored-program execution (e.g., using comparator arrays, lookup tables, or finite state machines that generate an index identifying the selected parameter set). Random-access memory (e.g., static random-access memory, block random-access memory, or scratchpad memory) is coupled to the processing circuitry and the selection circuitry via address and data connections and stores the plurality of parameter sets as data values (e.g., filter coefficients, threshold values, neural network weights, lookup table contents, quantization parameter values, or algorithmic mode selection values). The random-access memory provides identical non-speculative access latency in clock cycles independent of which parameter set is accessed. The random-access memory excludes cache memory. Processing circuitry having fixed topology (e.g., a predetermined sequence of operations having a fixed number of pipeline stages and no data-dependent branches) processes input data using parameters from the selected parameter set. The processing circuitry executes in a third fixed number of clock cycles per parameter set independent of condition values or input data.

In another aspect, an acceleration card includes a circuit board and a host interface (e.g., a PCI Express interface or a Compute Express Link interface) on the circuit board configured to receive input data from a host system and to provide output data to the host system. PCI Express is a standard of PCI-SIG, Beaverton, Oregon. Compute Express Link is a standard of the CXL Consortium, Inc., Beaverton, Oregon. An integrated circuit is mounted on the circuit board. The integrated circuit includes measurement circuitry that measures at least one condition value in a first fixed number of clock cycles independent of measured values. Selection circuitry selects one of a plurality of parameter sets based on the at least one condition value in a second fixed number of clock cycles independent of condition values and selection. The selection circuitry operates without instruction fetch, program counter, or stored-program execution. Random-access memory is coupled to the processing circuitry and the selection circuitry via address and data connections and stores the plurality of parameter sets as data values. The random-access memory provides identical non-speculative access latency in clock cycles independent of which parameter set is accessed. The random-access memory excludes cache memory. Processing circuitry having fixed topology processes input data using parameters from the selected parameter set. The processing circuitry executes in a third fixed number of clock cycles per parameter set independent of condition values or input data. The host interface is coupled to the processing circuitry.

In another aspect, a network interface card includes a circuit board and network port circuitry (e.g., Ethernet physical layer circuitry or InfiniBand physical layer circuitry) on the circuit board configured to receive data from a network and transmit data to the network. Ethernet is a standard of IEEE, Piscataway, New Jersey. InfiniBand is a standard of the InfiniBand Trade Association. An integrated circuit is on the circuit board. The integrated circuit includes measurement circuitry that measures at least one condition value in a first fixed number of clock cycles independent of measured values. Selection circuitry selects one of a plurality of parameter sets based on the at least one condition value in a second fixed number of clock cycles independent of condition values and selection. The selection circuitry operates without instruction fetch, program counter, or stored-program execution. Random-access memory is coupled to the processing circuitry and the selection circuitry via address and data connections and stores the plurality of parameter sets as data values. The random-access memory provides identical non-speculative access latency in clock cycles independent of which parameter set is accessed. The random-access memory excludes cache memory. Processing circuitry having fixed topology processes received data using parameters from the selected parameter set. The processing circuitry executes in a third fixed number of clock cycles per parameter set independent of condition values or input data. The network port circuitry is coupled to the processing circuitry.

In another aspect, a computer system includes a host processor and system memory coupled to the host processor. An acceleration subsystem (e.g., an acceleration card coupled via a PCI Express interface or a Compute Express Link interface) is coupled to the host processor. The acceleration subsystem includes an integrated circuit. The integrated circuit includes measurement circuitry that measures at least one condition value in a first fixed number of clock cycles independent of measured values. Selection circuitry selects one of a plurality of parameter sets based on the at least one condition value in a second fixed number of clock cycles independent of condition values and selection. The selection circuitry operates without instruction fetch, program counter, or stored-program execution. Random-access memory is coupled to the processing circuitry and the selection circuitry via address and data connections and stores the plurality of parameter sets as data values. The random-access memory provides identical non-speculative access latency in clock cycles independent of which parameter set is accessed. The random-access memory excludes cache memory. Processing circuitry having fixed topology processes input data using parameters from the selected parameter set. The processing circuitry executes in a third fixed number of clock cycles per parameter set independent of condition values or input data. The host processor is configured to transfer input data to the acceleration subsystem and receive processed output data from the acceleration subsystem.

In another aspect, a hardware-implemented method for processing input data is performed by an integrated circuit. Measurement circuitry of the integrated circuit measures at least one condition value in a first fixed number of clock cycles independent of measured values. Selection circuitry of the integrated circuit selects one of a plurality of parameter sets based on the at least one condition value in a second fixed number of clock cycles independent of condition values and selection. The selecting is performed without instruction fetch, program counter, or stored-program execution. Parameters from the selected parameter set are accessed from random-access memory that provides identical non-speculative access latency in clock cycles independent of which parameter set is accessed. The random-access memory excludes cache memory. Processing circuitry of the integrated circuit having fixed topology processes the input data using the accessed parameters. In some embodiments, the measuring, the selecting, and the processing are performed continuously for successive input data items without halting or suspending execution during transitions between parameter sets. The processing executes in a third fixed number of clock cycles per parameter set independent of condition values or input data.

In another aspect, a non-transitory computer-readable medium stores configuration data (e.g., hardware description language source code, a gate-level netlist, a field-programmable gate array bitstream, or application-specific integrated circuit layout data) that, when synthesized or programmed into hardware, produces an integrated circuit. The integrated circuit includes measurement circuitry that measures at least one condition value in a first fixed number of clock cycles independent of measured values. Selection circuitry selects one of a plurality of parameter sets based on the at least one condition value in a second fixed number of clock cycles independent of condition values and selection. The selection circuitry operates without instruction fetch, program counter, or stored-program execution. Random-access memory stores the plurality of parameter sets. The random-access memory provides identical non-speculative access latency in clock cycles independent of which parameter set is accessed. The random-access memory excludes cache memory. Processing circuitry having fixed topology processes input data using parameters from the selected parameter set. The processing circuitry executes in a third fixed number of clock cycles per parameter set independent of condition values or input data.

In another aspect, a processing appliance includes a chassis (e.g., configured for mounting in an equipment rack) and a plurality of integrated circuits mounted in the chassis. Each of the integrated circuits includes measurement circuitry that measures at least one condition value in a first fixed number of clock cycles independent of measured values. Selection circuitry selects one of a plurality of parameter sets based on the at least one condition value in a second fixed number of clock cycles independent of condition values and selection. The selection circuitry operates without instruction fetch, program counter, or stored-program execution. Random-access memory stores the plurality of parameter sets. The random-access memory provides identical non-speculative access latency in clock cycles independent of which parameter set is accessed. The random-access memory excludes cache memory. Processing circuitry having fixed topology processes input data using parameters from the selected parameter set. The processing circuitry executes in a third fixed number of clock cycles per parameter set independent of condition values or input data. Interconnect circuitry couples the plurality of integrated circuits.

In another aspect, a system-on-chip includes one or more processor cores and a processing circuit on the system-on-chip. The processing circuit includes measurement circuitry that measures at least one condition value in a first fixed number of clock cycles independent of measured values. Selection circuitry selects one of a plurality of parameter sets based on the at least one condition value in a second fixed number of clock cycles independent of condition values and selection. The selection circuitry operates without instruction fetch, program counter, or stored-program execution. Random-access memory (e.g., tightly coupled memory providing single-cycle access latency or scratchpad memory) stores the plurality of parameter sets. The random-access memory provides identical non-speculative access latency in clock cycles independent of which parameter set is accessed. The random-access memory excludes cache memory. Processing circuitry having fixed topology processes input data using parameters from the selected parameter set. The processing circuitry executes in a third fixed number of clock cycles per parameter set independent of condition values or input data. An on-chip interconnect couples the one or more processor cores to the processing circuit.

In another aspect, a computer-implemented method for designing an integrated circuit includes specifying measurement circuitry configured to measure at least one condition value in a first fixed number of clock cycles independent of measured values. The method includes specifying selection circuitry configured to select one of a plurality of parameter sets based on the at least one condition value in a second fixed number of clock cycles independent of condition values and selection. The selection circuitry is specified to operate without instruction fetch, program counter, or stored-program execution. The method includes allocating random-access memory resources for storing the plurality of parameter sets. The random-access memory resources have identical non-speculative access latency in clock cycles independent of which parameter set is accessed. The random-access memory resources exclude cache memory. The method includes specifying processing circuitry having fixed topology configured to process input data using parameters from a selected parameter set. The processing circuitry executes in a third fixed number of clock cycles per parameter set independent of condition values or input data. The method includes verifying (e.g., by performing static timing analysis across all paths through the measurement circuitry, the selection circuitry, and the processing circuitry) that the first fixed number, the second fixed number, and the third fixed number are each bounded such that total execution time is deterministic for each parameter set.

In another aspect, an integrated circuit for processing financial market data includes measurement circuitry that computes at least one market condition metric (e.g., price volatility metrics, bid-ask spread measurements, or order flow imbalance indicators) from streaming financial market data in a first fixed number of clock cycles independent of market data values. Selection circuitry selects one of a plurality of trading strategy configurations based on the at least one market condition metric in a second fixed number of clock cycles independent of market condition values and selection. Random-access memory stores the plurality of trading strategy configurations. The random-access memory provides deterministic access latency in clock cycles independent of which trading strategy configuration is accessed. Processing circuitry having fixed topology executes trade setup evaluation using parameters from the selected trading strategy configuration. In some embodiments, the processing circuitry generates trade setup outputs (e.g., instrument identification, opportunity scores, entry price levels, or risk metrics). The processing circuitry executes in a third fixed number of clock cycles per trading strategy configuration independent of market condition values or market data values. Trade setup evaluation latency is deterministic across all trading strategy configurations.

In another aspect, an integrated circuit for processing radar data includes measurement circuitry that computes at least one threat environment metric (e.g., signal-to-clutter ratio, target density, or jamming-to-signal ratio) from received radar return data in a first fixed number of clock cycles independent of radar return values. Selection circuitry selects one of a plurality of radar waveform parameter sets based on the at least one threat environment metric in a second fixed number of clock cycles independent of threat environment values and selection. Random-access memory stores the plurality of radar waveform parameter sets. The random-access memory provides deterministic access latency in clock cycles independent of which radar waveform parameter set is accessed. Processing circuitry having fixed topology executes radar signal processing (e.g., pulse compression, Doppler filtering, or constant false alarm rate detection) using parameters from the selected radar waveform parameter set. The processing circuitry executes in a third fixed number of clock cycles per radar waveform parameter set independent of threat environment values or radar return values. The third fixed number of clock cycles fits within an antenna dwell time allocation regardless of which radar waveform parameter set is selected.

In another aspect, an integrated circuit for wireless baseband processing includes measurement circuitry that computes at least one channel condition metric (e.g., channel quality indicator, interference level, or user equipment count) in a first fixed number of clock cycles independent of channel condition values. Selection circuitry selects one of a plurality of baseband parameter sets (e.g., numerology parameters, scheduling weights, or beamforming coefficients) based on the at least one channel condition metric in a second fixed number of clock cycles independent of channel condition values and selection. Random-access memory stores the plurality of baseband parameter sets. The random-access memory provides deterministic access latency in clock cycles independent of which baseband parameter set is accessed. Processing circuitry having fixed topology executes baseband signal processing (e.g., fast Fourier transform, channel estimation, or equalization) using parameters from the selected baseband parameter set. The processing circuitry executes in a third fixed number of clock cycles per baseband parameter set independent of channel condition values or input signal values. The third fixed number of clock cycles completes within a slot-boundary timing requirement regardless of which baseband parameter set is selected.

In another aspect, an integrated circuit for power system protection includes measurement circuitry that computes at least one grid condition metric (e.g., fault current magnitude, fault type indicator, or system frequency deviation) from power system measurements in a first fixed number of clock cycles independent of measurement values. Selection circuitry selects one of a plurality of protection parameter sets (e.g., trip curve parameters, overcurrent thresholds, or impedance circle parameters) based on the at least one grid condition metric in a second fixed number of clock cycles independent of grid condition values and selection. Random-access memory stores the plurality of protection parameter sets. The random-access memory provides deterministic access latency in clock cycles independent of which protection parameter set is accessed. Processing circuitry having fixed topology executes protection relay computation (e.g., overcurrent protection or distance protection) using parameters from the selected protection parameter set. The processing circuitry executes in a third fixed number of clock cycles per protection parameter set independent of grid condition values or measurement values. The third fixed number of clock cycles completes within a protection relay timing class regardless of which protection parameter set is selected.

In another aspect, an integrated circuit for robotic control includes measurement circuitry that computes at least one operational condition metric (e.g., proximity sensor metrics, force sensor metrics, or torque sensor metrics) from robotic sensors in a first fixed number of clock cycles independent of sensor values. Selection circuitry selects one of a plurality of control parameter sets (e.g., proportional-integral-derivative control gains, trajectory interpolation parameters, or safety zone definitions) based on the at least one operational condition metric in a second fixed number of clock cycles independent of condition values and selection. Random-access memory stores the plurality of control parameter sets. The random-access memory provides deterministic access latency in clock cycles independent of which control parameter set is accessed. Processing circuitry having fixed topology executes control computation using parameters from the selected control parameter set. The processing circuitry executes in a third fixed number of clock cycles per control parameter set independent of condition values or sensor values. The third fixed number of clock cycles completes within a fieldbus control cycle budget regardless of which control parameter set is selected.

In another aspect, an integrated circuit for satellite communication processing includes measurement circuitry that computes at least one link condition metric (e.g., link budget metrics, atmospheric fade measurements, or Doppler shift rate) in a first fixed number of clock cycles independent of link condition values. Selection circuitry selects one of a plurality of modem parameter sets (e.g., modulation order, code rate, interleaving depth, or power control parameters) based on the at least one link condition metric in a second fixed number of clock cycles independent of link condition values and selection. Random-access memory stores the plurality of modem parameter sets. The random-access memory provides deterministic access latency in clock cycles independent of which modem parameter set is accessed. Processing circuitry having fixed topology executes modem signal processing using parameters from the selected modem parameter set. The processing circuitry executes in a third fixed number of clock cycles per modem parameter set independent of link condition values or input signal values. The third fixed number of clock cycles completes within a frame timing budget regardless of which modem parameter set is selected.

In another aspect, an integrated circuit for audio signal processing includes measurement circuitry that computes at least one acoustic condition metric (e.g., input signal noise floor, dynamic range metrics, or source type classification) in a first fixed number of clock cycles independent of audio signal values. Selection circuitry selects one of a plurality of audio processing parameter sets (e.g., equalization coefficients, dynamic range compression parameters, noise gate thresholds, or spatial audio rendering parameters) based on the at least one acoustic condition metric in a second fixed number of clock cycles independent of condition values and selection. Random-access memory stores the plurality of audio processing parameter sets. The random-access memory provides deterministic access latency in clock cycles independent of which audio processing parameter set is accessed. Processing circuitry having fixed topology executes audio signal processing using parameters from the selected audio processing parameter set. The processing circuitry executes in a third fixed number of clock cycles per audio processing parameter set independent of condition values or audio signal values. The third fixed number of clock cycles maintains sample-accurate timing regardless of which audio processing parameter set is selected.

In another aspect, an integrated circuit for network packet processing includes measurement circuitry that computes at least one network condition metric (e.g., network congestion metrics, flow priority indicators, or quality of service violation indicators) in a first fixed number of clock cycles independent of packet data values. Selection circuitry selects one of a plurality of traffic management parameter sets (e.g., scheduling weights, queue management thresholds, or traffic shaping parameters) based on the at least one network condition metric in a second fixed number of clock cycles independent of condition values and selection. Random-access memory stores the plurality of traffic management parameter sets. The random-access memory provides deterministic access latency in clock cycles independent of which traffic management parameter set is accessed. Processing circuitry having fixed topology executes packet processing using parameters from the selected traffic management parameter set. The processing circuitry executes in a third fixed number of clock cycles per traffic management parameter set independent of condition values or packet data values. The third fixed number of clock cycles provides deterministic per-packet processing time regardless of which traffic management parameter set is selected.

In another aspect, an integrated circuit for video encoding comprises measurement circuitry computing at least one scene condition metric (e.g., spatial complexity metrics, temporal complexity metrics, or rate control feedback metrics) from input video data in a first fixed number of clock cycles independent of video data values. Selection circuitry selects one of a plurality of encoding parameter sets (e.g., quantization parameter values, mode weighting tables, or filter strength parameters) based on the at least one scene condition metric in a second fixed number of clock cycles independent of scene condition values and selection. Random-access memory stores the plurality of encoding parameter sets. The random-access memory provides deterministic access latency in clock cycles independent of which encoding parameter set is accessed. Processing circuitry having fixed topology executes video encoding operations (e.g., motion estimation, transform, quantization, or entropy coding) using parameters from the selected encoding parameter set. The processing circuitry executes in a third fixed number of clock cycles per encoding parameter set independent of scene condition values or video data values. The third fixed number of clock cycles completes encoding of each coding unit within a per-coding-unit time budget derived from a frame deadline regardless of which encoding parameter set is selected.

The foregoing summary is provided for the purpose of illustrating certain embodiments and aspects of the present disclosure and is not intended to define or limit the scope of the invention. The aspects and embodiments described in the Brief Summary are illustrative only. Additional aspects, embodiments, combinations, and variations are described in the Detailed Description and in the claims. No particular embodiment, aspect, or combination described in the Brief Summary should be construed as essential to the practice of the invention, and no statement in the Brief Summary constitutes a disclaimer of any subject matter not explicitly recited therein. In addition, the embodiments described herein are not mutually exclusive, and combinations and sub-combinations of the features described in the Brief Summary, the Detailed Description, and the claims are within the scope of the invention.

BRIEF DESCRIPTION OF THE DRAWINGS

The drawings, which are incorporated in and constitute a part of this specification, illustrate certain embodiments of the disclosure and together with the description serve to explain the principles of the disclosure. The drawings are illustrative of certain embodiments only to aid in understanding but do not limit the scope of the invention. Additional embodiments, elements, and structural arrangements are described in the Detailed Description. Unless expressly stated otherwise, blocks depicted in the figures and described herein as circuitry may represent dedicated hardware logic, configurable logic, programmable logic devices, field-programmable gate array fabric, application-specific integrated circuit structures, or any combination thereof.

In the drawings, functional blocks and interconnections are shown schematically to illustrate representative dataflow and control relationships. Unless expressly stated otherwise, selection among parameter sets is depicted as selecting among stored parameter values for use by a fixed-topology processing pipeline, and not as activating or deactivating different processing blocks, bypassing pipeline stages, or dynamically reconfiguring computational topology. Memory elements shown for storing parameter sets represent bounded-latency storage on the parameter access path (e.g., scratchpad memory, tightly coupled memory, on-chip SRAM/BRAM, or other deterministic-latency storage). Any depiction of host memory or shared system memory in system-context figures is illustrative of surrounding system resources and does not imply that parameter access relies on cache-dependent or variable-latency retrieval.

DETAILED DESCRIPTION

Figure 1:
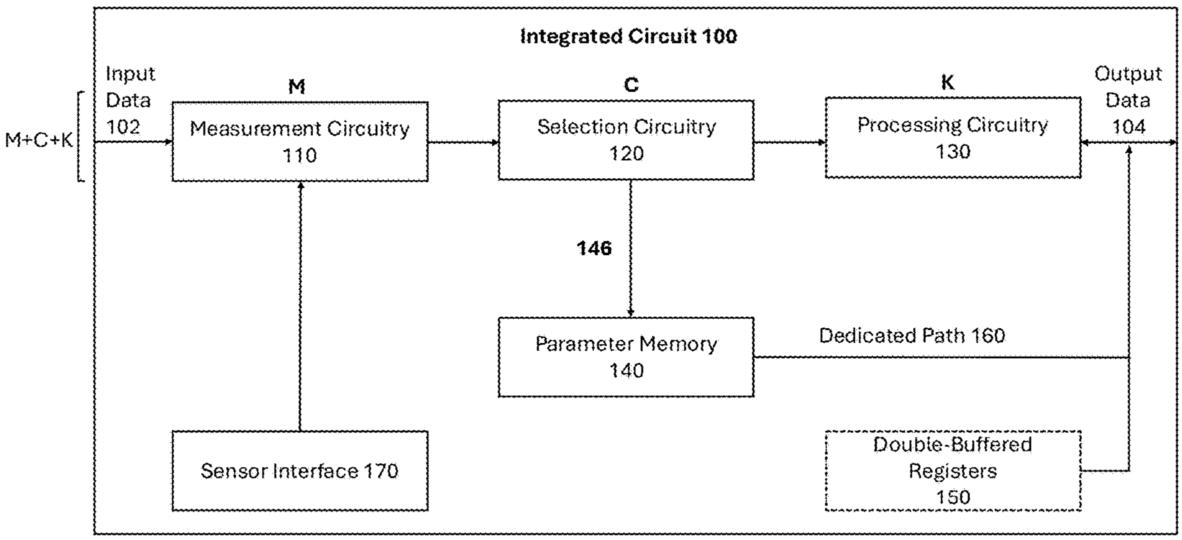
FIG. 1 is a block diagram of integrated circuit 100 showing internal architecture comprising measurement circuitry 110, selection circuitry 120, processing circuitry 130, parameter memory 140, dedicated memory access path 160, double-buffered parameter registers 150, and sensor interface 170 in accordance with some embodiments.

Embodiments of the disclosure provide hardware processing architectures in which measurement circuitry computes runtime condition values, selection circuitry selects among a plurality of parameter sets stored in random-access memory based on the computed condition values, and processing circuitry of fixed topology processes input data using parameters from the selected parameter set, where the random-access memory is coupled to both the selection circuitry and the processing circuitry through address and data connections such that selection signals generated by the selection circuitry determine which parameter set is accessed and the accessed parameters are provided to the processing circuitry.

In these architectures, measurement circuitry completes condition computation in a first fixed number of clock cycles independent of measured values, selection circuitry completes parameter set selection in a second fixed number of clock cycles independent of condition values and selection outcome, the random-access memory provides parameter access with deterministic latency independent of which parameter set is accessed, and processing circuitry completes data processing in a third fixed number of clock cycles per parameter set independent of condition values and input data values, such that total execution time from input data arrival to output data availability is predetermined for each parameter set.

Aspects of the disclosure relate to integrated circuits, acceleration cards, network interface cards, computer systems, processing appliances, and systems-on-chip. Further aspects relate to hardware-implemented methods for processing data, computer-implemented methods for designing such circuits, and non-transitory computer-readable media storing configuration data that, when synthesized or programmed into hardware, produces such circuits, as well as to domain-specific integrated circuits for financial market data processing, radar signal processing, wireless baseband processing, power system protection, robotic control, satellite communication processing, audio signal processing, and network packet processing.

A condition-adaptive architecture, in accordance with embodiments, refers to a hardware processing architecture that adapts its processing behavior to runtime conditions, that is, conditions that arise and change during operation, by selecting among a plurality of parameter sets based on condition values measured by hardware circuitry during operation, where the adaptation occurs through dedicated hardware selection circuitry as described herein rather than through software reconfiguration, operating system scheduling, or bitstream loading.

The term "condition-adaptive" encompasses architectures in which the selection among parameter sets occurs on a per-input-data-item basis. Each successive input data item can be processed using a different parameter set selected in response to different measured condition values. The total number of clock cycles from input data arrival to output data availability is predetermined for each parameter set and does not vary based on which conditions were measured, which parameter set was selected, or which input data values were processed. In some embodiments, an integrated circuit implements a condition-adaptive, fixed-latency pipeline that processes each input data item in a total number of clock cycles that is predetermined for each parameter set.

Measurement circuitry computes one or more condition metrics in a first fixed number of clock cycles, selection circuitry identifies a parameter set in a second fixed number of clock cycles, random-access memory supplies parameters from a plurality of parameter sets with deterministic access latency that does not depend on which parameter set is addressed, and processing circuitry of fixed topology applies the selected parameters to input data in a third fixed number of clock cycles per parameter set. In some embodiments, selection circuitry identifies the parameter set using hardware selection logic that operates without instruction fetch, program counter, or stored-program execution, and random-access memory storing the plurality of parameter sets excludes cache memory and is accessed through explicit addressing without tag lookup or replacement policy logic.

In some embodiments, processing circuitry executes a predetermined sequence of operations having no data-dependent branches, bounded loop structures with predetermined iteration counts independent of input data values, and a predetermined address sequence having a fixed number of memory accesses per parameter set. In other embodiments, selection circuitry provides deterministic selection timing through other structural mechanisms, provided that selection completes in the second fixed number of clock cycles independent of condition values and selection outcome.

The architectural pattern is realized, in accordance with some embodiments, using different implementation technologies and packaging forms. For example, the fixed-latency measurement, selection, memory, and processing stages can be implemented within a stand-alone integrated circuit or within a processing circuit on a system-on-chip alongside one or more processor cores.

These stages can also be implemented in embodiments on an acceleration card or network interface card incorporating one or more such circuits, inside a multi-device processing appliance, or within other systems that incorporate the same structural organization. Related embodiments include hardware-implemented methods executed by such circuits and computer-implemented methods for designing such circuits. Further related embodiments include non-transitory computer-readable media storing configuration data that, when synthesized, programmed into programmable logic, or fabricated into silicon, produce hardware structures exhibiting these timing and selection properties.

In some embodiments, execution-time independence with respect to runtime condition values arises from combined structural properties of measurement circuitry, selection circuitry, bounded-latency parameter memory storing parameter sets, and processing circuitry. The memory returns parameter values within a bounded and, in certain embodiments, identical number of clock cycles regardless of which parameter set is accessed. The measurement circuitry completes computation of condition metrics in a fixed number of clock cycles independent of the values measured. The selection circuitry produces configuration signals identifying a parameter set in a fixed number of clock cycles independent of which parameter set is chosen. The processing circuitry executes a processing operation in a number of clock cycles that is predetermined for each parameter set.

In some implementations, the interaction of bounded-latency parameter memory, fixed-cycle measurement circuitry, fixed-cycle selection circuitry, and fixed-topology processing circuitry is understood as a multi-stage pipeline in which condition measurement, configuration selection, and data processing occupy separate hardware stages with predetermined cycle counts.

In certain embodiments, for each input data item, condition measurement completes in a first fixed number of clock cycles M. Configuration selection completes in a second fixed number of clock cycles C, independent of which parameter set is selected. Processing completes in a third number of clock cycles K that is predetermined for each parameter set.

For a given input data item, M begins at the pipeline stage boundary at which condition measurement for that input data item commences. C begins at the pipeline stage boundary at which condition measurement completes and condition metrics are available to the selection circuitry. K begins at the pipeline stage boundary at which parameter set selection completes and parameters from the selected parameter set are available to the processing circuitry. K ends at the pipeline stage boundary at which processing completes and output data for that input data item is available. The stages are sequential for a given input data item, such that M, C, and K are non-overlapping and collectively account for total latency from commencement of condition measurement to availability of output data.

In embodiments, because the stages are non-overlapping and collectively exhaustive, total latency for each parameter set is the arithmetic sum of M, C, and K, expressed in clock cycles. M and C are independent of runtime condition values. K is predetermined for that parameter set and does not vary with runtime condition values or input data values. No inter-stage overhead, gap, or additional clock cycles exist outside of M, C, and K for a given input data item. This timing decomposition is referred to herein as the HDAM timing decomposition. Other timing decompositions that maintain fixed, value-independent cycle counts for measurement, selection, memory access, and processing stages while preserving execution-time independence from runtime conditions are also contemplated.

Execution time independence according to embodiments means that total processing time measured in clock cycles from input data arrival to output data availability is predetermined for each parameter set. In some embodiments, where different parameter sets have different predetermined values of K, total processing time across the set of parameter sets is bounded within a known range rather than being identical for all parameter sets. For any single parameter set, total processing time remains a single predetermined value. In either case, total processing time does not vary based on, e.g., runtime condition values measured, the order in which conditions are evaluated, the path taken through selection circuitry, or input data values, when measured under a consistent clock model.

According to some aspects of the disclosure, different parameter sets can have different predetermined execution times, but for any given parameter set, execution time remains fixed across all admissible runtime condition values.

In some implementations, other elements described herein, including, for example, particular memory types, condition measurement approaches, selection circuit topologies, processing pipeline configurations, and application-specific features, are illustrative embodiments. Other implementations having these structural properties are also contemplated.

The timing decomposition described herein may be referred to as the Hasan Deterministic Adaptation Model (HDAM) in accordance with some embodiments of the disclosure. In this decomposition, condition measurement completes in M clock cycles, parameter set selection completes in C clock cycles, and data processing completes in K clock cycles predetermined for each parameter set. Total latency is the arithmetic sum of M, C, and K for each parameter set, with M and C invariant across all operating conditions and K invariant across all admissible input data values and condition values for a given parameter set. HDAM is a convenience label for this structural timing decomposition and its associated timing invariance properties as described herein.

Use of the label HDAM in keeping with embodiments of the disclosure is synonymous with the timing decomposition as defined by the structural properties of measurement circuitry, selection circuitry, bounded-latency parameter memory, and processing circuitry described herein. The HDAM label does not impose structural requirements beyond those described herein for the M, C, and K pipeline stages and their associated timing properties.

In some embodiments, the HDAM timing decomposition can be verified for a given implementation through one or more of the following approaches. Static timing analysis of hardware description language source code can extract cycle counts for each pipeline stage. Simulation of synthesized hardware with representative input data and condition values can measure cycle counts per stage. Formal verification tools can prove timing independence properties across all possible condition values and parameter sets. Logic analyzer measurements on fabricated hardware can trace pipeline stage completion signals. Any combination of these approaches can be used. These verification methods are optional tools that implementers may use during design validation. They are not structural requirements of architectures described herein.

In some embodiments, the values of M, C, and K in the HDAM timing decomposition model for a given implementation are determinable from the circuit design through static timing analysis of the register-transfer level (RTL) description or gate-level netlist (a structural representation of a circuit as interconnected logic gates and their connections), in that the number of clock cycles consumed by each stage is a structural property of the circuit and does not depend on runtime values.

For a given implementation under steady-state operating conditions, each of M, C, and K is a single integer value. Because the processing pipeline has fixed topology without data-dependent branching, all valid determination methods, e.g., static timing analysis, simulation, formal verification, or logic analyzer measurement, yield the same integer cycle count for a given stage in a given implementation.

In some embodiments, the values of M, C, and K are also verifiable through external timing measurement. For example, M can be verified by varying condition values across the full admissible range while observing that measurement circuitry completion timing does not change. C can be verified by varying which parameter set is selected while observing that selection circuitry completion timing does not change. K can be verified by varying input data values while observing that processing circuitry completion timing does not change for a given parameter set.

In certain implementations, the boundaries between the M, C, and K stages correspond to observable pipeline register boundaries in the circuit, such that timing instruments, e.g., logic analyzers, on-chip debug probes, or hardware performance counters, can measure the clock cycle count consumed by each stage independently. In some embodiments, the invariance of M with respect to measured condition values, the invariance of C with respect to condition values and selection outcome, and the invariance of K with respect to condition values and input data values for a given parameter set, are each independently verifiable properties.

In some embodiments, the integrated circuit includes latency attestation circuitry. Hardware cycle counters are coupled to pipeline stage boundaries and record the actual clock cycle count consumed by each of the measurement, selection, and processing stages for each processed data item. Comparison circuitry compares the recorded cycle counts against the design-time predetermined values of M, C, and K stored in configuration registers. For each data item, the comparison circuitry outputs an attestation signal indicating whether deterministic timing was maintained.

In keeping with certain embodiments, the attestation signal is provided to an external interface, e.g., a status register readable by a host processor or a dedicated attestation output pin, permitting runtime verification that the integrated circuit is operating within its predetermined timing envelope without requiring external timing instrumentation.

Separating measurement, selection, and processing into dedicated pipeline stages according to embodiments makes it possible to assign each stage its own bounded cycle count. This separation permits total latency to be expressed as the arithmetic sum of M, C, and K, and permits each value to be verified independently. In architectures where adaptive behavior is implemented in software subject to operating system scheduling, branch prediction, and cache hierarchies, measurement, selection, and processing are interleaved in software execution. In those architectures, such a decomposition into individually bounded stages is not available.

According to some implementations, bounded-latency parameter memory includes, for example, at least one of the following, or any combination thereof: on-chip block random-access memory as found in field-programmable gate arrays (FPGAs), e.g., UltraRAM or BlockRAM memory resources commercially available from AMD, Inc. (formerly Xilinx, Inc.), San Jose, California, embedded static random-access memory (SRAM) as found in application-specific integrated circuits (ASICs) from vendors such as TSMC (Taiwan Semiconductor Manufacturing Company, Ltd., Hsinchu, Taiwan), Samsung (Samsung Electronics Co., Ltd., Suwon, South Korea), or Intel (Intel Corporation, Santa Clara, California), for example single-port or dual-port SRAM macros, scratchpad memory, e.g., directly addressable memory without cache controller logic, tightly-coupled memory, e.g., memory with deterministic access latency specified by a processor vendor, or other storage structures where read access latency is bounded by a predetermined number of clock cycles and does not vary based on cache hit or miss outcomes.

Bounded-latency parameter memory in some embodiments is accessed through explicit addressing without tag lookup or replacement policy logic. The address presented to the memory uniquely identifies the storage location and no associative comparison against stored tags is performed. Deterministic access latency as used herein in connection with such embodiments means that the number of clock cycles from address presentation to valid data output is fixed for all addresses in the parameter-set memory and does not depend on runtime access history, cache residency state, or speculative prefetch outcomes. In some embodiments, such memory provides identical non-speculative access latency in clock cycles independent of which parameter set is accessed, such that all parameter sets are accessed through identical addressing with identical latency.

According to certain embodiments, bounded-latency parameter memory includes off-chip memory accessed through deterministic interconnects with fixed arbitration policies and predetermined access windows, provided that read access latency is bounded by a predetermined number of clock cycles and does not vary based on dynamic arbitration, cache coherency protocols, or speculative prefetching outcomes.

In some embodiments, the worst-case read access latency for off-chip parameter memory is characterized by a deterministic memory latency envelope (DMLE). DMLE is defined as the predetermined maximum number of clock cycles from parameter address presentation to valid parameter data output through the off-chip memory path, including memory controller latency, interconnect latency, and any clock domain crossing latency. DMLE is a design-time parameter of the memory controller and interconnect configuration, determinable through static timing analysis or memory controller specification. The DMLE value for a given implementation is included within K for parameter sets that use off-chip parameter storage.

In some implementations, selection circuitry includes, for example, at least one of the following, or any combination thereof: comparison circuits that compare measured condition values to threshold values, e.g., magnitude comparators or window comparators, lookup table circuits indexed by condition values, e.g., content-addressable memory or direct-indexed tables, state machines, e.g., finite state machines encoding selection rules, priority encoders, e.g., circuits that select a highest-priority active signal, or other hardware structures where propagation delay is independent of values being processed or compared.

In keeping with some embodiments, measurement circuitry includes, for example, at least one of the following, or any combination thereof: pipelined arithmetic logic circuits that compute metrics in a fixed number of clock cycles independent of input data values, e.g., fixed-latency adder trees or multiplier arrays, hardware counters with bounded update latency, e.g., synchronous counters with known propagation delay, sensor interface circuits with deterministic sampling rates, e.g., analog-to-digital converters with fixed conversion time, or other measurement mechanisms where timing is not subject to operating system scheduling delays or software branch prediction variability.

Processing circuitry according to certain implementations includes, for example, at least one of the following, or any combination thereof: micro-coded engines, very long instruction word (VLIW) processors, dedicated pipeline stages, multiply-accumulate arrays, e.g., for systolic arrays, digital signal processing circuits, neural network processing circuits, finite impulse response filter circuits, or other computational architectures.

In keeping with some embodiments, instruction sequence and memory access pattern remain fixed across all parameter sets for a given processing operation, with only parameter values changing between parameter sets. In some embodiments, processing circuitry has fixed topology, meaning that the arrangement and interconnection of processing elements does not change between parameter sets. Control flow, pipeline depth, and memory access patterns are invariant across all parameter sets.

In an example implementation, processing circuitry maintains a predetermined K by executing a fixed number of computational steps regardless of input data values. For instance, a decoder may execute a predetermined number of decoding iterations for each codeword. A motion-estimation engine may evaluate a predetermined set of candidate motion vectors for each block. An entropy-coding engine may process a fixed maximum number of syntax elements per coding unit, treating unused positions as zero-valued symbols. A constant false alarm rate detector may evaluate a predetermined window of reference cells for each cell under test. A protection relay computation may evaluate a fixed set of protection elements during each evaluation interval. In each case, K is a single predetermined integer for the parameter set in use, independent of the input data values processed.

According to certain implementations, all processing units within the fixed topology are active for all parameter sets, without selective activation or deactivation of processing units based on parameter set selection. As a result, resource utilization and power dissipation patterns are consistent across parameter sets and execution timing is not affected by unit activation or deactivation sequences. In such embodiments, no functional unit within the processing pipeline receives a clock gating signal, a power gate signal, or a conditional activation signal that varies based on which parameter set is selected. The critical path timing of the processing pipeline is identical across all parameter sets because the same set of functional units is traversed for every parameter set.

In some implementations, the integrated circuit operates continuously without halting or suspending execution during transitions between parameter sets, and selection circuitry selects potentially different parameter sets for consecutive input data items without requiring a reconfiguration interval between the consecutive input data items. In some embodiments, double-buffered registers, if desired, hold parameters from the selected parameter set, such that parameter values for a next selection are loaded into a shadow register bank while processing circuitry operates on parameter values in an active register bank, and register banks are swapped, e.g., at a pipeline stage boundary, without interrupting processing.

Execution time independence, in keeping with some implementations, is maintained across parameter set transitions because the transitions do not introduce overhead cycles, do not require processing pipelines to drain or flush, and do not alter the processing circuitry's execution path. Structural properties contributing to this result include fixed topology, all units active, continuous operation, per-item selection without reconfiguration interval, and optionally double-buffered registers.

According to some aspects of the disclosure, bounded-latency parameter memory, selection circuitry, and measurement circuitry operating together are synergistic in that results achievable through their integration are improved and, in embodiments, are not achievable through any proper subset of such properties.

In prior approaches based on computing architectures that rely on cache hierarchies, software scheduling, and dynamic control flow, conventional techniques have assigned deterministic functions to dedicated processors or platforms and adaptive functions to separate processors or platforms, as described further herein, rather than integrating both functions in a single hardware architecture.

Embodiments of the disclosure reflect a departure from such prior approaches. For example, in some embodiments, the structural integration of bounded-latency parameter memory, selection circuitry with fixed propagation delay, and measurement circuitry with fixed-cycle completion produces timing properties that differ from those of stored-program architectures, as described herein and as further illustrated in Tables 1A and 1B. In some embodiments, no proper subset of one or more of bounded-latency parameter memory, fixed-propagation-delay selection circuitry, fixed-cycle measurement circuitry, and fixed-topology processing circuitry achieves timing independence from runtime conditions. This can be, for example, because each structural property addresses a different stage of the processing pipeline and the absence of any one property permits timing variability to enter through the unaddressed stage, as described herein.

In certain implementations, when all structural properties are integrated within a single integrated circuit, total execution time remains predetermined for each parameter set across all operating conditions. Worst-case execution time is determinable at design time for each parameter set.

According to certain embodiments, metrics such as latency determinism ratio (LDR) and adaptive determinism preservation factor (ADPF) characterize execution time independence from runtime conditions and are used, if desired, to verify or evaluate implementations of architectures as described herein. These metrics are defined in terms of the predetermined M, C, and K values described herein.

In certain implementations, a latency determinism ratio (LDR) characterizes how uniform total latency is across parameter sets. LDR for a given implementation is determined as follows. For each parameter set stored in bounded-latency parameter memory, total latency is M plus C plus the value of K for that parameter set, where M, C, and K are the predetermined integer clock cycle counts for that implementation. LDR is the ratio of maximum total latency across all parameter sets to minimum total latency across all parameter sets. For example, when M and C are identical across all parameter sets, LDR reduces to the ratio of maximum K to minimum K. An LDR approaching 1.0 (e.g., in some embodiments, plus or minus 0.25, 0.2, 0.15, 0.1, or 0.05) indicates that execution time is substantially uniform across parameter sets and runtime conditions.

In one embodiment, K is equal for all parameter sets stored in bounded-latency parameter memory, such that LDR equals 1.0. In another embodiment, different parameter sets have different predetermined values of K, and LDR is bounded by a design-time constant greater than 1.0 while remaining independent of the particular values of the input data or condition values. Because M, C, and each value of K are single integers determined by the circuit structure, LDR has exactly one value for a given implementation with a given set of parameter sets stored in parameter memory, and does not depend on measurement equipment, test conditions, or input data values.

In some implementations, an adaptive determinism preservation factor (ADPF) characterizes whether enabling adaptive parameter set selection changes timing variability across parameter sets. ADPF for a given implementation is determined as follows. A first LDR, referred to herein as static LDR, is computed from total latency values for each parameter set with that parameter set statically assigned. For each parameter set, the static total latency is M plus C plus the value of K for that parameter set. Static LDR is the ratio of maximum static total latency to minimum static total latency across all parameter sets stored in parameter memory.

A second LDR, referred to herein as adaptive LDR, in some embodiments is computed from total latency values for each parameter set with adaptive selection active. For each parameter set, the adaptive total latency is the total clock cycle count from input to output when the selection circuitry adaptively selects that parameter set. Adaptive LDR is the ratio of maximum adaptive total latency to minimum adaptive total latency across all parameter sets stored in parameter memory. ADPF is adaptive LDR divided by static LDR. An ADPF approaching 1.0 (e.g., in some embodiments, plus or minus 0.25, 0.2, 0.15, 0.1, or 0.05) indicates that adaptive selection does not materially increase execution time variability relative to fixed-parameter operation. This result is contrary to the characterization in the prior approaches discussed herein that adaptation inherently weakens timing guarantees.

In embodiments of the architectures described herein, selection circuitry has fixed propagation delay that does not depend on which parameter set is selected or on the condition values that caused the selection. The value of C is therefore the same whether the parameter set was statically assigned or adaptively selected. Because M is also unchanged and K for a given parameter set is a property of the processing circuitry independent of how the parameter set was selected, the adaptive total latency for each parameter set equals the static total latency for that parameter set. Adaptive LDR therefore equals static LDR, and ADPF equals 1.0. Because M, C, and all values of K are predetermined integers, both static LDR and adaptive LDR can be computed analytically from the circuit design without runtime measurement, and ADPF has exactly one value for a given implementation regardless of measurement equipment, test conditions, or input data values.

These metrics are optional verification and characterization tools that, if desired, may be applied during design validation or testing. They are not structural requirements of the architectures described herein, and they are not required to practice such architectures. Embodiments that do not compute or measure these metrics are also contemplated. Other measurement approaches that characterize execution time independence from runtime conditions are also contemplated in some embodiments.

In some embodiments, bounded-latency parameter memory provides identical access latency regardless of which parameter set is addressed. Selection circuitry with fixed propagation delay produces selection signals independent of condition values. Processing circuitry of fixed topology executes without data-dependent branches. As a result, parameter access timing does not vary based on cache residency, configuration selection timing does not vary based on branch prediction outcomes, and processing timing does not vary based on input data values.

Prior approaches in real-time computing systems have treated the timing variability introduced by cache hierarchies, instruction pipelines, and dynamic control flow as inherent characteristics of such systems that complicate or preclude worst-case execution time analysis. See Phillip A. Laplante and Seppo J. Ovaska, Real-Time Systems Design and Analysis: Tools for the Practitioner, 4th ed., Wiley-IEEE Press (2012), Ch. 7, pp. 397-398 (observing that caches, instruction pipelines, and DMA, while designed to improve average computing performance, "destroy determinism" in real-time systems, and that traditional worst-case analysis of systems using these enhancements leads to "impractically pessimistic outcomes due to long-tailed execution time distributions"). More broadly, the same authors observe that architectural enhancements that increase processing capability tend to degrade timing determinism. See id. at Ch. 2, pp. 45-47 (observing that architectural enhancements increasing parallelism, in spite of their average-case benefits, "typically degrade the timing predictability and worst-case performance," and that "[i]t is difficult to build a deterministic embedded system" on enhanced platforms offering high peak performance). Rather than addressing this degradation through the structural properties described herein, the prior approaches discussed below responded by separating deterministic and adaptive functions across different processing resources, different platforms, or different operational phases.

In accordance with certain embodiments, these architectures differ structurally from such prior approaches through the integration of bounded-latency parameter memory, fixed-propagation-delay selection circuitry, and fixed-topology processing circuitry within a single integrated circuit. In some embodiments, selection circuitry selects among parameter sets based on condition values measured during operation. The total cycle count for each parameter set is predetermined and independent of the condition values. Adaptation and deterministic execution timing thereby coexist within a single hardware architecture.

Previous surveys of adaptive real-time systems have characterized the combination of adaptation and timing guarantees as conflicting objectives, reflecting a consensus among prior approaches that adaptation and hard timing guarantees have been separated architecturally, rather than integrated within a single processing pipeline. See Abdelmadjid Benmachiche, Khadija Rais, and Hamda Slimi, Adaptive Real-Time Scheduling Algorithms for Embedded Systems, 2nd National Conference on Artificial Intelligence and Information Technologies (2025) (e.g., describing that adaptivity in software-based real-time systems weakens timing guarantees relied upon for safety certification, and that the challenge lies in permitting adaptation safely and verifiably. Further observing that the design constraints imposed by hard real-time certification frameworks and the flexibility requirements of adaptive scheduling represent conflicting objectives. Noting that adaptive decision logic's variable timing behavior can compromise a system's ability to meet certified worst-case bounds. Noting that existing formal verification methods for real-time systems rely on assumptions of static configuration that are invalidated when runtime adaptation is introduced).

In accordance with some implementations, adaptation is performed by hardware selection circuitry with fixed propagation delay. The selection circuitry operates on parameter sets stored in bounded-latency parameter memory, rather than through software-based adaptive scheduling that shares execution resources with time-critical functions. Because the adaptation mechanism itself introduces no timing variability, the coexistence of adaptation and deterministic execution timing that prior surveys characterized as inherently conflicting is achieved through hardware integration. In these embodiments, the adaptation mechanism operates within the same processing path as the time-critical function, without contending for shared execution resources, which is the specific configuration that Benmachiche et al. characterized as compromising worst-case bounds. Because M, C, and K according to some embodiments are individually predetermined and verifiable through static timing analysis at design time, worst-case execution time analysis remains determinable at design time despite the presence of runtime adaptation. In this respect, adaptation can occur without altering the structural timing envelope of the processing pipeline, and deterministic execution timing is preserved as a design-time property rather than a runtime estimate.

The architectures described herein with respect to some embodiments perform condition measurement, parameter selection, and data processing within a single hardware architecture on a single integrated circuit. These architectures operate without transferring tasks between processing units, without suspending or halting any processing resources during parameter set transitions, and without requiring separate processors, separate operating systems, or separate middleware for adaptive and deterministic functions.

Certain prior processor architectures, safety management systems, and operating system designs have instead employed architectural separation as one approach to combining deterministic and adaptive behavior. In these prior approaches, when deterministic and adaptive functions share execution resources such as processor cores, memory buses, or cache hierarchies, the adaptive function's variable resource consumption patterns affect the deterministic function's timing behavior in ways that prevent static worst-case execution time analysis. See IBM Corp., U.S. Patent Application Publication No. 2006/0150185 (describing a multiprocessing system in which at least one processing unit is designated as a hard real-time processing unit and at least one processing unit is designated as a non-hard real-time processing unit, where tasks assigned to the hard real-time processing unit that are about to execute a non-deterministic processing step are transferred to the non-hard real-time processing unit, and tasks assigned to the non-hard real-time processing unit that have a hard real-time status are transferred to the hard real-time processing unit, such that deterministic and non-deterministic processing steps are separated across different processing units). See also Intel Corporation, U.S. Pat. No. 9,286,137 (describing systems in which a code monitor detects a time-critical code section associated with a real-time processor core and a suspend module issues a signal to a suspendable processor core, causing the suspendable processor core to halt execution during the time-critical code section, thereby providing deterministic execution through suspension of non-real-time cores rather than through concurrent deterministic operation across all cores). See also BAE Systems plc, U.S. Patent Application Publication No. 2012/0203419 (describing a safety management system in which a non-deterministic processor receives monitoring data and processes it using software agents to produce ranked control signal options, and a deterministic processor monitors behavior of the non-deterministic processor, validates control signals against safety policies, and enforces time-critical delivery of responses, where the deterministic and non-deterministic processors are supported by separate and independent operating systems and communicate via an external interface such as an application programming interface).

By way of contrast, unlike the IBM approach, embodiments of the architectures described herein, e.g., do not transfer tasks between processing units during operation. Unlike the Intel approach, in embodiments of the disclosure, no processing core is suspended or halted during parameter set transitions. Unlike the BAE approach, according to embodiments of the disclosure, adaptive and deterministic functions share a single processing pipeline without requiring separate processors, separate operating systems, or an external interface between them. In each case, adaptive and deterministic functions coexist within dedicated hardware stages, e.g., having individually bounded, value-independent cycle counts.

In some embodiments, these architectures operate within a single integrated circuit without requiring separate platform specifications, separate operating systems, or virtualization layers to isolate adaptive and deterministic functions. Prior approaches at the platform level have institutionalized separate architectural frameworks for deterministic and adaptive functions, reflecting a consensus among some conventional automotive and safety system designers that these functions require fundamentally different execution environments. See AUTOSAR (AUTomotive Open System ARchitecture, a development partnership administered from Munich, Germany), Explanations of Adaptive Platform Design, AUTOSAR AP Release 17-03, Document ID 706, March 2017 (specifying a Classic Platform for deeply embedded electronic control units (ECUs) and a separate Adaptive Platform for high-performance computing and communication mechanisms with flexible software configuration, where the Classic Platform addresses needs of ECUs with static software that does not change fundamentally during vehicle lifetime and the Adaptive Platform addresses needs of ECUs running complex functions such as environment perception and behavior planning that are updated during the vehicle lifecycle). See also Yi Zheng, Architectures for ISO 26262 Systems with Multiple ASIL Requirements, eeNews Europe, February 2015 (describing virtualization-based architectures in which different guest operating systems run on a virtualization layer to isolate safety-related components from non-safety-related components, and describing microkernel operating system architectures providing component isolation through memory protection, time partitioning, and adaptive partitioning, where a single microkernel operating system such as the IEC 61508 SIL3-certified QNX OS for Safety provides both features for infotainment systems and the dependability and protection from interference for ISO 26262 compliance). In such embodiments, the concept of per-input-item reconfiguration is absent: all parameter sets are resident in bounded-latency parameter memory at all times, and selection among them occurs through fixed-propagation-delay address changes. No bitstream is transferred, no region ceases operation, and no duplicate hardware region is required.

According to certain embodiments, the architectures described herein store all parameter sets in bounded-latency parameter memory and select among them through changes to the base address presented to the memory, such that transitions between parameter sets do not involve loading configuration bitstreams through a configuration port, do not require any processing region to cease operation during transitions, and do not introduce reconfiguration overhead cycles that scale with configuration data size. Conventional techniques in reconfigurable computing have treated configuration changes as operations requiring timing overhead in which reconfigurable regions cease operation during bitstream loading, and previous attempts to reduce this overhead have focused on increasing bitstream transfer throughput rather than eliminating bitstream loading from the per-input-item adaptive path. See Papadimitriou et al., Performance of Partial Reconfiguration in FPGA Systems: A Survey and a Cost Model, ACM Transactions on Reconfigurable Technology and Systems, Vol. 4, No. 1 (2010) (noting that even for small bitstreams in partially reconfigurable FPGAs the time to load the configuration bitstream cannot be neglected, that a bus-based system connecting the processor, partially reconfigurable modules, static modules, and configuration port can be non-deterministic and unstable due to contention between data and reconfiguration transfers, and that the actual reconfiguration throughput of the system cannot be calculated from the bandwidth of the configuration port alone because overhead added by components participating in the reconfiguration process must be taken into account). See also Liu (S.) et al., Minimizing Partial Reconfiguration Overhead with Fully Streaming DMA Engines and Intelligent ICAP Controller, Microsoft Research Technical Report MSR-TR-2009-150, September 2009 (designing fully streaming DMA engines that achieved Internal Configuration Access Port (ICAP) throughput exceeding 395 MB/s, near the theoretical 400 MB/s ceiling, combined with an intelligent ICAP controller performing runtime bitstream decompression that achieved an effective configuration data transfer throughput of 1.2 GB/s, reducing configuration time from the range of seconds to the range of milliseconds, and noting that the performance overhead incurred by partial reconfiguration can be derived by dividing the bitstream size by the configuration throughput, such that the key to minimizing this overhead is either to increase the configuration throughput or to reduce the bitstream size). See also Liu (M.) et al., Reducing FPGA Reconfiguration Time Overhead using Virtual Configurations, Proc. 5th International Workshop on Reconfigurable Communication-Centric Systems-on-Chip (ReCoSoC), Karlsruhe, Germany, pp. 149-152 (2010) (noting that the reconfigurable portion cannot work during reconfiguration due to the incompleteness of the configuration data and has to wait to resume working until the complete configuration data have been successfully loaded in the FPGA configuration memory, and proposing virtual configurations in which duplicated partially reconfigurable regions are reserved so that reconfiguration of one region occurs in the background while the active region continues operating). See also Pezzarossa et al., Using Dynamic Partial Reconfiguration of FPGAs in Real-Time Systems, Microprocessors and Microsystems, Vol. 61, pp. 198-206 (2018) (analyzing the trade-offs between hardware resource utilization and computational performance loss due to reconfiguration time overhead of dynamic partial reconfiguration, which directly affects overall worst-case execution time, and noting that interface logic may be needed to isolate the reconfigurable region from the rest of the system during reconfiguration). The architectures described herein in accordance with embodiments of the disclosure depart from these conventional reconfiguration approaches, e.g., by pre-loading parameter sets into bounded-latency parameter memory and selecting among them through fixed-propagation-delay logic and address changes rather than through bitstream transfer, region halting, or hardware duplication.

In keeping with some embodiments, parameter set transitions in the architectures described herein occur during continuous processing operation, and selection circuitry selects potentially different parameter sets for consecutive input data items without requiring an intervening non-operative phase, reconfiguration interval, or temporal separation between configuration change and processing. Some conventional deterministic interconnect architectures have achieved deterministic latency within a given fixed configuration, with transitions between configurations occurring during separate non-operative phases. See U.S. Patent Application Publication No. 2024/0048259 (describing a semiconductor device system in which signal transmission delays are latency-deterministic for a given configuration, where latencies are determined only by the implementation and configuration of hardware nodes and hard-wired connections, and where connections are static during an operative phase and are changed only during a non-operative phase, such that reconfiguration of signal routing occurs through temporal separation between operative and non-operative phases rather than through concurrent reconfiguration during continuous operation).

These architectures according to embodiments maintain deterministic execution timing across transitions between parameter sets, e.g., in that selection among pre-loaded parameter sets occurs through bounded-latency parameter memory access and fixed-propagation-delay selection logic as described herein, and no non-operative phase is required between transitions.

These architectures further distinguish from selectable-hardware-path approaches that implement multiple pre-synthesized data-paths in parallel and select among completed outputs via a multiplexer. In the architectures described herein, a single processing pipeline is used for all parameter sets. Parameter values change while the pipeline structure remains fixed. The pipeline is not duplicated.

Separately, these architectures are distinguished from approaches that achieve bounded memory access latency through locked cache regions or cache partitioning. The bounded-latency parameter memory described herein does not include tag comparison logic, set-associative lookup logic, or replacement policy logic. Access latency is independent of whether a prior access loaded the requested data into a cache line.

In various embodiments, the following structural properties distinguish the architectures described herein from prior approaches. First, selection circuitry operates on condition values through dedicated hardware without software intervention, operating system scheduling, or branch prediction. Second, parameter sets are stored in memory structures where all parameter sets are accessed through identical addressing with identical latency regardless of which set is selected. The memory access path does not vary between parameter sets. Third, processing circuitry has fixed topology and execution sequence that remain invariant across all parameter sets, with only parameter values changing, not control flow or memory access patterns. Fourth, M, C, and K values are determined at design time through static timing analysis and remain invariant at runtime.

In some conventional systems that employ cache-based memory with prefetching, software-assisted selection, or dynamic worst-case execution time (WCET) estimation, these structural constraints are not met. Execution time independence from runtime conditions is not achieved because the sources of timing variability described herein are present in the memory access, selection, and processing paths.

Prior approaches have preserved deterministic timing by isolating sources of variability into separate processors, separate platforms, separate reconfiguration phases, or separate operating systems. The architectures in accordance with embodiments described herein instead eliminate timing variability at the individual pipeline stage level, such that isolation is unnecessary and adaptive and deterministic functions coexist within a single shared processing pipeline.

According to some implementations, the processing pipeline described herein does not include, by way of example and not limitation, at least one of the following, or any combination thereof: branch prediction logic, speculative execution logic, pipeline replay logic, hazard detection logic that inserts variable-latency stall cycles, scoreboard logic, dynamic scheduling logic, bubble insertion logic, interrupt-driven pipeline interruption logic, shared bus arbitration logic in the parameter access path, cache memory in the parameter access path, microcode storage or execution, instruction decode logic, or context switching logic. The absence of these mechanisms from the processing pipeline is a structural property that contributes to the timing independence described herein.

In some embodiments, architectures as described herein are applied across multiple domains where runtime-measurable conditions drive selection among parameter sets and where deterministic execution timing is desirable. The following paragraphs describe illustrative application domains. These examples are non-limiting and demonstrate how architectural principles described herein are realized across different technical contexts.

In some embodiments, the architectures described herein can be applied to financial market data processing where rapidly changing market conditions drive selection among trading strategy configurations, and where deterministic processing latency across all trading strategy configurations is desirable. In certain implementations, measurement circuitry computes at least one market condition metric from streaming financial market data, including, for example, at least one of price volatility metrics, bid-ask spread measurements, order flow imbalance indicators, queue depth measurements at trading venues, or volume-weighted metrics, and selection circuitry selects one of a plurality of trading strategy configurations based on market condition metrics, where different trading strategy configurations correspond to different market regime configurations such as, for example, high-volatility regimes, low-volatility regimes, trending regimes, or mean-reverting regimes.

In some embodiments, processing circuitry having fixed topology executes trade setup evaluation using parameters from a selected trading strategy configuration. Processing circuitry generates trade setup outputs comprising, for example, at least one of instrument identification, opportunity scores, entry price regions, profit-taking targets, protective exit levels, or position size recommendations.

In certain implementations, trade setup evaluation latency is predetermined for each trading strategy configuration. The integrated circuit does not introduce latency variation between trading strategy configurations that would cause adverse selection in electronic trading. Adverse selection refers to the phenomenon in which variable processing latency causes a market participant to systematically receive unfavorable executions during slower processing cycles while faster participants act on the same information.

In some embodiments, the trade setup evaluation latency M plus C plus K for the selected trading strategy configuration is selected at design time such that the sum of the evaluation latency and a fixed network propagation latency budget does not exceed a target tick-to-trade latency threshold applicable to the trading venue.

In some embodiments, measurement circuitry and processing circuitry operate on a common market data snapshot boundary. Selection circuitry is configured such that a trading strategy configuration selected for a given snapshot is applied to all trade setup evaluations based on that snapshot. No trade setup evaluation associated with a given snapshot is processed using a different trading strategy configuration than any other evaluation for the same snapshot.

In some embodiments, a user defines a plurality of investment scans or decision protocols through a parameter compilation interface, and the system compiles these user-defined protocols into internal configuration tables stored in the random-access memory as trading strategy configurations. In some implementations, representative user-defined strategies include, by way of example and not limitation, intraday momentum scans, mean-reversion scans, breakout detection scans, volatility-squeeze continuation scans, trap-pattern reversal scans, and long-horizon evaluation protocols.

In some embodiments, measurement circuitry computes market condition metrics from data received from a plurality of trading venues simultaneously, for example from at least two of NYSE, NASDAQ, CBOE, or other exchange venues. Selection circuitry selects a single trading strategy configuration applicable across all trading venues based on a composite of market condition metrics from the plurality of trading venues.

In certain implementations, a market data normalization pipeline coupled to measurement circuitry converts market data from a plurality of exchange protocols, for example at least one of Nasdaq ITCH (a market data dissemination protocol), Nasdaq OUCH (an order entry protocol), Financial Information exchange (FIX) binary, or Options Price Reporting Authority (OPRA) protocols, into a unified internal representation in a fixed number of clock cycles independent of source exchange protocol.

In some embodiments, processing circuitry computes opportunity scores for a plurality of financial instruments in parallel. The third fixed number of clock cycles is independent of a number of instruments being evaluated. Metric computation, in accordance with some embodiments, is independent of order book depth up to a configured maximum number of price levels per instrument.

In certain implementations, the integrated circuit includes a multi-port market data ingress interface receiving streaming market data from a plurality of physical network ports, e.g., at least two of 10 Gigabit Ethernet, 25 Gigabit Ethernet, or 100 Gigabit Ethernet ports each connected to a different trading venue feed. A port arbiter serializes market data updates from the plurality of physical network ports into the measurement circuitry using, e.g., round-robin arbitration or priority-weighted arbitration. The port arbiter completes arbitration in a fixed number of clock cycles independent of which port presented data and independent of simultaneous arrival of data on multiple ports. Back-pressure signaling is configured such that no port starvation occurs while preserving the M-cycle determinism of the measurement stage.

In some embodiments, measurement circuitry computes cross-asset condition metrics from market data received for a plurality of related financial instruments. These metrics include, for example, at least one of rolling correlation coefficients between price series of related instruments, basis spread measurements between a futures contract and its underlying cash instrument, or implied volatility surface parameters derived from options market data across a plurality of strike prices and expirations, or any combination thereof. Each cross-asset condition metric is computed in a fixed number of clock cycles within M, independent of the number of related instruments up to a configured maximum. Selection circuitry uses the cross-asset condition metrics to select among trading strategy configurations that are responsive to inter-market relationships.

In some implementations, trading strategy configurations include at least one configuration comprising parameters for options trade structure generation including, for example, at least one of strike selection parameters, expiration selection parameters, spread construction parameters, or Greeks-based position sizing parameters. Measurement circuitry in certain implementations computes at least one order flow metric comprising, for example, at least one of trade imbalance between buyer-initiated and seller-initiated trades, large order detection metrics, or price impact estimates. Selection circuitry according to embodiments uses the order flow metric to select between trading strategy configurations having different aggressiveness levels. In some embodiments, processing circuitry optionally further executes risk calculation comprising, for example, at least one of position-level risk metrics, portfolio-level exposure metrics, or correlation-based risk assessments. The risk calculation executes in a fixed number of clock cycles independent of portfolio composition. Risk limit checks for all positions affected by a candidate trade complete within the third fixed number of clock cycles.

In some embodiments, financial instruments processed by the architecture include event contracts or prediction market contracts. Condition values include, for example, at least one of probability movement rate, contract liquidity depth, time-to-resolution metrics, cross-market correlation indicators, or implied probability divergence between related contracts. Parameter sets correspond to different evaluation configurations, e.g., high-liquidity evaluation, thin-market evaluation, or near-expiry evaluation configurations. Processing circuitry evaluates event contract positions in a fixed number of clock cycles independent of which evaluation configuration is selected.

In some implementations, a trade execution interface is optionally coupled to processing circuitry and, if desired, transmits order messages to at least one trading venue based on trade setup outputs from the processing circuitry. In other implementations, trade setups are designed for manual execution, where the system outputs human-readable summaries, numerical scores, and supporting indicators, and users or external systems review and decide whether and how to act.

In some implementations, the integrated circuit further includes a timestamp engine synchronized to an external time reference, e.g., an IEEE 1588 Precision Time Protocol grandmaster or a Global Positioning System pulse-per-second signal. The timestamp engine captures a nanosecond-precision timestamp at each of the measurement, selection, and processing stage boundaries for each market data item. The timestamps are associated with trade setup outputs to provide regulatory-compliant audit trails with sub-microsecond time attribution, e.g., as required by Markets in Financial Instruments Directive II (MiFID II) or Consolidated Audit Trail (CAT) reporting obligations.

In various embodiments, these architectural principles can be applied to, e.g., high-frequency market making, systematic trading across multiple asset classes, options market making with real-time Greeks computation, portfolio risk monitoring, market surveillance, and regulatory compliance monitoring, among other applications where deterministic processing of financial market data with runtime strategy adaptation is desirable.

In some embodiments, the architectures described herein can be applied to radar and electronic warfare signal processing where threat environment conditions drive selection among radar waveform parameter sets, and where deterministic processing within antenna dwell time allocations is desirable regardless of which waveform parameters are selected. In certain implementations, measurement circuitry computes at least one threat environment metric from received radar return data.

These metrics include, for example, at least one of signal-to-clutter ratio, target density, jamming-to-signal ratio, or threat environment classification. Selection circuitry selects one of a plurality of radar waveform parameter sets based on threat environment metrics. Different radar waveform parameter sets comprise, for example, at least one of pulse width, pulse repetition frequency, frequency agility patterns, detection threshold multipliers, or constant false alarm rate (CFAR) threshold parameters.

In some embodiments, processing circuitry having fixed topology executes radar signal processing using parameters from a selected radar waveform parameter set, comprising, for example, at least one of pulse compression, Doppler filtering, constant false alarm rate detection, or electronic counter-countermeasure processing (ECCM), or any combination thereof. In certain implementations, the third fixed number of clock cycles fits within an antenna dwell time allocation regardless of which radar waveform parameter set is selected. The antenna dwell time allocation is the fixed duration during which a radar antenna illuminates a given angular position and during which all return processing for that position completes. In some embodiments, measurement circuitry detects jamming signals, e.g., circuitry that identifies the presence of intentional interference signals in received radar returns, and computes jamming-to-signal ratio. Selection circuitry selects radar waveform parameter sets comprising electronic counter-countermeasure waveform parameters in response to detected jamming. Processing circuitry applies the electronic counter-countermeasure waveform parameters to execute, e.g., at least one of frequency agility processing, sidelobe blanking, or coherent sidelobe cancellation, or any combination thereof, within the third fixed number of clock cycles. In some embodiments, the reference window size and guard cell count for constant false alarm rate detection are stored as waveform parameter values and are selected at design time. CFAR processing of all range-Doppler cells within a dwell completes within K clock cycles independent of the number of detections within the dwell, up to a configured maximum range-Doppler map size.

In certain implementations directed to airborne radar, processing circuitry includes a space-time adaptive processing engine. The engine computes a clutter covariance matrix from training data in range cells adjacent to a cell under test and applies an adaptive weight vector to suppress ground clutter. The covariance matrix computation and weight vector application each execute in a predetermined number of clock cycles within the third fixed number of clock cycles. The number of training cells and a covariance matrix dimension are stored as parameter values in the selected radar waveform parameter set. In some embodiments, the space-time adaptive processing engine uses a reduced-rank method, e.g., principal components or cross-spectral metric, with a predetermined rank parameter stored in the selected radar waveform parameter set. The computational budget is determined by the rank parameter at design time and is independent of the actual clutter environment.

In some embodiments, the integrated circuit interfaces with an active electronically scanned array antenna through a digital beamforming front end. The digital beamforming front end forms a plurality of simultaneous receive beams from element-level digital data. Processing circuitry processes each beam through the same fixed-topology pipeline with the same third fixed number of clock cycles. Beam-specific parameter values including steering vector coefficients, sidelobe control weights, and null placement coordinates are stored as entries in bounded-latency parameter memory. Selection circuitry selects beam-specific parameter values based on threat environment metrics computed by measurement circuitry for each beam independently.

In some implementations, radar waveform parameter sets include parameter sets for at least two different radar modes comprising, for example, at least two of search mode, track mode, track-while-scan mode, or ground mapping mode. Transitions between radar modes occur within the second fixed number of clock cycles. In certain implementations directed to synthetic aperture radar, processing circuitry includes an azimuth compression pipeline that performs range migration correction and azimuth matched filtering in a predetermined number of pipeline stages within the third fixed number of clock cycles. A motion compensation engine applies phase corrections derived from inertial measurement unit data using correction coefficients from the selected radar waveform parameter set. The azimuth compression and motion compensation execute in the same third fixed number of clock cycles regardless of which motion compensation parameter set is selected. Selection circuitry selects among parameter sets corresponding to different synthetic aperture radar imaging modes, e.g., stripmap, spotlight, or scan, based on mission phase condition values detected by measurement circuitry.

In certain implementations, processing circuitry maintains a plurality of target track states in the random-access memory. The third fixed number of clock cycles is independent of a number of active target tracks up to a configured maximum. In some embodiments where waveform parameter sets correspond to radar modes having different pulse repetition frequencies, the third fixed number of clock cycles K is selected to be less than a shortest pulse repetition interval among the radar modes. Processing of each radar return completes before the next transmitted pulse regardless of which radar mode is active. In some embodiments, a pulse timing generator is optionally coupled to processing circuitry and selection circuitry, producing transmit trigger signals at intervals determined by pulse repetition frequency parameters from the selected radar waveform parameter set.

The pulse timing generator operates synchronously with processing circuitry such that radar return processing completes before a next transmit trigger. In various embodiments, these architectural principles can be applied to, e.g., airborne fire control radar, ground-based surveillance radar, naval radar, synthetic aperture radar, weather radar, electronic warfare receivers, and radar warning receivers, among other applications.

In some embodiments, the architectures described herein can be applied to wireless baseband processing where channel conditions drive selection among baseband parameter sets, and where deterministic processing within slot-boundary timing requirements is desirable regardless of which baseband parameters are selected. In certain implementations, measurement circuitry computes at least one channel condition metric, including, for example, at least one of channel quality indicator, interference level, user equipment count, or traffic type classification. Selection circuitry selects one of a plurality of baseband parameter sets based on channel condition metrics. Different baseband parameter sets comprise, for example, at least one of numerology parameters, scheduling weights, beamforming coefficients, multiple-input multiple-output (MIMO) precoding matrices, or hybrid automatic repeat request (HARQ) parameters.

In some embodiments, processing circuitry having fixed topology executes baseband signal processing using parameters from a selected baseband parameter set, comprising, for example, at least one of fast Fourier transform, channel estimation, equalization, or low-density parity-check (LDPC) decoding. In certain implementations, the third fixed number of clock cycles completes within a slot-boundary timing requirement regardless of which baseband parameter set is selected.

The slot-boundary timing requirement is determined by the wireless standard's transmission time interval. In some implementations, baseband parameter sets correspond to different numerologies having different subcarrier spacings. The third fixed number of clock cycles accommodates the shortest slot duration among the different numerologies. In some embodiments for ultra-reliable low-latency communication transmissions, K is selected such that decoding of all control and data channels associated with a transmission completes within a hybrid automatic repeat request round-trip timing requirement across all supported numerologies. In some embodiments, a forward error correction decoder within processing circuitry executes a predetermined maximum number of decoding iterations without early termination based on syndrome check results. K does not vary with channel conditions or code word error rate.

In some embodiments, processing circuitry processes a plurality of spatial layers simultaneously using MIMO precoding matrices from the selected baseband parameter set. The third fixed number of clock cycles is independent of a number of spatial layers being processed. In some embodiments, equalization for all data subcarriers of an orthogonal frequency division multiplexing symbol completes within K clock cycles independent of a number of simultaneously scheduled users, up to a configured maximum. In some embodiments directed to massive MIMO configurations, measurement circuitry includes a channel matrix estimation engine that estimates channel state information for a plurality of antenna elements, e.g., 64, 128, or 256 antenna elements, from uplink reference signals.

The engine according to some embodiments computes beamforming weight vectors through a fixed-iteration matrix decomposition, e.g., a QR decomposition or an eigenvalue decomposition implemented as a systolic array, in a predetermined number of clock cycles within the first fixed number of clock cycles independent of channel matrix condition number. The computed beamforming weight vectors are stored in bounded-latency parameter memory as part of the selected baseband parameter set.

In certain implementations, HARQ buffer memory coupled to processing circuitry stores soft bits from previous transmissions. Processing circuitry combines current received data with previously stored soft bits according to HARQ parameters from the selected baseband parameter set. The combining executes in a fixed number of clock cycles independent of a number of HARQ retransmission iterations and independent of a number of simultaneously active HARQ processes, up to a configured maximum number of HARQ processes. In some implementations, selection circuitry receives scheduling grants from a medium access control layer. Selection circuitry selects baseband parameter sets based on both the at least one channel condition metric and the scheduling grants within the second fixed number of clock cycles.

In certain implementations directed to Open Radio Access Network architectures, the integrated circuit implements high-physical-layer processing in a distributed unit, receiving frequency-domain IQ samples from a radio unit through an enhanced Common Public Radio Interface or Open Fronthaul interface. Processing circuitry executes channel estimation, equalization, MIMO detection, and channel decoding within the third fixed number of clock cycles per slot. Parameter sets include beamforming weights, precoding matrices, and modulation and coding scheme configurations received from a RAN intelligent controller through an E2 interface.

Parameter set updates from the RAN intelligent controller are loaded into bounded-latency parameter memory between slots without interrupting processing of a current slot. In some implementations directed to sidelink communication, measurement circuitry computes at least one sidelink channel condition metric from signals received on a sidelink interface, e.g., a PC5 interface for vehicle-to-everything communication. Processing circuitry executes sidelink baseband processing within the third fixed number of clock cycles compatible with sidelink timing requirements. Sidelink parameter sets include resource pool configurations and sidelink feedback channel parameters.

Selection circuitry according to some embodiments selects among sidelink parameter sets based on relative vehicle proximity and channel congestion condition values computed by measurement circuitry. In various embodiments, these architectural principles can be applied to, e.g., 5G New Radio (NR) macro base stations, small cells, Open Radio Access Network (O-RAN) distributed units, fixed wireless access terminals, private 5G networks, and satellite-terrestrial integrated networks, among other applications.

In some embodiments, the architectures described herein can be applied to power system protection where grid conditions drive selection among protection parameter sets, and where deterministic processing within protection relay timing classes is desirable regardless of fault type or grid operating conditions.

In certain implementations, measurement circuitry computes at least one grid condition metric from power system measurements, including, for example, at least one of fault current magnitude, fault type indicator, system frequency deviation, harmonic content, or distributed generation state. Selection circuitry selects one of a plurality of protection parameter sets based on grid condition metrics. Different protection parameter sets comprise, for example, at least one of trip curve parameters, overcurrent thresholds, impedance circle parameters, directional element angles, or reclosing sequence parameters.

In some embodiments, processing circuitry having fixed topology executes protection relay computation using parameters from a selected protection parameter set, comprising, for example, at least one of phasor measurement, fault detection, fault classification, or trip decision computation. In certain implementations, the third fixed number of clock cycles completes within a protection relay timing class regardless of which protection parameter set is selected. The protection relay timing class specifies a maximum time from fault inception to trip command generation as defined by applicable protection standards. In some embodiments, K is selected to be less than the standard-defined maximum operate time for the applicable protection relay timing class by a predetermined design margin. The integrated circuit satisfies the timing class under all operating conditions including clock frequency variation within a specified tolerance. In some implementations, processing circuitry implements a plurality of protection functions simultaneously comprising, for example, at least two of overcurrent protection, distance protection, differential protection, or directional protection. Each protection function completes within the third fixed number of clock cycles regardless of which protection parameter set is selected. In some embodiments, processing circuitry computes differential currents from phasor measurements received from a plurality of line terminals. Differential protection decisions complete within K clock cycles independent of a number of line terminals, up to a configured maximum.

In some embodiments, a breaker control interface coupled to processing circuitry generates trip commands within a deterministic time from detection of a fault condition. The deterministic time is independent of fault type and independent of which protection parameter set is selected. In certain implementations, measurement circuitry computes voltage and current phasors using a discrete Fourier transform executing in a fixed number of clock cycles synchronized to a power system frequency reference.

The phasor computation provides phasor measurements to selection circuitry and processing circuitry. In certain implementations, measurement circuitry receives digitized voltage and current samples from instrument transformers through a process bus interface conforming to IEC 61850-9-2 or IEC 61869-9. The process bus interface synchronizes incoming sampled value streams to the integrated circuit's clock domain using a time-alignment buffer that absorbs network jitter. The discrete Fourier transform engine computes phasors from the time-aligned sampled values in the first fixed number of clock cycles independent of jitter magnitude on the process bus. In some embodiments, reclosing sequence parameters within a selected protection parameter set define dead times and reclose times.

Processing circuitry schedules reclosing commands using hardware timers that operate with fixed-cycle resolution synchronized to the phasor computation of measurement circuitry. In some implementations, optionally, a synchrophasor output interface provides phasor measurements with timestamps conforming to a synchrophasor measurement standard. In some embodiments, protection parameter sets correspond to different grid operating states including, for example, at least two of normal operation, islanded operation, and high distributed generation penetration. Selection circuitry selects protection parameters based on detected grid state.

In certain implementations, measurement circuitry further includes a traveling wave detection engine. The engine samples voltage and current signals at a sampling rate of at least one megahertz. It detects traveling wave arrivals using a correlation-based arrival time detector comparing incoming waveforms against reference waveshapes stored in bounded-latency parameter memory. The engine computes fault distance from arrival time differences. The traveling wave detection and fault distance computation execute in a predetermined number of clock cycles within the first fixed number of clock cycles independent of fault type or traveling wave amplitude. In some embodiments, selection circuitry selects between phasor-based protection parameter sets and traveling-wave-based protection parameter sets based on detected signal characteristics. Both protection approaches complete within the same protection relay timing class.

In various embodiments, these architectural principles can be applied to, e.g., transmission line protection, distribution feeder protection, transformer differential protection, bus protection, generator protection, microgrid islanding detection, and synchrophasor measurement, among other applications.

In some embodiments, the architectures described herein can be applied to robotic control where operational conditions drive selection among control parameter sets, and where deterministic processing within fieldbus control cycle budgets is desirable regardless of which control parameters are selected. In certain implementations, measurement circuitry computes at least one operational condition metric from robotic sensors, including, for example, at least one of proximity sensor metrics, force sensor metrics, torque sensor metrics, or vision-derived classification metrics. Selection circuitry selects one of a plurality of control parameter sets based on operational condition metrics. Different control parameter sets comprise, for example, at least one of proportional-integral-derivative (PID) control gains, trajectory interpolation parameters, safety zone definitions, or compliance parameters.

In some embodiments, processing circuitry having fixed topology executes control computation using parameters from a selected control parameter set, comprising, for example, at least one of servo control computation, trajectory generation, or collision avoidance. In certain implementations, the third fixed number of clock cycles completes within a fieldbus control cycle budget regardless of which control parameter set is selected. The fieldbus control cycle budget is determined by the fieldbus timing, for example EtherCAT (a standard of EtherCAT Technology Group, Nuremberg, Germany) cycle times of 1 millisecond or faster, or PROFINET (a standard of PROFINET International, Karlsruhe, Germany) IRT cycle times.

In some implementations, a fieldbus interface coupled to processing circuitry and measurement circuitry receives sensor data and transmits actuator commands synchronously with a fieldbus clock. Processing circuitry completes control computation between consecutive fieldbus clock cycles. In some embodiments, the fieldbus control cycle period and K are selected such that a maximum displacement of a robot end-effector between detection of a safety boundary violation by measurement circuitry and issuance of a safety-limited control output by processing circuitry is less than a safety stopping distance threshold determined by the application.

In some embodiments, processing circuitry computes both a nominal control output and a safety-limited control output for each control cycle. Selection circuitry selects between nominal and safety-limited control parameter sets based on proximity to safety boundaries detected by measurement circuitry. In certain implementations, control parameter sets include at least one parameter set for each of a plurality of robot axes. Processing circuitry computes control outputs for all of the plurality of robot axes within the third fixed number of clock cycles. In some embodiments, control parameter sets include estimated payload inertia parameters for each supported payload configuration. Processing circuitry computes torque commands using the payload inertia parameters in K clock cycles independent of payload configuration. In some embodiments, measurement circuitry performs a consistency check between redundant joint position sensors within M clock cycles. Selection circuitry selects a degraded-mode control parameter set upon detecting inconsistency between the redundant sensors. In some implementations, measurement circuitry receives force and torque measurements from a force-torque sensor.

Selection circuitry according to embodiments selects between position-control parameter sets and impedance-control parameter sets based on detected contact force exceeding a threshold. In some embodiments, the integrated circuit implements a safety integrity architecture in which processing circuitry computes the safety-limited control output through a redundant processing path that is logically independent of the nominal control output path. Comparison circuitry compares outputs from the redundant processing paths within the third fixed number of clock cycles. A discrepancy between redundant path outputs that exceeds a configured threshold triggers selection of a safe-state parameter set within the second fixed number of clock cycles. In certain implementations, the safety integrity architecture further includes diagnostic circuitry that performs periodic self-test of the processing pipeline using known input-output vector pairs stored in bounded-latency parameter memory. Self-test executes during designated time slots within the fieldbus cycle without affecting the deterministic timing of the control output.

The combination of redundant processing paths with runtime diagnostic coverage supports assessment against functional safety standards, e.g., IEC 62061 (functional safety of safety-related control systems) or ISO 13849 (safety-related parts of control systems). In various embodiments, these architectural principles can be applied to, e.g., multi-axis industrial manipulators, collaborative robots, mobile autonomous platforms, computer numerical control (CNC) machine tool controllers, semiconductor wafer handling, and surgical robotics, among other applications.

In some embodiments, the architectures described herein can be applied to satellite communication processing where link conditions drive selection among modem parameter sets, and where deterministic processing within frame timing budgets is desirable regardless of which modulation and coding scheme is selected. In certain implementations, measurement circuitry computes at least one link condition metric, including, for example, at least one of link budget metrics, atmospheric fade measurements, satellite elevation angle, or Doppler shift. Selection circuitry selects one of a plurality of modem parameter sets based on link condition metrics.

Different modem parameter sets comprise, for example, at least one of modulation order, code rate, interleaving depth, or power control parameters. In some embodiments, selection circuitry applies hysteresis thresholds when comparing link condition metrics against modem parameter set boundaries. A modem parameter set is not changed unless the link condition metric has exceeded a hysteresis margin beyond the selection boundary. Evaluation of the hysteresis condition completes within C clock cycles.

In some embodiments, processing circuitry having fixed topology executes modem signal processing using parameters from a selected modem parameter set, comprising, for example, at least one of modulation, forward error correction coding, or framing. In certain implementations, the third fixed number of clock cycles completes within a frame timing budget regardless of which modem parameter set is selected. The frame timing budget is determined by the communication standard's frame structure, for example Digital Video Broadcasting-Satellite Second Generation Extension (DVB-S2X) frame timing. In some implementations, measurement circuitry computes Doppler shift rate from received signals. Processing circuitry applies Doppler compensation using parameters from the selected modem parameter set. The Doppler compensation executes within the third fixed number of clock cycles regardless of Doppler shift magnitude.

In some embodiments, a forward error correction decoder or encoder within processing circuitry executes a predetermined maximum number of iterations without early termination based on syndrome results. K does not vary with channel conditions. In some embodiments, carrier tracking loop updates and Doppler compensation corrections are applied at a symbol rate and complete within a fixed number of clock cycles per symbol independent of Doppler shift magnitude.

By way of further example, modem parameter sets include parameter sets corresponding to different satellite beam configurations. Selection circuitry selects modem parameters based on beam handover events detected by measurement circuitry. In certain implementations, at least one of a forward error correction decoder or a forward error correction encoder uses code rate parameters from the selected modem parameter set. Processing completes within the third fixed number of clock cycles regardless of code rate. In some implementations, measurement circuitry estimates rain fade attenuation from received signal strength measurements. Selection circuitry selects modem parameter sets providing increased coding protection during detected rain fade events. In various embodiments, these architectural principles can be applied to, e.g., LEO constellation ground terminals, geostationary Earth orbit (GEO) satellite transponders, satellite-to-satellite inter-orbit links, maritime very small aperture terminal (VSAT) terminals, aeronautical satellite communication, and direct-to-device satellite communication, among other applications.

In some embodiments, the architectures described herein can be applied to audio signal processing where acoustic conditions drive selection among audio processing parameter sets, and where sample-accurate timing is maintained regardless of which audio processing parameters are selected. In certain implementations, measurement circuitry computes at least one acoustic condition metric, including, for example, at least one of input signal noise floor, dynamic range metrics, source type classification, or acoustic environment metrics. Selection circuitry selects one of a plurality of audio processing parameter sets based on acoustic condition metrics. Different audio processing parameter sets comprise, for example, at least one of equalization coefficients, dynamic range compression parameters, spatial audio rendering parameters, or noise reduction parameters. In some embodiments, transitions between audio processing parameter sets are performed using crossfade interpolation of parameter values over a fixed number of audio blocks. The interpolation executes within K clock cycles without increasing K beyond the value established for the selected parameter set.

In keeping with some embodiments, processing circuitry having fixed topology executes audio signal processing using parameters from a selected audio processing parameter set, comprising, for example, at least one of digital filtering, dynamic range processing, or spatial audio rendering. In certain implementations, the third fixed number of clock cycles maintains sample-accurate timing regardless of which audio processing parameter set is selected. Sample-accurate timing means that audio output timing is deterministic to within one sample period across all parameter set selections. In some implementations, processing circuitry maintains a predetermined audio processing latency from audio input sample arrival to processed audio output sample availability. The predetermined audio processing latency is independent of which audio processing parameter set is selected. In some embodiments, K is selected such that processing of each audio block completes within a fixed fraction of a block period. The block period is determined by the audio block size and sample rate. This processing latency fraction is independent of block size up to a configured maximum.

In some embodiments, processing circuitry processes a plurality of audio channels simultaneously. The third fixed number of clock cycles is independent of a number of audio channels being processed. In certain implementations, processing circuitry applies spatial audio rendering comprising head-related transfer function filtering using filter coefficients from the selected audio processing parameter set. The spatial audio rendering executes within the third fixed number of clock cycles regardless of a number of virtual sound sources. In some implementations, measurement circuitry detects acoustic feedback onset from audio signal characteristics.

Selection circuitry according to some embodiments selects audio processing parameter sets comprising notch filter parameters targeting detected feedback frequencies. Selection and processing complete within the third fixed number of clock cycles to suppress feedback before audible oscillation occurs. In certain implementations directed to hearing aid signal processing, the integrated circuit operates within a power budget of less than five milliwatts. Measurement circuitry computes acoustic environment classification from spectral features of the input signal, e.g., classifying environments as at least one of quiet, speech-in-noise, music, wind, or traffic. Selection circuitry selects among hearing aid processing parameter sets each configured for a different acoustic environment. Parameter sets include audiogram-compensating gain-frequency curves, noise reduction aggressiveness levels, and directional microphone steering parameters. Processing completes within the third fixed number of clock cycles to maintain an end-to-end processing latency below an audibility threshold, e.g., less than ten milliseconds. In some implementations, a bilateral synchronization interface exchanges classification results and gain values with a contralateral hearing aid device through a low-power wireless link. Synchronization completes within a single audio block period to maintain binaural perception. In various embodiments, these architectural principles can be applied to, e.g., professional live mixing consoles, broadcast audio processing, hearing aid signal processing, spatial audio rendering for virtual and augmented reality, automotive cabin audio, active noise cancellation, and studio recording signal chains, among other applications.

In some implementations, the architectures described herein can be applied to network packet processing where network conditions drive selection among traffic management parameter sets, and where deterministic per-packet processing time is desirable regardless of which traffic management parameters are selected. In some embodiments, the fixed-topology processing pipeline is configured through a hardware description that specifies header parsing fields, classification match patterns, and scheduling parameters. The hardware description is compiled from a high-level pipeline specification into parameter set data and pipeline configuration data. The compiled pipeline provides deterministic per-packet processing time regardless of which classification rules match and regardless of the number of matching rules evaluated.

Classification according to some embodiments is performed through fixed-depth lookup structures rather than sequential table traversal with data-dependent search depth. In certain implementations, measurement circuitry computes at least one network condition metric, including, for example, at least one of network congestion metrics, flow priority indicators, quality of service violation indicators, or buffer occupancy levels. Selection circuitry selects one of a plurality of traffic management parameter sets based on network condition metrics. Different traffic management parameter sets comprise, for example, at least one of scheduling weights, queue management thresholds, traffic shaping parameters, or rate limiting parameters.

In some embodiments, processing circuitry having fixed topology executes packet processing using parameters from a selected traffic management parameter set, comprising, for example, at least one of packet scheduling, queue management, or traffic policing. In certain implementations, the third fixed number of clock cycles provides deterministic per-packet processing time regardless of which traffic management parameter set is selected. In some implementations, measurement circuitry monitors a plurality of traffic flows simultaneously and computes per-flow quality of service compliance metrics. Selection circuitry selects traffic management parameter sets based on aggregate quality of service compliance across the plurality of traffic flows. In some embodiments, processing circuitry applies per-class traffic policing using token buckets with parameters from the selected traffic management parameter set. Policing decisions complete within K clock cycles independent of a number of active token buckets up to a configured maximum.

In some embodiments, processing circuitry applies hierarchical scheduling comprising a plurality of scheduling levels. The third fixed number of clock cycles per packet is independent of a depth of the hierarchical scheduling and independent of a number of active traffic queues. In certain implementations, a time-sensitive networking (TSN) interface provides gate-controlled packet transmission synchronized to a network time reference. Processing circuitry completes packet processing within a time-sensitive networking guard band regardless of which traffic management parameter set is selected.

Measurement circuitry according to some implementations receives a time-aware gate control schedule and computes network condition metrics aligned to gate cycle boundaries within M clock cycles. Traffic management parameter set selection reflects current gate state at each gate cycle boundary. In some implementations, traffic management parameter sets include at least one parameter set for packet replication and elimination for redundant network paths. Processing circuitry executes replication or elimination within the third fixed number of clock cycles independent of a number of active redundant paths up to a configured maximum number of disjoint paths.

In certain implementations directed to encrypted traffic, measurement circuitry computes condition values from packet metadata and side-channel features available without payload decryption. These features include, for example, at least one of sequences of packet sizes, timing patterns, directionality indicators, handshake properties, or visible protocol metadata. Selection circuitry selects among parameter sets for anomaly detection or traffic classification based on these metadata-derived condition values. Deterministic per-packet processing time is maintained regardless of which parameter set is selected. In various embodiments, these architectural principles can be applied to, e.g., carrier-grade Ethernet switches, data center top-of-rack switches, automotive in-vehicle networking, industrial Ethernet switches, network security appliances, software-defined networking data planes, service provider edge routers, and inline security appliances processing encrypted and unencrypted traffic, among other applications.

In other embodiments, the architectures described herein can be applied to video encoding and decoding, error correction for storage controllers, image signal processing, cryptographic acceleration, or other application domains where runtime-measurable conditions drive selection among parameter sets and where deterministic execution timing is desirable, as described in further detail below.

In some embodiments, the architectures described herein are further applied to consumer and prosumer edge devices. These include, for example, augmented reality or virtual reality headsets where condition values derived from cameras, depth sensors, eye-tracking sensors, and inertial measurement units drive selection among parameter sets for head pose estimation or scene recognition, and where deterministic motion-to-photon timing is desirable. Additional edge devices include wearable health monitors where condition values derived from physiological sensors such as electrocardiogram and photoplethysmography sensors drive selection among parameter sets for anomaly detection, and where deterministic alert timing within power and thermal budgets is desirable. Additional edge devices include smart-home hubs where condition values derived from audio streams and environmental sensor telemetry drive selection among parameter sets for event detection or command recognition, or any combination thereof.

In certain implementations, the architectures described herein are further applied to energy-grid monitoring where condition values derived from synchrophasor measurements, grid-equipment telemetry, and exogenous condition feeds such as weather data drive selection among parameter sets for protection-adjacent evaluations, fault detection, or load analysis, and where deterministic processing within protection relay timing classes is desirable.

In some embodiments, the architectures described herein are further applied to multi-tenant shared computing platforms where condition values derived from per-tenant workload metrics drive selection among parameter sets for resource allocation and traffic management, and where deterministic per-tenant control loop timing is desirable for noisy-neighbor mitigation. In some embodiments, the architectures described herein are further applied to 5G and 6G network slicing where condition values derived from per-slice performance measurements across radio access, transport, and core domains drive selection among parameter sets for slice-level resource control, and where deterministic end-to-end slice control loop timing is desirable.

In some embodiments, the architectures described herein can be applied to video encoding and decoding where scene content conditions drive selection among encoding parameter sets, and where deterministic frame encoding latency is desirable for live streaming, video conferencing, and broadcast applications. In certain implementations, measurement circuitry computes at least one scene condition metric from input video data. These metrics include, for example, at least one of spatial complexity metrics derived from edge density or texture variance, temporal complexity metrics derived from motion estimation residual energy, scene change detection indicators, or quantization feedback metrics from a rate control loop, or any combination thereof. Selection circuitry selects one of a plurality of encoding parameter sets based on scene condition metrics. Different encoding parameter sets comprise, for example, at least one of quantization parameter values, intra-prediction and inter-prediction mode weighting tables, transform size selection tables, deblocking filter strength parameters, or rate control target bit allocation tables, or any combination thereof.

In some embodiments, processing circuitry having fixed topology executes video encoding operations using parameters from the selected encoding parameter set, comprising, for example, at least one of intra prediction, inter prediction, transform, quantization, or entropy coding, or any combination thereof. Encoding of a coding tree unit or macroblock completes within the third fixed number of clock cycles for each encoding parameter set, independent of scene content complexity. The predetermined number of clock cycles provides constant encoding latency per frame for a given resolution and frame rate.

In various embodiments, these architectural principles can be applied to, e.g., live broadcast encoders, video conferencing endpoints, cloud gaming streaming encoders, surveillance video encoders, and medical imaging video encoders, among other applications where deterministic frame-level encoding latency with runtime scene-adaptive parameter selection is desirable.

In certain implementations, measurement circuitry computes scene condition metrics using a spatial complexity estimator that computes edge density or transform-domain energy from a lookahead window of incoming video samples. A temporal complexity estimator computes frame-difference energy or motion vector statistics from a reference frame buffer. Each estimator completes in a predetermined number of clock cycles within the first fixed number of clock cycles independent of scene content. Processing circuitry according to some embodiments includes a motion estimation engine that evaluates candidate motion vectors over a fixed search window using a fixed search pattern, e.g., a full search over a predetermined search range or a structured multi-step search with a predetermined number of steps. The motion estimation executes in a predetermined number of clock cycles within the third fixed number of clock cycles independent of motion vector values and independent of match quality at each candidate position, and without early termination based on distortion thresholds. In certain implementations, processing circuitry further includes a transform and quantization pipeline that applies a block transform, e.g., a discrete cosine transform or an asymmetric discrete sine transform, and applies quantization using a quantization parameter value from the selected encoding parameter set. The transform and quantization execute in a fixed number of pipeline stages regardless of coefficient magnitudes.

Processing circuitry in some embodiments further includes an entropy coding engine, e.g., a context-adaptive binary arithmetic coding engine or a context-adaptive variable-length coding engine. The entropy coding engine processes a fixed maximum number of syntax elements per coding unit with unused element slots coded as zero-value symbols. Entropy coding cycle count is independent of the number of non-zero coefficients produced by quantization. In some embodiments, processing circuitry encodes each coding unit within a predetermined number of clock cycles independent of tile or slice boundaries within the frame. Tile boundaries do not alter K for coding units adjacent to the boundary.

In some embodiments, a rate control engine within measurement circuitry maintains a buffer fullness model and computes a target quantization parameter from buffer occupancy and bit budget metrics in a fixed number of clock cycles within the first fixed number of clock cycles. Selection circuitry uses the target quantization parameter as a condition value to select among encoding parameter sets corresponding to different quality-rate operating points. Parameter sets include quantization parameter values, mode decision weighting tables, and lambda values for rate-distortion optimization. In certain implementations, the third fixed number of clock cycles completes encoding of each coding tree unit within a per-coding-tree-unit time budget derived from a frame deadline. The frame deadline is determined by the target frame rate and resolution, e.g., approximately 7.5 microseconds per coding tree unit for 4K resolution at 60 frames per second with a coding tree unit size of 64×64. Deterministic per-unit encoding latency guarantees deterministic frame-level encoding latency.

In various embodiments, encoding parameter sets correspond to different video codec configurations, e.g., at least one of H.264/AVC, H.265/HEVC, H.266/VVC, or AV1. Codec-specific transform types, prediction modes, and entropy coding tables are stored as parameter values. The fixed-topology processing pipeline accommodates different codec configurations through parameter value changes rather than pipeline reconfiguration.

In some embodiments, processing circuitry accesses reference frame data from a reference frame buffer stored in bounded-latency parameter memory. Reference frame read access completes in a deterministic number of clock cycles independent of which reference frame is accessed and independent of the motion vector pointing to the accessed location. The reference frame buffer maintains a fixed maximum number of reference frames with reference frame index selection determined by parameters in the selected encoding parameter set. In certain implementations, processing circuitry further includes an in-loop filtering pipeline that applies, e.g., at least one of a deblocking filter, a sample adaptive offset filter, or an adaptive loop filter, or any combination thereof, using filter strength parameters and filter coefficient values from the selected encoding parameter set. The in-loop filtering executes in a fixed number of clock cycles per coding tree unit independent of block boundary characteristics or filter classification results.

In certain implementations, encoding parameter sets include region-of-interest encoding parameters that specify spatially varying quantization parameter offsets for designated frame regions, e.g., assigning a lower quantization parameter to a region containing a face or text overlay and a higher quantization parameter to background regions. The region boundaries and per-region offsets are stored as parameter values in the selected encoding parameter set. Processing circuitry applies the spatially varying quantization within the same third fixed number of clock cycles independent of the number or size of designated regions up to a configured maximum.

In some embodiments, encoding parameter sets correspond to different encoding layer configurations for scalable video coding, e.g., different spatial resolutions or different temporal frame rates. Each layer configuration has a predetermined third fixed number of clock cycles. Selection circuitry selects among layer-specific parameter sets based on bandwidth condition values or display resolution condition values computed by measurement circuitry.

According to some implementations, the architectures described herein can be applied to inference on learned representations where condition values such as, for example, at least one of input data quality measured as signal-to-noise ratio, processor utilization percentage, die temperature, or instantaneous power budget drive selection among parameter sets corresponding to different neural network quantization modes. Each quantization mode executes in a predetermined number of clock cycles. Perception-to-decision latency is predetermined for each parameter set in safety-critical applications such as autonomous vehicle perception.

In additional embodiments, the architectures described herein can be applied to autonomous vehicles, mobile robots, and unmanned aerial vehicles where multi-modal sensor fusion and environment-dependent processing are desirable. In certain implementations, condition values are derived from heterogeneous sensors including, for example, at least one of LiDAR units providing point cloud data, RADAR modules providing range and velocity measurements, cameras providing image data, inertial measurement units, or positioning receivers such as Global Navigation Satellite System (GNSS) receivers, or any combination thereof. In some embodiments, measurement circuitry evaluates metrics such as, for example, at least one of rain intensity, ambient illumination, vehicle velocity, LiDAR point cloud density indicating sensor confidence, camera image contrast metrics, RADAR signal-to-noise ratio, positioning dilution-of-precision measures, or inertial drift indicators, or any combination thereof.

In certain implementations, selection circuitry uses these condition values to select among parameter sets corresponding to different environmental operating modes, for example day/dry/highway, day/wet/urban, night/dry/highway, or night/wet/urban conditions. Each mode has a predetermined execution cycle count. In some embodiments, when data-quality condition values for certain sensors degrade, selection circuitry selects a parameter set that places greater emphasis on modalities with higher quality indicators. The selected parameter set has a predetermined execution cycle count. For example, the selected parameter set increases reliance on LiDAR and RADAR features while reducing reliance on camera-derived features, with a predetermined execution cycle count.

In some implementations directed to unmanned aerial vehicles, condition values further include positioning system lock status and dilution-of-precision flags. Selection circuitry selects among parameter sets configured for GNSS-reliable, GNSS-degraded, and GNSS-denied conditions. Each parameter set maintains a predetermined execution cycle count compatible with flight control loop timing. Processing circuitry generates perception outputs including, for example, at least one of object classifications, risk scores, trajectory proposals, or fused environmental representations such as occupancy grids. The third fixed number of clock cycles provides deterministic perception-to-output latency for each parameter set regardless of environmental complexity.

In some embodiments directed to multi-robot coordination, each robot in a fleet includes the architecture described herein. Condition values further include data derived from peer communication streams such as, for example, at least one of peer-reported object positions, free-space descriptions, coordination intent signals, or communication latency estimates. Selection circuitry selects among parameter sets that weight local versus peer information differently based on communication quality and peer consistency scores. Each parameter set has a predetermined execution cycle count.

In certain safety-critical applications, such deterministic timing characteristics are compatible with functional safety standards such as ISO 26262 for automotive systems. In various embodiments, similar architectural principles can be applied to, for example, multi-robot coordination systems, drone fleets, autonomous mining vehicles, agricultural robots, warehouse automation platforms, autonomous delivery vehicles, and inspection drones, among other applications.

In yet further embodiments, the architectures described herein can be applied to industrial Internet-of-Things sensor networks for predictive maintenance and anomaly detection. In certain implementations, heterogeneous sensors are mounted on industrial equipment such as, for example, at least one of motors, pumps, compressors, conveyors, or heat exchangers. These sensors provide measurements such as, for example, at least one of vibration signatures, temperature profiles, pressure readings, acoustic frequency band amplitudes, chemical concentration levels, or flow rates, or any combination thereof. In some embodiments, condition values include, for example, at least one of sensor drift indicators, rare-event scores, equipment age or maintenance history indicators, cross-sensor correlation metrics, or data-quality descriptors such as missing-sample rates and noise indices, or any combination thereof.

In certain implementations, hardware preprocessing circuitry performs domain-specific conditioning, including normalization of raw sensor codes into physical units, application of calibration curves, and compensation for known offsets and drifts for each sensor type. Multi-rate asynchronous stream alignment circuitry uses timestamps from a shared time reference together with per-sensor queues and buffer controllers to synchronize data from sensors operating at different sampling rates. Aligned multi-sensor samples are presented to downstream circuitry so that features for a given piece of equipment are computed from coherent cross-sensor snapshots even when sampling rates differ.

In some implementations, selection circuitry chooses among parameter sets corresponding to different anomaly detection sensitivities or fault isolation modes based on the condition values. When sensor drift is detected, parameter sets with drift-compensated thresholds are selected. When rare-event signatures are identified from deviations between short-horizon forecasts and actual readings, parameter sets with enhanced feature extraction are activated. Deterministic execution timing is maintained across all parameter sets.

In some embodiments, edge-deployed instances of the architecture at or near sensors on industrial equipment perform local preprocessing, feature computation, and preliminary anomaly detection. Selection circuitry at the edge chooses among parameter sets based on locally measured condition values. The edge instances transmit compact descriptors and selected raw segments upstream for further processing. Fault propagation containment circuitry monitors sensor values and anomaly scores for inconsistencies. When a sensor exhibits erratic or contradictory readings, selection circuitry selects a parameter set that isolates the affected sensor from primary decision paths and adjusts weights for neighboring sensors.

In various embodiments, these architectural principles can be applied to, for example, oil and gas pipeline monitoring, power generation turbine health monitoring, semiconductor fabrication equipment monitoring, pharmaceutical manufacturing process control, water treatment plant monitoring, and mining equipment health assessment, among other applications.

In additional embodiments, the architectures described herein can be applied to medical image reconstruction and physiological signal monitoring in diagnostic and patient monitoring systems. In certain implementations directed to image reconstruction, condition values such as, for example, at least one of patient body habitus metrics, tissue density variation, motion artifact scores, or signal-to-noise ratio measurements drive selection among parameter sets corresponding to different reconstruction algorithms. Reconstruction latency is predetermined for each parameter set.

In some embodiments directed to physiological signal monitoring, the architecture receives multichannel physiological streams such as, for example, at least one of electrocardiogram signals, electroencephalogram signals, blood-pressure waveforms, or oxygen saturation signals, or any combination thereof. Measurement circuitry computes condition values including, for example, at least one of missing-sample rates, noise indices, baseline drift estimates, or motion artifact indicators for each physiological channel. Artifact-aware conditioning logic within signal preprocessing circuitry computes data-quality descriptors that are carried forward alongside conditioned samples and used by selection circuitry to select among parameter sets.

Selection circuitry according to certain implementations selects among parameter sets corresponding to different processing configurations, such as parameter sets tuned to resting, ambulatory, or intensive-care states. Each individual parameter set has a predetermined execution cycle count. When data-quality condition values indicate degraded signal quality for a particular channel, selection circuitry selects a parameter set with reduced feature complexity or adjusted detection thresholds for that channel.

Processing circuitry in accordance with some embodiments maintains deterministic timing within the predetermined cycle count. Processing circuitry computes outputs including, for example, at least one of anomaly scores, state classifications, or alert indicators. Life-critical alert paths are associated with parameter sets having tighter timing characteristics. Each parameter set has a predetermined and deterministic cycle count. In various embodiments, these architectural principles can be applied to, for example, computed tomography reconstruction, magnetic resonance imaging reconstruction, ultrasound beamforming, bedside patient monitoring, ambulatory cardiac monitoring, and neonatal intensive care unit monitoring, among other applications.

In further embodiments, the architectures described herein can be applied to avionics flight control and navigation systems where condition values such as, for example, at least one of flight phase indicators, atmospheric pressure, airspeed, angle of attack, altitude, or turbulence intensity drive selection among parameter sets corresponding to different flight control law configurations. Worst-case execution time is predetermined for each parameter set. In certain implementations, different flight phases such as takeoff, climb, cruise, descent, approach, and landing are associated with different control law parameter sets. Selection circuitry transitions between parameter sets based on flight phase condition values within the second fixed number of clock cycles.

In some embodiments, processing circuitry computes both primary control outputs and redundant or degraded-mode control outputs. Selection circuitry selects between primary and degraded-mode parameter sets based on detected sensor health or system status condition values. In various embodiments, these architectural principles can be applied to, for example, primary flight control computers, autopilot systems, flight management systems, terrain awareness and warning systems, unmanned aerial vehicle flight controllers, and satellite attitude control systems, among other applications.

The architectures according to certain implementations described herein are realized in a range of physical forms. In an aspect, a hardware processing circuit includes an integrated circuit die or a portion of an integrated circuit die, for example at least one of an FPGA or an ASIC, that implements the fixed-latency measurement, selection, memory, and processing structures described herein.

In another aspect, in some embodiments such a circuit is deployed on an acceleration card that includes, for example, at least one of a printed circuit board, a host interface circuit such as a PCI Express interface or, if desired, a Compute Express Link interface, a hardware processing circuit having structural properties as described herein, optionally external memory for storing additional parameter sets, and optionally at least one of power management circuits, thermal sensors, or status registers accessible by a host processor, or any combination thereof.

In a further aspect, in certain implementations such a circuit is deployed on a network interface card that includes, for example, at least one of a printed circuit board configured for installation in computing equipment, network interface circuits for receiving and transmitting packets, and a hardware processing circuit for processing packets according to condition-driven parameter set selection, or any combination thereof.

In yet another aspect, in some embodiments such an architecture is integrated into a system-on-chip that includes, for example, at least one of one or more processor cores, a hardware processing circuit having structural properties as described herein, optionally shared memory accessible by both processor cores and a processing circuit, an on-chip interconnect, and optionally at least one of thermal sensors, power monitoring circuits, or performance counters serving as sources of runtime-measurable condition values, or any combination thereof.

In still further aspects, in some implementations one or more acceleration cards are installed in a host computer system or assembled into a processing appliance. In certain embodiments, each of these aspects shares a common architectural property of execution time independence from runtime condition values and differs in at least one of packaging, integration level, interface characteristics, power envelope, or target application.

In some embodiments, the architectures described herein are practiced as a hardware-implemented method for processing data. Such a method includes, for example, generating selection signals from runtime-measurable condition values, accessing parameters from a selected one of a plurality of parameter sets stored in memory having a read access latency bounded by a predetermined number of clock cycles, and processing input data using accessed parameters, wherein total processing time measured in clock cycles is independent of runtime condition values and is predetermined for each parameter set. In some implementations, such a method further includes, for example, computing runtime-measurable condition values in a first fixed number of clock cycles, generating selection signals in a second fixed number of clock cycles, and processing input data in a third number of clock cycles predetermined for a selected parameter set, such that total latency remains fixed for each parameter set across all runtime condition values.

In further embodiments, a computer-implemented method for designing such a hardware processing circuit includes, for example, at least one of analyzing timing paths of selection circuitry to determine propagation delays, allocating memory resources having bounded read access latency such as block random-access memory or embedded SRAM, configuring processing circuitry with predetermined execution cycle counts for each parameter set, and verifying through at least one of static timing analysis, simulation, or formal verification that total execution time remains independent of runtime condition values across all parameter sets, or any combination thereof.

In additional embodiments, a non-transitory computer-readable medium stores configuration data representing a hardware processing circuit having structural properties as described herein. In keeping with some embodiments, such configuration data includes, for example, at least one of hardware description language source code in formats such as, e.g., VHSIC Hardware Description Language (VHDL), Verilog, or System Verilog, gate-level netlists, FPGA bitstreams, ASIC layout data in formats such as, e.g., Graphic Database System II (GDSII), or other representations that, when synthesized, programmed into programmable logic, or fabricated into silicon, produce hardware structures exhibiting timing independence from runtime condition values as described herein, or any combination thereof. In some embodiments, such configuration data is optionally parameterized to allow configuration of, for example, at least one of parameter set counts, memory sizes, pipeline depths, condition measurement complexity, or selection circuitry thresholds.

The following sections illustratively describe architectural elements of systems as disclosed herein, some variations, and some interactions in further technical detail, across implementation technologies, application domains, and performance regimes. It will be understood that these are illustrative to aid in understanding but are not intended to be limiting.

In accordance with some embodiments of the disclosure, bounded-latency parameter memory refers to memory providing read access latency that is bounded by a predetermined maximum number of clock cycles from address presentation to valid data output. In various embodiments, bounded-latency parameter memory can include, without limitation, at least one of on-chip memory integrated on a same die as processing circuitry, off-chip memory accessed through a bounded-latency parameter memory controller, or stacked memory coupled through a synchronous physical interface with fixed pipeline depth, or any combination thereof. The bounded access latency property can arise from at least one of intrinsic physical memory structure, controller scheduling with reserved bandwidth, arbitration policies with bounded worst-case delay, or routing topologies with predetermined propagation latency, or any combination thereof. As used herein, bounded access latency refers to a predetermined maximum number of clock cycles from address presentation to valid data output that does not depend on runtime data values, access history, or cache residency state, regardless of whether individual accesses complete in fewer clock cycles than the predetermined maximum.

In some embodiments, all accesses complete in an identical number of clock cycles, while in other embodiments accesses complete within a bounded range up to the predetermined maximum. In keeping with some implementations, the specific memory technology, physical location, and access mechanism are implementation choices, and the architectural property common to all bounded-latency parameter memory embodiments described herein is that worst-case read access latency is predetermined and does not vary based on which parameter set is accessed, which parameter within a set is retrieved, or what prior access pattern has occurred.

FIG. 1 is a block diagram of integrated circuit 100 in accordance with some embodiments. As shown in FIG. 1, integrated circuit 100 comprises measurement circuitry 110, selection circuitry 120, processing circuitry 130, parameter memory 140, and dedicated memory access path 160. In some embodiments, dedicated memory access path 160 is separate from any shared interconnect, shared bus, or shared cache hierarchy used by other functional blocks on integrated circuit 100. The outer rectangle in FIG. 1 denotes the boundary of integrated circuit 100, indicating that measurement circuitry 110, selection circuitry 120, processing circuitry 130, and parameter memory 140 are fabricated on a single semiconductor die in some embodiments. In operation, input data 102 enters measurement circuitry 110, which computes one or more condition values and provides them to selection circuitry 120, which selects a parameter set and provides address signals to parameter memory 140, which returns parameter values via dedicated memory access path 160 to processing circuitry 130, which processes input data 102 using the selected parameter values to produce output data 104.

In some embodiments, measurement circuitry 110 computes condition values in M clock cycles, where M is a predetermined positive integer for a given implementation, and M does not vary with the values of input data 102 or with the condition values computed therefrom. In some embodiments, measurement circuitry 110 computes condition values using a predetermined sequence of operations with fixed iteration counts and a fixed memory access pattern, such that M does not vary with input data values regardless of the number of distinct condition values computed.

In keeping with some embodiments, measurement circuitry 110 receives condition values from input data 102, from sensor interface 170, from system state registers, or from other on-chip or off-chip monitoring circuits, or any combination thereof. Sensor interface 170 is an optional block in some embodiments that provides condition signals derived from external sensors to measurement circuitry 110. The arrow from sensor interface 170 entering the bottom of measurement circuitry 110 in FIG. 1 represents this condition signal path.

Selection circuitry 120 receives the condition values from measurement circuitry 110, identifies a parameter set index, and generates address signals directed to parameter memory 140 in C clock cycles, where C is a predetermined positive integer for a given implementation and does not vary with condition values or selection outcome in some embodiments. Address signal 146 shown in FIG. 1 is the base address signal from selection circuitry 120 to parameter memory 140 identifying the selected parameter set.

Parameter memory 140 receives address signal 146 and returns the corresponding parameter values to processing circuitry 130 via dedicated memory access path 160. Dedicated memory access path 160, shown in FIG. 1 as the routing track from the right side of parameter memory 140 to the right side of processing circuitry 130, is in some embodiments isolated from other memory traffic on integrated circuit 100, so that parameter value access latency is not affected by other memory operations. In some embodiments, optional double-buffered parameter registers 150, shown as a dashed box in FIG. 1 to indicate their optional nature, are interposed in the parameter value path between parameter memory 140 and processing circuitry 130 as described further with respect to FIG. 5.

Processing circuitry 130 processes input data 102 using the parameter values received via dedicated memory access path 160 in K clock cycles, where K is a predetermined positive integer for the selected parameter set, and K does not vary with input data values or condition values in some embodiments. The M, C, and K bracket annotations shown adjacent to each respective block in FIG. 1 indicate the clock-cycle contribution of each pipeline stage. The brace annotation "M+C+K" shown to the left of integrated circuit 100 in FIG. 1 indicates the total latency from arrival of input data 102 at measurement circuitry 110 to availability of output data 104 at the output of processing circuitry 130.

In some embodiments, on-chip bounded-latency parameter memory (hereinafter also referred to as "parameter memory" where context is clear) can include, by way of example and not limitation, at least one of embedded static random-access memory (SRAM) as found in application-specific integrated circuits (ASICs), providing single-cycle or two-cycle access at typical operating frequencies through single-port or dual-port macro configurations; block random-access memory (BRAM) as found in field-programmable gate arrays (FPGAs), e.g., Xilinx BlockRAM or UltraRAM or Intel M20K blocks, with vendor-documented fixed-cycle access latency; tightly coupled memory (TCM) providing single-cycle access as specified by processor vendor documentation without tag lookup or replacement policy; or scratchpad memory directly addressable without cache controller logic, or any combination thereof.

In certain implementations, memory timing for on-chip parameter memory is characterized by the physical geometry of the storage cells, the length of bitlines and wordlines, and the response time of sense amplifiers (circuits that detect and amplify the voltage difference on memory bit lines during a read operation), all of which are determined at fabrication time and are independent of the data values stored or the sequence in which addresses are presented.

In accordance with embodiments, other on-chip memory types and configurations providing bounded access latency, e.g., register files, distributed RAM in FPGA logic elements, or embedded magnetoresistive random-access memory (MRAM), are also contemplated. In some embodiments, the capacity of on-chip parameter memory involves a trade-off between the number of parameter sets that can be simultaneously resident and the static power dissipation of the memory, because on-chip SRAM and BRAM consume leakage power proportional to their storage capacity, and implementations can select among at least one of reducing parameter set size through quantization or compression, reducing the number of simultaneously resident parameter sets, using lower-leakage memory technologies such as embedded MRAM, or placing some parameter sets in off-chip memory accessed through a bounded-latency parameter memory controller as described herein, or any combination thereof, to balance storage capacity against power budget.

In some embodiments, parameter memory is accessed through explicit addressing without tag comparison, set-associative lookup, or replacement policy evaluation. The address presented to parameter memory uniquely identifies the storage location, and no associative comparison against stored tags is performed during the access. In keeping with some implementations, addressing uses a base address plus an offset, where the base address identifies the selected parameter set and the offset identifies a specific parameter within the set, and address generation hardware, e.g., a hardware counter producing addresses in a fixed sequence, a state machine traversing a predetermined address pattern, a read-only memory storing address sequences, or a micro-sequencer with programmable stride and wrap boundaries, produces these addresses in a predetermined order that does not vary with parameter values or condition values.

In certain implementations, the address decode logic, bitline precharge, and sense amplifier timing are physical properties of the on-chip memory structure that do not vary with access sequence or data content, such that every parameter access completes in the same predetermined number of clock cycles regardless of which parameter set is selected. In various embodiments, cache memory can be present elsewhere on the same integrated circuit for other purposes, e.g., processor instruction cache or general-purpose data cache, but is not included in the parameter memory, and the latency characteristics of such cache memory do not affect the latency of parameter access by processing circuitry or selection circuitry as described herein.

The parameter memory access path according to some embodiments does not include speculative prefetch logic, predictive request generation, or line fill buffers, and every memory access on the parameter access path is initiated by address generation hardware in response to a predetermined address sequence as described herein. In keeping with some implementations, the parameter memory access path operates independently of any cache coherency protocol present elsewhere on the integrated circuit, such that coherency snoops, invalidation requests, and coherency state transitions generated by other memory consumers do not introduce additional latency or contention on parameter memory accesses.

In accordance with some embodiments, parameter memory is physically located on a same die as measurement circuitry, selection circuitry, and processing circuitry, such that parameter access does not traverse off-die interconnects, package-level routing, or board-level signal paths, and access latency is determined by on-die wire delays and memory cell response times. Other memory organizations consistent with explicit addressing and bounded access latency are also contemplated in various embodiments.

In some embodiments, a plurality of parameter sets are simultaneously resident in parameter memory, such that all parameter sets available for selection are stored in parameter memory concurrently and selection among parameter sets is accomplished by changing the base address presented to parameter memory, without transferring parameter data from external storage, without direct memory access (DMA) operations, and without loading new data into parameter memory at the time of selection.

All parameter sets according to certain implementations are loaded into parameter memory during an initialization phase, e.g., at system startup or during a configuration phase preceding active pipeline processing, and remain resident throughout active processing. In keeping with other implementations, parameter sets can be loaded or replaced in the background through a secondary write port or a dedicated load path while active processing continues on the currently selected parameter set, provided that the loading operation does not affect the bounded access latency of reads from the active parameter set.

According to some embodiments, bounded-latency parameter memory includes a parameter set versioning mechanism in which new parameter set data is written to a shadow region of parameter memory while the current parameter set data remains available at its existing base address for active selection and processing, and upon completion of the write, an address mapping register or pointer register is updated atomically, e.g., in a single clock cycle, so that selection circuitry selects from the new parameter set data on the next selection cycle. In this arrangement, there is no processing interruption and no intermediate state in which a partially written parameter set is addressable by selection circuitry.

In some embodiments, all parameter sets are accessible through a unified address space via identical addressing logic, such that selection circuitry generates a base address identifying the selected parameter set and processing circuitry accesses individual parameters via fixed offsets from that base address. In other embodiments, parameter sets can be organized within at least one of segmented, banked, hierarchical, or indirect address spaces, or any combination thereof, provided that access latency for parameter retrieval remains bounded as described herein. In certain implementations, dedicated access paths, e.g., a dedicated port on a dual-port SRAM or a dedicated BRAM interface, couple parameter memory to processing circuitry and selection circuitry without shared arbitration logic, such that parameter access latency is independent of memory traffic from other consumers on the integrated circuit.

In keeping with other implementations, shared access paths with at least one of fixed-priority arbitration or time-division arbitration, or any combination thereof, are also contemplated, provided that worst-case arbitration delay is bounded and included within the bounded access latency of the implementation as described herein.

In some embodiments employing shared access paths, a reserved fraction of available memory bandwidth is allocated to parameter accesses through time-division scheduling or priority assignment, such that parameter access latency remains bounded even under maximum contention from other memory consumers on the shared path.

In certain implementations employing arbitration, individual accesses can complete in variable numbers of clock cycles depending on contention state, but the worst-case access latency remains bounded by a predetermined maximum that is independent of runtime data values. In some embodiments, address generation hardware produces addresses in a predetermined sequence as described herein, and the addressing mechanism presents a base address corresponding to the selected parameter set concatenated with an offset corresponding to the specific parameter within the set.

Figure 2:
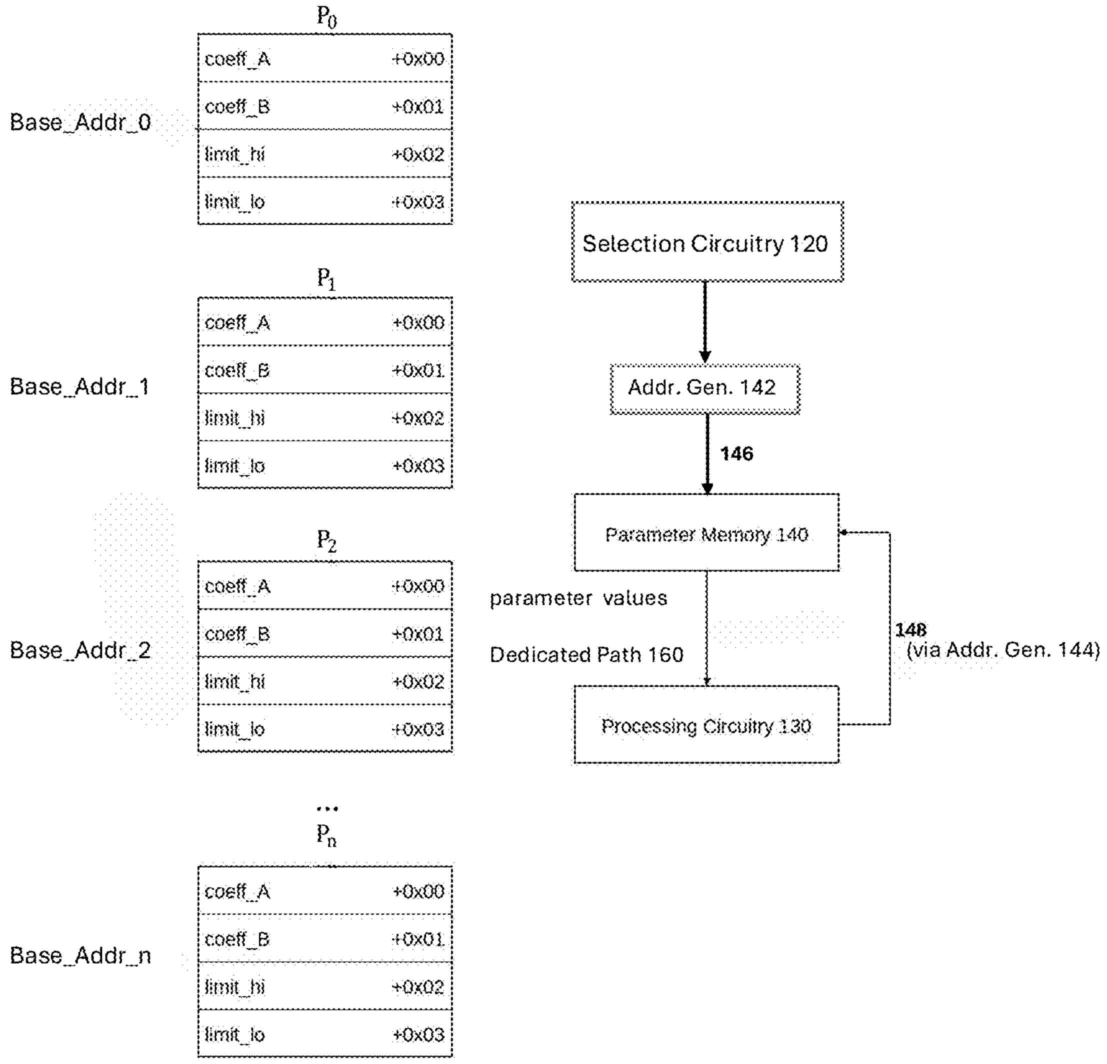
FIG. 2 is a diagram of a parameter memory addressing arrangement illustrating generation of base address signal 146 by selection circuitry 120 and offset address signal 148 by address generator 144 within processing circuitry 130 for accessing parameter memory 140 in accordance with some embodiments.

FIG. 2 illustrates, in accordance with some embodiments, the parameter memory addressing arrangement for integrated circuit 100, comprising a memory map on the left showing how parameter sets are organized within parameter memory 140, and an address-generation path on the right showing how selection circuitry 120 and processing circuitry 130 together address parameter memory 140. In operation as shown in FIG. 2, selection circuitry 120 generates base address signal 146, which identifies the start of the selected parameter set within parameter memory 140, and address generator 144 within processing circuitry 130 generates offset address signal 148, which identifies the individual parameter position within the selected set. Parameter memory 140 returns the addressed parameter values to processing circuitry 130 via dedicated memory access path 160.

As shown in the left column of FIG. 2, parameter memory 140 stores, in some embodiments, a plurality of parameter sets $P_0$ through $P_n$, where the subscript denotes the parameter set index and n+1 is the total number of parameter sets stored. Each parameter set occupies a contiguous region of parameter memory 140 identified by a respective base address, labeled "Base_Addr_0" through "Base_Addr_n" in FIG. 2. Within each parameter set, individual parameters are stored at fixed offsets from the base address, labeled "+0x00," "+0x01," "+0x02," and "+0x03" in the illustrative arrangement shown. The field names "coeff_A," "coeff_B," "limit_hi," and "limit_lo" shown in FIG. 2 are illustrative field names only (as noted in the figure) and do not represent required parameter names or a required number of parameters in any embodiment. The ellipsis between parameter set $P_2$ and parameter set $P_n$ in FIG. 2 indicates that additional parameter sets may be present in some embodiments.

As shown in the right column of FIG. 2, selection circuitry 120 provides the parameter set index to address generator 142, which is in some embodiments an internal element of selection circuitry 120 that computes base address signal 146 as a function of the parameter set index, for example by multiplying the index by the parameter set size. Address generator 142 (abbreviated "Addr. Gen. 142" in FIG. 2) is distinct from address generator 144, which resides within processing circuitry 130 and generates offset address signal 148. Address generator 144 produces offset address signal 148 as a predetermined sequence of offsets, for example using a hardware counter or state machine that traverses offsets +0x00 through +0x03 in the illustrative arrangement. The number of read operations performed by address generator 144 per input data item is a predetermined fixed integer for each parameter set, independent of input data values.

In accordance with some embodiments, the combined address presented to parameter memory 140 is the sum of base address signal 146 and offset address signal 148, and this combined address explicitly and uniquely identifies the storage location without tag lookup, set-associative comparison, replacement policy evaluation, or speculative prefetch, so that access latency is bounded and predetermined as described herein. In some embodiments, every parameter set stores parameters at the same structural offset positions, so that the same offset sequence generated by address generator 144 applies to every parameter set regardless of which parameter set is selected. The addressing arrangement shown in FIG. 2 is illustrative. Other arrangements consistent with bounded access latency are also contemplated in various embodiments.

In accordance with some embodiments, a bounded-latency parameter memory controller integrated on a same die as, or on a same package substrate as, selection circuitry and processing circuitry provides bounded-latency access to external dynamic random-access memory (DRAM) by enforcing reserved bandwidth allocation for parameter retrieval. In certain implementations, the bounded-latency parameter memory controller schedules parameter access commands in predetermined time slots within each DRAM refresh interval, e.g., by operating the DRAM interface in a closed-page policy where every access incurs a row-activate, column-read, and precharge sequence with a predetermined total cycle count, and by reserving a specified fraction of available command slots exclusively for parameter accesses, such that parameter access latency is bounded by the refresh interval duration plus one reserved slot duration regardless of concurrent traffic from other memory consumers.

In various embodiments, the bounded-latency parameter memory controller issues parameter access commands in a predetermined order within each reserved slot, e.g., a fixed sequence of activate, read, and precharge commands, without dynamic command reordering based on pending queue state, such that the command sequence and its associated cycle count are deterministic for each parameter access.

In some embodiments, the bounded-latency parameter memory controller accesses the external DRAM through a dedicated memory channel or a dedicated memory rank that is not shared with other memory consumers on the integrated circuit, such that no contention from other bus masters affects parameter access latency. In keeping with some implementations, the bounded-latency parameter memory controller can include, optionally, at least one of bank-aware command scheduling that distributes parameter accesses across DRAM banks to avoid bank conflict penalties, rank-level interleaving that exploits parallelism across multiple DRAM ranks while maintaining bounded worst-case latency, or refresh-aware scheduling that defers parameter accesses around refresh operations with bounded deferral duration, or any combination thereof.

By way of example and not limitation, error-correcting code (ECC) logic in the memory access path can add a fixed, predetermined number of additional clock cycles for ECC decoding, e.g., 1 to 3 additional cycles for single-error-correcting double-error-detecting (SECDED) codes, and this fixed ECC overhead is included in the bounded access latency of the implementation without affecting the bounded-latency property.

In other embodiments, high-bandwidth memory (HBM) in a three-dimensional stacked configuration is integrated via through-silicon vias (TSVs) with the processing die, providing high bandwidth with bounded latency through a synchronous physical interface (PHY) with fixed pipeline depth between the processing die and the HBM stack. The PHY can include a fixed number of pipeline stages, for example from 4 to 32 pipeline stages in various implementations, producing a predetermined transfer latency per pseudo-channel (a subdivision of an HBM channel having an independent data path) that does not vary with data values or access pattern.

In certain implementations, off-chip memory accessed through deterministic interconnects with at least one of fixed arbitration policies or predetermined access windows, or any combination thereof, is also contemplated, provided that read access latency for parameter retrieval is bounded by a predetermined number of clock cycles and does not vary based on dynamic arbitration, cache coherency protocols, or speculative prefetching outcomes. The selection between on-chip and off-chip parameter memory, or combinations thereof, in various implementations can be guided by parameter set size, access bandwidth, and available die area. Other off-chip memory technologies with bounded-latency access interfaces are also contemplated in various embodiments.

In some embodiments where parameter memory and processing circuitry operate in different clock domains, e.g., where off-chip DRAM operates at a memory clock frequency different from the processing clock frequency, a clock domain crossing (a boundary between circuits operating at different clock frequencies or phases) interface with a fixed, predetermined latency in processing clock cycles is optionally interposed between the memory access path and processing circuitry.

In certain implementations, the clock domain crossing interface can include, e.g., at least one of a synchronizer chain with a predetermined number of synchronization stages, a dual-clock first-in-first-out (FIFO) buffer with bounded fill latency, or a phase-aligned interface where memory and processing clocks share a common reference and a fixed phase relationship, or any combination thereof. The clock domain crossing latency can be included in the bounded access latency of parameter memory as described herein. In keeping with other implementations where parameter memory and processing circuitry share a common clock domain, e.g., when on-chip SRAM or BRAM is clocked by the same clock as processing circuitry, no clock domain crossing interface is included and parameter access latency is determined solely by the memory access path as described herein.

In various embodiments, a deterministic memory latency envelope (DMLE) can be defined, if desired, as the predetermined maximum number of clock cycles from parameter address presentation to valid parameter data output through the off-chip memory path for a given implementation. DMLE accounts for memory controller latency, interconnect latency, clock domain crossing latency, error correction decode latency, and routing delays of the specific memory subsystem configuration. DMLE is a design-time parameter of the memory controller and interconnect configuration, determined by the structural properties of the memory access path for a given implementation.

By way of illustrative example, for an FPGA implementation using dual-port BlockRAM at 200 MHz, DMLE is 2 clock cycles, corresponding to 10 nanoseconds at a 5-nanosecond clock period. For an ASIC implementation using embedded SRAM at 1 GHZ, DMLE is 1 clock cycle, corresponding to 1 nanosecond at a 1-nanosecond clock period. For a DRAM-based implementation using a bounded-latency parameter memory controller at 800 MHz, DMLE is 40 clock cycles, corresponding to 50 nanoseconds at a 1.25-nanosecond clock period, including row-activate, column-read, precharge, ECC decode, and clock domain crossing.

For a given implementation under steady-state operating conditions, DMLE is a single integer value measured in clock cycles. Because the memory access path for parameter retrieval has fixed structure without dynamic arbitration dependent on runtime data, all valid determination methods, e.g., static timing analysis of memory access paths, simulation of synthesized memory controller logic, formal analysis of arbitration worst-case latency, or on-chip measurement during operation, yield the same integer cycle count for a given memory subsystem configuration. DMLE can be verified by varying which parameter set is addressed while observing that memory access completion timing does not change.

DMLE is an optional analysis and characterization tool, and implementations that do not define or compute a DMLE value are also contemplated in some embodiments. The bounded access latency property that DMLE describes is a consequence of the memory subsystem's structural and architectural characteristics as described herein, regardless of whether a DMLE value is explicitly calculated or assigned a name in a given implementation.

According to some embodiments, a localized parameter memory ratio (LPMR) can be defined, if desired, as a ratio of parameter storage capacity in bounded-latency parameter memory to total active parameter storage, where "local" can be defined in various ways including, e.g., at least one of same die, same tile, within a predetermined number of clock cycles of access, zero network-on-chip hops, or within a specified memory hierarchy tier, or any combination thereof, and a given implementation specifies which definition of local applies. In certain implementations, maintaining LPMR above a configured threshold ensures that most or all parameter accesses occur within the bounded access latency of the implementation as described herein. For a given implementation with a specified definition of local storage, LPMR has exactly one value determined by the ratio of bounded-latency parameter storage capacity to total active parameter storage capacity.

In various embodiments, the configured threshold can be, for example, at least 0.5, for example from 0.5 to 0.999, such as from 0.6 to 0.995, for example from 0.7 to 0.99, such as from 0.75 to 0.98, for example from 0.8 to 0.97, such as from 0.85 to 0.95, and the specific threshold is selected based on application latency requirements and available bounded-latency parameter memory capacity.

LPMR is an optional placement-control metric used, if desired, during design or runtime resource allocation to guide parameter set placement decisions, and implementations that do not compute LPMR but store all active parameters in bounded-latency parameter memory are also contemplated in some embodiments. In some implementations where parameter sets exceed the capacity of on-chip bounded-latency parameter memory, LPMR can inform decisions about which parameter sets to retain in on-chip memory and which to place in off-chip memory with potentially higher but still bounded access latency as described herein.

In some embodiments, selection circuitry includes hardware logic structures that generate a parameter set index from measured condition values, with the number of clock cycles to complete selection being predetermined by the circuit topology. By way of example and not limitation, representative topologies can include, without limitation, at least one of comparator arrays where magnitude comparators or window comparators compare measured condition values against threshold values stored in registers or memory, with propagation delay determined by gate-level path length and independent of the numeric values being compared.

Additional topologies include, for example, lookup tables, e.g., direct-indexed tables implemented in block RAM or distributed logic, or content-addressable memories, providing a selection index with access latency independent of which entry is accessed or what value is stored. Finite state machines (FSMs) can also be used, where a state register holds current state and combinational next-state and output logic generates the selection output in a number of clock cycles that is predetermined by the FSM design, independent of state values or transition direction. Another example is priority encoder circuits, which identify a highest-priority active condition among multiple inputs with propagation delay determined by the number of inputs rather than by which input is active. Any combination of the foregoing can also be used.

In various embodiments, other selection topologies, including combinations of the above, are also contemplated, and the architectural property common to these embodiments is that selection completes in a second fixed number of clock cycles (C clock cycles as described herein) independent of condition values and selection outcome. In some embodiments, threshold values, lookup table entries, or FSM transition parameters used by selection circuitry are loaded from parameter memory or from dedicated configuration registers at initialization, and once loaded, these values remain static during active latency-bounded processing without affecting the C clock cycle count for selection.

According to some implementations, threshold values or lookup table entries can be updated during runtime through a secondary write port or a shadow register mechanism, e.g., by writing updated values to a shadow register set that is atomically swapped into the active register set at a predetermined pipeline boundary, such that updates take effect between input items without interrupting the C clock cycle timing of selection for any individual input item. In certain implementations, the propagation delay of selection circuitry is a function of the physical gate-level path length, transistor characteristics, and interconnect routing, none of which depend on the runtime values presented to the selection circuitry inputs.

The selection circuitry according to some embodiments completes its operation within a predetermined and bounded number of clock cycles that is independent of the functional selection outcome, such that C does not change based on which parameter set is selected or which condition values are measured. In some embodiments, selection circuitry constitutes a defined pipeline stage, referred to herein as the selection stage, that occupies C clock cycles between the measurement stage and the processing stage, with registered boundaries at the input and output of the selection stage.

Figure 3:
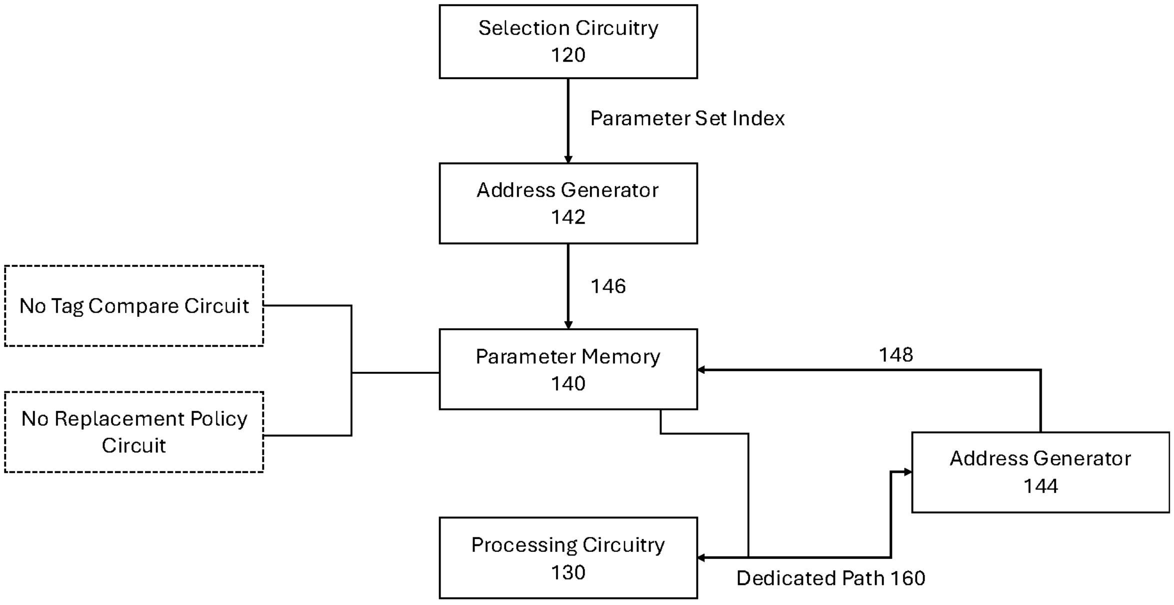
FIG. 3 is a block diagram of the parameter memory access path of integrated circuit 100 showing address generator 142, parameter memory 140, address generator 144, and dedicated memory access path 160, with no tag compare circuit and no replacement policy circuit indicated, in accordance with some embodiments.

FIG. 3 is a block diagram, in accordance with some embodiments, of the parameter memory access path of integrated circuit 100, showing the structural elements through which parameter values are addressed, retrieved, and delivered to processing circuitry 130. As shown in FIG. 3, the access path comprises selection circuitry 120, address generator 142, parameter memory 140, address generator 144, and dedicated memory access path 160 terminating at processing circuitry 130.

In operation, selection circuitry 120 provides a parameter set index to address generator 142, which computes base address signal 146 directed to parameter memory 140, as described with respect to FIG. 2. Address generator 144, shown to the right of parameter memory 140 in FIG. 3, generates offset address signal 148 directed to parameter memory 140, identifying individual parameter positions within the selected parameter set as described with respect to FIG. 2. Parameter memory 140 returns the addressed parameter values to processing circuitry 130 via dedicated memory access path 160, shown as the arrow from the bottom of parameter memory 140 to processing circuitry 130.

Two dashed boxes are shown to the left of parameter memory 140 in FIG. 3, labeled "No Tag Compare Circuit" and "No Replacement Policy Circuit." These dashed boxes represent circuit structures that are intentionally absent from the parameter memory access path of integrated circuit 100 in some embodiments. A tag compare circuit is a hardware comparator array used in cache memories to determine whether a requested address is present in the cache (a cache hit) or absent (a cache miss). The presence of a tag compare circuit introduces variable access latency because a cache miss requires a subsequent access to a slower backing memory. A replacement policy circuit is logic that selects which cache line to evict when a new entry must be stored. The presence of a replacement policy circuit introduces additional variable latency and data-dependent timing.

By showing these structures as absent, FIG. 3 illustrates that parameter memory 140 is accessed in some embodiments using explicit base-address-plus-offset addressing in which every access resolves to a known storage location in a predetermined number of clock cycles, without tag comparison, without set-associative lookup, without replacement policy evaluation, and without the possibility of a cache miss. In some embodiments, this explicit addressing structure is such that the access latency of parameter memory 140 is bounded and predetermined, and is included within K clock cycles as described herein.

Address generator 142 is in some embodiments an internal element of selection circuitry 120, as described with respect to FIG. 2, such that the latency of base address computation is included within C clock cycles. Address generator 144 is in some embodiments an internal element of processing circuitry 130, as described with respect to FIG. 2, such that the latency of offset address generation is included within K clock cycles. The arrangement shown in FIG. 3 is illustrative. Other parameter memory access path configurations consistent with bounded and predetermined access latency are contemplated in various embodiments as described herein.

In accordance with some embodiments, selection circuitry includes purely combinational logic, e.g., comparators feeding a multiplexer select line, with no registered intermediate state, such that C equals one. In such implementations, the measured condition values propagate through the comparator and multiplexer logic within a single clock period, and the parameter set index is available at the output of the selection circuitry before the next rising clock edge. In other embodiments, selection circuitry includes one or more registered pipeline stages for more complex selection logic, e.g., at least one of multi-threshold comparisons with hysteresis, multi-dimensional lookup tables, or weighted scoring functions implemented in pipelined arithmetic, or any combination thereof, such that C is greater than one but remains predetermined for the implementation. Both single-cycle and multi-cycle approaches are contemplated in various implementations, and the specific value of C depends on the complexity of the selection logic, the number of condition values being evaluated, and the operating frequency of the implementation.

In some embodiments, measurement circuitry measures two or more different types of condition values, e.g., at least one of temperature and signal quality, or power consumption and processing load, or any combination thereof, and selection circuitry optionally generates a selection based on a combination of these condition values. In certain implementations, the combination function can include, by way of example and not limitation, at least one of a weighted priority scheme, a multi-dimensional lookup table, a cascaded comparator tree, or a logical combination of individual threshold comparisons, or any combination thereof. The total selection time remains within C clock cycles regardless of which condition values are present or which combination produces the selection result.

Multiplexer circuits or equivalent routing structures according to some embodiments have data inputs coupled to parameter memory, select inputs receiving signals from selection circuitry, and outputs coupled to processing circuitry. A tree of multiplexers or equivalent routing logic routes parameter words from the memory region corresponding to the selected parameter set to the processing circuitry input ports.

In certain implementations, the multiplexer tree propagation delay is independent of which input is selected, because the electrical path from each multiplexer input to the output traverses the same number of transistor stages regardless of the select signal value. In various embodiments, parameter routing between parameter memory and processing circuitry can be implemented, without limitation, through at least one of multiplexer trees, crossbar switches, register files with indexed read ports, interconnect networks, network-on-chip routing, or address-based memory read paths, or any combination thereof, and the selection of routing topology is an implementation choice that does not affect the bounded-latency property of the parameter access path.

In some embodiments, selection circuitry generates a parameter set index through hardware logic structures, e.g., at least one of comparators, lookup tables, finite state machines, or priority encoders, or any combination thereof, without instruction fetch, program counter, stored-program execution, microcode storage, instruction decoding, or branch prediction logic. The mapping from condition values to parameter set index is implemented directly in hardware, e.g., a comparator output driving a multiplexer select line, or an FSM transition table encoded in combinational logic, such that the selection function is determined by hardware structure and its propagation delay is a property of the gate-level path length.

According to certain implementations, this structural arrangement produces selection timing that is independent of condition values and selection outcome, because the hardware logic traverses the same gate paths regardless of the specific input values presented. In accordance with some embodiments, the selection circuitry does not include an instruction memory, does not fetch or decode instructions, does not maintain a program counter or instruction pointer, and does not perform branch prediction or speculative execution, and the selection function is instead encoded in the physical arrangement of logic gates, registers, and interconnections. In various implementations, because selection circuitry operates through hardware logic structures without stored-program execution, C is determined entirely by the hardware structure at design time and remains invariant during runtime operation regardless of condition values or selection outcomes.

Measurement circuitry in some embodiments includes hardware arithmetic and sensing structures that evaluate runtime condition values in M clock cycles, where M is a first fixed number of clock cycles that is independent of the condition values being measured. Representative measurement structures can include, by way of example and not limitation, at least one of pipelined arithmetic logic units, for example fixed-latency adder trees or multiplier arrays computing running averages, variance estimates, or other statistical characterizations of input data or system state. Additional structures include hardware counters with bounded update latency, such as synchronous counters for event counting, queue depth tracking, or error rate accumulation; sensor interface circuits with deterministic sampling rates, e.g., analog-to-digital converters (ADCs) with predetermined conversion time for temperature, voltage, or current measurements; comparison units, such as threshold detectors generating binary condition flags in a single clock cycle, or any combination thereof.

Condition measurement in some embodiments is implemented in dedicated hardware circuitry, such that its execution time is determined by the circuit's physical propagation characteristics, e.g., gate depth of the adder tree, pipeline register count in the multiplier array, or conversion cycle count of the ADC, and does not depend on software scheduling, interrupt handling, or device driver execution. In keeping with some embodiments, analog-to-digital conversion completes in a fixed number of clock cycles, with the conversion cycle count determined by the conversion algorithm, e.g., successive approximation with a predetermined bit count, sigma-delta modulation with a predetermined decimation filter length, or pipeline ADC with a fixed number of pipeline stages, and the analog input value does not affect the conversion cycle count.

In accordance with aspects of the disclosure, the arithmetic logic circuits within measurement circuitry execute in a number of clock cycles that is independent of the condition values produced by those circuits, with the pipelined arithmetic traversing the same stages in the same order regardless of operand magnitudes, carry propagation patterns, or intermediate results, and as a result, the cycle count is a structural property of the pipeline depth that does not depend on data values at runtime.

Other measurement mechanisms with deterministic timing characteristics are also contemplated in various embodiments, and the architectural property common to all measurement circuitry embodiments described herein is that condition value computation completes in M clock cycles from the beginning of measurement to the availability of condition values at the output of measurement circuitry, independent of the measured values. In accordance with some embodiments, the M clock cycle contribution of measurement circuitry to total pipeline latency is predetermined at design time and does not vary with the conditions being measured, the adaptation decisions that result from those measurements, or the specific parameter set selected by selection circuitry.

In some embodiments, condition values produced by measurement circuitry can include, by way of example and not limitation, at least one of temperature measured via on-die thermal sensor and analog-to-digital converter with predetermined conversion time. Additional condition values include power consumption measured via current sense circuits or power monitoring registers with deterministic read latency; processing load characterized by hardware counters tracking queue occupancy, utilization metrics, or pending transaction counts over a predetermined observation window; signal quality computed from input data statistics, such as signal-to-noise ratio or error vector magnitude, using pipelined arithmetic completing in a predetermined number of clock cycles; error rate accumulated by hardware error counters over a configurable observation interval; network latency measured by hardware timestamp comparison circuits; threat level or security posture computed from multiple security indicators by fixed-latency combinational or pipelined logic; battery charge level read from a monitoring register or fuel gauge interface with deterministic access timing; queue depth read from a hardware counter; or bandwidth availability computed from traffic rate counters over a predetermined observation window, or any combination thereof.

In various embodiments, condition value types not listed herein are also contemplated, and multiple different condition value types can be measured simultaneously by respective measurement subcircuits operating in parallel, provided that all subcircuits complete within M clock cycles. In some embodiments, condition values are derived from on-die sources, e.g., thermal sensors or power monitors integrated on the same die as processing circuitry, while in other embodiments condition values are derived from off-die or off-chip sources, e.g., external sensor interfaces, system management bus registers, or network-side monitoring circuits, accessed through interface circuits with deterministic read latency included within M clock cycles. The architectural property common to all condition value types is that measurement completes in M clock cycles independent of the values measured, with each measurement subcircuit having a fixed pipeline depth or fixed conversion cycle count determined at design time.

In some embodiments, measurement circuitry optionally computes a composite data quality score, referred to herein as a data quality impact factor (DQIF), from multiple observable features of input data or system state. Observable features contributing to the composite score can include, by way of example and not limitation, at least one of signal-to-noise ratio, missing-sample rate, baseline drift estimate, motion artifact indicator, sensor saturation flag, or data freshness indicator, or any combination thereof. In certain implementations, the composite score is computed as, e.g., a weighted combination of component metrics, a lookup table mapping from quantized component values to a composite index, a pipelined scoring function producing a scalar output, or other configurable combination function, where the specific combination function, component weights, and number of components are application-dependent and configurable, and the architecture does not fix a particular combination function or particular component weights.

The composite quality score according to some embodiments is used by selection circuitry as one of the condition values driving parameter set selection, e.g., selecting parameter sets with higher sensitivity or more conservative processing when data quality is degraded, and its computation completes within M clock cycles as part of measurement circuitry operation. Implementations that do not compute a composite quality score, e.g., implementations where selection is driven by a single condition value or by condition values that do not include a quality metric, are also contemplated in various embodiments, and DQIF is an optional feature of measurement circuitry, not a structural requirement of the architecture.

In some embodiments, processing circuitry has a fixed topology, meaning that the arrangement and interconnection of processing elements does not change between parameter sets, and control flow, pipeline depth, and memory access patterns are invariant across all parameter sets, with only parameter values changing. In accordance with some embodiments, processing circuitry executes a fixed datapath including predetermined pipeline stages with interconnections determined at design time, for example multiplier stages, adder stages, memory access stages, accumulator stages, normalization stages, and register stages arranged in a predetermined order, such that the sequence of operations is established by the pipeline structure itself, and the pipeline does not fetch, decode, or execute instructions.

According to some implementations of the disclosure, the operation sequence is encoded in the physical interconnection of pipeline stages, and the pipeline traverses the same stages in the same order for all input data items and all parameter sets, producing K clock cycles of deterministic execution per parameter set as a structural consequence of the pipeline depth and stage interconnection.

The data processing path through processing circuitry in certain implementations does not include an instruction memory, an instruction decoder, a program counter, or a branch predictor, and the operation sequence does not depend on fetched instructions, decoded opcodes, or predicted branch targets. Other fixed-topology processing arrangements, e.g., dataflow architectures where computation is determined by hardware graph structure, systolic arrays where data flows through a fixed mesh of processing elements, or streaming architectures where data moves through a predetermined sequence of functional units, are also contemplated in various embodiments.

In some embodiments, the fixed topology of the processing pipeline is characterized by one or more of the following structural properties, or any combination thereof. The number of pipeline stages traversed by each input data item is the same for all parameter sets. Processing circuitry does not include microcode storage, instruction fetch logic, or any stored-program execution mechanism, and the processing sequence is determined entirely by the hardware pipeline structure. The interconnection of functional units within the pipeline does not change between parameter sets. No structural reconfiguration of the data-path fabric occurs during operation. No functional unit within the pipeline receives a conditional activation signal or a selective gating signal that varies based on which parameter set is currently selected. No data-dependent bypass path causes any input data item to traverse fewer pipeline stages than any other input data item processed under the same parameter set. No data-dependent forwarding path alters the number of pipeline stages between input registration and output registration. The critical path timing of the processing pipeline is determined by the physical gate-level path lengths established at design time rather than by runtime data values or runtime parameter-set selection.

Not all embodiments exhibit all of the foregoing properties. For example, in some embodiments clock gating may be applied to individual functional units provided that the predetermined number of clock cycles K for each parameter set remains unchanged and the gating pattern is determined by parameter set identity rather than by input data values. As such, clock gating does not introduce data-dependent timing variation.

In some embodiments, the function that in a stored-program architecture would specify which operations to perform and in what order is served, in embodiments disclosed herein, by the physical arrangement of pipeline stages and the parameter values loaded into bounded-latency parameter memory as described herein. In accordance with some embodiments, different computational behaviors are achieved by changing the parameter values that flow through the fixed pipeline, and the pipeline structure and operation sequence remain unchanged across all parameter sets.

By way of illustrative example, in a neural network inference implementation, different neural network models can be represented as different parameter sets containing different weight matrices, bias vectors, and activation function parameters, and the processing circuitry applies the same multiply-accumulate pipeline to all parameter sets, producing different inference results from different parameter values while traversing the same pipeline stages in the same number of clock cycles. In certain implementations directed to digital signal processing, different filter responses can be achieved by loading different filter coefficient values into the same fixed filtering pipeline, e.g., a finite impulse response filter pipeline that executes the same multiply-accumulate sequence for all coefficient sets.

In some embodiments directed to error correction, different coding configurations can be represented as different parameter sets containing different generator polynomials, puncturing patterns, or interleaving tables, and the processing circuitry applies the same encoder or decoder pipeline to all parameter sets, producing different coding protection levels from different parameter values while traversing the same pipeline stages in the same number of clock cycles.

In keeping with some embodiments, the fixed-topology pipeline structure described herein provides a broad range of computational behaviors within a fixed timing envelope, with the timing of the pipeline determined by its physical structure and independent of the parameter values flowing through it, and the number of distinct computational behaviors limited by the number of parameter sets stored in bounded-latency parameter memory and not by the pipeline structure.

In some embodiments, processing circuitry executes a predetermined sequence of operations having a fixed number of pipeline stages and no data-dependent branches within the processing pipeline, and control flow through the processing pipeline is invariant across all parameter sets and all input data items. As used in this paragraph, "within the processing pipeline" refers to the pipeline stages through which input data and parameter values flow to produce output data and does not refer to other circuitry on the integrated circuit, e.g., host interface controllers or management processors, that may include data-dependent branching for their own operation.

In certain implementations, data-dependent behavior is confined to arithmetic values, and control flow through the pipeline does not change in response to data values: each multiplier multiplies, each adder adds, and each accumulator accumulates in the same order regardless of operand values, with the results differing as parameter values and input data values differ, but the operations performed and their sequence remaining the same for every pipeline traversal.

In keeping with some embodiments, where the processing algorithm includes a conditional operation, such as applying a threshold, selecting between processing modes, or clamping a value to a range, the processing circuitry includes parallel computation paths that compute all possible outcomes simultaneously and a multiplexer or equivalent selection circuit controlled by the comparison result that selects among the computed outcomes, such that all computation paths execute in every pipeline traversal and the total cycle count is independent of the comparison outcome. This structural arrangement may be referred to in the art as predicated execution (in which all computation paths execute unconditionally and a selector chooses the result) or if-conversion (a design-time transformation that replaces conditional branches with such parallel paths).

In some embodiments, the parallel computation paths and selection circuits are implemented through at least one of multiplexers selecting between computed outcomes based on comparison flags, conditional move circuits where both source values are computed and the move selects one, or masked arithmetic circuits where both paths execute and results are combined using data-dependent masks, or any combination thereof, and the specific implementation is a design choice that does not affect the fixed-cycle-count property of the processing pipeline.

In some embodiments, the processing pipeline described herein does not include hazard detection logic that inserts variable-latency stall cycles, does not include scoreboard logic (hardware that tracks operand availability to reorder operations) or dynamic scheduling logic that reorders operations based on operand availability, does not include bubble insertion logic that introduces variable-latency idle cycles into the pipeline in response to data dependencies or resource conflicts, and does not include interrupt-driven pipeline interruption logic that suspends pipeline operation in response to asynchronous events.

The absence of these mechanisms in such embodiments is a structural consequence of the fixed-topology pipeline design described herein, in which the pipeline schedule is fully determined at design time for each parameter set, and no data hazard arises during operation because each pipeline stage receives its input from a predetermined source at a predetermined clock cycle relative to the start of processing for each input data item. Because no runtime condition causes a pipeline stage to wait for a result that is not yet available, no hardware mechanism for detecting, resolving, or recovering from such conditions is present in the processing pipeline in such embodiments. In alternative embodiments, one or more of the mechanisms described above may be present provided that the total number of clock cycles for each parameter set remains predetermined as described herein.

In certain implementations, predicated execution involves a trade-off between silicon area and timing determinism, in that computing all possible outcomes of each conditional operation consumes more logic resources than computing a single outcome, and implementations can balance this trade-off by selecting which conditionals to predicate and which to implement as fixed-outcome operations based on the application's computational requirements and available logic resources.

In accordance with some embodiments, the processing pipeline has no data-dependent branches and no data-dependent stall conditions, and as a result, pipeline forwarding paths and pipeline stage timing are fixed structural properties of the hardware. No pipeline stall, pipeline flush, or pipeline replay, e.g., no stall due to data hazard resolution, no flush due to misprediction, and no replay due to memory access conflict, occurs in response to data values, parameter values, or condition values during processing of any input data item. In some embodiments, the processing algorithm implemented in the processing pipeline is selected or designed to be amenable to branch-free execution with predicated conditionals, e.g., algorithms expressible as sequences of arithmetic operations with multiplexer-based conditional selection, and algorithms with inherently data-dependent iteration counts that cannot be converted to predetermined iteration counts, e.g., algorithms requiring convergence-based termination, are not implemented in the processing pipeline described herein. In keeping with some embodiments, multiplexers and parallel computation paths within the processing pipeline that select among computed outcomes based on parameter values or comparison results are part of the fixed topology as described herein, in that the multiplexers and all computation paths connected to them are physically present and active for all parameter sets.

According to certain embodiments, loop structures within processing circuitry have iteration counts that are predetermined and independent of input data values and condition values. By way of illustrative example, a convolution loop iterating over a predetermined-size kernel executes the same number of multiply-accumulate operations regardless of pixel values or filter coefficient values. The iteration count is determined at design time by the kernel size, not at runtime by data values.

In certain implementations, different parameter sets may specify different effective computations within the same pipeline structure, e.g., different weight values within the same matrix dimensions or different coefficient values within the same filter length, in which case K may vary between parameter sets but remains predetermined for each individual parameter set and does not depend on input data values or condition values. In keeping with some embodiments, processing circuitry accesses parameter memory according to a predetermined address sequence having a fixed number of memory accesses per parameter set, independent of input data values and condition values, and the address generator, for example a hardware counter with predetermined stride and wrap boundaries, produces addresses in a predetermined sequence determined by the pipeline design.

No individual address in the parameter access sequence in some implementations depends on a runtime computation result, a data-dependent comparison outcome, or a value read from parameter memory during the current pipeline traversal. The complete address sequence for each parameter set is deterministic from the base address and the pipeline structure. No memory fetch within the pipeline is conditional on a runtime data value, a comparison outcome, or a previously fetched parameter value.

In some embodiments, processing circuitry includes, by way of example and not limitation, at least one of multiply-accumulate (MAC) arrays for neural network inference, digital filtering, and matrix operations; digital signal processing (DSP) circuits for Fourier transforms, filtering, and spectral analysis; neural network processing circuits, such as systolic arrays, dataflow engines, or weight-stationary (in which weight parameters remain in local registers while input activations stream through processing elements) architectures; video processing circuits for transform, quantization, and entropy coding (lossless compression of quantized coefficients); packet processing circuits for header parsing, pattern matching, and classification; error correction circuits, e.g., Viterbi decoders with fixed trellis depth, low-density parity-check (LDPC) decoders with fixed maximum iteration count, or turbo decoders with predetermined iteration budget; image signal processing circuits for demosaicing, color correction, tone mapping, and noise reduction; or arithmetic logic units for general-purpose fixed-function computation, or any combination thereof.

In certain implementations, MAC arrays pack multiple lower-precision operations into higher-precision multiplier hardware, such that execution time remains the same across quantization precision levels, e.g., a 16-bit multiplier executing one 16-bit floating-point (FP16) multiplication or two 8-bit integer (INT8) multiplications or four 4-bit integer (INT4) multiplications in the same number of clock cycles, with the number of effective operations per cycle varying by precision while the cycle count remains fixed.

In keeping with some embodiments, operations such as division or square root are implemented as pipelined functional units with fixed pipeline depth, e.g., a pipelined divider that accepts one operand pair per clock cycle and produces a quotient after a fixed number of pipeline stages regardless of operand values, and the latency of each operation is a structural property of the functional unit. This latency does not depend on operand values or intermediate computation results.

In accordance with some embodiments, iterative algorithms within processing circuitry, e.g., iterative decoders or iterative solvers, execute a predetermined maximum number of iterations regardless of convergence behavior, such that early termination based on convergence criteria does not occur and the cycle count is determined by the iteration budget at design time, independent of runtime convergence behavior. Other processing circuit types are also contemplated in various embodiments, and the architectural property common to all processing circuitry embodiments described herein is that processing completes in K clock cycles per parameter set, where K is predetermined for each parameter set and does not depend on input data values.

K is identical for all parameter sets in some embodiments, such that all parameter sets produce the same processing time measured in clock cycles. In other embodiments, K varies between parameter sets, e.g., by less than twenty percent of a maximum K value across parameter sets. By way of illustrative example, if the maximum K across parameter sets is 200 clock cycles, the minimum K is at least 160 clock cycles in such embodiments. In certain implementations, pipeline padding is optionally used to equalize K across parameter sets where exact equality is desired, e.g., inserting wait states, no-operation pipeline stages, or register delay stages at the end of a shorter pipeline path such that all parameter sets produce the same K value. The twenty percent threshold is one illustrative threshold. Other thresholds, e.g., at least one of less than ten percent variation, less than five percent variation, less than one percent variation, or zero variation (identical K), or any combination thereof, and other approaches to managing K variation across parameter sets, e.g., designing all parameter sets to have inherently identical pipeline traversal counts, are also contemplated in various implementations. In keeping with some embodiments, regardless of whether K is identical or varies within a bounded range across parameter sets, K for each individual parameter set is predetermined and does not depend on input data values, condition values, or runtime computation results.

In some embodiments, parameter sets control computational behavior including algorithmic parameters, e.g., at least one of filter coefficients, neural network weights and biases, detection thresholds, quantization levels, scaling factors, lookup table entries, or transform matrix coefficients, or any combination thereof, and exclude operating frequency values and supply voltage values, such that clock frequency and supply voltage remain unchanged across parameter set transitions. In keeping with some embodiments, clock frequency is unchanged across parameter set transitions, such that execution time independence measured in clock cycles directly corresponds to execution time independence measured in wall-clock time, e.g., if K equals 1000 clock cycles at 200 MHz for all parameter sets, the wall-clock processing time is 5.0 microseconds for all parameter sets.

According to certain implementations, all processing units within the fixed topology are active for all parameter sets, e.g., all multiply-accumulate units, all adder units, and all normalization units execute on every clock cycle, without selectively activating or deactivating processing units based on parameter set selection, such that power dissipation patterns, thermal profiles, and timing characteristics are consistent across parameter sets. In keeping with some embodiments, different computational behaviors are achieved by changing the parameter values processed by the uniformly active processing units, not by changing which processing units are active or by gating clock signals to selected processing units. This uniform activity provides consistent power dissipation and thermal behavior across parameter set transitions. Consistent power dissipation corresponds to consistent timing characteristics, given that gate delays in complementary metal-oxide-semiconductor (CMOS) circuits are functions of temperature and supply voltage, both of which remain stable when power dissipation patterns are consistent.

Other parameter types not listed herein, e.g., routing table entries, protocol configuration parameters, or address mapping parameters, are also contemplated in various embodiments, provided that such parameters control computational behavior of processing circuitry and exclude operating frequency and supply voltage values as described herein. In some embodiments, maintaining all processing units active for all parameter sets involves a trade-off between timing consistency and dynamic power consumption, in that uniformly active processing units consume dynamic power on every clock cycle regardless of whether a given unit's output contributes to the final result for the current parameter set.

Implementations can balance this trade-off by selecting the number and granularity of processing units, the operating voltage, and the clock frequency based on the application's power budget and timing requirements. In other embodiments, clock gating or power gating may be applied to processing units that are not in the active computation path for a given parameter set, e.g., gating clock signals to multiply-accumulate units whose outputs are masked to zero for the current parameter set, provided that K remains predetermined for each parameter set and the gating pattern is determined by the parameter set selection and not by input data values.

As used herein, timing independence and identical access latency refer to timing properties within the synchronous clocked digital domain of the integrated circuit, measured from a first registered clock edge at which an input is captured to a registered clock edge at which an output is available. Timing properties described herein do not extend to analog signal conditioning, analog-to-digital converter settling time, metastability (an indeterminate logic state that can arise when a signal is sampled across unsynchronized clock domains) resolution at asynchronous domain boundaries, or off-chip signal propagation outside the synchronous digital domain. In some embodiments, the circuit's timing properties begin at the first synchronous clock edge after input synchronization is complete.

In some embodiments, double-buffered registers hold parameter values from the selected parameter set, with an active register bank supplying parameter values to processing circuitry during processing of a current input data item while a shadow register bank is concurrently loaded with parameter values for a next selection from parameter memory. In accordance with some embodiments, the active register bank and the shadow register bank each include a set of registers, e.g., flip-flop arrays, register files, or latch banks, sufficient to hold a complete parameter set or a portion thereof used by one or more pipeline stages. The two banks are coupled to parameter memory, e.g., on-die SRAM, off-die SRAM, or a dedicated partition of a shared memory device, through a loading interface.

Processing circuitry according to embodiments receives parameter values through a multiplexer or equivalent switching circuit that selects which bank supplies values to the pipeline. In certain implementations, register banks are swapped at a pipeline stage boundary, for example between consecutive input data items, by toggling a bank select signal that redirects the multiplexer or equivalent switching circuit, so that the swap completes in, for example, a single clock cycle or a small number of clock cycles and does not interrupt processing circuitry operation. After the swap, the previously active bank becomes the shadow bank available for loading the next parameter set. Other register bank swap mechanisms, such as pointer-based bank selection, circular buffer indexing, or multi-bank rotation with more than two banks, are also contemplated in various embodiments.

In keeping with some embodiments, the register bank swap is coordinated with selection circuitry output, so that when selection circuitry identifies a new parameter set index for a next input data item, the shadow bank is loaded from parameter memory at the base address corresponding to the new index while the active bank continues to supply parameter values for the current item. The parameter set size and memory interface bandwidth are selected so that loading of the shadow bank completes within the time available before the next swap.

In some embodiments, the register banks, the parameter memory loading interface, and processing circuitry operate within a common clock domain. In other embodiments, parameter values are read directly from bounded-latency parameter memory on each access without double buffering, and double buffering is an optional structural arrangement that may further reduce effective parameter access latency in some implementations. Both double-buffered and direct-access configurations are contemplated in various embodiments.

A default parameter set, e.g., a parameter set stored at a predetermined base address or a parameter set designated during system initialization, in some embodiments is loaded into the active register bank during power-on or reset, and subsequent parameter set transitions are performed as described herein. In some embodiments, parameter set switching as described herein occurs without flushing the pipeline, without stalling any pipeline stage, without restarting pipeline operation, and without draining in-flight data items from the pipeline, such that the pipeline continues processing input data items on every clock cycle throughout the parameter set transition.

In accordance with aspects of the disclosure, transitions between parameter sets occur without partial reconfiguration of programmable logic, without interruption of data processing, and without reconfiguration overhead cycles. In some embodiments, the processing circuitry's pipeline structure, physical interconnections, and control flow remain unchanged across all parameter set transitions, with the data values, i.e., the parameter values, flowing through the pipeline changing from one parameter set to another.

In certain implementations, parameter values are stored in bounded-latency parameter memory as described herein and accessed through the same deterministic addressing mechanism used during normal processing, so that selecting a different parameter set involves, by way of example and not limitation, presenting a different base address to the parameter memory, e.g., incrementing a base address register, loading a new base address from selection circuitry output, or indexing into an address mapping table. This address change completes within the existing memory access timing. The transition does not involve a configuration port, a bitstream transfer, a configuration controller, a look-up table rewrite, a routing resource modification, or any combination thereof.

In keeping with some embodiments, the integrated circuit's programmable logic configuration, including, without limitation, look-up table contents, routing resource configurations, and configurable logic block interconnections in FPGA implementations, remains identical before, during, and after each parameter set transition. According to some implementations of the disclosure, no processing region on the integrated circuit is taken offline, blanked, or placed in an inactive state during parameter set transitions, and all pipeline stages, such as measurement circuitry, selection circuitry, and processing circuitry, remain operational throughout each transition.

According to various embodiments, a single instance of the processing pipeline serves all parameter sets stored in bounded-latency parameter memory, with computational diversity achieved, e.g., through different parameter values flowing through the single pipeline instance as described herein, and the number of distinct computational behaviors available to the integrated circuit is determined by the number of parameter sets stored in bounded-latency parameter memory.

In some embodiments, selection circuitry selects potentially different parameter sets for consecutive input data items without a reconfiguration interval between those items. In accordance with some embodiments, the pipeline processes item N using parameter set $P_N$ and processes item N+1 using parameter set $P_{\{N+1\}}$, where $P_{\{N+1\}}$ may differ from $P_N$, for example in response to a changed condition value measured by measurement circuitry, with no idle cycles, no reconfiguration cycles, and no pipeline drain between the processing of item N and the processing of item N+1.

In certain implementations, this per-item parameter set selection is accomplished through the structural arrangement in which parameter set transitions involve address changes in bounded-latency parameter memory, e.g., updating a base address register with the output of selection circuitry or indexing into a parameter set address table, and, optionally, register bank swaps as described herein. Both operations complete within the existing pipeline timing and do not introduce additional cycles beyond the predetermined M, C, and K clock cycles allocated to each item. In keeping with some embodiments, the pipeline operates as a continuous stream processor in which input data items flow through measurement, selection, and processing stages in sequence, with each item potentially receiving a different parameter set selected by condition values measured for that item, and the throughput of the pipeline, measured in items per unit time, is not reduced when consecutive items use different parameter sets.

By way of illustrative example, a pipeline processing wireless communication symbols may apply a first modulation-specific parameter set to symbol N and a second modulation-specific parameter set to symbol N+1 with no throughput penalty between the two symbols. Other continuous operation modes, such as batch processing where a sequence of items uses the same parameter set before a transition, or periodic reselection where selection circuitry evaluates condition values at configurable intervals, are also contemplated in various embodiments. In keeping with some implementations, the maximum rate of parameter set change is one parameter set transition per input data item, and this maximum rate is sustained without throughput reduction, without additional latency per item, and without idle or overhead cycles between items.

In some embodiments, measurement circuitry, selection circuitry, and processing circuitry execute as stages of a single hardware pipeline, with data flowing from measurement through selection to processing via physically interconnected hardware signal paths, e.g., registered data buses, pipeline registers, and point-to-point interconnections. In accordance with some embodiments, there is no task migration between separate processing units, no arbitration between competing execution contexts, and no operating system scheduler in the data path, and the progression of data through the pipeline is determined, for example, by the hardware pipeline structure and clock signal and not by a software scheduler or interrupt controller. In certain implementations, all circuitry on the integrated circuit that participates in the parameter-selective processing pipeline operates concurrently during parameter set transitions, e.g., measurement circuitry continues computing condition values for incoming data, selection circuitry continues generating parameter set indices from those condition values, and processing circuitry continues processing data with the currently selected parameter set, with no suspension of any pipeline stage during the transition.

In keeping with some embodiments, dedicated memory access paths and fixed-propagation-delay hardware logic provide timing isolation structurally, in that parameter memory access does not traverse shared cache hierarchies, shared interconnect fabrics, or shared memory controller arbitration queues, such that concurrent operation of at least one of host interface controllers, management processors, direct memory access engines, debug interfaces, or peripheral controllers, or any combination thereof, does not affect the timing of the parameter-selective processing pipeline. No memory arbitration decision within the parameter access path depends on runtime data values, condition values, or the identity of the selected parameter set. In accordance with some embodiments, parameter memory is accessed in read-only mode by the processing pipeline during operation, with parameter set contents written, e.g., during initialization, during a maintenance window, or by an external management interface, such that no write conflicts or memory coherency overhead arises between pipeline stages accessing parameter values concurrently.

In various embodiments, no processor core or processing unit is suspended, halted, or placed in a reduced-activity state in response to a parameter set transition, and the integrated circuit does not include a supervisory mechanism, including, e.g., a watchdog timer, a configuration state machine, or a dual-processor supervisor, that pauses one processing unit or pipeline stage while another processing unit or pipeline stage completes a configuration change. In some embodiments, no pipeline stage undergoes a micro-reset, a local reset, or a state reinitialization during or after a parameter set transition, and all pipeline stage registers maintain valid data throughout the transition.

Figure 4:
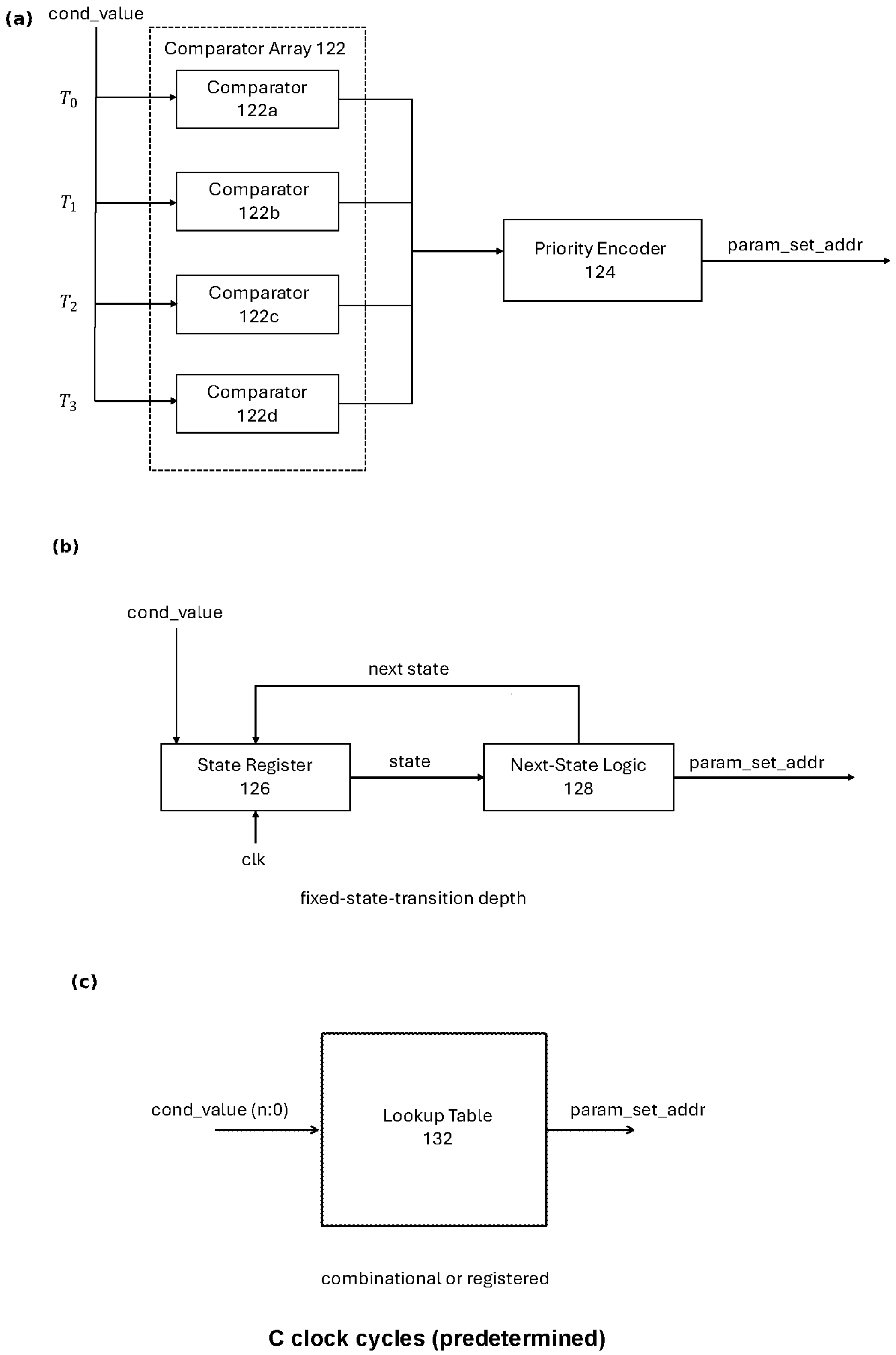
FIG. 4 is a diagram of three implementation topologies for selection circuitry 120, comprising panel (a) a comparator array topology, panel (b) a finite state machine topology, and panel (c) a lookup table topology, in accordance with some embodiments.

FIG. 4 illustrates, in accordance with some embodiments, three alternative implementation topologies for selection circuitry 120, shown in panels (a), (b), and (c). All three topologies share the property that the time required to produce the parameter set address output is C clock cycles, where C is predetermined and does not vary with condition values or selection outcome. The choice among topologies is an implementation decision that does not affect the bounded-latency properties described herein. In each panel, the input is a condition value received from measurement circuitry 110, and the output labeled "param set addr" is the parameter set address provided to address generator 142 to form base address signal 146 directed to parameter memory 140 as described herein.

Panel (a) of FIG. 4 illustrates a comparator array topology. Selection circuitry 120 in panel (a) comprises comparator array 122, containing comparator instances 122*a*, 122*b*, 122*c*, and 122*d*, each comparing the condition value against a respective threshold value $T_0$, $T_1$, $T_2$, or $T_3$, where $T_0$ through $T_3$ are threshold values stored in or supplied to selection circuitry 120 and represent the boundaries between adjacent parameter set regions. The outputs of comparator instances 122*a* through 122*d* are provided to priority encoder 124, which encodes the highest-priority active comparator output as the parameter set address. In some embodiments, the comparator array topology of panel (a) is combinational, such that C equals the number of registered pipeline stages between the condition value input and the parameter set address output, which may be as few as one clock cycle in some embodiments.

Panel (b) of FIG. 4 illustrates a finite state machine topology. Selection circuitry 120 in panel (b) comprises state register 126, clocked by the pipeline clock signal, and next-state logic 128, which receives the current state from state register 126 and the condition value, and produces both the next state fed back to state register 126 and the parameter set address output. The "fixed state-transition depth" annotation in panel (b) indicates that the state machine reaches the output-producing state in a fixed number of clock transitions regardless of condition values, such that C is the number of clock cycles required for the state machine to complete its evaluation.

Panel (c) of FIG. 4 illustrates a lookup table topology. Selection circuitry 120 in panel (c) comprises lookup table 132, which may be implemented as a read-only memory, a block random-access memory, or any equivalent addressed storage structure, accepting the condition value as an address input and producing the parameter set address directly. The annotation "combinational or registered" indicates that lookup table 132 may be implemented with or without output registers depending on timing requirements. In some embodiments, C for the lookup table topology equals the access latency of lookup table 132 expressed in clock cycles.

Figure 5:
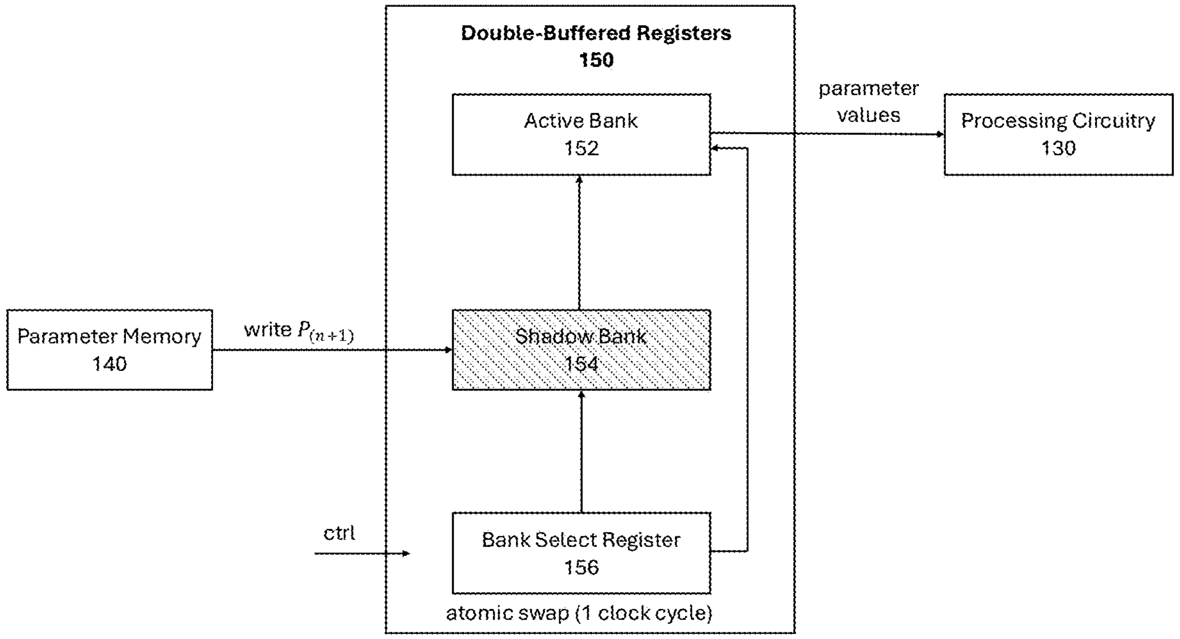
FIG. 5 is a block diagram of double-buffered parameter registers 150 comprising active bank 152, shadow bank 154, and bank select register 156 in accordance with some embodiments.

FIG. 5 is a block diagram, in accordance with some embodiments, of optional double-buffered parameter registers 150, comprising active bank 152, shadow bank 154, and bank select register 156, together with parameter memory 140 as the write source and processing circuitry 130 as the read destination. The outer rectangle in FIG. 5 represents double-buffered parameter registers 150 as a whole. In operation, active bank 152 supplies parameter values to processing circuitry 130 via the "parameter values" path on the right side of FIG. 5, while parameter memory 140 concurrently writes a subsequent parameter set into shadow bank 154 via the write path on the left side of FIG. 5, without interfering with reads from active bank 152. A bank swap, indicated by "atomic swap (1 clock cycle)" adjacent to bank select register 156 in FIG. 5, promotes shadow bank 154 to active bank 152 in a single clock cycle, or in some embodiments a small predetermined number of clock cycles.

Active bank 152, shown in FIG. 5 as the upper register bank within double-buffered parameter registers 150, holds the parameter set currently in use by processing circuitry 130 and supplies those values with fixed, predetermined read latency. Shadow bank 154, shown as the lower register bank with diagonal-line fill indicating it is in a write or standby state, receives the next parameter set from parameter memory 140 while active bank 152 remains undisturbed.

Bank select register 156 holds a value designating which of active bank 152 and shadow bank 154 is currently the active bank. A control signal entering the left side of bank select register 156 from outside double-buffered parameter registers 150, for example a write from selection circuitry 120 or an external configuration interface, updates bank select register 156 to initiate a bank swap. After the bank swap, the bank that was shadow bank 154 becomes active bank 152 and immediately supplies the parameter set previously written into it, and the bank that was active bank 152 becomes shadow bank 154 and is available for loading a subsequent parameter set. In some embodiments, the bank swap does not interrupt or extend processing by processing circuitry 130, and the predetermined K clock cycle count associated with the newly selected parameter set begins at the first clock cycle of processing circuitry 130 following the bank swap.

In some embodiments, parameter memory 140 begins loading a parameter set for a subsequent input data item into shadow bank 154 while active bank 152 is supplying parameter values for a current item, providing prefetch of the subsequent parameter set without altering total processing latency M plus C plus K. In some embodiments, parameter values are read directly from parameter memory 140 without double-buffered parameter registers 150, in which case double-buffered parameter registers 150 are absent from integrated circuit 100.

Figure 6:
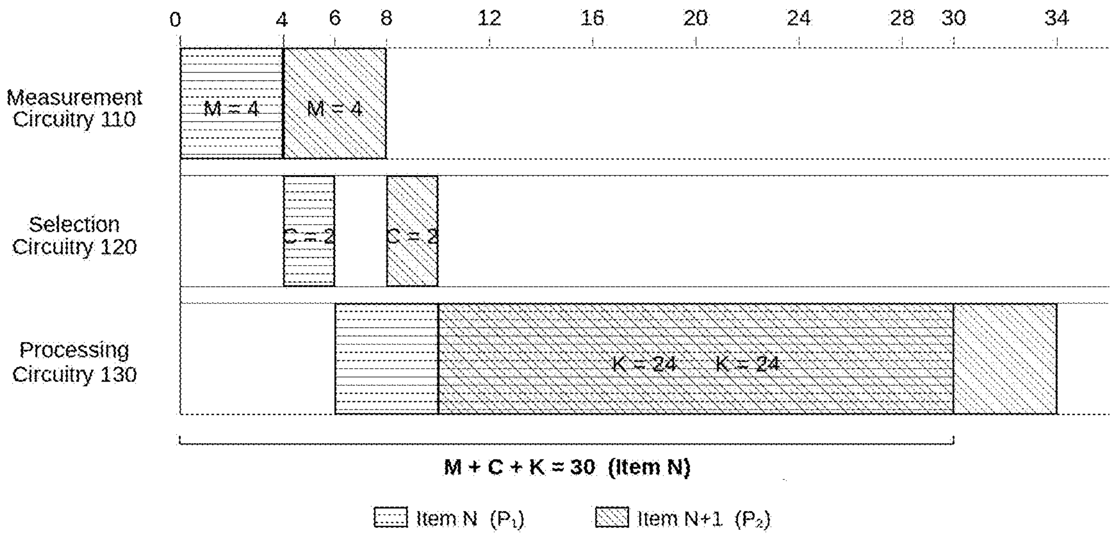
FIG. 6 is a pipeline timing diagram illustrating overlapping M, C, and K pipeline stages for consecutive input data items N and N+1 processed using different parameter sets in accordance with some embodiments.

FIG. 6 is a pipeline timing diagram, in accordance with some embodiments, illustrating concurrent processing of consecutive input data items N and N+1 through measurement circuitry 110, selection circuitry 120, and processing circuitry 130. The horizontal axis represents clock cycles and the vertical axis represents the three pipeline stages. As shown in FIG. 6, item N enters measurement circuitry 110 at clock cycle 0 and is processed using parameter set $P_1$, proceeding through selection circuitry 120 and then processing circuitry 130. Item N+1 enters measurement circuitry 110 at clock cycle 4 and is processed using parameter set $P_2$, which may differ from parameter set $P_1$ selected for item N. The pipeline stages for item N and item N+1 overlap in time, with measurement of item N+1 beginning while processing of item N is still in progress, and with no idle gap, no reconfiguration interval, and no pipeline drain appearing between the two items, even though different parameter sets are selected for the consecutive items.

Item N is shown with horizontal-line fill in FIG. 6 and item N+1 is shown with diagonal-line fill, as identified in the legend below the diagram. The different fill patterns illustrate that consecutive items may be processed using different parameter sets selected in response to different condition values, while each item experiences a total latency of M plus C plus K clock cycles that is predetermined and independent of the selected parameter set and independent of condition values. In the illustrative arrangement shown in FIG. 6, M is 4 clock cycles, C is 2 clock cycles, and K is 24 clock cycles for both items, yielding a total latency of 30 clock cycles. The brace annotation "M+C+K=30 (Item N)" below the axis spans from cycle 0 to cycle 30, indicating the complete latency for item N. The horizontal axis extends to cycle 34 to show the complete processing interval for item N+1, which enters at cycle 4 and completes at cycle 34. These values are illustrative. Actual values of M, C, and K depend on implementation choices as described herein.

In some embodiments, the total latency for processing a single input data item through the integrated circuit is equal to M+C+K clock cycles, where M is the number of clock cycles consumed by measurement circuitry, C is the number of clock cycles consumed by selection circuitry, and K is the number of clock cycles consumed by processing circuitry as described herein. In accordance with some embodiments, the values of M, C, and K are each predetermined at design time and do not vary with input data values, parameter values within the selected parameter set, parameter set selection, condition values measured by measurement circuitry, or the sequence of parameter sets selected for previous input data items, such that the total latency M+C+K is identical for every input data item processed by the integrated circuit regardless of operating conditions.

In certain implementations, the total latency M+C+K is a structural property of the integrated circuit, determined by the number of pipeline stages in measurement circuitry, the number of pipeline stages in selection circuitry, and the number of pipeline stages in processing circuitry, and is verifiable by inspection of the pipeline structure, e.g., by counting registered stages in the data-path, without requiring execution of test vectors, simulation of input data patterns, or statistical analysis of timing distributions.

According to some embodiments, the identical total latency across all parameter sets and all input data items is a structural property that holds in embodiments of the integrated circuit that include, without limitation, bounded-latency parameter memory with predetermined access timing, fixed-topology processing circuitry with no data-dependent branches, predetermined iteration counts in all loops, and all processing units active for all parameter sets. In various embodiments, the total latency M+C+K represents a deterministic upper bound that is simultaneously a deterministic lower bound, in that no input data item completes in fewer than M+C+K clock cycles and no input data item requires more than M+C+K clock cycles.

In accordance with aspects of the disclosure, the worst-case execution time for processing a single input data item is equal to the best-case execution time and equal to the typical-case execution time, with all three values equal to M+C+K clock cycles. In some embodiments, this identity between worst-case, best-case, and typical-case execution times is a structural property that holds for all parameter sets stored in bounded-latency parameter memory and for all input data values within the specified data width of the processing pipeline.

In certain implementations, timing analysis of the integrated circuit does not require probabilistic methods, e.g., measurement-based probabilistic timing analysis (MBPTA), extreme value theory (EVT) fitting, or statistical confidence interval estimation, and instead reduces to deterministic verification of the pipeline stage counts M, C, and K and the clock period. In keeping with some embodiments, the absence of probabilistic timing variability is a structural property arising from the absence of data-dependent control flow, the absence of cache memory in the parameter access path, and the absence of shared resource contention as described herein, such that execution time does not exhibit a statistical distribution across different input data items or different parameter set selections.

In various implementations, the execution time for the integrated circuit can be expressed as a single deterministic value, e.g., L equals M+C+K clock cycles at a clock frequency F, yielding a wall-clock execution time of L divided by F seconds, for example 1014 clock cycles at 200 MHz yielding 5.07 microseconds, and this single value applies to all input data items and all parameter sets without qualification, margin, or confidence interval. In other embodiments, timing margins, e.g., additional clock cycles or fractional clock period margins, may be allocated for physical-level timing effects, such as process-voltage-temperature (PVT) variations, clock jitter, and clock distribution skew, and such margins are additive to the deterministic pipeline stage count and do not depend on input data values or parameter set selection.

By way of illustrative example, where a pipeline with M equals 4, C equals 2, and K equals 24, two consecutive input data items are processed under different conditions. Item A is processed when measurement circuitry measures a first condition value and selection circuitry selects parameter set P1. Item B is processed when measurement circuitry measures a second, different condition value and selection circuitry selects parameter set P2. In this example, item A completes in 4 plus 2 plus 24 equals 30 clock cycles, and item B completes in 4 plus 2 plus 24 equals 30 clock cycles, demonstrating that total latency is identical regardless of which condition value was measured and which parameter set was selected. Similarly, for two input data items with different data values processed using the same parameter set P1, each completes in 30 clock cycles, demonstrating that total latency is identical regardless of input data values. It will be understood that this scenario is for illustrative purposes only and is not limiting.

In some embodiments, the latency contributions of measurement circuitry (M clock cycles), selection circuitry (C clock cycles), and processing circuitry (K clock cycles) are independently verifiable, in that each contribution can be confirmed by inspection of the respective circuitry's pipeline structure without reference to the other two. In accordance with some embodiments, this independent verifiability arises from the pipelined structure of the integrated circuit, in which measurement circuitry, selection circuitry, and processing circuitry are separate pipeline stages with registered boundaries between them, such that the timing behavior of each stage is determined by its own internal pipeline depth and does not depend on the internal structure of the other stages.

In certain implementations, the independently verifiable timing contributions compose additively, such that verification of the total latency M+C+K reduces to independent verification of M, independent verification of C, and independent verification of K, with the total being their arithmetic sum. In keeping with some embodiments, this composability property permits modular timing verification, in which a change to one pipeline stage, e.g., increasing the number of arithmetic stages in processing circuitry to support higher-precision computation, changes K without affecting M or C, and the new total latency is determined by adding the updated K to the unchanged M and C.

In various embodiments, the composability property also permits hierarchical timing analysis, in which a system designer can allocate a timing budget to each of the three pipeline stages independently and verify compliance of each stage against its allocated budget, e.g., verifying that measurement circuitry completes within an allocated M clock cycles by inspecting the measurement pipeline structure, without requiring knowledge of the processing algorithm or parameter set contents. In some embodiments where measurement circuitry, selection circuitry, and processing circuitry operate in a common clock domain, the total latency M+C+K is expressed in units of the common clock period. In other embodiments where two or more of the three stages operate in different clock domains, the wall-clock latency for each stage is computed using the respective stage clock period, and the total wall-clock latency is the sum of the individual stage wall-clock latencies.

In some embodiments, verification of the timing properties described herein is performed by counting clock cycles through the pipeline stages of the integrated circuit. In accordance with some embodiments, the clock cycle count for each pipeline stage, e.g., M for measurement circuitry, C for selection circuitry, and K for processing circuitry, is determined from the hardware design, for example from the number of registered pipeline stages instantiated in a hardware description language (HDL) design, from the pipeline depth reported by a synthesis tool, or from the stage count in a register-transfer-level (RTL) schematic. This count can be a fixed property of the design that does not change with operating conditions.

In certain implementations, timing verification includes confirming that each pipeline stage meets its setup and hold timing constraints at the target clock frequency, e.g., by static timing analysis (STA) using commercially available EDA tools, and the combination of the verified clock cycle count and the verified clock period yields the deterministic wall-clock execution time for each stage. In keeping with some embodiments, by way of example and not limitation, verification of the total wall-clock latency for a single input data item includes at least one of confirming the pipeline stage count M from measurement circuitry design, confirming the pipeline stage count C from selection circuitry design, confirming the pipeline stage count K from processing circuitry design, confirming that the clock period meets the target frequency specification via static timing analysis, and computing the wall-clock latency as the product of the total clock cycle count (M+C+K) and the clock period, or any combination thereof.

In various implementations, no test vector generation, no input-data-dependent simulation, no statistical sampling, and no confidence interval estimation is used in the timing verification of the pipeline stage counts, and the deterministic nature of the pipeline stage counts permits timing verification to be completed during the design phase, for example prior to fabrication, by analysis of the HDL or RTL design.

Figure 7:
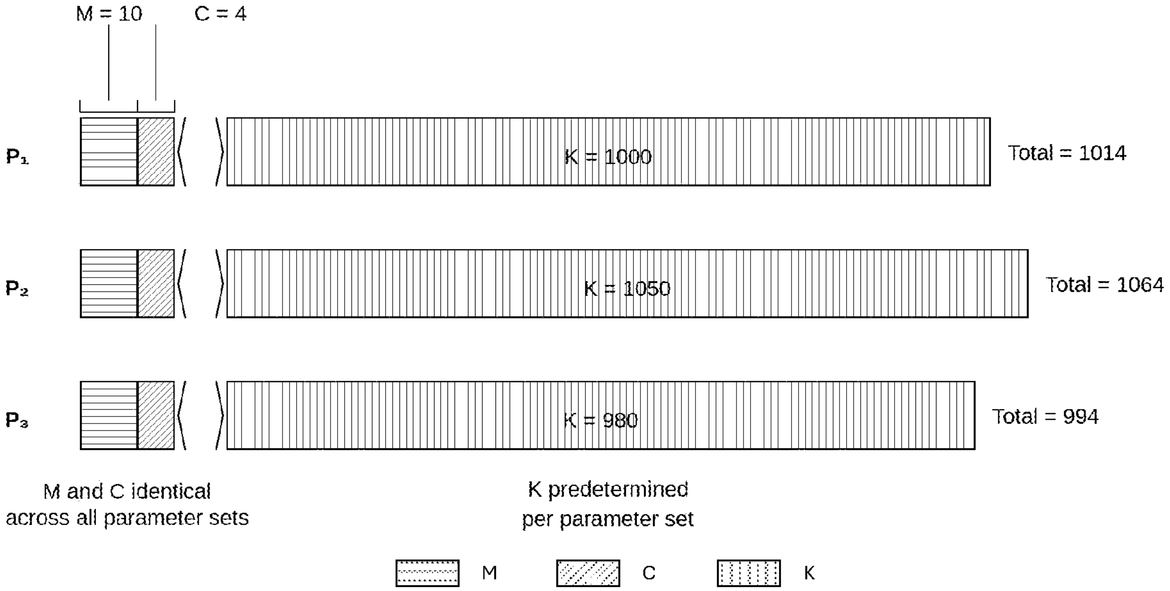
FIG. 7 is a latency breakdown diagram illustrating M and C segments identical across parameter sets P1, P2, and P3 and K predetermined per parameter set in accordance with some embodiments.

FIG. 7 is a latency breakdown diagram, in accordance with some embodiments, illustrating the total processing latency for input data items processed using different parameter sets. As shown in FIG. 7, each horizontal bar represents the total latency for one input data item, divided into three contiguous labeled segments: an M segment at the left corresponding to measurement circuitry 110, a C segment adjacent to it corresponding to selection circuitry 120, and a K segment at the right corresponding to processing circuitry 130. Three bars are shown, one for each of parameter sets $P_1$, $P_2$, and $P_3$, illustrating that while M and C are identical across all parameter sets in this arrangement, the K segment may differ between parameter sets while remaining predetermined for each.

The M segment, shown at the left of each bar with horizontal-line fill in FIG. 7, has the same length across all three bars, reflecting that measurement circuitry 110 completes in M clock cycles independent of input data values or condition values. The C segment, shown adjacent to the M segment in each bar with diagonal-line fill, likewise has the same length across all three bars, reflecting that selection circuitry 120 completes in C clock cycles independent of condition values and selection outcome. The K segment, shown at the right of each bar with vertical-line fill, has a length individually predetermined for each parameter set. A scale-break symbol between the C segment and the K segment in each bar indicates that the K segment is drawn at a compressed scale relative to the M and C segments.

In the illustrative arrangement shown in FIG. 7, M is 10 clock cycles and C is 4 clock cycles for all parameter sets, while K is 1000 clock cycles for parameter set $P_1$, 1050 clock cycles for parameter set $P_2$, and 980 clock cycles for parameter set $P_3$, yielding total latencies of 1014, 1064, and 994 clock cycles respectively (illustrative values). In embodiments where K is identical across all parameter sets, total latency is also identical. In other embodiments, as shown in FIG. 7, K differs between parameter sets while remaining predetermined for each, so that total latency is predetermined per parameter set and does not vary at runtime. The values shown in FIG. 7 are illustrative. Actual values of M, C, and K depend on implementation choices as described herein.

Figure 8:
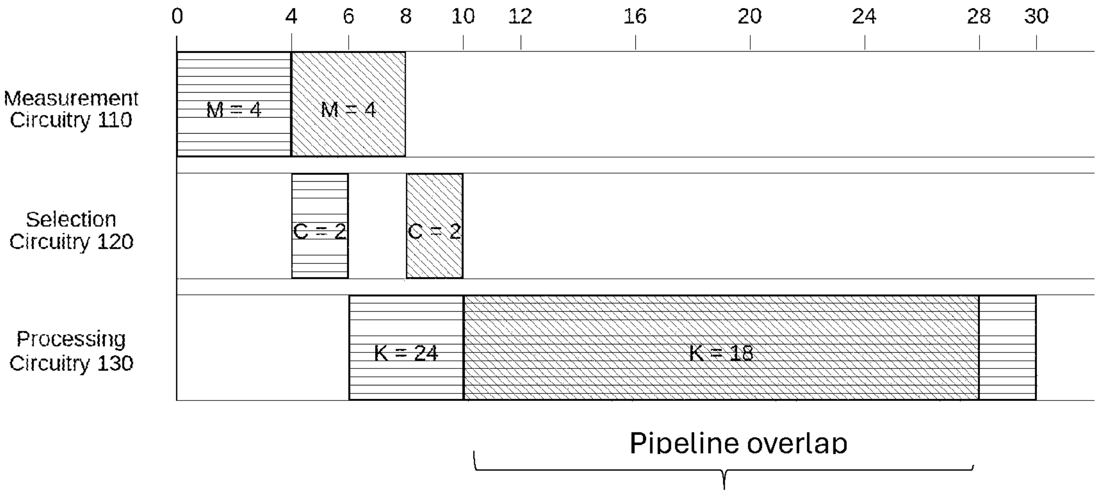
FIG. 8 is a clock-by-clock pipeline trace diagram illustrating consecutive input data items N and N+1 processed using parameter sets P1 and P2 with different predetermined K values in accordance with some embodiments.

FIG. 8 is a clock-by-clock pipeline trace diagram, in accordance with some embodiments, showing the progression of consecutive input data items N and N+1 through measurement circuitry 110, selection circuitry 120, and processing circuitry 130 on a cycle-accurate timeline. A clock-by-clock pipeline trace shows, for each pipeline stage and each clock cycle, whether that stage is actively processing a particular item, indicated by a filled cell, or is idle, indicated by an empty cell. As shown in FIG. 8, item N is processed using parameter set $P_1$ and item N+1 is processed using parameter set $P_2$. The different fill patterns identify which item occupies each stage at each cycle, and the summary table below the trace shows the M, C, K, and total latency values for each item.

In the illustrative arrangement shown in FIG. 8, M is 4 clock cycles and C is 2 clock cycles for both items. K is 24 clock cycles for item N (parameter set $P_1$) and 18 clock cycles for item N+1 (parameter set $P_2$), yielding total latencies of 30 and 24 clock cycles respectively (illustrative values). Item N+1 enters measurement circuitry 110 at cycle 4, while processing circuitry 130 is still processing item N.

The bracket labeled "pipeline overlap" above the Processing Circuitry 130 row of FIG. 8 spans the region of concurrent activity and illustrates this pipeline overlap. In some embodiments, measurement, selection, and processing stages are temporally overlapped for successive input items while preserving the predetermined M, C, and K cycle counts for each individual item. The different K values for parameter sets $P_1$ and $P_2$ in FIG. 8 illustrate that K may differ across parameter sets while remaining predetermined and invariant for each individual parameter set regardless of runtime condition values or input data values. In some embodiments, all three pipeline stages operate in a common clock domain so that M, C, and K are expressed in the same clock period.

In other embodiments, pipeline stages may operate in different clock domains and wall-clock latency contributions are computed using the respective stage clock period. The values shown in FIG. 8 are illustrative. Actual values of M, C, and K depend on implementation choices as described herein.

Figure 9:
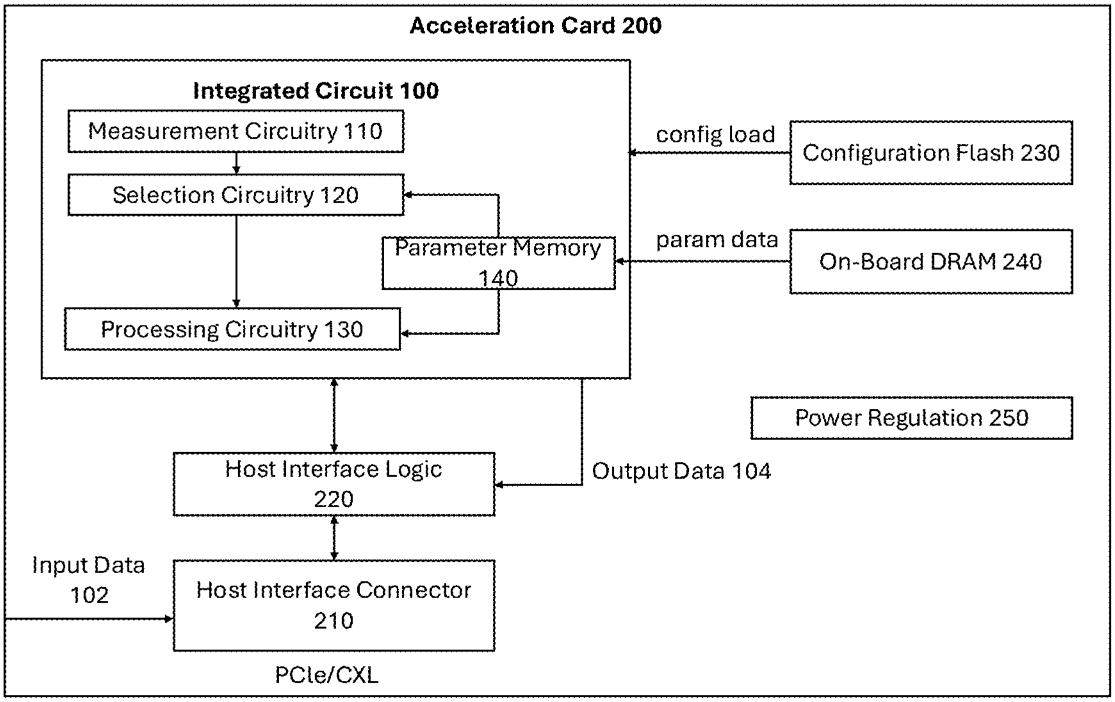
FIG. 9 is a block diagram of acceleration card 200 incorporating integrated circuit 100 with host interface connector 210, host interface logic 220, configuration flash 230, on-board dynamic random-access memory (DRAM) 240, and power regulation circuitry 250 in accordance with some embodiments.

FIG. 9 is a block diagram, in accordance with some embodiments, of acceleration card 200 incorporating integrated circuit 100. The outer rectangle in FIG. 9 denotes the boundary of acceleration card 200 as a physical printed circuit board assembly. As shown in FIG. 9, acceleration card 200 comprises host interface connector 210, host interface logic 220, integrated circuit 100, configuration flash 230, on-board DRAM (dynamic random-access memory) 240, and power regulation circuitry 250. In operation, input data 102 enters integrated circuit 100 from host interface logic 220, is processed through measurement circuitry 110, selection circuitry 120, and processing circuitry 130, and output data 104 is returned to host interface logic 220 for transfer to the host system via host interface connector 210.

Host interface connector 210 is in some embodiments a PCIe (Peripheral Component Interconnect Express) or CXL (Compute Express Link) edge connector that couples acceleration card 200 to a host system through an expansion slot or direct board connection. Host interface logic 220 manages communication between the host system and integrated circuit 100 and includes, in some embodiments, a DMA (direct memory access) engine that transfers input data to and output data from integrated circuit 100, and a configuration register interface through which a host software driver loads parameter sets into parameter memory 140 via the configuration load path shown connecting configuration flash 230 to integrated circuit 100. In some embodiments, host interface logic 220 presents input data to integrated circuit 100 in a fixed number of clock cycles per data unit independent of bus occupancy or transaction type.

Integrated circuit 100 on acceleration card 200 comprises measurement circuitry 110, selection circuitry 120, processing circuitry 130, and parameter memory 140, all fabricated on a single semiconductor die in some embodiments, as indicated by the inner rectangle labeled "Integrated Circuit 100" in FIG. 9. Configuration flash 230 is a non-volatile memory device that, in embodiments where integrated circuit 100 is implemented as a field-programmable gate array (FPGA), stores bitstream data for loading into integrated circuit 100 during power-on initialization. Such initialization does not constitute runtime reconfiguration of processing circuitry 130 during pipeline operation as described herein.

On-board DRAM 240 stores, in some embodiments, auxiliary data or additional parameter sets that are transferred into parameter memory 140 via the parameter data path shown connecting on-board DRAM 240 to integrated circuit 100. Power regulation circuitry 250 provides regulated supply voltages to integrated circuit 100 and other components of acceleration card 200. The arrangement shown in FIG. 9 is illustrative. Other acceleration card configurations are contemplated in various embodiments as described herein.

Figure 10:
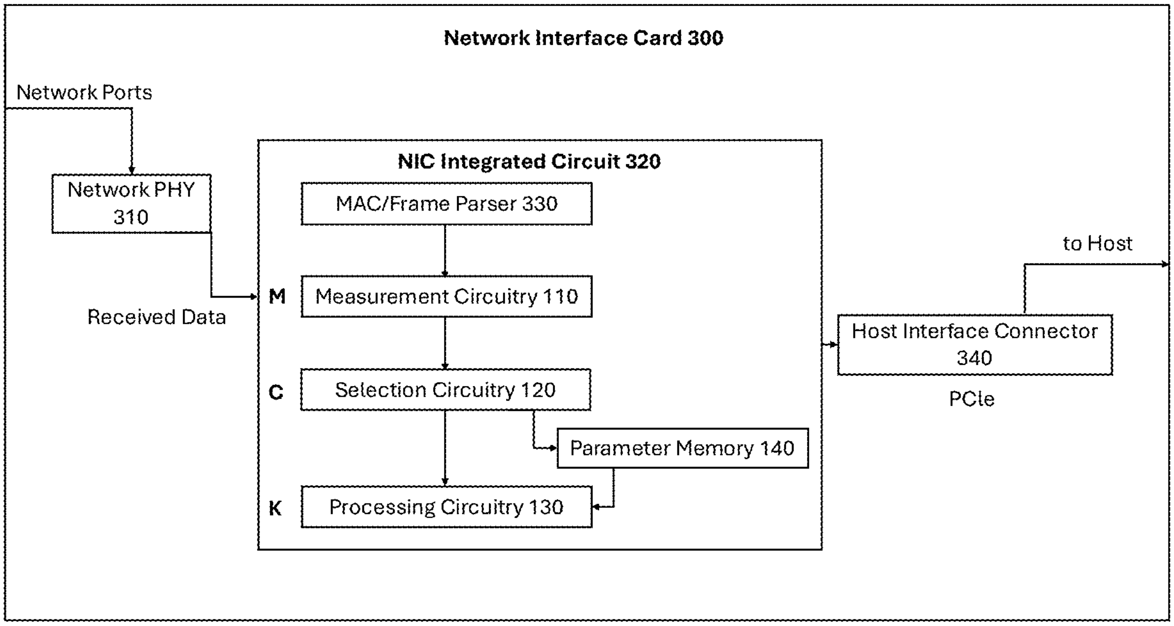
FIG. 10 is a block diagram of network interface card 300 incorporating NIC integrated circuit 320 with network PHY 310, MAC and frame parser 330, and host interface connector 340 in accordance with some embodiments.

FIG. 10 is a block diagram, in accordance with some embodiments, of network interface card 300 incorporating NIC integrated circuit 320. The outer rectangle in FIG. 10 denotes the boundary of network interface card 300 as a physical printed circuit board assembly. As shown in FIG. 10, network interface card 300 comprises network PHY (physical layer transceiver) 310, NIC integrated circuit 320, and host interface connector 340. In operation, network PHY 310 receives data from network ports and presents received data to NIC integrated circuit 320, which processes it through MAC (media access controller) and frame parser 330, measurement circuitry 110, selection circuitry 120, and processing circuitry 130, and delivers processed data to the host system via host interface connector 340.

Network PHY 310 comprises one or more physical-layer transceivers that receive and transmit data on network ports and present received data to NIC integrated circuit 320 in digital format. NIC integrated circuit 320 is a single semiconductor integrated circuit, indicated by the inner rectangle in FIG. 10, that incorporates the pipeline architecture described herein together with network-specific front-end logic. The M, C, and K labels within NIC integrated circuit 320 indicate the clock-cycle contribution of each pipeline stage, consistent with FIG. 1. Within NIC integrated circuit 320, MAC and frame parser 330 performs protocol framing, demultiplexing, and header extraction for received network frames and presents extracted packet fields to measurement circuitry 110.

Measurement circuitry 110 computes condition values from packet header fields, payload characteristics, traffic statistics, or any combination thereof in M clock cycles as described herein. Selection circuitry 120 selects a parameter set from parameter memory 140 based on the computed condition values in C clock cycles, and processing circuitry 130 applies the selected parameter values to perform processing operations in K clock cycles, including by way of example and not limitation at least one of application-layer inspection, cryptographic operations, pattern matching, neural network inference, telemetry aggregation, compression, protocol translation, stateful session tracking, security policy enforcement, or traffic management operations, or any combination thereof.

Parameter memory 140 is contained within NIC integrated circuit 320, as shown in FIG. 10. Host interface connector 340 couples NIC integrated circuit 320 to a host computer system and is, in some embodiments, a PCIe connector through which DMA transfers convey processed data and through which a host driver programs parameter sets into parameter memory 140. The arrangement shown in FIG. 10 is illustrative. Other network interface card configurations are contemplated in various embodiments as described herein.

Figure 11:
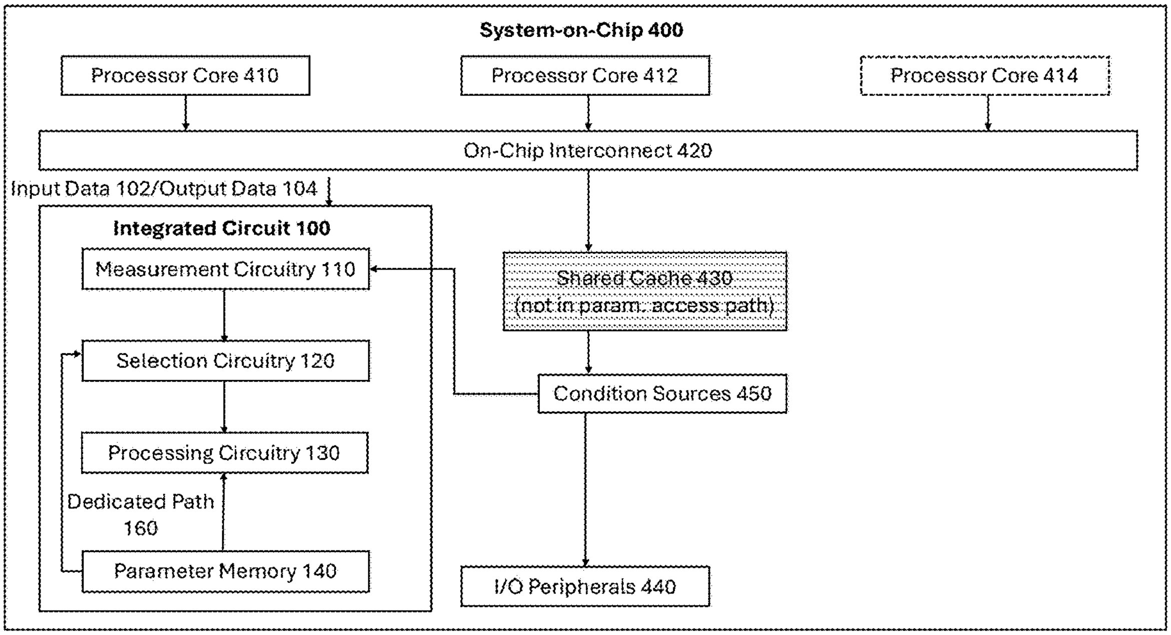
FIG. 11 is a block diagram of system-on-chip 400 incorporating integrated circuit 100 with processor cores 410, 412, and 414, on-chip interconnect 420, shared cache 430, I/O peripherals 440, and condition sources 450 in accordance with some embodiments.

FIG. 11 is a block diagram, in accordance with some embodiments, of system-on-chip 400 incorporating integrated circuit 100 on a single semiconductor die. The outer rectangle in FIG. 11 denotes the boundary of system-on-chip 400.

As shown in FIG. 11, system-on-chip 400 comprises processor cores 410, 412, and 414, on-chip interconnect 420, integrated circuit 100, parameter memory 140, shared cache 430, condition sources 450, and I/O peripherals 440. In operation, processor cores 410 and 412 communicate with integrated circuit 100 and other on-chip elements via on-chip interconnect 420. Condition sources 450 supply condition signals to measurement circuitry 110 within integrated circuit 100. Integrated circuit 100 processes input data using parameter values from parameter memory 140 via dedicated memory access path 160, independent of shared cache 430.

Processor cores 410 and 412 are application-class processor cores in some embodiments. Optional processor core 414 is shown with a dashed outline in FIG. 11 to indicate it is an optional element. In some embodiments processor core 414 is a real-time processor core providing deterministic scheduling for software-executed tasks on system-on-chip 400 separate from pipeline operations of integrated circuit 100. Deterministic timing of integrated circuit 100 is achieved by the hardware structure of measurement circuitry 110, selection circuitry 120, processing circuitry 130, and parameter memory 140 as described herein, and does not depend on scheduling by processor cores 410 through 414.

On-chip interconnect 420 provides communication among processor cores 410, 412, and 414 and other on-chip functional blocks, and may be implemented as an AXI (Advanced extensible Interface, a standard of Arm Ltd., Cambridge, United Kingdom) bus, an ACE (AXI Coherency Extensions) coherent interconnect, a network-on-chip fabric, or any equivalent coherent interconnect, or any combination thereof.

Integrated circuit 100, shown as the inner rectangle on the left side of FIG. 11, is fabricated on the same semiconductor die as processor cores 410, 412, and 414 in some embodiments, with parameter memory 140 implemented as on-chip SRAM or block RAM. Shared cache 430 is shown in FIG. 11 with horizontal-line fill to indicate that it is present on system-on-chip 400 but is not in the parameter memory access path of integrated circuit 100. The shading is a visual indicator of this architectural separation and does not indicate a functional state of shared cache 430.

In some embodiments, shared cache 430 is not included in the parameter memory access path, and parameter memory 140 is accessed via dedicated memory access path 160 as described herein, such that activity on shared cache 430 does not affect parameter access latency of integrated circuit 100. The label "(not in param. access path)" within the shared cache 430 block in FIG. 11 restates this separation. Dedicated memory access path 160 is shown on the arrow shaft from parameter memory 140 to processing circuitry 130 within integrated circuit 100.

Condition sources 450, shown in FIG. 11 as a block connected to measurement circuitry 110, represent the set of on-chip and off-chip sources of condition signals and may include, by way of example and not limitation, at least one of a thermal sensor, a power or voltage monitor, a clock frequency state register, a load utilization counter, an error rate counter, a memory bandwidth monitor, a queue depth indicator, a peripheral status register, or an off-chip sensor interface, or any combination thereof. I/O peripherals 440 are connected to on-chip interconnect 420 and provide external communication interfaces for system-on-chip 400. The arrangement shown in FIG. 11 is illustrative. Other system-on-chip configurations are contemplated in various embodiments as described herein.

Figure 12:
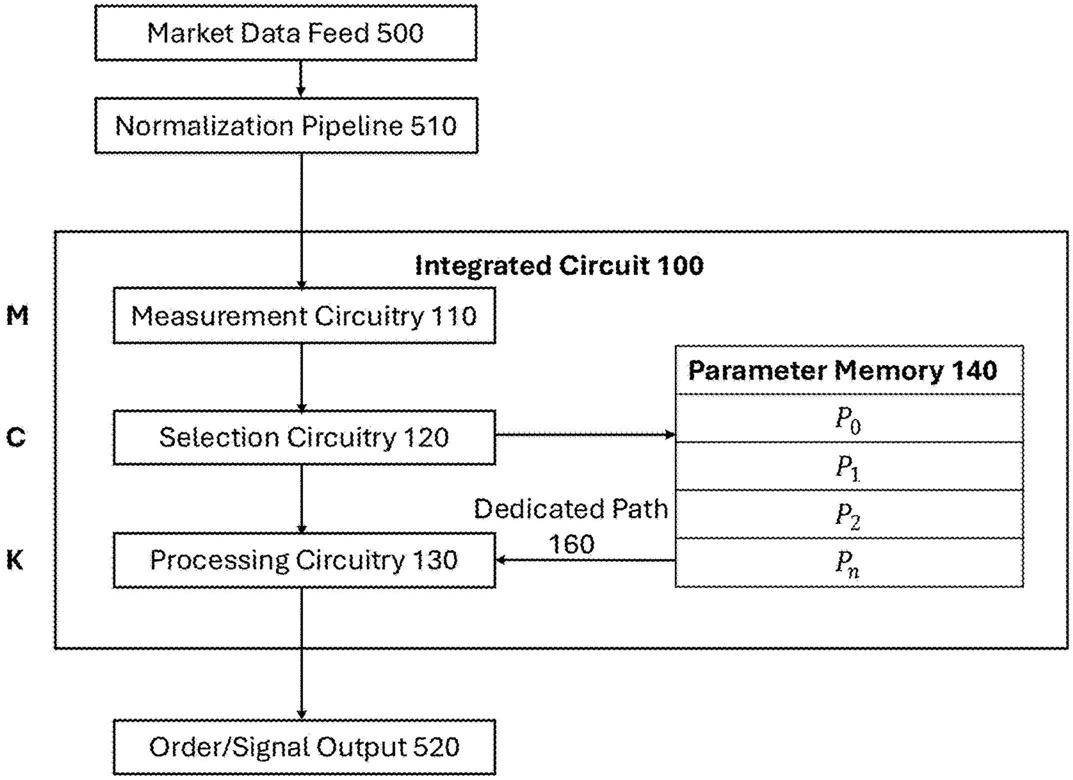
FIG. 12 is a block diagram of integrated circuit 100 configured for financial market data processing with market data feed 500, normalization pipeline 510, and order and signal output 520 in accordance with some embodiments.

FIG. 12 is a block diagram, in accordance with some embodiments, of integrated circuit 100 configured for financial market data processing. The inner rectangle labeled "Integrated Circuit 100" in FIG. 12 denotes the boundary of integrated circuit 100, consistent with FIG. 1. As shown in FIG. 12, market data feed 500 provides raw tick data, time-stamped market price and volume update messages, to normalization pipeline 510, which standardizes the format of the data and presents normalized data to measurement circuitry 110 within integrated circuit 100. Measurement circuitry 110 computes market condition metrics and provides them to selection circuitry 120, which selects a parameter set from parameter memory 140. Processing circuitry 130 applies the selected parameter values to produce order or signal output 520.

Measurement circuitry 110 computes, in some embodiments, market condition metrics including by way of example and not limitation at least one of price volatility, volume-weighted average price (VWAP), bid-ask spread, or momentum indicators, from the normalized market data stream in M clock cycles as described herein, independent of market data values. Normalization pipeline 510 is shown outside the boundary of integrated circuit 100 in FIG. 12 to indicate that it is, in some embodiments, a separate preprocessing element. In other embodiments, normalization pipeline 510 may be integrated within integrated circuit 100. Selection circuitry 120 evaluates the computed condition metrics and selects a corresponding parameter set from parameter memory 140 in C clock cycles as described herein, independent of condition values and selection outcome.

Parameter memory 140, shown within the boundary of integrated circuit 100 in FIG. 12, stores in some embodiments a plurality of trading strategy parameter sets shown as $P_0$, $P_1$, $P_2$, and $P_3$, where each parameter set corresponds to a different market condition regime. Each parameter set contains, by way of example and not limitation, strategy weights, position thresholds, order sizing parameters, and related values for the corresponding regime. Processing circuitry 130 applies the selected parameter set to the normalized market data and produces order or signal output 520 in K clock cycles for the selected parameter set as described herein, independent of market data values and measured condition values. In accordance with some embodiments, the total latency M plus C plus K is predetermined for each trading strategy parameter set and does not vary with market data values or regime selection. The arrangement shown in FIG. 12 is illustrative. Other financial market data processing configurations are contemplated in various embodiments as described herein.

Figure 13:
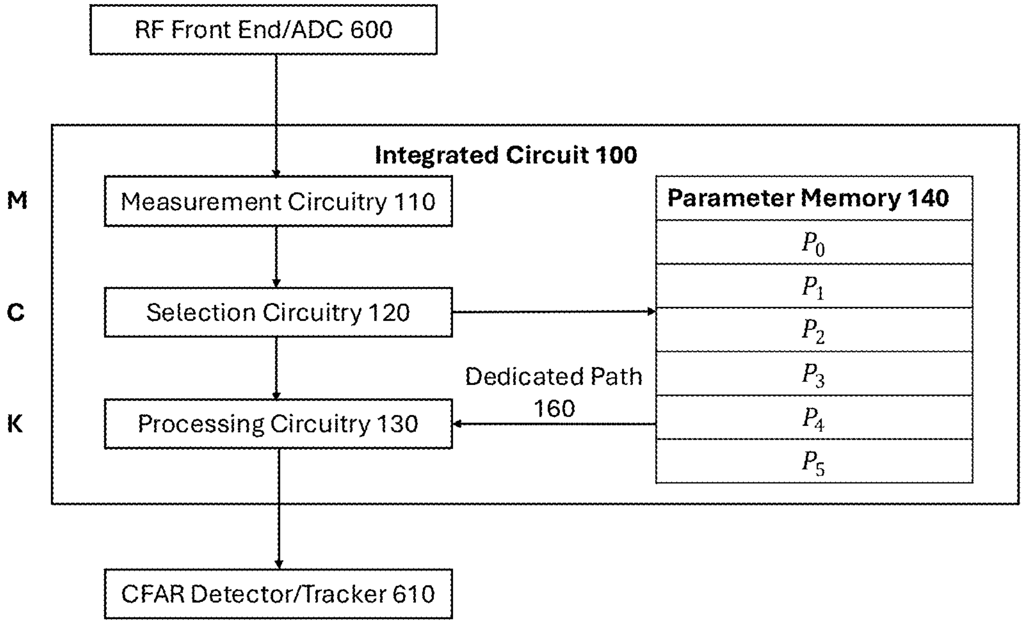
FIG. 13 is a block diagram of integrated circuit 100 configured for radar signal processing with RF front end and ADC 600 and CFAR detector and tracker 610 in accordance with some embodiments.

FIG. 13 is a block diagram, in accordance with some embodiments, of integrated circuit 100 configured for radar signal processing. The inner rectangle labeled “Integrated Circuit 100” in FIG. 13 denotes the boundary of integrated circuit 100, consistent with FIG. 1. As shown in FIG. 13, RF (radio frequency) front end and ADC (analog-to-digital converter) 600 digitizes received radar return data and presents digitized samples to measurement circuitry 110 within integrated circuit 100. Measurement circuitry 110 computes threat environment metrics and provides them to selection circuitry 120, which selects a waveform parameter set from parameter memory 140. Processing circuitry 130 applies the selected parameter values and delivers processed data to CFAR (constant false alarm rate) detector and tracker 610.

Measurement circuitry 110 computes, in some embodiments, threat environment metrics including by way of example and not limitation at least one of signal-to-noise ratio, jammer-to-noise ratio, clutter statistics, or interference type indicators, from the digitized radar return data in M clock cycles as described herein, independent of radar return data values. CFAR detector and tracker 610 is shown outside the boundary of integrated circuit 100 in FIG. 13.

The constant false alarm rate algorithm adaptively sets a detection threshold so that the rate of false target detections remains approximately constant despite varying clutter and noise levels. Selection circuitry 120 identifies the current threat environment class from the computed metrics and selects a corresponding waveform parameter set from parameter memory 140 in C clock cycles, independent of threat environment values and selection outcome. Parameter memory 140, shown within the boundary of integrated circuit 100 in FIG. 13, stores in some embodiments a plurality of waveform parameter sets shown as $P_0$ through $P_5$, where each parameter set corresponds to a different threat environment class. Each parameter set contains, by way of example and not limitation, pulse repetition frequency (PRF) values, carrier frequency values, pulse width values, phase code sequences, bandwidth parameters, and related waveform definition parameters.

Processing circuitry 130 performs, in some embodiments, pulse compression, a matched-filtering operation that compresses the received radar pulse to extract range resolution and Doppler filtering, a frequency-domain operation that extracts target velocity from the received waveform, using the selected waveform parameter set in K clock cycles for the selected parameter set, independent of radar return data values and threat environment measurements. In accordance with some embodiments, the total latency M plus C plus K is predetermined for each waveform parameter set, so that dwell time allocation and radar timeline scheduling are independent of which waveform parameter set is selected. The arrangement shown in FIG. 13 is illustrative. Other radar signal processing configurations are contemplated in various embodiments as described herein.

Figure 14:
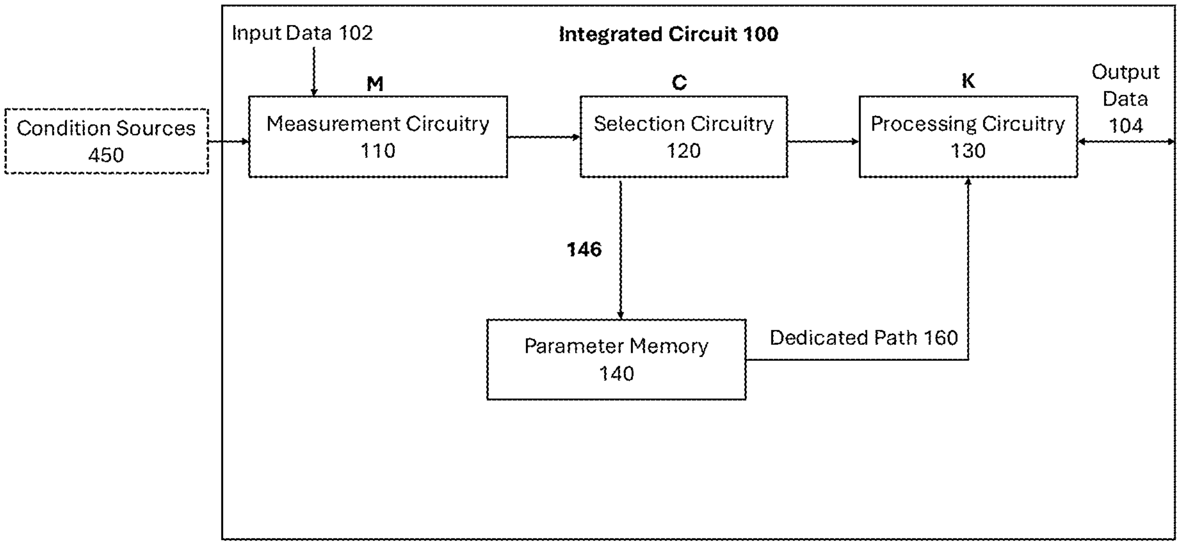
FIG. 14 is a block diagram of integrated circuit 100 showing external interfaces and signal flow among measurement circuitry 110, selection circuitry 120, processing circuitry 130, parameter memory 140, dedicated memory access path 160, and condition sources 450 in accordance with some embodiments.

FIG. 14 is a block diagram, in accordance with some embodiments, of integrated circuit 100, showing the structural relationships among measurement circuitry 110, selection circuitry 120, processing circuitry 130, parameter memory 140, dedicated memory access path 160, and condition sources 450. The outer rectangle in FIG. 14 denotes the boundary of integrated circuit 100, consistent with FIG. 1.

Condition sources 450 are shown as a dashed box to the left of and outside integrated circuit 100, indicating that condition sources are external to integrated circuit 100 in some embodiments, though in other embodiments some condition sources may be on-chip. In operation, condition sources 450 provide condition signals to measurement circuitry 110. Input data 102 also enters measurement circuitry 110. Measurement circuitry 110 computes condition values in M clock cycles and provides them to selection circuitry 120. Selection circuitry 120 generates address signals to parameter memory 140 via signal 146 in C clock cycles. Parameter memory 140 returns parameter values via dedicated memory access path 160 to processing circuitry 130. Processing circuitry 130 produces output data 104 in K clock cycles.

In accordance with some embodiments, measurement circuitry 110, selection circuitry 120, processing circuitry 130, parameter memory 140, and dedicated memory access path 160 all reside on a single semiconductor die within integrated circuit 100, with no general-purpose processor, operating system scheduler, device driver stack, or inter-chip communication bus in the parameter transition path. This structural arrangement enables the total latency M plus C plus K to be statically determinable from the gate-level netlist of integrated circuit 100 without requiring execution of test vectors or simulation of input data patterns.

In some embodiments, parameter set transitions do not involve a runtime reconfiguration interval, instruction fetch sequence, cache lookup, or inter-processor communication, as those operations would introduce latency variability inconsistent with the predetermined total latency described herein. In some embodiments, all iterative computation engines within processing circuitry 130 execute a predetermined maximum number of iterations without early termination based on intermediate result quality, convergence criteria, or distortion thresholds, such that K does not vary with the quality of intermediate results produced during processing.

In some embodiments, processing circuitry 130 executes a fixed set of arithmetic and logic operations for every input data item regardless of which parameter set is selected, such that all functional units, pipeline stages, and memory access operations within processing circuitry 130 are active for every input data item.

In some such embodiments, parameter values for an operation that does not contribute to the output for a given parameter set are set to identity values, for example, zero for an additive operation or one for a multiplicative operation, such that the operation executes without affecting the output value, without reducing K below the predetermined value for the selected parameter set, and without gating, bypassing, or clock-disabling any pipeline stage. In these embodiments, K is invariant because the complete fixed set of operations is always executed in full, not because unused operations are omitted or skipped.

In some embodiments, parameter set selection does not alter the number of active pipeline stages within processing circuitry 130 or the routing of data through processing circuitry 130. The fixed topology of processing circuitry 130 is a structural property of the hardware that is not configurable by parameter set values.

Figure 15:
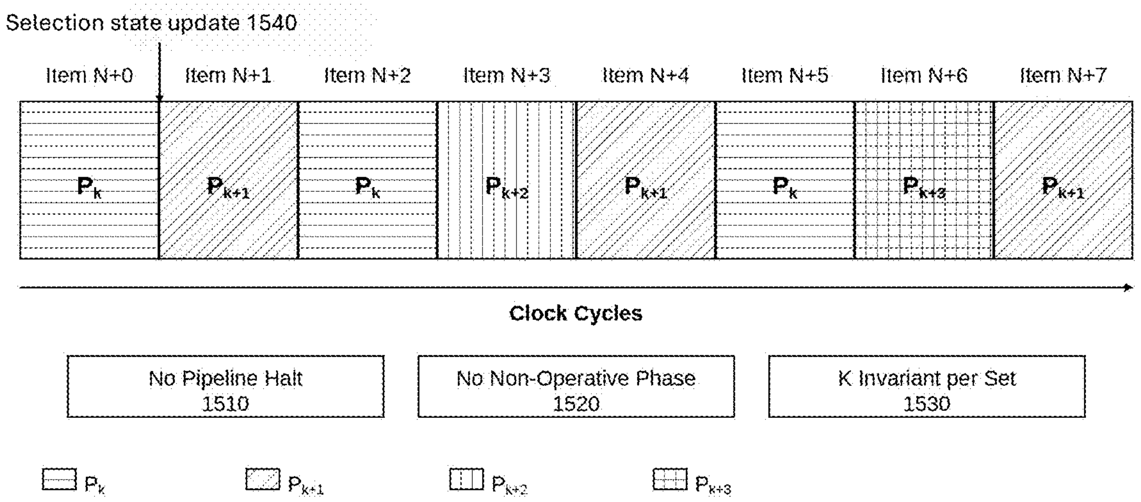
FIG. 15 is a timeline diagram illustrating continuous pipeline operation of integrated circuit 100 across successive input data items using different parameter sets without pipeline halting in accordance with some embodiments.

FIG. 15 is a timeline diagram, in accordance with some embodiments, illustrating continuous pipeline operation of integrated circuit 100 across a sequence of eight successive input data items N through N+7, each potentially processed using a different parameter set. As shown in FIG. 15, the horizontal axis represents successive input data items and the timeline cells show which parameter set is applied to each item. The four fill patterns in the cells correspond to parameter sets $P_k$, $P_{k+1}$, $P_{k+2}$, and $P_{k+3}$ as identified in the legend below the timeline. In operation, items N through N+7 are processed consecutively without any pipeline halt or non-operative phase between items, even as the selected parameter set changes from item to item.

The parameter set sequence shown in FIG. 15 is $P_k$, $P_{k+1}$, $P_k$, $P_{k+2}$, $P_{k+1}$, $P_k$, $P_{k+3}$, and $P_{k+1}$ for items N through N+7 respectively, demonstrating that the parameter set index may change at every item boundary, may repeat, and may appear in any order, without interrupting pipeline operation. Selection state update marker 1540, shown as a vertical tick mark with downward arrow at the boundary between items N+0 and N+1 in FIG. 15, indicates that a parameter set transition occurs at an item boundary and not during item processing. In some embodiments this transition is effected by updating a selection index or base address value within selection circuitry 120, which causes parameter memory 140 to present the corresponding parameter values beginning with the next applicable clock cycle, without halting the pipeline, without loading a configuration bitstream, and without any non-operative phase between items.

Property indicators 1510, 1520, and 1530 in FIG. 15 state three properties that hold throughout the illustrated sequence. Property indicator 1510 states "No Pipeline Halt," indicating that integrated circuit 100 does not halt or stall between consecutive items. Property indicator 1520 states "No Non-Operative Phase," indicating that there is no interval between items during which integrated circuit 100 is non-operative, idle, or reconfiguring. Property indicator 1530 states "K Invariant per Set," indicating that K remains constant for each selected parameter set regardless of which parameter sets were selected for preceding items. Processing circuitry 130 completes processing of each item in K clock cycles for the corresponding parameter set, and the total latency M plus C plus K is predetermined for each parameter set and does not vary at runtime with changing conditions or parameter set selection order. The parameter set sequence shown in FIG. 15 is illustrative. Other sequences, including sequences involving more or fewer distinct parameter sets, are contemplated in various embodiments as described herein.

Figure 16:
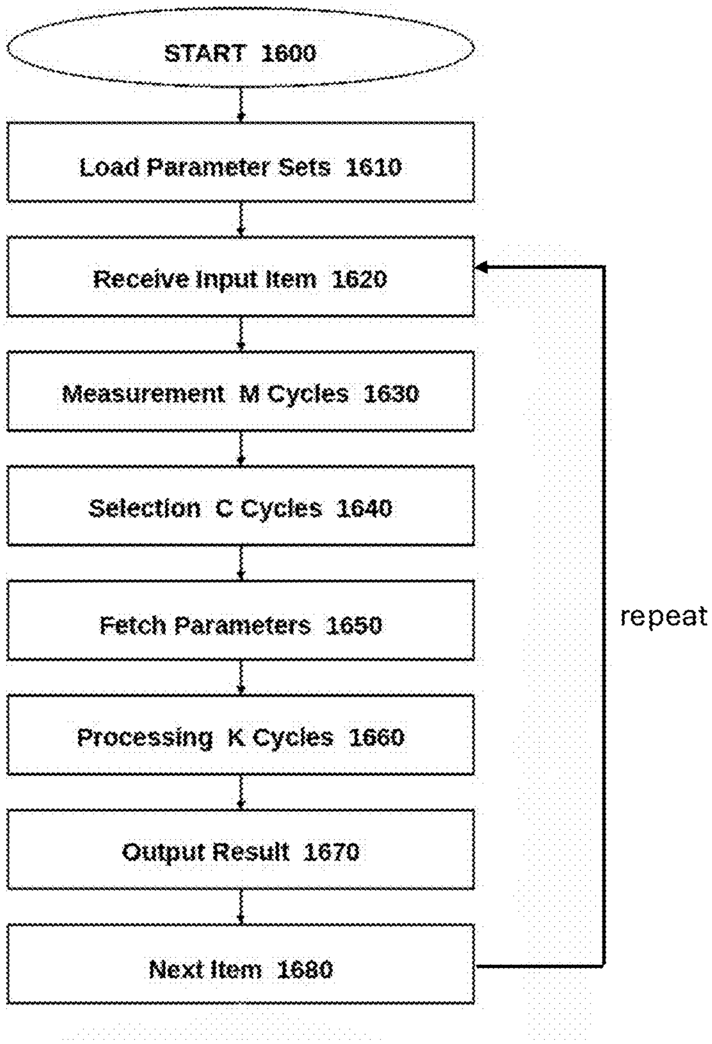
FIG. 16 is a flowchart of a hardware-implemented method for processing input data items using integrated circuit 100 in accordance with some embodiments.

FIG. 16 is a flowchart, in accordance with some embodiments, of a hardware-implemented method for processing input data items using integrated circuit 100. Method 1600 may be performed by integrated circuit 100 of FIG. 1 or by other circuitry comprising measurement circuitry 110, selection circuitry 120, parameter memory 140, and processing circuitry 130 arranged as described herein. As shown in FIG. 16, the method begins at START step 1600, proceeds through parameter loading step 1610, input receipt step 1620, measurement step 1630, selection step 1640, parameter fetch step 1650, processing step 1660, output step 1670, and pipeline continuation step 1680, and repeats from step 1620 via the loop-back arrow on the right side of FIG. 16 for each successive input data item.

At step 1610, parameter sets are loaded into parameter memory 140, for example during an initialization phase. In some embodiments, parameter sets may additionally be updated via a separate write path without affecting the bounded-latency read path used during processing. At step 1620, an input data item is received at integrated circuit 100. At step 1630, measurement circuitry 110 computes one or more condition values from the input data item or from sensor interface 170 as described herein in M clock cycles, where M does not vary with input data values or condition values in some embodiments.

At step 1640, selection circuitry 120 selects a parameter set in C clock cycles by generating address signals directed to parameter memory 140, where C does not vary with condition values or selection outcome in some embodiments. At step 1650, parameter values corresponding to the selected parameter set are accessed from parameter memory 140 via dedicated memory access path 160. In some embodiments the latency associated with this access is included within K clock cycles as described herein.

At step 1660, processing circuitry 130 processes the input data item using the selected parameter values in K clock cycles, where K is predetermined for the selected parameter set and does not vary with input data values or condition values as described herein. At step 1670, output data is presented at the output port of integrated circuit 100. At step 1680, a subsequent input data item may enter measurement circuitry 110 while a current item is still being processed by processing circuitry 130, with no idle gap and no reconfiguration interval between items.

The loop-back arrow in FIG. 16 from step 1680 to step 1620 represents this repeat path for each successive input data item in a continuous processing stream. In accordance with some embodiments, the method of FIG. 16 is performed entirely in hardware by integrated circuit 100 without instruction fetch, program counter, or stored-program execution for any of steps 1620 through 1680. The order of steps shown in FIG. 16 is illustrative. In some embodiments steps may overlap in time consistent with the pipeline architecture described herein.

Figure 17:
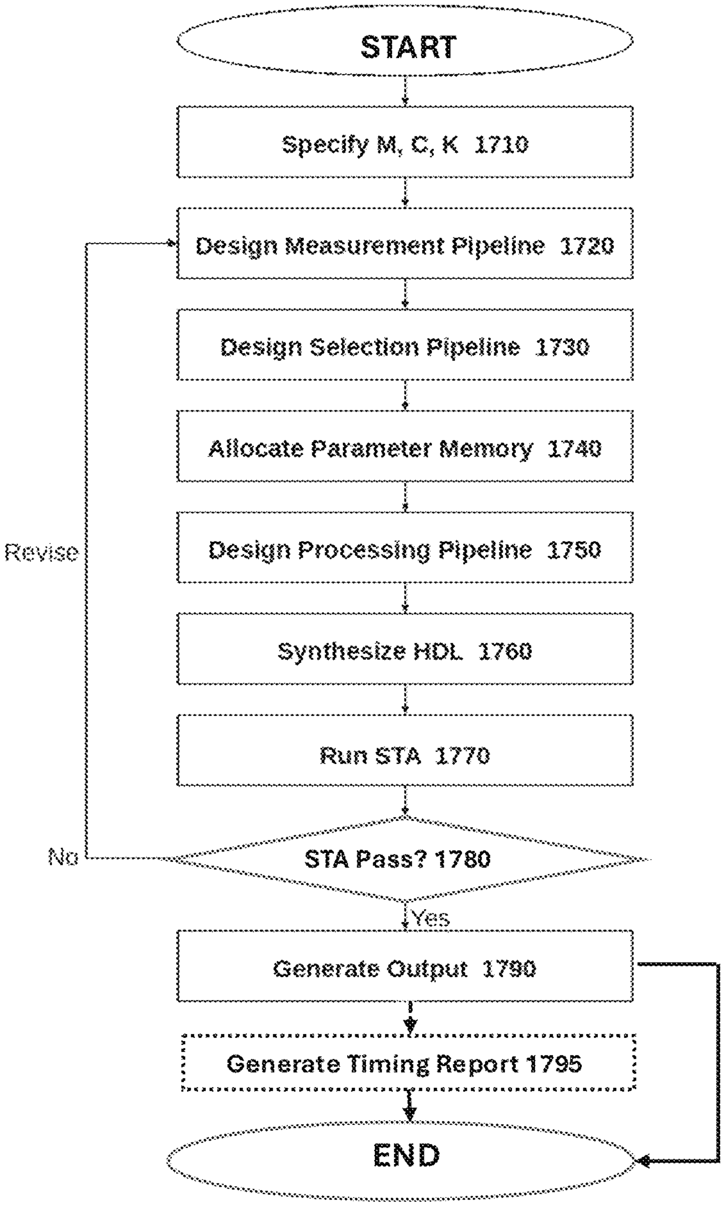
FIG. 17 is a flowchart of a computer-implemented design method for an integrated circuit in accordance with some embodiments.

FIG. 17 is a flowchart, in accordance with some embodiments, of a computer-implemented design method for an integrated circuit as described herein. As shown in FIG. 17, the method begins at START step 1700 and proceeds through timing specification step 1710, measurement pipeline design step 1720, selection pipeline design step 1730, parameter memory allocation step 1740, processing pipeline design step 1750, HDL synthesis step 1760, static timing analysis step 1770, timing closure decision step 1780, output generation step 1790, and optional timing report step 1795. If timing closure is not achieved at step 1780, the method returns to step 1720 for pipeline restructuring, as shown by the loop-back arrow on the left side of FIG. 17 labeled "Revise."

At step 1710, timing requirements and target allocations for M, C, and K clock-cycle segments are determined for the intended application. At step 1720, measurement circuitry 110 is designed with a predetermined number of pipeline stages and an architecture that avoids data-dependent control-flow structures in the datapath, so that completion time does not vary with input data values. At step 1730, selection circuitry 120 is designed with a predetermined number of pipeline stages using, by way of example and not limitation, a comparator array, finite state machine, lookup table, or other topology having completion time independent of condition values, or any combination thereof, as described with respect to FIG. 4.

At step 1740, parameter memory 140 is allocated with capacity for a predetermined number of parameter sets using explicit addressing without tag lookup, so that access latency is bounded and included within K clock cycles in some embodiments. At step 1750, processing circuitry 130 is designed with fixed topology and predetermined pipeline depth so that execution length does not vary with input data values or runtime condition values, and parameter set selection does not alter the number of active pipeline stages or the routing of data through processing circuitry 130. In some embodiments, the design of step 1750 includes applying synthesis directives or constraints that prohibit early-termination logic paths, such that the synthesis tool does not generate circuitry that conditionally bypasses pipeline stages or terminates iterative computations based on intermediate result values.

At step 1760, an HDL (hardware description language) representation of the integrated circuit is synthesized to generate a gate-level netlist. At step 1770, STA (static timing analysis) is performed on the gate-level netlist to verify pipeline stage counts, worst-case propagation delay at the target clock frequency, and setup and hold timing margins. As used herein, STA refers to the analysis of all combinational paths in the synthesized netlist to verify that no path exceeds the target clock period, independent of input data values. In some embodiments, the static timing analysis of step 1770 is further used to verify that the number of pipeline stages traversed does not vary across condition value ranges or across parameter set selections, confirming that M, C, and K are invariant regardless of input data values.

At decision step 1780, if timing closure is not achieved at the target clock frequency, the method returns to step 1720 for pipeline restructuring and re-synthesis. Timing closure (the condition in which all signal paths meet setup and hold timing constraints at the target clock frequency) failure indicates that the pipeline stage allocation must be revised, not merely that parameter values must be adjusted. If timing closure is achieved, step 1790 generates at least one implementation deliverable including, by way of example and not limitation, a configuration bitstream for a field-programmable gate array, an ASIC (application-specific integrated circuit) layout data set, a gate-level netlist, or an HDL source representation for further integration, or any combination thereof. In some embodiments, step 1795 may generate a timing characterization report identifying the verified M, C, and K values, the corresponding target clock frequency, and a statement that M, C, and K are invariant across all admissible input data values and condition values for each parameter set. The sequence shown in FIG. 17 is illustrative. In some embodiments, steps may be reordered or iterated as part of a conventional electronic design automation workflow.

Tables 1A-1B, in accordance with some embodiments, present a comparison of timing properties of the integrated circuit as described herein with timing properties of other architectural categories.

TABLE 1A

Comparison of Timing Properties Across Architectural Categories

| Timing Property | Integrated Circuit Described Herein | Stored-Program Architectures |
|---|---|---|
| Worst-case execution time characterization | Deterministic | Probabilistic/ data-dependent |
| Execution-time variability across input data | Zero variability | High data-dependent variability |
| Execution-time variability across parameter sets/configurations | Predetermined K per set (identical or bounded variation) | Varies with code paths |
| Timing-verification methodology | Pipeline-stage counting | Statistical measurement |
| Need for timing margins | Physical-level margins only | Physical + architectural variability margins |
| Composability of timing contributions | Additive composition | Non-additive interactions |
| Parameter-transition overhead | Zero overhead cycles | Reconfiguration overhead |
| Worst-case execution time equals best-case execution time? | Structurally identical | Divergent (data-dependent) |

TABLE 1B

Comparison of Timing Properties Across Architectural Categories (Continued)

| Timing Property | Partially Reconfigurable FPGA Architectures | DVFS-Based Architecture (Dynamic Voltage/Frequency Scaling) |
|---|---|---|
| Worst-case execution time characterization | Configuration-dependent | Voltage/frequency-dependent, probabilistic |
| Execution-time variability across input data | Moderate data-dependent variability | High variability due to DVFS adjustments |
| Execution-time variability across parameter sets/configurations | Varies with bitstream/configuration | Varies with operating point and workload |
| Timing-verification methodology | Bitstream-level timing analysis | Statistical + physical-margin analysis |
| Need for timing margins | Physical + configuration-dependent margins | Physical + DVFS-induced variability |
| Composability of timing contributions | Non-additive interactions | Non-additive interactions |
| Parameter-transition overhead | Reconfiguration latency (bitstream) | Transition latency between DVFS states |
| Worst-case execution time equals best-case execution time? | Divergent (configuration-dependent) | Divergent (voltage/frequency-dependent) |

Note for Tables 1A-1B: Values are representative characterizations. Actual properties may vary across specific implementations within each architectural category.

Tables 1A and 1B, in accordance with some embodiments, present a comparison of timing properties between the integrated circuit as described herein and representative alternative architectural categories. The following paragraphs describe the timing properties listed in the rows of Tables 1A and 1B and explain the values shown for each architectural category.

Worst-case execution time characterization refers to whether the longest possible processing time for a given configuration can be determined exactly from the design or must be estimated through statistical methods. In architectures where worst-case execution time is deterministic, the longest processing time is known with certainty from the circuit structure, e.g., by at least one of counting pipeline stages, static timing analysis, or inspection of the hardware design, or any combination thereof, without requiring runtime measurement or statistical inference. In architectures where worst-case execution time is probabilistic, data-dependent, configuration-dependent, or voltage-and-frequency-dependent, the longest processing time cannot be determined exactly from the design alone and must instead be bounded through statistical sampling, measurement-based analysis, or conservative assumptions that may yield pessimistic bounds.

Execution time variability across input data refers to whether different input data values produce different processing times for the same configuration. Zero variability means that processing time is identical regardless of which input data values are presented. Data-dependent variability means that certain input values produce longer processing times than other input values.

Execution time variability across parameter sets or configurations refers to whether different parameter sets or configurations produce different processing times. Predetermined K per set means that K is predetermined for each individual parameter set and does not depend on input data values, condition values, or runtime computation results. In some embodiments, K is identical across all parameter sets, and in other embodiments K varies between parameter sets while remaining predetermined for each individual parameter set, such that total latency is predetermined for each parameter set but may differ between parameter sets.

Configuration-dependent variability means that different configurations produce different processing times. Timing verification methodology refers to the technique used to confirm that the implementation meets timing requirements. Pipeline stage counting involves inspecting the hardware design to count registered stages and computing execution time as the product of stage count and clock period, which is a deterministic design-time technique.

Statistical measurement involves running the implementation with representative inputs and measuring timing distributions. Need for timing margins refers to whether the implementation requires additional time beyond the computed execution time to account for variability. Physical-level margins only means that the only margins needed are for process, voltage, and temperature variations in the semiconductor. Physical plus architectural variability margins means that additional margins are needed to account for timing variability introduced by the architecture itself.

Composability of timing contributions refers to whether the timing of individual stages or subsystems can be analyzed independently and combined through simple addition. Additive composition means that total latency equals the arithmetic sum of stage latencies. Non-additive interactions means that the timing of one stage or subsystem can affect the timing of another. Parameter transition overhead refers to the processing time lost when switching between parameter sets or configurations. Zero overhead cycles means that transitions introduce no additional clock cycles. Reconfiguration latency means that the architecture requires a period during which processing ceases while new configuration data is loaded. Whether worst-case execution time equals best-case execution time refers to whether the shortest and longest processing times for a given configuration are identical. Structurally identical means that every input data item produces exactly the same processing time for a given parameter set. Divergent means that best-case and worst-case execution times differ.

As shown in Tables 1A and 1B, the integrated circuit as described herein exhibits deterministic worst-case execution time, zero execution time variability across input data, additive composability, zero parameter transition overhead, and structural identity between worst-case and best-case execution time, arising from the structural integration of fixed-topology processing circuitry, bounded-latency parameter memory, and fixed-propagation-delay selection circuitry as described herein. In embodiments where K varies between parameter sets, each individual parameter set retains these timing properties, in that worst-case execution time equals best-case execution time for each parameter set, and the timing properties shown in Tables 1A and 1B apply on a per-parameter-set basis. In some embodiments, these timing properties permit timing verification to be completed during the design phase prior to fabrication, permit total execution time to be guaranteed without statistical confidence intervals or probabilistic margins, and permit per-input-data-item parameter set selection without throughput reduction or processing interruption, as described herein.

As shown in Tables 1A and 1B, stored-program processor architectures commonly employ at least one of cache hierarchies, branch prediction, or operating system scheduling, or any combination thereof, as architectural features that improve average-case throughput. These architectural features introduce timing variability because cache hit and miss outcomes, branch prediction accuracy, and scheduling decisions produce different execution times for different input data values and different runtime states. Prior approaches have accommodated this timing variability through probabilistic worst-case execution time analysis, through architectural separation of timing-critical and adaptive functions as described herein, or through conservative timing margins, reflecting design choices within the stored-program architectural paradigm.

As shown in Tables 1A and 1B, partially reconfigurable FPGA architectures employ runtime bitstream loading to change the functionality of programmable logic regions. Bitstream loading introduces reconfiguration latency during which the reconfigurable region ceases processing, and different configurations instantiate different logic structures with different timing characteristics. Prior approaches have accommodated this reconfiguration latency through techniques such as optimizing bitstream transfer throughput, pre-staging configurations in duplicated hardware regions, or treating reconfiguration duration as a schedulable component of worst-case execution time, as described herein, reflecting design choices within the partial reconfiguration paradigm.

As shown in Tables 1A and 1B, dynamically voltage-and-frequency-scaled architectures adjust supply voltage and clock frequency during operation in response to workload, thermal conditions, or power budget. Voltage and frequency changes alter gate delays and clock period, producing execution time variability that depends on the operating point and on transition settling behavior. Prior approaches have accommodated this variability through combined statistical and physical-margin analysis at multiple operating points, reflecting design choices within the DVFS paradigm.

As described herein in paragraphs referencing Laplante, Benmachiche, IBM Corporation, Intel Corporation, BAE Systems, AUTOSAR, Papadimitriou et al., Liu (S.) et al., Liu (M.) et al., and Pezzarossa et al., prior approaches across multiple independent organizations and technical disciplines converged on a common architectural direction: separating adaptive functions and deterministic functions onto different processors, different platforms, or different operating system partitions. IBM Corporation described transferring tasks between hard real-time and non-hard real-time processing units. Intel Corporation described suspending non-real-time cores during time-critical code sections. BAE Systems described separate deterministic and non-deterministic processors supported by separate and independent operating systems. AUTOSAR specified separate Classic and Adaptive platforms for deeply embedded ECUs with static software and for high-performance ECUs with dynamically updatable software, respectively.

This convergence across independent organizations and technical disciplines on architectural separation, rather than architectural integration, is described herein as context for the architectures disclosed in this specification. Separately, the FPGA reconfiguration community, as represented by Papadimitriou et al., Liu (S.) et al., Liu (M.) et al., and Pezzarossa et al., pursued increasing bitstream transfer throughput and reducing reconfiguration overhead rather than eliminating bitstream loading from the adaptive path. The architectures described herein take a different approach.

Rather than separating adaptive and deterministic functions onto different hardware, the architectures described herein integrate measurement circuitry, selection circuitry, bounded-latency parameter memory, and fixed-topology processing circuitry on a single integrated circuit as described herein. Instead of reducing reconfiguration overhead through faster bitstream transfer, the architectures described herein eliminate bitstream loading from the per-input-item processing path by storing parameter sets in bounded-latency parameter memory and selecting among them through address changes and fixed-propagation-delay selection logic. The result is an architectural paradigm in which the sources of timing variability that motivated architectural separation in the prior approaches are structurally absent from the processing path, as described in further detail herein.

In keeping with some embodiments, Tables 1A and 1B are provided for informational purposes to illustrate representative timing properties and are not limiting. The characterizations presented may vary depending on specific implementations within each architectural category.

In some embodiments, the integrated circuit as described herein is implemented as a system-on-chip (SoC) in which measurement circuitry, selection circuitry, processing circuitry, and bounded-latency parameter memory are fabricated on a single semiconductor die as shown in FIG. 11 in accordance with some embodiments. In accordance with some embodiments, the SoC includes, in addition to the parameter-selective processing pipeline, at least one of a host processor core, e.g., an ARM Cortex-class core (ARM and Cortex are trademarks of Arm Ltd., Cambridge, United Kingdom), a RISC-V core (RISC-V is a trademark of RISC-V International, Zurich, Switzerland), or a proprietary processor core.

The SoC can further include an on-chip interconnect fabric, e.g., an Advanced Microcontroller Bus Architecture (AMBA, a standard of Arm Ltd., Cambridge, United Kingdom) interconnect, an Advanced extensible Interface (AXI) bus, or a Network-on-Chip (NoC); one or more peripheral controllers, e.g., Universal Asynchronous Receiver-Transmitter (UART), Serial Peripheral Interface (SPI), Inter-Integrated Circuit (I2C), or General-Purpose Input/Output (GPIO) controllers; a memory controller for off-chip memory access; a power management unit; a clock generation circuit, e.g., a phase-locked loop (PLL) or clock multiplier unit, providing the pipeline clock signal; and a reset controller that initializes the parameter-selective processing pipeline and loads a default parameter set into bounded-latency parameter memory during power-on or system reset; or any combination thereof.

In certain implementations, the parameter-selective processing pipeline operates with timing isolation from the host processor core and other SoC subsystems as described herein, such that the deterministic M+C+K latency is maintained regardless of the activity of the host processor core, peripheral controllers, or interconnect fabric. In keeping with some embodiments, bounded-latency parameter memory is implemented as a dedicated on-die SRAM partition, physically separate from any cache memory used by the host processor core. Alternatively, bounded-latency parameter memory can be implemented as a dedicated SRAM macro instantiated in the SoC floor plan with its own address decode and sense amplifier circuitry, e.g., a single-port SRAM, a dual-port SRAM, or a register-file-based memory, sized to hold a predetermined number of parameter sets. In other embodiments, off-die bounded-latency parameter memory, e.g., a dedicated off-die SRAM device coupled to the SoC via a point-to-point memory interface with deterministic access timing, is also contemplated. In various embodiments, the SoC is fabricated using a semiconductor process, e.g., a complementary metal-oxide-semiconductor (CMOS) process at a technology node such as 7 nm, 14 nm, 28 nm, or 65 nm, or any other process node, and is packaged in a semiconductor package, e.g., a ball grid array (BGA), a quad flat no-lead (QFN), a chip-scale package (CSP), or a flip-chip package, for mounting on a printed circuit board (PCB).

In accordance with aspects of the disclosure, the integrated circuit is implemented on an acceleration card configured for insertion into a host computer system as shown in FIG. 9 in accordance with some embodiments. In some embodiments, the acceleration card includes a printed circuit board carrying the integrated circuit, a host interface connector, e.g., at least one of a Peripheral Component Interconnect Express (PCIe) connector, a Compute Express Link (CXL) connector, or an OpenCAPI (a standard of the OpenCAPI Consortium) connector, or any combination thereof, through which the acceleration card communicates with a host processor in the host computer system, and power supply circuitry that receives power from the host computer system through the connector or through an auxiliary power connector.

In certain implementations, the acceleration card further includes local memory devices, e.g., DDR4 SDRAM, DDR5 SDRAM, High Bandwidth Memory (HBM), or GDDR6 memory, mounted on the printed circuit board and coupled to the integrated circuit via memory interface traces, and the local memory devices store parameter sets that are loaded into bounded-latency parameter memory, e.g., on-die SRAM, at initialization or upon command from the host processor through the host interface.

In keeping with some embodiments, the host interface controller on the acceleration card translates host commands into parameter set loading operations, configuration register writes, and status register reads, with parameter set loading transferring parameter set data from local memory or from host memory via direct memory access (DMA) into bounded-latency parameter memory. The host interface controller operates independently of the parameter-selective processing pipeline, so that host communication does not affect the deterministic M+C+K timing of the pipeline. In various embodiments, the acceleration card includes an input data interface, e.g., at least one of a high-speed serial interface, a parallel data bus, or an analog front-end with analog-to-digital converter (ADC), or any combination thereof, through which input data items are received for processing by the parameter-selective processing pipeline. An output data interface transmits processed results, e.g., to at least one of the host computer system via the host interface connector, a network via a network port, or an external device via a dedicated output connector, or any combination thereof.

In some embodiments, the integrated circuit is implemented on a network interface card (NIC) that provides network connectivity to a host computer system while performing parameter-selective processing on network data as shown in FIG. 10 in accordance with some embodiments. In accordance with some embodiments, the NIC includes the integrated circuit, one or more network ports, e.g., Ethernet ports supporting 10 Gigabit Ethernet (10 GbE), 25 Gigabit Ethernet (25 GbE), 100 Gigabit Ethernet (100 GbE), or higher data rates, or fiber-optic transceiver interfaces, and a host interface connector, e.g., a PCIe connector, for communication with the host processor.

In certain implementations, the parameter-selective processing pipeline on the NIC processes network packets, frames, or protocol data units as input data items, with measurement circuitry computing condition values from packet header fields, payload characteristics, or traffic statistics, selection circuitry selecting a parameter set based on the computed condition values, and processing circuitry applying the selected parameter set to perform, by way of example and not limitation, at least one of packet classification, deep packet inspection, traffic shaping, protocol conversion, encryption, decryption, error correction, or flow-based quality-of-service enforcement, or any combination thereof. In keeping with some embodiments, the NIC is inserted into a PCIe slot or mounted in a network appliance chassis and receives power from the host system or chassis backplane.

In various embodiments, the NIC supports multiple parameter sets for different traffic classes, protocol types, or security policies, with selection circuitry selecting among parameter sets on a per-packet basis as described herein and the M+C+K per-packet processing latency being identical across all parameter sets.

In some embodiments, the integrated circuit is incorporated into a computer system that includes a host processor, main memory, and the integrated circuit coupled to the host processor via a system bus or interconnect. In accordance with some embodiments, the computer system includes the host processor, e.g., a central processing unit (CPU), main memory, e.g., dynamic random-access memory (DRAM), a system interconnect coupling the host processor and main memory. The computer system further includes the integrated circuit as described herein. The integrated circuit can be implemented as at least one of a discrete chip on a motherboard, an acceleration card in an expansion slot, a SoC incorporating the host processor on the same die, or a multi-chip module (MCM) packaging the host processor die and the integrated circuit die in a single package, or any combination thereof.

In certain implementations, the host processor loads parameter sets into bounded-latency parameter memory of the integrated circuit via the system interconnect, e.g., through memory-mapped I/O (MMIO) registers, through DMA transfers, or through a dedicated configuration interface, and the integrated circuit processes input data items using the parameter-selective processing pipeline independently of and concurrently with the host processor's execution of software. In keeping with some embodiments, the computer system is implemented as at least one of a server, a desktop computer, a workstation, an embedded computing platform, a rack-mounted computing node, a blade server, an edge computing device, or a portable computing device, or any combination thereof.

In accordance with aspects of the disclosure, the integrated circuit is incorporated into a processing appliance that is a self-contained device receiving input data from an external source, processing the input data through the parameter-selective processing pipeline, and providing output data to an external destination. In some embodiments, the processing appliance includes a housing, a power supply, the integrated circuit as described herein, an input interface for receiving input data items, e.g., an analog input with ADC, a digital serial input, a sensor interface, or a network port, and an output interface for providing processed results, e.g., a digital output, an actuator control interface, a display interface, or a network port.

The processing appliance in certain implementations operates as a standalone device without a separate host computer system, with a management processor or microcontroller on the appliance performing initialization, parameter set loading, and monitoring functions, while the parameter-selective processing pipeline operates autonomously with deterministic M+C+K timing after initialization.

In keeping with some embodiments, the processing appliance is deployed in, by way of illustrative example, at least one of an industrial automation environment, e.g., a factory floor or process control facility. Additional deployments include a telecommunications infrastructure, e.g., a cell tower cabinet or central office, a financial trading venue, e.g., an exchange colocation facility or trading floor, a power grid substation, a radar installation, a satellite ground station, or any combination thereof. In various embodiments, the processing appliance includes environmental protection features, e.g., ruggedized housing, conformal coating on the printed circuit board, extended temperature range components, electromagnetic interference (EMI) shielding, or thermal management provisions such as heatsinks, thermal interface materials, or forced-air cooling, selected based on the deployment environment.

In some embodiments, a hardware-implemented method for processing input data items includes receiving an input data item, computing at least one condition value from the input data item using measurement circuitry in M clock cycles, selecting a parameter set from a plurality of parameter sets stored in bounded-latency parameter memory based on the at least one condition value using selection circuitry in C clock cycles, and processing the input data item using processing circuitry in K clock cycles using the selected parameter set, where M, C, and K are each predetermined and the total latency M+C+K is identical for all input data items and all parameter set selections.

In accordance with some embodiments, the method is performed entirely in hardware by the integrated circuit as described herein, without execution of software instructions for the measurement, selection, or processing steps, and each step is performed by dedicated circuitry as described herein.

In certain implementations, the method further includes loading parameter sets into bounded-latency parameter memory prior to processing input data items, e.g., during an initialization phase, a maintenance window, or upon command from a host interface, and the loading is performed by at least one of a host processor, a management controller, or a configuration interface communicating with bounded-latency parameter memory through a loading interface, or any combination thereof.

In keeping with some embodiments, the method processes a continuous stream of input data items, with each input data item potentially receiving a different parameter set selected based on condition values measured for that item, and the method produces, for each input data item, at least one of a processed output value, a classification result, a detection flag, a transformed data item, or a control signal, or any combination thereof.

In some embodiments, a non-transitory computer-readable medium stores configuration data that, when used to configure a configurable integrated circuit, e.g., a field-programmable gate array (FPGA) or a structured ASIC, causes the configurable integrated circuit to implement measurement circuitry, selection circuitry, processing circuitry, and bounded-latency parameter memory as described herein. In accordance with some embodiments, the configuration data includes, by way of example and not limitation, at least one of a bitstream file for an FPGA, a configuration file for a structured ASIC, a hardware description language (HDL) source file, a gate-level netlist, or a register-transfer-level (RTL) description, or any combination thereof. When applied to the configurable integrated circuit, the configuration data instantiates the parameter-selective processing pipeline with the structural properties described herein, including predetermined M, C, and K clock cycle counts, bounded-latency parameter memory, and deterministic total latency M+C+K.

In certain implementations, the non-transitory computer-readable medium includes, e.g., a flash memory device, a magnetic disk, an optical disc, a solid-state drive, or a network-accessible storage location, and the configuration data is transferred from the medium to the configurable integrated circuit through a configuration interface, e.g., a JTAG interface, a serial configuration interface, or a parallel configuration interface, during an initial configuration phase.

In some embodiments, a computer-implemented method for designing an integrated circuit as described herein includes specifying the measurement circuitry pipeline structure and determining M, specifying the selection circuitry pipeline structure and determining C, specifying the processing circuitry pipeline structure and determining K, allocating bounded-latency parameter memory capacity for a predetermined number of parameter sets, and verifying that the total latency M+C+K meets a timing requirement for the target application.

In accordance with some embodiments, the design method further includes, by way of example and not limitation, at least one of performing logic synthesis from a hardware description language (HDL) specification to generate a gate-level netlist, performing place-and-route to generate a physical layout, performing static timing analysis (STA) to verify that each pipeline stage meets setup and hold timing constraints at the target clock frequency, and generating a configuration bitstream or a manufacturing data set from the physical layout. Additional steps can include inserting design-for-test (DFT) structures, e.g., scan chains or built-in self-test (BIST) circuitry, for manufacturing test, or any combination thereof.

The design method in certain implementations includes verifying the deterministic timing properties described herein, e.g., confirming that M, C, and K are each independent of input data values and parameter set selection, confirming that the total latency M+C+K is identical for all parameter sets. The design method can further include confirming that the parameter-selective processing pipeline operates with timing isolation from other circuitry on the integrated circuit. Verification can be performed, for example, by pipeline stage counting and static timing analysis as described herein, prior to fabrication of the integrated circuit.

In some embodiments, the design method includes generating timing constraint data, e.g., constraint files compatible with static timing analysis tools, that specify the predetermined cycle counts M, C, and K as design constraints, such that the static timing analysis tool verifies that no path through the processing pipeline exceeds the specified cycle count for any parameter set. In certain implementations, the design method includes programmatic analysis of the datapath graph to identify and reject variable-latency paths, e.g., paths that include data-dependent loop termination, data-dependent pipeline stall conditions, or data-dependent memory access patterns, such that the design tool verifies that the pipeline structure satisfies the timing invariance properties described herein prior to synthesis.

In some embodiments, input data is transformed into a fixed-dimension representation prior to processing by the parameter-selective processing pipeline, where the ratio of representation dimension to original data dimension is a design parameter affecting the richness of information available to processing circuitry, e.g., lower dimensions reduce memory requirements and computation time but may attenuate transient features, while higher dimensions preserve more information at greater resource cost.

In accordance with some embodiments directed to at least one of anomaly detection, safety-critical monitoring, or rare-event identification, or any combination thereof, the deterministic timing and data-quality-aware parameter set selection as described herein, e.g., selecting parameter sets with higher sensitivity when condition values indicate degraded signal quality, are expected to support detection of rare or transient events within the fixed M+C+K timing envelope. In certain implementations, specific detection rates, representation dimension choices, and quality metric definitions are application-dependent and are not structural properties of the architecture, and different implementations may use different representation dimensions, different quality metrics, and different parameter set selection criteria as appropriate to the target application.

The following examples further illustrate various embodiments but, of course, should not be construed as in any way limiting the scope of the claims. The following examples are illustrative implementations demonstrating how the condition-adaptive architectural principles described herein are realized across different application domains, implementation technologies, and operating parameters. In each example, the architecture selects a potentially different parameter set for each successive input data item based on runtime-measured condition values. The total number of clock cycles from input data arrival to output data availability is predetermined for each parameter set and does not vary based on which conditions were measured, which parameter set was selected, or which input data values were processed.

The values of M, C, K, clock frequency, and other parameters in each example are representative for illustration purposes only and do not limit the scope of the disclosure to the specific values shown. Actual values of M, C, K, clock frequency, and other parameters depend on implementation choices as described herein, and the architectural principles described in the examples and elsewhere herein apply regardless of the specific numeric values selected for a given implementation.

The disclosure is further illustrated by the following exemplary aspects. Other exemplary combinations are apparent from the entirety of the description herein. It will also be understood by one of ordinary skill in the art that various aspects may be used in various combinations with the other aspects provided herein. Individual features described in connection with any aspect may be implemented independently or in combination with other features, and no aspect is intended to require all features described therein.

1. An integrated circuit comprising: measurement circuitry on the integrated circuit measuring at least one condition value in a first fixed number of clock cycles independent of measured values; selection circuitry selecting one of a plurality of parameter sets based on the at least one condition value in a second fixed number of clock cycles independent of condition values and selection, the selection circuitry operating without instruction fetch, program counter, or stored-program execution; random-access memory coupled to the processing circuitry and the selection circuitry via address and data connections and storing the plurality of parameter sets as data values, wherein the random-access memory provides identical non-speculative access latency in clock cycles independent of which parameter set is accessed, and wherein the random-access memory excludes cache memory; processing circuitry having fixed topology processing input data using parameters from the selected parameter set, the processing circuitry executing in a third fixed number of clock cycles per parameter set independent of condition values or input data.

2. The integrated circuit of aspect 1, wherein the processing circuitry executes a predetermined sequence of operations having a fixed number of pipeline stages and no data-dependent branches, such that control flow of the processing circuitry is invariant across all parameter sets.

3. The integrated circuit of aspect 2, wherein the predetermined sequence comprises fixed-iteration loops having iteration counts that are constant and independent of input data values.

4. The integrated circuit of any one of aspects 1-3, wherein the processing circuitry accesses the random-access memory for parameters according to a predetermined address sequence having a fixed number of memory accesses per parameter set, independent of input data values and independent of the at least one condition value.

5. The integrated circuit of any one of aspects 1-4, wherein the random-access memory comprises static random-access memory on the integrated circuit die.

6. The integrated circuit of aspect 5, wherein the static random-access memory comprises tightly coupled memory providing single-cycle access latency.

7. The integrated circuit of any one of aspects 1-4, wherein the random-access memory comprises block random-access memory of a field-programmable gate array.

8. The integrated circuit of any one of aspects 1-7, wherein the random-access memory is distinct from any cache memory coupled to a processor core and is accessed by the processing circuitry and the selection circuitry via explicit addressing without tag lookup or replacement policy logic.

9. The integrated circuit of any one of aspects 1-4, wherein the random-access memory comprises a memory controller on the integrated circuit providing fixed-latency arbitration to dynamic random-access memory, wherein the memory controller enforces the identical non-speculative access latency through reserved bandwidth allocation.

10. The integrated circuit of any one of aspects 1-9, wherein all of the plurality of parameter sets are accessible through a unified address space via identical addressing logic.

11. The integrated circuit of any one of aspects 1-10, wherein access to the plurality of parameter sets from the random-access memory occurs via dedicated access paths without shared arbitration logic.

12. The integrated circuit of any one of aspects 1-11, wherein the random-access memory comprises scratchpad memory directly addressable without cache controller logic.

13. The integrated circuit of any one of aspects 1-12, wherein the random-access memory is physically located on a same die as the measurement circuitry, the selection circuitry, and the processing circuitry.

14. The integrated circuit of any one of aspects 1-13, wherein the random-access memory comprises high-bandwidth memory in a three-dimensional stacked configuration with the integrated circuit.

15. The integrated circuit of any one of aspects 1-14, wherein the selection circuitry comprises at least one of: a comparator array comparing the at least one condition value to a plurality of threshold values; a finite state machine generating a selection index; or a lookup table addressed by the at least one condition value.

16. The integrated circuit of aspect 15, wherein the finite state machine comprises a state register and combinational logic implementing next-state and output functions.

17. The integrated circuit of any one of aspects 1-16, wherein the selection circuitry generates an index value identifying the selected parameter set without microcode storage, instruction decoding, or branch prediction logic.

18. The integrated circuit of any one of aspects 1-17, wherein the selection circuitry comprises combinational logic, and wherein the second fixed number of clock cycles equals one.

19. The integrated circuit of any one of aspects 1-18, wherein the selection circuitry has a propagation delay that is independent of values of the at least one condition value.

20. The integrated circuit of any one of aspects 1-19, further comprising multiplexer circuits having data inputs coupled to the random-access memory, select inputs receiving signals from the selection circuitry, and outputs coupled to the processing circuitry.

21. The integrated circuit of any one of aspects 1-20, wherein total execution time from completion of the measurement circuitry to completion of the processing circuitry for a given parameter set equals the first fixed number plus the second fixed number plus the third fixed number of clock cycles.

22. The integrated circuit of aspect 21, wherein the measurement circuitry, the selection circuitry, and the processing circuitry comprise clocked pipeline stages with fixed stage latencies, such that end-to-end latency remains constant across all admissible values of the at least one condition value.

23. The integrated circuit of any one of aspects 1-22, wherein the third fixed number of clock cycles is identical for all of the plurality of parameter sets.

24. The integrated circuit of any one of aspects 1-22, wherein the third fixed number of clock cycles varies between parameter sets by less than twenty percent of a maximum third fixed number.

25. The integrated circuit of any one of aspects 1-24, wherein the plurality of parameter sets comprise neural network weight values.

26. The integrated circuit of any one of aspects 1-24, wherein the plurality of parameter sets comprise filter coefficient values.

27. The integrated circuit of any one of aspects 1-24, wherein the plurality of parameter sets comprise threshold values.

28. The integrated circuit of any one of aspects 1-24, wherein the plurality of parameter sets comprise lookup table contents.

29. The integrated circuit of any one of aspects 1-24, wherein the plurality of parameter sets comprise quantization parameter values.

30. The integrated circuit of any one of aspects 1-24, wherein the plurality of parameter sets comprise error correction code parameters.

31. The integrated circuit of any one of aspects 1-24, wherein the plurality of parameter sets comprise algorithmic mode selection values.

32. The integrated circuit of any one of aspects 1-24, wherein the plurality of parameter sets comprise precision level selection values.

33. The integrated circuit of any one of aspects 1-24, wherein the plurality of parameter sets comprise processing quality preset values.

34. The integrated circuit of any one of aspects 1-33, wherein the at least one condition value comprises temperature.

35. The integrated circuit of any one of aspects 1-33, wherein the at least one condition value comprises power consumption.

36. The integrated circuit of any one of aspects 1-33, wherein the at least one condition value comprises processing load.

37. The integrated circuit of any one of aspects 1-33, wherein the at least one condition value comprises signal quality.

38. The integrated circuit of any one of aspects 1-33, wherein the at least one condition value comprises error rate.

39. The integrated circuit of any one of aspects 1-33, wherein the at least one condition value comprises network latency.

40. The integrated circuit of any one of aspects 1-33, wherein the at least one condition value comprises threat level.

41. The integrated circuit of any one of aspects 1-33, wherein the at least one condition value comprises battery charge level.

42. The integrated circuit of any one of aspects 1-33, wherein the at least one condition value comprises queue depth.

43. The integrated circuit of any one of aspects 1-33, wherein the at least one condition value comprises bandwidth availability.

44. The integrated circuit of any one of aspects 1-43, wherein the processing circuitry comprises arithmetic logic units.

45. The integrated circuit of any one of aspects 1-43, wherein the processing circuitry comprises multiply-accumulate arrays.

46. The integrated circuit of any one of aspects 1-43, wherein the processing circuitry comprises digital signal processing circuits.

47. The integrated circuit of any one of aspects 1-43, wherein the processing circuitry comprises neural network processing circuits.

48. The integrated circuit of any one of aspects 1-43, wherein the processing circuitry comprises video processing circuits.

49. The integrated circuit of any one of aspects 1-43, wherein the processing circuitry comprises packet processing circuits.

50. The integrated circuit of any one of aspects 1-43, wherein the processing circuitry comprises error correction circuits.

51. The integrated circuit of any one of aspects 1-43, wherein the processing circuitry comprises image signal processing circuits.

52. The integrated circuit of any one of aspects 1-51, wherein the measurement circuitry comprises sensor interface circuits measuring at least one of: ambient illumination, rain intensity, vehicle speed, or sensor quality metrics from at least one of LiDAR, RADAR, camera, or inertial sensors; wherein the plurality of parameter sets comprise neural network weight values for autonomous vehicle perception; and wherein the processing circuitry comprises neural network processing circuits.

53. The integrated circuit of aspect 52, wherein the plurality of parameter sets correspond to environmental operating modes including at least day driving, night driving, and adverse weather conditions, and wherein the third fixed number of clock cycles is predetermined for each environmental operating mode.

54. The integrated circuit of any one of aspects 1-51, wherein the measurement circuitry comprises circuits measuring at least one of: vibration metrics, temperature metrics, or rare-event scores from sensor data; wherein the plurality of parameter sets correspond to anomaly detection sensitivities; and wherein the processing circuitry executes industrial equipment monitoring algorithms.

55. The integrated circuit of any one of aspects 1-54, wherein the integrated circuit is integrated into a system-on-chip including at least one processor core and tightly coupled memory, and wherein the measurement circuitry, the selection circuitry, the random-access memory, and the processing circuitry comprise fixed-latency pipeline stages such that worst-case execution time is statically bounded for safety-critical control functions.

56. The integrated circuit of any one of aspects 1-55, wherein the measurement circuitry comprises a temperature sensor and analog-to-digital converter measuring integrated circuit die temperature; wherein the plurality of parameter sets comprise neural network weight values encoded at different quantization precision levels; wherein the processing circuitry comprises multiply-accumulate arrays executing neural network operations; and wherein the multiply-accumulate arrays pack multiple lower-precision operations into higher-precision multipliers such that execution time remains constant across quantization precision levels.

57. The integrated circuit of any one of aspects 1-55, wherein the measurement circuitry comprises signal-to-noise ratio estimation circuitry analyzing input data quality; wherein the plurality of parameter sets comprise image reconstruction algorithm parameters including at least one of filter coefficients or regularization weights; wherein the processing circuitry comprises at least one of: Fourier transform circuits, filtering circuits, or iterative reconstruction circuits executing medical image reconstruction; and wherein different parameter sets correspond to different reconstruction quality levels.

58. The integrated circuit of any one of aspects 1-55, wherein the measurement circuitry comprises bandwidth estimation circuitry measuring available network bandwidth or storage bandwidth; wherein the plurality of parameter sets comprise video encoding quality presets including at least one of quantization parameter values or motion estimation search ranges; wherein the processing circuitry comprises at least one of: transform circuits, quantization circuits, or entropy coding circuits executing video encoding; and wherein the third fixed number of clock cycles per frame is identical across all quality presets.

59. The integrated circuit of any one of aspects 1-55, wherein the measurement circuitry comprises bit error rate monitoring circuits analyzing data read from storage media or received from communication channels; wherein the plurality of parameter sets comprise error correction code parameters including at least one of different code strengths or different code rates; wherein the processing circuitry comprises error correction decoding circuits; and wherein different parameter sets are selected based on bit error rate.

60. The integrated circuit of any one of aspects 1-55, wherein the measurement circuitry comprises channel quality indicator measurement circuits evaluating wireless channel conditions; wherein the plurality of parameter sets comprise modulation and coding scheme parameters including different combinations of modulation order and code rate; wherein the processing circuitry comprises at least one of: demodulation circuits, de-interleaving circuits, turbo decoding circuits, or LDPC decoding circuits; and wherein different parameter sets correspond to different modulation and coding schemes selected based on channel quality.

61. The integrated circuit of any one of aspects 1-55, wherein the measurement circuitry comprises at least one of: ambient light sensor interface, scene complexity analyzer, or motion detection circuits; wherein the plurality of parameter sets comprise image signal processing parameters including at least one of noise reduction strength, edge enhancement parameters, or dynamic range compression settings; wherein the processing circuitry comprises at least one of: demosaicing circuits, color correction circuits, tone mapping circuits, or noise reduction circuits; and wherein different parameter sets are selected based on scene conditions.

62. The integrated circuit of any one of aspects 1-61, wherein the measurement circuitry measures at least two different types of condition values, and wherein the selection circuitry generates the selection based on a combination of the at least two different types of condition values.

63. The integrated circuit of any one of aspects 1-62, further comprising arithmetic logic circuits configured to compute the at least one condition value from input data or system state, wherein the arithmetic logic circuits execute in a number of clock cycles that is independent of values of the at least one condition value.

64. The integrated circuit of any one of aspects 1-63, wherein the integrated circuit comprises a single monolithic die.

65. The integrated circuit of any one of aspects 1-63, wherein the integrated circuit comprises multiple dies in a multi-chip package.

66. The integrated circuit of any one of aspects 1-65, wherein the plurality of parameter sets control computational behavior including algorithmic parameters and precision parameters, excluding operating frequency values and supply voltage values.

67. The integrated circuit of any one of aspects 1-66, wherein the measurement circuitry, the selection circuitry, the random-access memory, and the processing circuitry are implemented within a same package.

68. The integrated circuit of any one of aspects 1-67, wherein the integrated circuit comprises a field-programmable gate array.

69. The integrated circuit of any one of aspects 1-67, wherein the integrated circuit comprises an application-specific integrated circuit.

70. The integrated circuit of any one of aspects 1-69, further comprising double-buffered registers holding parameters from the selected parameter set.

71. The integrated circuit of any one of aspects 1-70, wherein all processing units within the fixed topology are active for all parameter sets without selective activation or deactivation of processing units based on parameter set selection.

72. The integrated circuit of any one of aspects 1-71, wherein the measurement circuitry, the selection circuitry, and the processing circuitry execute on a single execution pipeline without task migration between separate processing units and without arbitration between competing execution contexts.

73. The integrated circuit of any one of aspects 1-71, wherein the measurement circuitry, the selection circuitry, and the processing circuitry operate concurrently with all other circuitry on the integrated circuit without requiring suspension of any processor core or processing unit.

74. The integrated circuit of any one of aspects 1-73, wherein transitions between parameter sets occur without partial reconfiguration of programmable logic, without interruption of data processing, and without reconfiguration overhead cycles.

75. The integrated circuit of any one of aspects 1-74, wherein the selection circuitry selects potentially different parameter sets for consecutive input data items without requiring a reconfiguration interval between the consecutive input data items.

76. An acceleration card comprising: a circuit board; a host interface on the circuit board configured to receive input data from a host system and to provide output data to the host system; an integrated circuit mounted on the circuit board, the integrated circuit comprising: measurement circuitry on the integrated circuit measuring at least one condition value in a first fixed number of clock cycles independent of measured values; selection circuitry selecting one of a plurality of parameter sets based on the at least one condition value in a second fixed number of clock cycles independent of condition values and selection, the selection circuitry operating without instruction fetch, program counter, or stored-program execution; random-access memory coupled to the processing circuitry and the selection circuitry via address and data connections and storing the plurality of parameter sets as data values, wherein the random-access memory provides identical non-speculative access latency in clock cycles independent of which parameter set is accessed, and wherein the random-access memory excludes cache memory; and processing circuitry having fixed topology processing input data using parameters from the selected parameter set, the processing circuitry executing in a third fixed number of clock cycles per parameter set independent of condition values or input data; wherein the host interface is coupled to the processing circuitry.

77. The acceleration card of aspect 76, wherein the host interface comprises a PCI Express interface, and wherein the processing circuitry provides processed output data to the host system via the PCI Express interface with a per-transaction latency that is independent of which of the plurality of parameter sets is selected.

78. The acceleration card of aspects 76 or 77, wherein the host interface comprises a Compute Express Link interface.

79. The acceleration card of any one of aspects 76-78, further comprising card-mounted memory coupled to the integrated circuit and providing additional storage for parameter sets or intermediate results.

80. The acceleration card of any one of aspects 76-79, further comprising power regulation circuitry on the circuit board providing power to the integrated circuit, wherein the power regulation circuitry maintains a fixed supply voltage during transitions between parameter sets such that the third fixed number of clock cycles is not affected by power state changes.

81. The acceleration card of any one of aspects 76-80, wherein the circuit board conforms to at least one of: a PCI Express full-height full-length form factor, a PCI Express half-height half-length form factor, an M.2 form factor, or an OCP Accelerator Module form factor.

82. The acceleration card of any one of aspects 76-81, further comprising thermal management structures on the circuit board coupled to the integrated circuit, wherein the measurement circuitry measures die temperature of the integrated circuit, and wherein the plurality of parameter sets include at least one parameter set comprising reduced-precision computation parameters for elevated temperature operation.

83. The acceleration card of any one of aspects 76-82, wherein the processing circuitry comprises multiply-accumulate arrays, wherein the plurality of parameter sets comprise neural network weight values, and wherein the host interface provides output data to the host system with deterministic latency per inference operation.

84. The acceleration card of any one of aspects 76-83, wherein the plurality of parameter sets comprise power state parameters, and further comprising power management circuitry on the circuit board configured to adjust power states of the integrated circuit according to power state parameters from the selected parameter set.

85. The acceleration card of any one of aspects 76-80, wherein the circuit board comprises a plurality of the integrated circuits.

86. The acceleration card of any one of aspects 76-85, wherein all processing units within the fixed topology are active for all parameter sets without selective activation or deactivation of processing units based on parameter set selection.

87. A network interface card comprising: a circuit board; network port circuitry on the circuit board configured to receive data from a network and transmit data to the network; an integrated circuit on the circuit board, the integrated circuit comprising: measurement circuitry on the integrated circuit measuring at least one condition value in a first fixed number of clock cycles independent of measured values; selection circuitry selecting one of a plurality of parameter sets based on the at least one condition value in a second fixed number of clock cycles independent of condition values and selection, the selection circuitry operating without instruction fetch, program counter, or stored-program execution; random-access memory coupled to the processing circuitry and the selection circuitry via address and data connections and storing the plurality of parameter sets as data values, wherein the random-access memory provides identical non-speculative access latency in clock cycles independent of which parameter set is accessed, and wherein the random-access memory excludes cache memory; and processing circuitry having fixed topology processing received data using parameters from the selected parameter set, the processing circuitry executing in a third fixed number of clock cycles per parameter set independent of condition values or input data; wherein the network port circuitry is coupled to the processing circuitry.

88. The network interface card of aspect 87, wherein the processing circuitry executes a predetermined sequence of operations having a fixed number of pipeline stages and no data-dependent branches, such that control flow of the processing circuitry is invariant across all parameter sets.

89. The network interface card of any one of aspects 87-88, wherein the random-access memory comprises at least one of static random-access memory or block random-access memory of a field-programmable gate array.

90. The network interface card of any one of aspects 87-89, wherein the third fixed number of clock cycles is identical for all of the plurality of parameter sets.

91. The network interface card of any one of aspects 87-89, wherein the third fixed number of clock cycles varies between parameter sets by less than twenty percent of a maximum third fixed number.

92. The network interface card of any one of aspects 87-91, wherein the network port circuitry comprises Ethernet physical layer circuitry.

93. The network interface card of any one of aspects 87-91, wherein the network port circuitry comprises InfiniBand physical layer circuitry.

94. The network interface card of any one of aspects 87-93, wherein the at least one condition value comprises at least one of: packet queue depth, traffic rate, threat score, or connection count.

95. The network interface card of any one of aspects 87-94, wherein the plurality of parameter sets comprise packet inspection depth parameters ranging from header-only inspection to deep payload analysis.

96. The network interface card of any one of aspects 87-94, wherein the plurality of parameter sets comprise cryptographic processing parameters.

97. The network interface card of any one of aspects 87-96, wherein the processing circuitry performs operations beyond network protocol handling, including at least one of: application-layer data inspection, cryptographic operations, pattern matching, or inference operations on received data.

98. The network interface card of any one of aspects 87-97, further comprising a host interface on the circuit board configured to communicate with a host processor.

99. The network interface card of any one of aspects 87-98, wherein the circuit board comprises a plurality of the integrated circuits.

100. The network interface card of any one of aspects 87-99, wherein the integrated circuit comprises a field-programmable gate array.

101. The network interface card of any one of aspects 87-99, wherein the integrated circuit comprises an application-specific integrated circuit.

102. The network interface card of any one of aspects 87-101, further comprising double-buffered registers holding parameters from the selected parameter set.

103. The network interface card of any one of aspects 87-102, wherein the selection circuitry selects potentially different parameter sets for consecutive input data items without requiring a reconfiguration interval between the consecutive input data items.

104. The network interface card of aspect 87, wherein all processing units within the fixed topology are active for all parameter sets without selective activation or deactivation of processing units based on parameter set selection.

105. A computer system comprising: a host processor; system memory coupled to the host processor; an acceleration subsystem coupled to the host processor, the acceleration subsystem comprising an integrated circuit, the integrated circuit comprising: measurement circuitry on the integrated circuit measuring at least one condition value in a first fixed number of clock cycles independent of measured values; selection circuitry selecting one of a plurality of parameter sets based on the at least one condition value in a second fixed number of clock cycles independent of condition values and selection, the selection circuitry operating without instruction fetch, program counter, or stored-program execution; random-access memory coupled to the processing circuitry and the selection circuitry via address and data connections and storing the plurality of parameter sets as data values, wherein the random-access memory provides identical non-speculative access latency in clock cycles independent of which parameter set is accessed, and wherein the random-access memory excludes cache memory; and processing circuitry having fixed topology processing input data using parameters from the selected parameter set, the processing circuitry executing in a third fixed number of clock cycles per parameter set independent of condition values or input data; wherein the host processor is configured to transfer input data to the acceleration subsystem and receive processed output data from the acceleration subsystem.

106. The computer system of aspect 105, wherein the processing circuitry executes a predetermined sequence of operations having a fixed number of pipeline stages and no data-dependent branches.

107. The computer system of any one of aspects 105-106, wherein the third fixed number of clock cycles is identical for all of the plurality of parameter sets.

108. The computer system of any one of aspects 105-106, wherein the third fixed number of clock cycles varies between parameter sets by less than twenty percent of a maximum third fixed number.

109. The computer system of any one of aspects 105-108, wherein the acceleration subsystem comprises an acceleration card coupled to the host processor via at least one of a PCI Express interface or a Compute Express Link interface.

110. The computer system of any one of aspects 105-109, further comprising application software stored in the system memory and executable by the host processor, the application software configured to transfer input data to the acceleration subsystem.

111. The computer system of aspect 110, further comprising driver software stored in the system memory and executable by the host processor, the driver software configured to program the plurality of parameter sets into the random-access memory.

112. The computer system of any one of aspects 105-111, wherein the plurality of parameter sets comprise at least one of: neural network weight values, video encoding parameters, packet inspection parameters, or error correction code parameters.

113. The computer system of any one of aspects 105-112, wherein the at least one condition value comprises at least one of: temperature, processing load, signal quality, error rate, queue depth, network latency, or threat level.

114. The computer system of any one of aspects 105-113, wherein the computer system is installed in a vehicle, and wherein the plurality of parameter sets correspond to different perception algorithm configurations.

115. The computer system of any one of aspects 105-113, wherein the computer system is configured for medical imaging, and wherein the plurality of parameter sets comprise image reconstruction algorithm parameters.

116. The computer system of any one of aspects 105-115, further comprising a plurality of the acceleration subsystems coupled to the host processor.

117. The computer system of any one of aspects 105-116, wherein the integrated circuit comprises at least one of a field-programmable gate array or an application-specific integrated circuit.

118. The computer system of any one of aspects 105-117, wherein the integrated circuit operates continuously without halting or suspending execution during transitions between parameter sets.

119. The computer system of any one of aspects 105-118, wherein the selection circuitry selects potentially different parameter sets for consecutive input data items without requiring a reconfiguration interval between the consecutive input data items.

120. The computer system of any one of aspects 105-119, further comprising double-buffered registers in the integrated circuit holding parameters from the selected parameter set.

121. The computer system of aspect 105, wherein all processing units within the fixed topology of the processing circuitry are active for all parameter sets without selective activation or deactivation of processing units based on parameter set selection.

122. A hardware-implemented method for processing input data, the method performed by an integrated circuit and comprising: measuring, by measurement circuitry of the integrated circuit, at least one condition value in a first fixed number of clock cycles independent of measured values; selecting, by selection circuitry of the integrated circuit, one of a plurality of parameter sets based on the at least one condition value in a second fixed number of clock cycles independent of condition values and selection, wherein the selecting is performed without instruction fetch, program counter, or stored-program execution; accessing parameters from the selected parameter set from random-access memory that provides identical non-speculative access latency in clock cycles independent of which parameter set is accessed, wherein the random-access memory excludes cache memory; and processing, by processing circuitry of the integrated circuit having fixed topology, the input data using the accessed parameters, the processing executing in a third fixed number of clock cycles per parameter set independent of condition values or input data.

123. The method of aspect 122, wherein total execution time from the measuring to completion of the processing equals the first fixed number plus the second fixed number plus the third fixed number of clock cycles, independent of the at least one condition value.

124. The method of any one of aspects 122-123, wherein the processing comprises executing a predetermined sequence of operations having a fixed number of pipeline stages and no data-dependent branches.

125. The method of aspect 124, wherein the predetermined sequence comprises fixed-iteration loops having iteration counts that are constant and independent of input data values.

126. The method of any one of aspects 122-125, wherein the measuring, the selecting, and the processing are performed continuously for successive input data items without halting or suspending execution during transitions between parameter sets.

127. The method of any one of aspects 122-126, wherein the third fixed number of clock cycles is identical for all of the plurality of parameter sets.

128. The method of any one of aspects 122-126, wherein the third fixed number of clock cycles varies between parameter sets by less than twenty percent of a maximum third fixed number.

129. The method of any one of aspects 122-128, further comprising preloading the plurality of parameter sets into the random-access memory prior to the measuring.

130. The method of any one of aspects 122-129, wherein the at least one condition value changes between successive input data items, and wherein the total execution time remains constant despite the changes.

131. The method of any one of aspects 122-130, wherein the at least one condition value comprises at least one of: temperature, power consumption, processing load, signal quality, error rate, queue depth, threat level, or battery charge level.

132. The method of any one of aspects 122-131, wherein the plurality of parameter sets comprise at least one of: neural network weight values, filter coefficients, quantization parameters, error correction code parameters, or algorithmic mode selection values.

133. The method of any one of aspects 122-132, wherein the random-access memory comprises at least one of static random-access memory or block random-access memory of a field-programmable gate array.

134. The method of any one of aspects 122-133, further comprising verifying, at design time, that the first fixed number, the second fixed number, and the third fixed number are bounded by static timing analysis.

135. The method of any one of aspects 122-134, wherein the selection circuitry selects potentially different parameter sets for consecutive input data items without requiring a reconfiguration interval between the consecutive input data items.

136. The method of any one of aspects 122-135, wherein the measuring measures at least two different types of condition values, and wherein the selecting generates the selection based on a combination of the at least two different types.

137. The method of aspect 122, wherein all processing units within the fixed topology are active for all parameter sets without selective activation or deactivation of processing units based on parameter set selection.

138. A non-transitory computer-readable medium storing configuration data that, when synthesized or programmed into hardware, produces an integrated circuit comprising: measurement circuitry measuring at least one condition value in a first fixed number of clock cycles independent of measured values; selection circuitry selecting one of a plurality of parameter sets based on the at least one condition value in a second fixed number of clock cycles independent of condition values and selection, the selection circuitry operating without instruction fetch, program counter, or stored-program execution; random-access memory storing the plurality of parameter sets, wherein the random-access memory provides identical non-speculative access latency in clock cycles independent of which parameter set is accessed, and wherein the random-access memory excludes cache memory; and processing circuitry having fixed topology processing input data using parameters from the selected parameter set, the processing circuitry executing in a third fixed number of clock cycles per parameter set independent of condition values or input data.

139. The non-transitory computer-readable medium of aspect 138, wherein the configuration data comprises hardware description language source code.

140. The non-transitory computer-readable medium of aspect 139, wherein the hardware description language comprises at least one of VHDL, Verilog, or System Verilog.

141. The non-transitory computer-readable medium of aspect 138, wherein the configuration data comprises a gate-level netlist.

142. The non-transitory computer-readable medium of aspect 138, wherein the configuration data comprises a field-programmable gate array bitstream.

143. The non-transitory computer-readable medium of aspect 138, wherein the configuration data comprises application-specific integrated circuit layout data.

144. The non-transitory computer-readable medium of any one of aspects 138-143, wherein the configuration data is parameterized to allow configuration of at least one of a count of the plurality of parameter sets, a size of the random-access memory, or a bit width of the processing circuitry.

145. The non-transitory computer-readable medium of any one of aspects 138-144, further storing timing constraint data specifying that the first fixed number, the second fixed number, and the third fixed number satisfy predetermined bounds.

146. The non-transitory computer-readable medium of any one of aspects 138-145, further storing simulation testbench data for verifying that total execution time is independent of which parameter set is selected.

147. The non-transitory computer-readable medium of any one of aspects 138-146, wherein the configuration data specifies that the processing circuitry executes an identical number of clock cycles for each of the plurality of parameter sets.

148. The non-transitory computer-readable medium of any one of aspects 138-146, wherein the configuration data specifies that the processing circuitry executes in a range from a minimum to a maximum number of clock cycles, wherein the maximum minus the minimum is less than twenty percent of the maximum.

149. The non-transitory computer-readable medium of any one of aspects 138-148, wherein the configuration data specifies the processing circuitry with bounded loop structures having iteration counts limited to predetermined values and without data-dependent conditional branches.

150. The non-transitory computer-readable medium of any one of aspects 138-149, wherein the configuration data specifies the random-access memory as at least one of block random-access memory or embedded static random-access memory.

151. The non-transitory computer-readable medium of any one of aspects 138-150, wherein the configuration data is encrypted.

152. The non-transitory computer-readable medium of any one of aspects 138-151, wherein the plurality of parameter sets specified by the configuration data comprise at least one of: neural network weight values, filter coefficient values, video encoding parameters, packet processing parameters, or error correction code parameters.

153. The non-transitory computer-readable medium of any one of aspects 138-152, wherein the configuration data specifies that transitions between parameter sets occur without partial reconfiguration of programmable logic and without reconfiguration overhead cycles.

154. A processing appliance comprising: a chassis; a plurality of integrated circuits mounted in the chassis, each of the integrated circuits comprising: measurement circuitry measuring at least one condition value in a first fixed number of clock cycles independent of measured values; selection circuitry selecting one of a plurality of parameter sets based on the at least one condition value in a second fixed number of clock cycles independent of condition values and selection, the selection circuitry operating without instruction fetch, program counter, or stored-program execution; random-access memory storing the plurality of parameter sets, wherein the random-access memory provides identical non-speculative access latency in clock cycles independent of which parameter set is accessed, and wherein the random-access memory excludes cache memory; and processing circuitry having fixed topology processing input data using parameters from the selected parameter set, the processing circuitry executing in a third fixed number of clock cycles per parameter set independent of condition values or input data; and interconnect circuitry coupling the plurality of integrated circuits.

155. The processing appliance of aspect 154, wherein each of the processing circuitry executes a predetermined sequence of operations having a fixed number of pipeline stages and no data-dependent branches.

156. The processing appliance of any one of aspects 154-155, wherein the third fixed number of clock cycles is identical for all of the plurality of parameter sets.

157. The processing appliance of any one of aspects 154-156, wherein the chassis is configured for mounting in an equipment rack.

158. The processing appliance of any one of aspects 154-157, further comprising load distribution circuitry configured to distribute input data across the plurality of integrated circuits.

159. The processing appliance of any one of aspects 154-158, further comprising network interface circuitry configured to receive input data from a network and transmit processed output data to the network.

160. The processing appliance of any one of aspects 154-159, further comprising a management processor configured to monitor and control the plurality of integrated circuits.

161. The processing appliance of any one of aspects 154-160, wherein the plurality of parameter sets correspond to different packet inspection depths, and wherein the processing appliance is configured as a network security device.

162. The processing appliance of any one of aspects 154-160, wherein the plurality of parameter sets correspond to different neural network configurations, and wherein the processing appliance is configured as an inference server.

163. The processing appliance of any one of aspects 154-160, wherein the plurality of parameter sets correspond to different video encoding configurations, and wherein the processing appliance is configured as a transcoding device.

164. The processing appliance of any one of aspects 154-160, wherein the plurality of parameter sets correspond to different error correction code strengths, and wherein the processing appliance is configured as a storage controller.

165. The processing appliance of any one of aspects 154-164, wherein each of the plurality of integrated circuits is mounted on a respective circuit board configured as a removable card.

166. The processing appliance of any one of aspects 154-165, wherein the plurality of integrated circuits comprise field-programmable gate arrays.

167. The processing appliance of any one of aspects 154-165, wherein the plurality of integrated circuits comprise application-specific integrated circuits.

168. The processing appliance of any one of aspects 154-167, further comprising redundant power supplies and redundant integrated circuits, wherein upon failure of any single integrated circuit, remaining integrated circuits continue processing with the third fixed number of clock cycles per parameter set.

169. The processing appliance of any one of aspects 154-168, wherein the selection circuitry of each of the integrated circuits selects potentially different parameter sets for consecutive input data items without requiring a reconfiguration interval between the consecutive input data items.

170. The processing appliance of aspect 154, wherein all processing units within the fixed topology of each of the integrated circuits are active for all parameter sets without selective activation or deactivation of processing units based on parameter set selection.

171. A system-on-chip comprising: one or more processor cores; a processing circuit on the system-on-chip, the processing circuit comprising: measurement circuitry measuring at least one condition value in a first fixed number of clock cycles independent of measured values; selection circuitry selecting one of a plurality of parameter sets based on the at least one condition value in a second fixed number of clock cycles independent of condition values and selection, the selection circuitry operating without instruction fetch, program counter, or stored-program execution; random-access memory storing the plurality of parameter sets, wherein the random-access memory provides identical non-speculative access latency in clock cycles independent of which parameter set is accessed, and wherein the random-access memory excludes cache memory; and processing circuitry having fixed topology processing input data using parameters from the selected parameter set, the processing circuitry executing in a third fixed number of clock cycles per parameter set independent of condition values or input data; and an on-chip interconnect coupling the one or more processor cores to the processing circuit.

172. The system-on-chip of aspect 171, wherein the processing circuitry executes a predetermined sequence of operations having a fixed number of pipeline stages and no data-dependent branches.

173. The system-on-chip of any one of aspects 171-172, wherein the random-access memory comprises tightly coupled memory providing single-cycle access latency.

174. The system-on-chip of any one of aspects 171-172, wherein the random-access memory comprises scratchpad memory directly addressable without cache controller logic.

175. The system-on-chip of any one of aspects 171-174, wherein the third fixed number of clock cycles is identical for all of the plurality of parameter sets.

176. The system-on-chip of any one of aspects 171-175, further comprising shared memory accessible by both the one or more processor cores and the processing circuit.

177. The system-on-chip of any one of aspects 171-176, further comprising thermal sensors providing temperature measurements as the at least one condition value to the measurement circuitry.

178. The system-on-chip of any one of aspects 171-176, further comprising power monitoring circuits providing power consumption measurements as the at least one condition value to the measurement circuitry.

179. The system-on-chip of any one of aspects 171-178, wherein the at least one condition value comprises battery charge level, and wherein the plurality of parameter sets correspond to different power consumption configurations.

180. The system-on-chip of any one of aspects 171-178, wherein the plurality of parameter sets comprise neural network weight values at different quantization precision levels.

181. The system-on-chip of any one of aspects 171-178, wherein the plurality of parameter sets comprise modulation and coding scheme parameters, and further comprising wireless modem circuitry coupled to the processing circuit.

182. The system-on-chip of any one of aspects 171-178, wherein the plurality of parameter sets comprise image signal processing parameters, and further comprising an image signal processor interface coupled to the processing circuit.

183. The system-on-chip of any one of aspects 171-182, configured for automotive applications, wherein the plurality of parameter sets correspond to different sensor fusion algorithm configurations.

184. The system-on-chip of any one of aspects 171-182, configured for Internet of Things applications, wherein different parameter sets correspond to different tradeoffs between power consumption and processing throughput, including at least one reduced-precision parameter set and at least one full-precision parameter set.

185. The system-on-chip of any one of aspects 171-184, wherein the system-on-chip comprises a single monolithic die.

186. The system-on-chip of any one of aspects 171-184, wherein the system-on-chip comprises a plurality of dies interconnected within a single package.

187. The system-on-chip of any one of aspects 171-186, wherein the processing circuit is integrated on a same die as the one or more processor cores.

188. The system-on-chip of any one of aspects 171-187, wherein the one or more processor cores are configured to program the plurality of parameter sets into the random-access memory.

189. The system-on-chip of any one of aspects 171-188, wherein the processing circuit operates continuously without halting or suspending execution during transitions between parameter sets.

190. The system-on-chip of any one of aspects 171-189, wherein the selection circuitry selects potentially different parameter sets for consecutive input data items without requiring a reconfiguration interval between the consecutive input data items.

191. The system-on-chip of any one of aspects 171-190, further comprising double-buffered registers holding parameters from the selected parameter set.

192. The system-on-chip of aspect 171, wherein all processing units within the fixed topology are active for all parameter sets without selective activation or deactivation of processing units based on parameter set selection.

193. A computer-implemented method for designing an integrated circuit, the method comprising: specifying measurement circuitry configured to measure at least one condition value in a first fixed number of clock cycles independent of measured values; specifying selection circuitry configured to select one of a plurality of parameter sets based on the at least one condition value in a second fixed number of clock cycles independent of condition values and selection, the selection circuitry specified to operate without instruction fetch, program counter, or stored-program execution; allocating random-access memory resources for storing the plurality of parameter sets, the random-access memory resources having identical non-speculative access latency in clock cycles independent of which parameter set is accessed, the random-access memory resources excluding cache memory; specifying processing circuitry having fixed topology configured to process input data using parameters from a selected parameter set, the processing circuitry executing in a third fixed number of clock cycles per parameter set independent of condition values or input data; and verifying that the first fixed number, the second fixed number, and the third fixed number are each bounded such that total execution time is deterministic for each parameter set.

194. The method of aspect 193, wherein the verifying comprises performing static timing analysis across all paths through the measurement circuitry, the selection circuitry, and the processing circuitry.

195. The method of any one of aspects 193-194, wherein the verifying comprises confirming that the third fixed number of clock cycles is identical across all of the plurality of parameter sets.

196. The method of any one of aspects 193-194, wherein the verifying comprises confirming that worst-case total execution time across all of the plurality of parameter sets equals a predetermined constant value.

197. The method of any one of aspects 193-196, wherein the allocating comprises selecting at least one of block random-access memory or embedded static random-access memory.

198. The method of any one of aspects 193-197, further comprising synthesizing hardware description language code into a gate-level netlist.

199. The method of any one of aspects 193-198, further comprising generating a field-programmable gate array bitstream.

200. The method of any one of aspects 193-198, further comprising generating application-specific integrated circuit layout data.

201. The method of any one of aspects 193-200, further comprising generating timing constraint data specifying bounds on the first fixed number, the second fixed number, and the third fixed number.

202. The method of any one of aspects 193-201, further comprising iteratively modifying the integrated circuit design until the verifying confirms the total execution time is deterministic.

203. The method of any one of aspects 193-202, further comprising performing high-level synthesis from algorithmic descriptions to hardware description language, including extracting loop bounds to ensure deterministic execution time.

204. The method of any one of aspects 193-203, further comprising balancing pipeline depths of the processing circuitry across the plurality of parameter sets.

205. The method of any one of aspects 193-204, wherein the verifying comprises at least one of simulating the integrated circuit under all of the plurality of parameter sets or performing formal verification of timing properties.

206. The method of any one of aspects 193-205, further comprising generating a timing certification document specifying, for each of the plurality of parameter sets, the first fixed number, the second fixed number, and the third fixed number, and certifying that total execution time is deterministic across all parameter sets.

207. The method of any one of aspects 193-206, further comprising specifying that the processing circuitry has bounded loop structures having iteration counts limited to predetermined values and no data-dependent conditional branches.

208. The method of any one of aspects 193-207, further comprising specifying that transitions between parameter sets occur without partial reconfiguration of programmable logic and without reconfiguration overhead cycles.

209. The method of any one of aspects 193-208, further comprising performing placement and routing to achieve the identical non-speculative access latency.

210. The method of any one of aspects 193-209, further comprising generating a compatibility verification report confirming that each of the plurality of parameter sets produces the third fixed number of clock cycles when loaded into the processing circuitry.

211. An integrated circuit for processing financial market data, the integrated circuit comprising: measurement circuitry computing at least one market condition metric from streaming financial market data in a first fixed number of clock cycles independent of market data values; selection circuitry selecting one of a plurality of trading strategy configurations based on the at least one market condition metric in a second fixed number of clock cycles independent of market condition values and selection; random-access memory storing the plurality of trading strategy configurations, wherein the random-access memory provides deterministic access latency in clock cycles independent of which trading strategy configuration is accessed; and processing circuitry having fixed topology executing trade setup evaluation using parameters from the selected trading strategy configuration, the processing circuitry executing in a third fixed number of clock cycles per trading strategy configuration independent of market condition values or market data values; wherein trade setup evaluation latency is deterministic across all trading strategy configurations.

212. The integrated circuit of aspect 211, wherein the at least one market condition metric comprises at least one of: price volatility metrics, bid-ask spread measurements, order flow imbalance indicators, queue depth measurements at trading venues, or volume-weighted metrics.

213. The integrated circuit of any one of aspects 211-212, wherein the plurality of trading strategy configurations correspond to different market regime configurations, and wherein the selection circuitry selects a market regime configuration such that trade setup evaluation latency is identical across all market regime configurations.

214. The integrated circuit of any one of aspects 211-213, wherein the processing circuitry generates trade setup outputs comprising at least one of: instrument identification, opportunity scores, entry price regions, profit-taking targets, protective exit levels, or position size recommendations.

215. The integrated circuit of any one of aspects 211-214, wherein the at least one market condition metric changes between successive market data updates, and wherein trade setup evaluation latency remains constant despite the changes, such that the integrated circuit does not introduce latency variation that would cause adverse selection in electronic trading.

216. The integrated circuit of any one of aspects 211-215, wherein the plurality of trading strategy configurations are compiled from user-defined trading strategy specifications through a parameter compilation interface.

217. The integrated circuit of any one of aspects 211-216, further comprising a trade execution interface coupled to the processing circuitry and configured to transmit order messages to at least one trading venue based on trade setup outputs from the processing circuitry.

218. The integrated circuit of any one of aspects 211-217, wherein the processing circuitry further executes risk calculation comprising at least one of: position-level risk metrics, portfolio-level exposure metrics, or correlation-based risk assessments, with the risk calculation executing in a fixed number of clock cycles independent of portfolio composition.

219. The integrated circuit of any one of aspects 211-218, wherein the measurement circuitry computes the at least one market condition metric from data received from a plurality of trading venues simultaneously, and wherein the selection circuitry selects a single trading strategy configuration applicable across all trading venues based on a composite of market condition metrics from the plurality of trading venues.

220. The integrated circuit of any one of aspects 211-219, further comprising a market data normalization pipeline coupled to the measurement circuitry, the market data normalization pipeline converting market data from a plurality of exchange protocols into a unified internal representation in a fixed number of clock cycles independent of source exchange protocol.

221. The integrated circuit of any one of aspects 211-220, wherein the processing circuitry computes opportunity scores for a plurality of financial instruments in parallel, and wherein the third fixed number of clock cycles is independent of a number of instruments being evaluated.

222. The integrated circuit of any one of aspects 211-221, wherein the plurality of trading strategy configurations include at least one configuration comprising parameters for options trade structure generation including at least one of: strike selection parameters, expiration selection parameters, spread construction parameters, or Greeks-based position sizing parameters.

223. The integrated circuit of any one of aspects 211-222, wherein the measurement circuitry computes at least one order flow metric comprising at least one of: trade imbalance between buyer-initiated and seller-initiated trades, large order detection metrics, or price impact estimates; and wherein the selection circuitry uses the order flow metric to select between trading strategy configurations having different aggressiveness levels.

224. The integrated circuit of any one of aspects 211-223, wherein the processing circuitry executes a predetermined sequence of operations having a fixed number of pipeline stages and no data-dependent branches.

225. The integrated circuit of any one of aspects 211-224, wherein the integrated circuit operates continuously without halting or suspending execution during transitions between trading strategy configurations.

226. The integrated circuit of any one of aspects 211-225, wherein the selection circuitry selects potentially different trading strategy configurations for consecutive market data items without requiring a reconfiguration interval between the consecutive market data items.

227. The integrated circuit of any one of aspects 211-226, wherein the third fixed number of clock cycles is identical for all of the plurality of trading strategy configurations.

228. The integrated circuit of any one of aspects 211-227, further comprising double-buffered registers holding parameters from the selected trading strategy configuration.

229. The integrated circuit of any one of aspects 211-228, wherein all processing units within the fixed topology are active for all trading strategy configurations without selective activation or deactivation of processing units based on trading strategy configuration selection.

230. The integrated circuit of any one of aspects 211-229, wherein the selection circuitry operates without instruction fetch, program counter, or stored-program execution.

231. The integrated circuit of any one of aspects 211-230, wherein the random-access memory excludes cache memory.

232. An integrated circuit for processing radar data, the integrated circuit comprising: measurement circuitry computing at least one threat environment metric from received radar return data in a first fixed number of clock cycles independent of radar return values; selection circuitry selecting one of a plurality of radar waveform parameter sets based on the at least one threat environment metric in a second fixed number of clock cycles independent of threat environment values and selection; random-access memory storing the plurality of radar waveform parameter sets, wherein the random-access memory provides deterministic access latency in clock cycles independent of which radar waveform parameter set is accessed; and processing circuitry having fixed topology executing radar signal processing using parameters from the selected radar waveform parameter set, the processing circuitry executing in a third fixed number of clock cycles per radar waveform parameter set independent of threat environment values or radar return values; wherein the third fixed number of clock cycles fits within an antenna dwell time allocation regardless of which radar waveform parameter set is selected.

233. The integrated circuit of aspect 232, wherein the at least one threat environment metric comprises at least one of: signal-to-clutter ratio, target density, jamming-to-signal ratio, or threat environment classification.

234. The integrated circuit of any one of aspects 232-233, wherein the plurality of radar waveform parameter sets comprise at least one of: pulse width, pulse repetition frequency, frequency agility patterns, detection threshold multipliers, or CFAR threshold parameters.

235. The integrated circuit of any one of aspects 232-234, wherein the processing circuitry comprises at least one of: pulse compression circuits, Doppler filtering circuits, or constant false alarm rate detection circuits.

236. The integrated circuit of any one of aspects 232-235, wherein the plurality of radar waveform parameter sets correspond to different electronic warfare threat environments, and wherein the selection circuitry selects waveform parameters based on detected threat characteristics.

237. The integrated circuit of any one of aspects 232-236, wherein the measurement circuitry detects jamming signals and computes jamming-to-signal ratio, and wherein the selection circuitry selects radar waveform parameter sets comprising electronic counter-countermeasure waveform parameters in response to detected jamming.

238. The integrated circuit of any one of aspects 232-237, wherein the plurality of radar waveform parameter sets include parameter sets for at least two different radar modes comprising at least two of: search mode, track mode, track-while-scan mode, or ground mapping mode; and wherein transitions between radar modes occur within the second fixed number of clock cycles.

239. The integrated circuit of any one of aspects 232-238, wherein the processing circuitry maintains a plurality of target track states in the random-access memory, and wherein the third fixed number of clock cycles is independent of a number of active target tracks.

240. The integrated circuit of any one of aspects 232-239, further comprising a pulse timing generator coupled to the processing circuitry and the selection circuitry, the pulse timing generator producing transmit trigger signals at intervals determined by pulse repetition frequency parameters from the selected radar waveform parameter set, wherein the pulse timing generator operates synchronously with the processing circuitry such that radar return processing completes before a next transmit trigger.

241. The integrated circuit of any one of aspects 232-240, wherein the processing circuitry executes a predetermined sequence of operations having a fixed number of pipeline stages and no data-dependent branches.

242. The integrated circuit of any one of aspects 232-241, wherein the integrated circuit operates continuously without halting or suspending execution during transitions between radar waveform parameter sets.

243. The integrated circuit of any one of aspects 232-242, wherein the selection circuitry selects potentially different radar waveform parameter sets for consecutive radar return processing intervals without requiring a reconfiguration interval between the consecutive intervals.

244. The integrated circuit of any one of aspects 232-243, wherein the third fixed number of clock cycles is identical for all of the plurality of radar waveform parameter sets.

245. The integrated circuit of any one of aspects 232-244, further comprising double-buffered registers holding parameters from the selected radar waveform parameter set.

246. The integrated circuit of any one of aspects 232-245, wherein all processing units within the fixed topology are active for all radar waveform parameter sets without selective activation or deactivation of processing units based on radar waveform parameter set selection.

247. The integrated circuit of any one of aspects 232-246, wherein the selection circuitry operates without instruction fetch, program counter, or stored-program execution.

248. The integrated circuit of any one of aspects 232-247, wherein the random-access memory excludes cache memory.

249. An integrated circuit for wireless baseband processing, the integrated circuit comprising: measurement circuitry computing at least one channel condition metric in a first fixed number of clock cycles independent of channel condition values; selection circuitry selecting one of a plurality of baseband parameter sets based on the at least one channel condition metric in a second fixed number of clock cycles independent of channel condition values and selection; random-access memory storing the plurality of baseband parameter sets, wherein the random-access memory provides deterministic access latency in clock cycles independent of which baseband parameter set is accessed; and processing circuitry having fixed topology executing baseband signal processing using parameters from the selected baseband parameter set, the processing circuitry executing in a third fixed number of clock cycles per baseband parameter set independent of channel condition values or input signal values; wherein the third fixed number of clock cycles completes within a slot-boundary timing requirement regardless of which baseband parameter set is selected.

250. The integrated circuit of aspect 249, wherein the at least one channel condition metric comprises at least one of: channel quality indicator, interference level, user equipment count, or traffic type classification.

251. The integrated circuit of any one of aspects 249-250, wherein the plurality of baseband parameter sets comprise at least one of: numerology parameters, scheduling weights, beamforming coefficients, MIMO precoding matrices, or HARQ parameters.

252. The integrated circuit of any one of aspects 249-251, wherein the processing circuitry comprises at least one of: fast Fourier transform circuits, channel estimation circuits, equalization circuits, or LDPC decoding circuits.

253. The integrated circuit of any one of aspects 249-252, wherein the plurality of baseband parameter sets correspond to different service categories including at least ultra-reliable low-latency communication parameters and enhanced mobile broadband parameters.

254. The integrated circuit of any one of aspects 249-253, wherein the plurality of baseband parameter sets correspond to different numerologies having different subcarrier spacings, and wherein the third fixed number of clock cycles accommodates a shortest slot duration among the different numerologies.

255. The integrated circuit of any one of aspects 249-254, wherein the processing circuitry processes a plurality of spatial layers simultaneously using MIMO precoding matrices from the selected baseband parameter set, and wherein the third fixed number of clock cycles is independent of a number of spatial layers being processed.

256. The integrated circuit of any one of aspects 249-255, further comprising HARQ buffer memory coupled to the processing circuitry, wherein the processing circuitry combines current received data with previously stored soft bits from the HARQ buffer memory according to HARQ parameters from the selected baseband parameter set, and wherein the combining executes in a fixed number of clock cycles independent of a number of HARQ retransmission iterations.

257. The integrated circuit of any one of aspects 249-256, wherein the selection circuitry receives scheduling grants from a medium access control layer, and wherein the selection circuitry selects baseband parameter sets based on both the at least one channel condition metric and the scheduling grants within the second fixed number of clock cycles.

258. The integrated circuit of any one of aspects 249-257, wherein the processing circuitry executes a predetermined sequence of operations having a fixed number of pipeline stages and no data-dependent branches.

259. The integrated circuit of any one of aspects 249-258, wherein the integrated circuit operates continuously without halting or suspending execution during transitions between baseband parameter sets.

260. The integrated circuit of any one of aspects 249-259, wherein the selection circuitry selects potentially different baseband parameter sets for consecutive transmission time intervals without requiring a reconfiguration interval between the consecutive transmission time intervals.

261. The integrated circuit of any one of aspects 249-260, wherein the third fixed number of clock cycles is identical for all of the plurality of baseband parameter sets.

262. The integrated circuit of any one of aspects 249-261, further comprising double-buffered registers holding parameters from the selected baseband parameter set.

263. The integrated circuit of any one of aspects 249-262, wherein all processing units within the fixed topology are active for all baseband parameter sets without selective activation or deactivation of processing units based on baseband parameter set selection.

264. The integrated circuit of any one of aspects 249-263, wherein the selection circuitry operates without instruction fetch, program counter, or stored-program execution.

265. The integrated circuit of any one of aspects 249-264, wherein the random-access memory excludes cache memory.

266. An integrated circuit for power system protection, the integrated circuit comprising: measurement circuitry computing at least one grid condition metric from power system measurements in a first fixed number of clock cycles independent of measurement values; selection circuitry selecting one of a plurality of protection parameter sets based on the at least one grid condition metric in a second fixed number of clock cycles independent of grid condition values and selection; random-access memory storing the plurality of protection parameter sets, wherein the random-access memory provides deterministic access latency in clock cycles independent of which protection parameter set is accessed; and processing circuitry having fixed topology executing protection relay computation using parameters from the selected protection parameter set, the processing circuitry executing in a third fixed number of clock cycles per protection parameter set independent of grid condition values or measurement values; wherein the third fixed number of clock cycles completes within a protection relay timing class regardless of which protection parameter set is selected.

267. The integrated circuit of aspect 266, wherein the at least one grid condition metric comprises at least one of: fault current magnitude, fault type indicator, system frequency deviation, harmonic content, or distributed generation state.

268. The integrated circuit of any one of aspects 266-267, wherein the plurality of protection parameter sets comprise at least one of: trip curve parameters, overcurrent thresholds, impedance circle parameters, directional element angles, or reclosing sequence parameters.

269. The integrated circuit of any one of aspects 266-268, wherein the plurality of protection parameter sets correspond to different grid operating states including at least two of: normal operation, islanded operation, and high distributed generation penetration.

270. The integrated circuit of any one of aspects 266-269, wherein the processing circuitry implements a plurality of protection functions simultaneously comprising at least two of: overcurrent protection, distance protection, differential protection, or directional protection; and wherein each protection function completes within the third fixed number of clock cycles regardless of which protection parameter set is selected.

271. The integrated circuit of any one of aspects 266-270, further comprising a breaker control interface coupled to the processing circuitry, wherein the processing circuitry generates trip commands via the breaker control interface within a deterministic time from detection of a fault condition, the deterministic time being independent of fault type and independent of which protection parameter set is selected.

272. The integrated circuit of any one of aspects 266-271, wherein the measurement circuitry computes voltage and current phasors using a discrete Fourier transform executing in a fixed number of clock cycles synchronized to a power system frequency reference, and wherein the phasor computation provides phasor measurements to the selection circuitry and the processing circuitry.

273. The integrated circuit of any one of aspects 266-272, further comprising a synchrophasor output interface providing phasor measurements with timestamps conforming to a synchrophasor measurement standard.

274. The integrated circuit of any one of aspects 266-273, wherein the processing circuitry executes a predetermined sequence of operations having a fixed number of pipeline stages and no data-dependent branches.

275. The integrated circuit of any one of aspects 266-274, wherein the integrated circuit operates continuously without halting or suspending execution during transitions between protection parameter sets.

276. The integrated circuit of any one of aspects 266-275, wherein the selection circuitry selects potentially different protection parameter sets for consecutive measurement intervals without requiring a reconfiguration interval between the consecutive measurement intervals.

277. The integrated circuit of any one of aspects 266-276, wherein the third fixed number of clock cycles is identical for all of the plurality of protection parameter sets.

278. The integrated circuit of any one of aspects 266-277, further comprising double-buffered registers holding parameters from the selected protection parameter set.

279. The integrated circuit of any one of aspects 266-278, wherein all processing units within the fixed topology are active for all protection parameter sets without selective activation or deactivation of processing units based on protection parameter set selection.

280. The integrated circuit of any one of aspects 266-279, wherein the selection circuitry operates without instruction fetch, program counter, or stored-program execution.

281. The integrated circuit of any one of aspects 266-280, wherein the random-access memory excludes cache memory.

282. An integrated circuit for robotic control, the integrated circuit comprising: measurement circuitry computing at least one operational condition metric from robotic sensors in a first fixed number of clock cycles independent of sensor values; selection circuitry selecting one of a plurality of control parameter sets based on the at least one operational condition metric in a second fixed number of clock cycles independent of condition values and selection; random-access memory storing the plurality of control parameter sets, wherein the random-access memory provides deterministic access latency in clock cycles independent of which control parameter set is accessed; and processing circuitry having fixed topology executing control computation using parameters from the selected control parameter set, the processing circuitry executing in a third fixed number of clock cycles per control parameter set independent of condition values or sensor values; wherein the third fixed number of clock cycles completes within a fieldbus control cycle budget regardless of which control parameter set is selected.

283. The integrated circuit of aspect 282, wherein the at least one operational condition metric comprises at least one of: proximity sensor metrics, force sensor metrics, torque sensor metrics, or vision-derived classification metrics.

284. The integrated circuit of any one of aspects 282-283, wherein the plurality of control parameter sets comprise at least one of: PID control gains, trajectory interpolation parameters, safety zone definitions, or compliance parameters.

285. The integrated circuit of any one of aspects 282-284, wherein the plurality of control parameter sets correspond to different payload configurations or task phases.

286. The integrated circuit of any one of aspects 282-285, further comprising a fieldbus interface coupled to the processing circuitry and the measurement circuitry, the fieldbus interface receiving sensor data and transmitting actuator commands synchronously with a fieldbus clock, wherein the processing circuitry completes control computation between consecutive fieldbus clock cycles.

287. The integrated circuit of any one of aspects 282-286, wherein the processing circuitry computes both a nominal control output and a safety-limited control output for each control cycle, and wherein the selection circuitry selects between nominal and safety-limited control parameter sets based on proximity to safety boundaries detected by the measurement circuitry.

288. The integrated circuit of any one of aspects 282-287, wherein the plurality of control parameter sets include at least one parameter set for each of a plurality of robot axes, and wherein the processing circuitry computes control outputs for all of the plurality of robot axes within the third fixed number of clock cycles.

289. The integrated circuit of any one of aspects 282-288, wherein the measurement circuitry receives force and torque measurements from a force-torque sensor, and wherein the selection circuitry selects between position-control parameter sets and impedance-control parameter sets based on detected contact force exceeding a threshold.

290. The integrated circuit of any one of aspects 282-289, wherein the processing circuitry executes a predetermined sequence of operations having a fixed number of pipeline stages and no data-dependent branches.

291. The integrated circuit of any one of aspects 282-290, wherein the integrated circuit operates continuously without halting or suspending execution during transitions between control parameter sets.

292. The integrated circuit of any one of aspects 282-291, wherein the selection circuitry selects potentially different control parameter sets for consecutive control cycles without requiring a reconfiguration interval between the consecutive control cycles.

293. The integrated circuit of any one of aspects 282-292, wherein the third fixed number of clock cycles is identical for all of the plurality of control parameter sets.

294. The integrated circuit of any one of aspects 282-293, further comprising double-buffered registers holding parameters from the selected control parameter set.

295. The integrated circuit of any one of aspects 282-294, wherein all processing units within the fixed topology are active for all control parameter sets without selective activation or deactivation of processing units based on control parameter set selection.

296. The integrated circuit of any one of aspects 282-295, wherein the selection circuitry operates without instruction fetch, program counter, or stored-program execution.

297. The integrated circuit of any one of aspects 282-296, wherein the random-access memory excludes cache memory.

298. An integrated circuit for satellite communication processing, the integrated circuit comprising: measurement circuitry computing at least one link condition metric in a first fixed number of clock cycles independent of link condition values; selection circuitry selecting one of a plurality of modem parameter sets based on the at least one link condition metric in a second fixed number of clock cycles independent of link condition values and selection; random-access memory storing the plurality of modem parameter sets, wherein the random-access memory provides deterministic access latency in clock cycles independent of which modem parameter set is accessed; and processing circuitry having fixed topology executing modem signal processing using parameters from the selected modem parameter set, the processing circuitry executing in a third fixed number of clock cycles per modem parameter set independent of link condition values or input signal values; wherein the third fixed number of clock cycles completes within a frame timing budget regardless of which modem parameter set is selected.

299. The integrated circuit of aspect 298, wherein the at least one link condition metric comprises at least one of: link budget metrics, atmospheric fade measurements, satellite elevation angle, or Doppler shift.

300. The integrated circuit of any one of aspects 298-299, wherein the plurality of modem parameter sets comprise at least one of: modulation order, code rate, interleaving depth, or power control parameters.

301. The integrated circuit of any one of aspects 298-300, wherein the plurality of modem parameter sets are selectable on a per-frame basis based on link conditions.

302. The integrated circuit of any one of aspects 298-301, wherein the measurement circuitry computes Doppler shift rate from received signals, and wherein the processing circuitry applies Doppler compensation using parameters from the selected modem parameter set, the Doppler compensation executing within the third fixed number of clock cycles regardless of Doppler shift magnitude.

303. The integrated circuit of any one of aspects 298-302, wherein the plurality of modem parameter sets include parameter sets corresponding to different satellite beam configurations, and wherein the selection circuitry selects modem parameters based on beam handover events detected by the measurement circuitry.

304. The integrated circuit of any one of aspects 298-303, further comprising at least one of a forward error correction decoder or a forward error correction encoder, wherein the at least one of the decoder or encoder uses code rate parameters from the selected modem parameter set, and wherein the at least one of the decoder or encoder completes processing within the third fixed number of clock cycles regardless of code rate.

305. The integrated circuit of any one of aspects 298-304, wherein the measurement circuitry estimates rain fade attenuation from received signal strength measurements, and wherein the selection circuitry selects modem parameter sets providing increased coding protection during detected rain fade events.

306. The integrated circuit of any one of aspects 298-305, wherein the processing circuitry executes a predetermined sequence of operations having a fixed number of pipeline stages and no data-dependent branches.

307. The integrated circuit of any one of aspects 298-306, wherein the integrated circuit operates continuously without halting or suspending execution during transitions between modem parameter sets.

308. The integrated circuit of any one of aspects 298-307, wherein the selection circuitry selects potentially different modem parameter sets for consecutive communication frames without requiring a reconfiguration interval between the consecutive communication frames.

309. The integrated circuit of any one of aspects 298-308, wherein the third fixed number of clock cycles is identical for all of the plurality of modem parameter sets.

310. The integrated circuit of any one of aspects 298-309, further comprising double-buffered registers holding parameters from the selected modem parameter set.

311. The integrated circuit of any one of aspects 298-310, wherein all processing units within the fixed topology are active for all modem parameter sets without selective activation or deactivation of processing units based on modem parameter set selection.

312. The integrated circuit of any one of aspects 298-311, wherein the selection circuitry operates without instruction fetch, program counter, or stored-program execution.

313. The integrated circuit of any one of aspects 298-312, wherein the random-access memory excludes cache memory.

314. An integrated circuit for audio signal processing, the integrated circuit comprising: measurement circuitry computing at least one acoustic condition metric in a first fixed number of clock cycles independent of audio signal values; selection circuitry selecting one of a plurality of audio processing parameter sets based on the at least one acoustic condition metric in a second fixed number of clock cycles independent of condition values and selection; random-access memory storing the plurality of audio processing parameter sets, wherein the random-access memory provides deterministic access latency in clock cycles independent of which audio processing parameter set is accessed; and processing circuitry having fixed topology executing audio signal processing using parameters from the selected audio processing parameter set, the processing circuitry executing in a third fixed number of clock cycles per audio processing parameter set independent of condition values or audio signal values; wherein the third fixed number of clock cycles maintains sample-accurate timing regardless of which audio processing parameter set is selected.

315. The integrated circuit of aspect 314, wherein the at least one acoustic condition metric comprises at least one of: input signal noise floor, dynamic range metrics, source type classification, or acoustic environment metrics.

316. The integrated circuit of any one of aspects 314-315, wherein the plurality of audio processing parameter sets comprise at least one of: equalization coefficients, dynamic range compression parameters, spatial audio rendering parameters, or noise reduction parameters.

317. The integrated circuit of any one of aspects 314-316, wherein the plurality of audio processing parameter sets correspond to different acoustic environments or source types.

318. The integrated circuit of any one of aspects 314-317, wherein the processing circuitry maintains a constant audio processing latency from audio input sample arrival to processed audio output sample availability, the constant audio processing latency being independent of which audio processing parameter set is selected.

319. The integrated circuit of any one of aspects 314-318, wherein the processing circuitry processes a plurality of audio channels simultaneously, and wherein the third fixed number of clock cycles is independent of a number of audio channels being processed.

320. The integrated circuit of any one of aspects 314-319, wherein the processing circuitry applies spatial audio rendering comprising head-related transfer function filtering using filter coefficients from the selected audio processing parameter set, and wherein the spatial audio rendering executes within the third fixed number of clock cycles regardless of a number of virtual sound sources.

321. The integrated circuit of any one of aspects 314-320, wherein the measurement circuitry detects acoustic feedback onset from audio signal characteristics, and wherein the selection circuitry selects audio processing parameter sets comprising notch filter parameters targeting detected feedback frequencies, the selection and processing completing within the third fixed number of clock cycles to suppress feedback before audible oscillation occurs.

322. The integrated circuit of any one of aspects 314-321, wherein the processing circuitry executes a predetermined sequence of operations having a fixed number of pipeline stages and no data-dependent branches.

323. The integrated circuit of any one of aspects 314-322, wherein the integrated circuit operates continuously without halting or suspending execution during transitions between audio processing parameter sets.

324. The integrated circuit of any one of aspects 314-323, wherein the selection circuitry selects potentially different audio processing parameter sets for consecutive audio sample blocks without requiring a reconfiguration interval between the consecutive audio sample blocks.

325. The integrated circuit of any one of aspects 314-324, wherein the third fixed number of clock cycles is identical for all of the plurality of audio processing parameter sets.

326. The integrated circuit of any one of aspects 314-325, further comprising double-buffered registers holding parameters from the selected audio processing parameter set.

327. The integrated circuit of any one of aspects 314-326, wherein all processing units within the fixed topology are active for all audio processing parameter sets without selective activation or deactivation of processing units based on audio processing parameter set selection.

328. The integrated circuit of any one of aspects 314-327, wherein the selection circuitry operates without instruction fetch, program counter, or stored-program execution.

329. The integrated circuit of any one of aspects 314-328, wherein the random-access memory excludes cache memory.

330. An integrated circuit for network packet processing, the integrated circuit comprising: measurement circuitry computing at least one network condition metric in a first fixed number of clock cycles independent of packet data values; selection circuitry selecting one of a plurality of traffic management parameter sets based on the at least one network condition metric in a second fixed number of clock cycles independent of condition values and selection; random-access memory storing the plurality of traffic management parameter sets, wherein the random-access memory provides deterministic access latency in clock cycles independent of which traffic management parameter set is accessed; and processing circuitry having fixed topology executing packet processing using parameters from the selected traffic management parameter set, the processing circuitry executing in a third fixed number of clock cycles per traffic management parameter set independent of condition values or packet data values; wherein the third fixed number of clock cycles provides deterministic per-packet processing time regardless of which traffic management parameter set is selected.

331. The integrated circuit of aspect 330, wherein the at least one network condition metric comprises at least one of: network congestion metrics, flow priority indicators, quality of service violation indicators, or buffer occupancy levels.

332. The integrated circuit of any one of aspects 330-331, wherein the plurality of traffic management parameter sets comprise at least one of: scheduling weights, queue management thresholds, traffic shaping parameters, or rate limiting parameters.

333. The integrated circuit of any one of aspects 330-332, wherein the measurement circuitry monitors a plurality of traffic flows simultaneously and computes per-flow quality of service compliance metrics, and wherein the selection circuitry selects traffic management parameter sets based on aggregate quality of service compliance across the plurality of traffic flows.

334. The integrated circuit of any one of aspects 330-333, wherein the processing circuitry applies hierarchical scheduling comprising a plurality of scheduling levels, and wherein the third fixed number of clock cycles per packet is independent of a depth of the hierarchical scheduling and independent of a number of active traffic queues.

335. The integrated circuit of any one of aspects 330-334, further comprising a time-sensitive networking interface providing gate-controlled packet transmission synchronized to a network time reference, wherein the processing circuitry completes packet processing within a time-sensitive networking guard band regardless of which traffic management parameter set is selected.

336. The integrated circuit of any one of aspects 330-335, wherein the plurality of traffic management parameter sets include at least one parameter set for packet replication and elimination for redundant network paths, and wherein the processing circuitry executes replication or elimination within the third fixed number of clock cycles.

337. The integrated circuit of any one of aspects 330-336, wherein the processing circuitry executes a predetermined sequence of operations having a fixed number of pipeline stages and no data-dependent branches.

338. The integrated circuit of any one of aspects 330-337, wherein the integrated circuit operates continuously without halting or suspending execution during transitions between traffic management parameter sets.

339. The integrated circuit of any one of aspects 330-338, wherein the selection circuitry selects potentially different traffic management parameter sets for consecutive packets without requiring a reconfiguration interval between the consecutive packets.

340. The integrated circuit of any one of aspects 330-339, wherein the third fixed number of clock cycles is identical for all of the plurality of traffic management parameter sets.

341. The integrated circuit of any one of aspects 330-340, further comprising double-buffered registers holding parameters from the selected traffic management parameter set.

342. The integrated circuit of any one of aspects 330-341, wherein all processing units within the fixed topology are active for all traffic management parameter sets without selective activation or deactivation of processing units based on traffic management parameter set selection.

343. The integrated circuit of any one of aspects 330-342, wherein the selection circuitry operates without instruction fetch, program counter, or stored-program execution.

344. The integrated circuit of any one of aspects 330-343, wherein the random-access memory excludes cache memory.

345. An integrated circuit for video encoding, the integrated circuit comprising: measurement circuitry computing at least one scene condition metric from input video data in a first fixed number of clock cycles independent of video data values; selection circuitry selecting one of a plurality of encoding parameter sets based on the at least one scene condition metric in a second fixed number of clock cycles independent of scene condition values and selection; random-access memory storing the plurality of encoding parameter sets, wherein the random-access memory provides deterministic access latency in clock cycles independent of which encoding parameter set is accessed; and processing circuitry having fixed topology executing video encoding operations using parameters from the selected encoding parameter set, the processing circuitry executing in a third fixed number of clock cycles per encoding parameter set independent of scene condition values or video data values; wherein the third fixed number of clock cycles completes encoding of each coding unit within a per-coding-unit time budget derived from a frame deadline regardless of which encoding parameter set is selected.

346. The integrated circuit of aspect 345, wherein the at least one scene condition metric comprises at least one of: spatial complexity metrics, temporal complexity metrics, scene change detection indicators, or quantization feedback metrics from a rate control loop.

347. The integrated circuit of aspects 345 or 346, wherein the plurality of encoding parameter sets comprise at least one of: quantization parameter values, intra-prediction and inter-prediction mode weighting tables, transform size selection tables, filter strength parameters, or rate control target bit allocation tables.

348. The integrated circuit of any one of aspects 345-347, wherein the processing circuitry comprises at least one of: a motion estimation engine, a transform and quantization pipeline, an entropy coding engine, or an in-loop filtering pipeline.

349. The integrated circuit of any one of aspects 345-348, wherein the processing circuitry includes a motion estimation engine that evaluates candidate motion vectors over a fixed search region using a fixed search pattern with a predetermined number of search steps, the motion estimation engine executing in a predetermined number of clock cycles within the third fixed number of clock cycles without early termination based on distortion thresholds.

350. The integrated circuit of any one of aspects 345-349, wherein the processing circuitry includes an entropy coding engine that processes a fixed maximum number of syntax elements per coding unit with unused element slots coded as zero-value symbols, such that entropy coding cycle count is independent of a number of non-zero coefficients produced by quantization.

351. The integrated circuit of any one of aspects 345-350, wherein the processing circuitry includes an in-loop filtering pipeline applying at least one of a deblocking filter, a sample adaptive offset filter, or an adaptive loop filter using filter parameters from the selected encoding parameter set, the in-loop filtering executing in a fixed number of clock cycles per coding unit independent of block boundary characteristics or filter classification results.

352. The integrated circuit of any one of aspects 345-351, further comprising a rate control engine within the measurement circuitry that maintains a buffer fullness model and computes a target quantization parameter from buffer occupancy and bit budget metrics in a fixed number of clock cycles within the first fixed number of clock cycles, and wherein the selection circuitry uses the target quantization parameter to select among encoding parameter sets corresponding to different quality-rate operating points.

353. The integrated circuit of any one of aspects 345-352, wherein the processing circuitry accesses reference frame data from a reference frame buffer stored in bounded-latency memory, with reference frame read access completing in a deterministic number of clock cycles independent of which reference frame is accessed and independent of a motion vector pointing to an accessed location.

354. The integrated circuit of any one of aspects 345-353, wherein the plurality of encoding parameter sets correspond to different video codec configurations, and wherein the fixed-topology processing circuitry accommodates different codec configurations through parameter value changes rather than pipeline reconfiguration.

355. The integrated circuit of any one of aspects 345-354, wherein the plurality of encoding parameter sets correspond to different encoding layer configurations for scalable video coding, and wherein the selection circuitry selects among layer-specific encoding parameter sets based on at least one of bandwidth condition values or display resolution condition values computed by the measurement circuitry.

356. The integrated circuit of any one of aspects 345-355, wherein the plurality of encoding parameter sets include at least one encoding parameter set comprising region-of-interest encoding parameters specifying spatially varying quantization parameter offsets for designated frame regions.

357. The integrated circuit of any one of aspects 345-356, wherein the measurement circuitry detects a scene change from the at least one scene condition metric, and wherein the selection circuitry selects an encoding parameter set configured for intra-dominant encoding in response to the detected scene change within the second fixed number of clock cycles.

358. The integrated circuit of any one of aspects 345-357, wherein the processing circuitry executes a predetermined sequence of operations having a fixed number of pipeline stages and no data-dependent branches.

359. The integrated circuit of any one of aspects 345-358, wherein the integrated circuit operates continuously without halting or suspending execution during transitions between encoding parameter sets.

360. The integrated circuit of any one of aspects 345-359, wherein the selection circuitry selects potentially different encoding parameter sets for consecutive coding units without requiring a reconfiguration interval between the consecutive coding units.

361. The integrated circuit of any one of aspects 345-360, wherein the third fixed number of clock cycles is identical for all of the plurality of encoding parameter sets.

362. The integrated circuit of any one of aspects 345-361, further comprising double-buffered registers holding parameters from the selected encoding parameter set.

363. The integrated circuit of any one of aspects 345-362, wherein all processing units within the fixed topology are active for all encoding parameter sets without selective activation or deactivation of processing units based on encoding parameter set selection.

364. The integrated circuit of any one of aspects 345-363, wherein the selection circuitry operates without instruction fetch, program counter, or stored-program execution.

365. The integrated circuit of any one of aspects 345-364, wherein the random-access memory excludes cache memory.

The aspects and embodiments described herein are intended to illustrate principles of operation and structural configurations, and are not intended to limit the scope of any claimed subject matter. Structural elements and functional characteristics described in connection with one embodiment may be omitted, substituted, or combined with those of other embodiments. The scope of protection is defined by the claims as filed and as subsequently amended, and not by specific embodiments, aspects, or examples provided in this description.

Example 1: Neural Network Inference Implementation

In some embodiments, a representative neural network inference implementation demonstrating deterministic timing across multiple precision levels includes an FPGA-based integrated circuit. Measurement circuitry includes an on-die temperature sensor providing digitized output values through a hardware interface register and 12-bit analog-to-digital converter, a hardware processing load counter tracking inference queue depth, and a signal quality estimator computing input signal-to-noise ratio from input data statistics, with all three measurement subcircuits operating in parallel and capturing and registering the digitized condition values within M equals 8 clock cycles.

Selection circuitry includes a pipelined multi-condition evaluation stage that combines temperature, processing load, and signal quality condition values through a weighted scoring function implemented in pipelined arithmetic. A threshold comparator stage maps the composite score to a parameter set index. Selection completes in C equals 3 clock cycles, independent of condition values and selection outcome.

Six parameter sets are stored in bounded-latency parameter memory, e.g., block random-access memory in an FPGA implementation or embedded SRAM in an ASIC implementation, corresponding to combinations of quantization precision levels, e.g., INT8, INT16, FP16, and FP32 weight quantizations, and processing sensitivity configurations, e.g., standard and high-sensitivity feature extraction.

Processing circuitry includes a systolic multiply-accumulate array or, in other implementations, a dataflow engine. Inference executes in K equals 1000 clock cycles, identical across all parameter sets. The multiply-accumulate units pack multiple lower-precision operations into higher-precision multipliers, e.g., two INT8 multiplications per multiplier cycle versus one FP32 multiplication per multiplier cycle. The total number of multiplier cycles is the same in both cases. Unused multiplier capacity in lower-precision modes is occupied by no-operation pipeline stages or replicated computations such that the total pipeline stage count remains constant across all parameter sets.

In accordance with some embodiments, at a clock frequency of 200 MHz, total expected latency is 1011 clock cycles or approximately 5.06 microseconds per inference. Because K is identical across all six parameter sets and M and C are constant, LDR as defined herein equals 1.0. Because LDR does not change between adaptive and fixed-parameter operation, ADPF as defined herein also equals 1.0, indicating that adaptive selection introduces no additional timing variability in this illustrative implementation.

In certain implementations, when the composite condition score indicates favorable operating conditions, e.g., low temperature, low queue depth, and high signal quality, selection circuitry selects a full-precision FP32 parameter set with standard sensitivity. When the composite score indicates thermal stress, high processing load, or degraded signal quality, selection circuitry selects a parameter set with reduced-precision weights, increased processing sensitivity, or both. In either case, inference pipeline timing remains unchanged.

In various embodiments, the number of parameter sets, the specific quantization levels, the temperature thresholds, the clock frequency, the neural network architecture, and the inference application are implementation-dependent. At least one of power consumption, battery charge level, processing load, or signal quality may be used instead of or in addition to temperature as a condition value, or any combination thereof. ASIC implementations, other processing architectures, and other parameter set types, e.g., filter coefficients or detection thresholds, are also contemplated. Analogous implementations in adjacent domains are also contemplated, e.g., at least one of medical imaging reconstruction, autonomous driving perception, video analytics, or natural language processing inference, or any combination thereof, where the same systolic or dataflow processing structure applies across multiple precision or complexity parameter sets.

Example 2: Network Security Implementation

In some embodiments, a representative network security implementation demonstrating deterministic per-packet processing across multiple inspection depths includes a network interface card or, in other implementations, a processing appliance, with an FPGA-based integrated circuit. Measurement circuitry includes hardware counters monitoring packet queue depth and connection rate, completing measurement in M equals 4 clock cycles independent of packet data values and traffic conditions. In some embodiments, measurement circuitry additionally receives condition values from off-chip sources, e.g., threat intelligence feed registers updated by a management processor through a system management bus interface with deterministic read latency, and the off-chip condition values are included within M clock cycles.

Selection circuitry includes a priority encoder or, in other implementations, a finite state machine encoding threat level transitions, selecting among three inspection parameter sets, completing selection in C equals 2 clock cycles independent of threat level values and selection outcome.

Three sets of pattern-matching rules and classification thresholds are stored in bounded-latency parameter memory, e.g., block random-access memory in an FPGA implementation or embedded SRAM in an ASIC implementation. Processing circuitry includes a pipeline of parser, pattern matcher, and classifier, executing in K equals 500 clock cycles padded to be identical across inspection depths. Per-packet processing time does not vary regardless of which inspection depth is selected.

In accordance with some embodiments, total expected latency is 506 clock cycles; at 250 MHz, approximately 2.02 microseconds per packet, deterministic regardless of which inspection depth is selected. LDR equals 1.0 for this illustrative implementation because K is identical across all parameter sets.

In certain implementations, when threat indicators are at a low level, a header-only inspection parameter set is selected and the full pattern-matching pipeline executes with a reduced rule set, e.g., unused pattern slots produce no-operation matches, in the same K clock cycles; when threat score rises above a configured threshold, a deep inspection parameter set is selected and the full pipeline is utilized with a complete rule set.

In keeping with some embodiments, time-sensitive networking (TSN) guard band compliance is optionally maintained by configuring K to fit within a TSN guard band as specified by the deployment network. In various embodiments, the number of inspection levels, the specific patterns and rules, and the condition metrics are implementation-dependent. At least one of Ethernet, InfiniBand, or Fibre Channel physical layers, or any combination thereof, and at least one of FPGA or ASIC implementation technologies, or any combination thereof, are contemplated. Analogous implementations in adjacent domains are also contemplated, e.g., at least one of intrusion detection, unified threat management, content filtering, or distributed denial-of-service mitigation, or any combination thereof, where the same parser, pattern matcher, and classifier pipeline applies across multiple inspection depth parameter sets.

Example 3: Radar Processing Implementation

In some embodiments, a representative radar processing implementation demonstrating deterministic mode transitions across multiple waveform configurations includes an ASIC-based integrated circuit. Measurement circuitry includes a signal-to-clutter ratio estimator and a jamming detector, e.g., circuitry that identifies the presence of intentional interference signals in received radar returns, completing measurement in M equals 20 clock cycles independent of radar return values and threat environment conditions. Selection circuitry includes a finite state machine encoding mode transitions, e.g., search to track to electronic counter-countermeasure (ECCM), completing selection in C equals 2 clock cycles independent of threat environment values and selection outcome. Waveform parameter sets including pulse repetition frequency, pulse width, frequency agility patterns, and detection thresholds are stored in bounded-latency parameter memory. In some embodiments, the bounded-latency parameter memory for the radar implementation includes embedded SRAM or tightly coupled memory on the integrated circuit die.

In other embodiments, the waveform parameter sets are large, e.g., including matched filter coefficient sets for multiple waveform configurations, frequency agility pattern tables, and CFAR reference window parameters across multiple radar modes. In such embodiments, at least a portion of the parameter sets are stored in off-chip DRAM accessed through a bounded-latency parameter memory controller as described herein. The bounded-latency parameter memory controller enforces reserved bandwidth allocation for parameter retrieval, such that parameter access latency remains bounded regardless of concurrent memory traffic from other subsystems on the integrated circuit. In this illustrative implementation, the deterministic memory latency envelope (DMLE) as described herein is, for example, 25 clock cycles at 500 MHz, corresponding to 50 nanoseconds, and is included within K.

In some embodiments where the off-chip DRAM operates at a memory clock frequency different from the processing clock frequency, a clock domain crossing interface with a fixed, predetermined latency in processing clock cycles can be interposed between the memory access path and processing circuitry, and the clock domain crossing latency is included within the DMLE as described herein. Processing circuitry includes a pulse compression, Doppler filtering, and constant false alarm rate (CFAR) detection pipeline, executing in K equals 8000 clock cycles identical across all waveform parameter sets within an antenna dwell time allocation.

In accordance with some embodiments, a pulse timing generator coupled to processing circuitry and selection circuitry produces transmit trigger signals at intervals determined by the pulse repetition frequency from the selected parameter set, operating synchronously with processing circuitry such that radar return processing is expected to complete before the next transmit trigger.

To illustrate, at 500 MHz, total expected latency is 8022 clock cycles or approximately 16.04 microseconds. LDR equals 1.0 for this illustrative implementation. Target track states are maintained in parameter memory, and processing time is independent of the number of active target tracks up to a fixed maximum track capacity.

In keeping with some embodiments, when the jamming detector identifies jamming signals, selection circuitry transitions to an ECCM waveform parameter set within C equals 2 clock cycles. Processing circuitry applies frequency agility patterns and adjusted detection thresholds from the selected ECCM parameter values. Multi-mode transitions between search, track, track-while-scan, and ground mapping modes are also contemplated within the same C clock cycles.

In various embodiments, at least one of the number of radar modes, the specific waveform parameter values, the processing pipeline depth, the target track capacity, or the antenna configuration is implementation-dependent, or any combination thereof. At least one of FPGA or ASIC implementation technologies, or any combination thereof, are contemplated. Analogous implementations in adjacent domains are also contemplated, e.g., at least one of sonar or underwater acoustic processing, LiDAR return signal processing, electronic warfare signal analysis, or weather radar, or any combination thereof, where the same pulsed signal processing pipeline applies across multiple waveform or detection parameter sets.

Example 4: Power System Protection Relay Implementation

In some embodiments, a representative protection relay implementation demonstrating deterministic fault response timing across multiple grid operating states includes an FPGA-based integrated circuit. In some embodiments, the integrated circuit is deployed in a processing appliance, e.g., a ruggedized chassis mounted in an equipment rack at a power substation with environmental protection features including extended temperature range components and electromagnetic interference shielding. In other embodiments, the integrated circuit is integrated as a processing circuit on a system-on-chip alongside a management processor core for configuration and monitoring functions. Measurement circuitry includes a discrete Fourier transform engine computing voltage and current phasors from sampled waveforms, synchronized to a power system frequency reference, completing measurement in M equals 16 clock cycles per sample window.

In accordance with some embodiments, selection circuitry includes comparator logic or, in other implementations, a multi-threshold decoder. Selection circuitry evaluates fault indicators and grid operating state, completing selection in C equals 2 clock cycles. Processing circuitry executes overcurrent, distance, and differential protection functions simultaneously within K equals 200 clock cycles, identical across all protection parameter sets. Protection parameter sets for, e.g., normal operation, islanded operation, and high distributed generation penetration states are stored in bounded-latency parameter memory, e.g., block random-access memory in an FPGA implementation, or embedded SRAM in an ASIC implementation.

In certain implementations, total expected latency is 218 clock cycles; at 100 MHz, approximately 2.18 microseconds, which is expected to be within protection relay timing classes as specified for the target application. LDR equals 1.0 for this illustrative implementation because K is identical across all protection parameter sets. In keeping with some embodiments, when measurement circuitry detects a transition from normal grid operation to islanded operation, e.g., through loss of voltage on a reference bus, selection circuitry selects the islanded operation protection parameter set within C equals 2 clock cycles. A breaker control interface coupled to processing circuitry generates trip commands within a deterministic time from fault detection, independent of fault type and independent of which protection parameter set is selected. In some embodiments, an optional synchrophasor output interface outputs phasor measurements with timestamps conforming to synchrophasor measurement specifications.

In various embodiments, at least one of the specific protection functions, the number of grid operating states, the timing class target, the synchrophasor interface, or the implementation technology is implementation-dependent, or any combination thereof; and analogous implementations in adjacent domains, e.g., at least one of power quality monitoring, microgrid control, arc flash detection, or motor protection, or any combination thereof, are also contemplated where the same phasor-based measurement and grid-condition-driven selection pipeline applies across multiple protection or monitoring parameter sets.

Example 5: Robotic Control Implementation

In some embodiments, a representative robotic control implementation demonstrating deterministic control loop timing across multiple payload and contact configurations includes an FPGA-based or ASIC-based integrated circuit, optionally integrated in a system-on-chip. Measurement circuitry includes force-torque sensor interface circuits and proximity sensors, completing measurement in M equals 10 clock cycles independent of sensor values and operational conditions.

Selection circuitry includes a threshold comparator or, in other implementations, a cascaded comparator tree, that selects between position-control and impedance-control parameter sets based on detected contact force, completing selection in C equals 1 clock cycle independent of contact force values and selection outcome.

Parameter sets are stored in bounded-latency parameter memory, e.g., block random-access memory or scratchpad memory. Processing circuitry includes, e.g., a systolic array or a vector pipeline, computing control outputs for multiple robot axes simultaneously within K equals 250 clock cycles identical across all control parameter sets, including both a nominal control output and a safety-limited control output computed each cycle. In some embodiments, clock gating is statically configured at design time for unused hardware resources and does not vary as a function of parameter set selection or input data, and does not alter the number of active pipeline stages or the pipeline stage count K.

In accordance with some embodiments, a fieldbus interface, e.g., EtherCAT or PROFINET IRT, receives sensor data and transmits actuator commands synchronously with a fieldbus clock, with processing circuitry completing control computation between consecutive fieldbus clock cycles.

In certain implementations, total expected latency is 261 clock cycles; at 200 MHz, approximately 1.31 microseconds. LDR equals 1.0 for this illustrative implementation. When contact force exceeds a configured threshold, selection circuitry transitions from position-control to impedance-control parameter set within C equals 1 clock cycle as described herein.

In various embodiments, at least one of the number of robot axes, the fieldbus type, the number of payload configurations, the specific control law parameter values, or vision-derived condition metrics is implementation-dependent, or any combination thereof; and analogous implementations in adjacent domains, e.g., at least one of computer numerical control (CNC) machine tool control, unmanned aerial vehicle (UAV) flight control, prosthetic limb control, or surgical robot control, or any combination thereof, are also contemplated where the same servo control pipeline applies across multiple payload, contact, or environmental parameter sets.

Example 6: Satellite Modem Implementation

In some embodiments, a representative satellite modem implementation demonstrating deterministic frame processing timing across multiple modulation and coding configurations includes an ASIC-based integrated circuit. Measurement circuitry includes link budget estimators, Doppler rate computation from received signals, and rain fade estimation from signal strength measurements, completing measurement in M equals 12 clock cycles independent of link condition values and signal characteristics. Selection circuitry includes a modulation and coding scheme lookup, completing selection in C equals 2 clock cycles independent of link condition values and selection outcome. Modem parameter sets corresponding to entries in a modulation and coding scheme table, e.g., per DVB-S2X adaptive coding and modulation, are stored in bounded-latency parameter memory, e.g., embedded SRAM.

Processing circuitry executes forward error correction encoding or decoding within a number of clock cycles K that is predetermined for each modem parameter set and varies between parameter sets based on code rate. K equals 5000 clock cycles for the lowest code rate parameter set, e.g., rate 1/4, and K equals 4200 clock cycles for the highest code rate parameter set, e.g., rate 9/10, with intermediate code rates having intermediate predetermined values of K. K for each modem parameter set is predetermined at design time and does not depend on input signal values or link condition values. In this illustrative implementation, K differs across parameter sets, yielding an LDR of approximately 1.19. This demonstrates an embodiment in which LDR exceeds 1.0 because different parameter sets have different predetermined values of K, while each individual parameter set still has a fixed, predetermined total latency.

Total expected latency ranges from 4214 clock cycles for the highest code rate to 5014 clock cycles for the lowest code rate; at 400 MHz, approximately 10.54 microseconds to approximately 12.54 microseconds, each of which is expected to be within the frame timing budget. Doppler compensation is applied using parameter values from the selected modem parameter set in fixed cycles regardless of Doppler shift magnitude. In keeping with some embodiments, when measurement circuitry detects rain fade attenuation exceeding a configured threshold, selection circuitry selects a modem parameter set providing increased coding protection within C equals 2 clock cycles. Measurement circuitry optionally detects beam handover events, e.g., in low Earth orbit (LEO) constellation applications, and selection circuitry reselects modem parameter values upon beam handover detection.

In various embodiments, at least one of the number of modulation and coding scheme entries, the specific coding parameter values, the beam handover detection, or the implementation technology is implementation-dependent, or any combination thereof, and FPGA implementations are also contemplated; and analogous implementations in adjacent domains, e.g., at least one of deep space communication, terrestrial microwave backhaul, maritime VSAT, or aircraft satellite terminal processing, or any combination thereof, are also contemplated where the same forward error correction and adaptive coding and modulation pipeline applies across multiple link condition parameter sets.

Example 7: Audio Processing Implementation

In some embodiments, a representative audio processing implementation demonstrating deterministic audio block processing timing across multiple acoustic environment configurations includes an ASIC-based or FPGA-based integrated circuit. Measurement circuitry includes noise floor estimation and source type classification circuits, completing measurement in M equals 6 clock cycles independent of audio signal values and acoustic conditions. In some embodiments, measurement circuitry computes a composite data quality score from multiple observable features of the audio signal, e.g., a weighted combination of signal-to-noise ratio, missing-sample rate, and baseline drift estimate, and selection circuitry uses the composite data quality score as one of the condition values driving parameter set selection, e.g., selecting parameter sets with more conservative noise reduction when data quality is degraded.

Selection circuitry includes an environment and source lookup or, in other implementations, a classifier output decoder, completing selection in C equals 1 clock cycle independent of acoustic condition values and selection outcome. Parameter sets are stored in bounded-latency parameter memory. Processing circuitry executes equalization, dynamics processing, and spatial audio rendering including head-related transfer function (HRTF) filtering within K equals 480 clock cycles identical across all parameter sets per audio block. Processing circuitry processes multiple channels simultaneously with channel count independent of K, e.g., a fixed maximum channel capacity with unused channels processed at zero or passthrough coefficients.

In accordance with some embodiments, at a clock frequency of 100 MHz with a 48 kHz sample rate and 256-sample audio blocks, expected processing time is approximately 4.87 microseconds per block, which is expected to be within the approximately 5.33 millisecond processing budget per block. LDR equals 1.0 for this illustrative implementation because K is identical across all parameter sets.

In certain implementations, when measurement circuitry detects acoustic feedback onset from audio signal characteristics, selection circuitry selects a parameter set including notch filter coefficients targeting the detected feedback frequency, with selection and processing completing within K clock cycles, which is expected to suppress feedback before audible oscillation occurs.

In various embodiments, at least one of the sample rate, block size, channel count, specific DSP algorithms, HRTF database size, number of virtual sound sources, or feedback suppression configuration is implementation-dependent, or any combination thereof; and analogous implementations in adjacent domains, e.g., at least one of hearing aid signal processing, automotive active noise cancellation, teleconference audio processing, or live sound production, or any combination thereof, are also contemplated where the same spectral processing pipeline applies across multiple acoustic environment parameter sets.

Example 8: Financial Market Data Processing Implementation

In some embodiments, a representative financial market data processing implementation demonstrating deterministic processing latency across multiple trading strategy configurations includes an FPGA-based integrated circuit. Measurement circuitry includes volatility estimators, bid-ask spread measurement circuits, and order flow imbalance computation from streaming market data, completing measurement in M equals 6 clock cycles independent of market data values and market conditions.

Selection circuitry includes a market regime comparator or, in other implementations, a weighted priority encoder, completing selection in C equals 1 clock cycle independent of market condition values and selection outcome. Parameter sets are stored in bounded-latency parameter memory, e.g., block random-access memory or register-file memory. In some embodiments, the parameter memory for the financial trading implementation is organized in a banked configuration, e.g., with each trading strategy configuration occupying a separate memory bank, such that selection circuitry activates the appropriate bank through a bank select signal and parameter access latency is independent of which bank is selected.

In accordance with some embodiments, parameter set transitions between consecutive market data items use double-buffered registers as described herein. An active register bank supplies trading strategy parameter values to processing circuitry during evaluation of a current market data item. A shadow register bank is concurrently loaded with parameter values for the next trading strategy configuration selected by selection circuitry. Register banks are swapped at the pipeline boundary between consecutive market data items. No idle cycles, no pipeline drain, and no throughput reduction occur during parameter set transitions.

Processing circuitry includes, e.g., a multiply-accumulate pipeline, evaluating opportunity scores for multiple financial instruments in parallel within K equals 300 clock cycles identical across all trading strategy configurations, with instrument count independent of K, e.g., a fixed maximum instrument capacity. In accordance with some embodiments, at 300 MHz, total expected latency is 307 clock cycles or approximately 1.02 microseconds, deterministic regardless of which market regime or trading strategy configuration is selected. LDR equals 1.0 and ADPF equals approximately 1.0 for this illustrative implementation.

In certain implementations, when measurement circuitry detects a volatility regime change, e.g., volatility exceeding a configured threshold sustained over a measurement window, selection circuitry selects the corresponding trading strategy parameter set within C equals 1 clock cycle. A market data normalization pipeline converts data from multiple exchange protocols, e.g., Financial Information exchange (FIX) or ITCH, into a unified internal representation in fixed clock cycles independent of source protocol. Parameter sets are compiled from user-defined trading strategy specifications through a parameter compilation interface. In keeping with some embodiments, processing circuitry is expected not to introduce latency variation, in that processing latency is constant regardless of which strategy configuration is selected as described herein, and constant processing latency is expected to reduce exposure to adverse selection in electronic trading.

In various embodiments, processing circuitry optionally includes an options trade structure generation pipeline that computes, e.g., at least one of strike selection, expiration selection, spread construction, or Greeks-based position sizing, or any combination thereof. Processing circuitry optionally further includes a risk calculation pipeline that computes position-level, portfolio-level, and correlation-based risk metrics in fixed cycles independent of portfolio composition.

The number of strategy configurations, the specific strategy types, the number of trading venues, the instrument count, options features, and risk calculation features are implementation-dependent. Analogous implementations in adjacent domains, e.g., at least one of cryptocurrency market data processing, foreign exchange processing, commodity futures processing, or fixed income market data processing, or any combination thereof, are also contemplated where the same market data normalization and regime-driven strategy selection pipeline applies across multiple trading strategy parameter sets.

Example 9: Video Encoding Implementation

In some embodiments, a representative video encoding implementation demonstrating deterministic coding tree unit encoding latency across multiple quality-rate configurations includes an ASIC-based or FPGA-based integrated circuit. Measurement circuitry includes a spatial complexity estimator computing, e.g., at least one of edge density, transform-domain energy, or variance of pixel block statistics, or any combination thereof, from a lookahead window of incoming video samples, a temporal complexity estimator computing, e.g., at least one of frame-difference energy, motion vector statistics, or histogram of block-level distortion metrics, or any combination thereof, from a reference frame buffer, and a rate control buffer model computing a target quantization parameter from buffer occupancy and bit budget metrics, completing measurement in M equals 8 clock cycles independent of scene content values.

Selection circuitry includes a threshold comparator or, in other implementations, a multi-level quality-rate lookup table, selecting among quality-rate operating point parameter sets completing selection in C equals 2 clock cycles independent of scene condition values and selection outcome. Parameter sets are stored in bounded-latency parameter memory, e.g., embedded SRAM or block random-access memory, with each quality-rate operating point occupying a separate memory region addressable through a base address offset generated by selection circuitry, such that parameter access latency is independent of which operating point is selected.

In accordance with some embodiments, parameter set transitions between consecutive coding tree units use double-buffered registers as described herein, with an active register bank supplying encoding parameter values to processing circuitry during encoding of a current coding tree unit while a shadow register bank is concurrently loaded with parameter values for the next quality-rate operating point selected by selection circuitry, and register banks are swapped at the coding tree unit boundary such that no idle cycles, no pipeline drain, and no throughput reduction occur during parameter set transitions.

Processing circuitry includes a motion estimation engine that evaluates candidate motion vectors over a fixed search region using, e.g., a full search, a structured multi-step search with a predetermined number of steps, or a hierarchical search with a predetermined number of levels. The motion estimation engine executes in a predetermined number of clock cycles without early termination based on distortion thresholds. Processing circuitry further includes a transform and quantization pipeline applying, e.g., a discrete cosine transform or an asymmetric discrete sine transform, and applying quantization using a quantization parameter value from the selected encoding parameter set. The transform and quantization execute in a fixed number of pipeline stages regardless of coefficient magnitudes. Processing circuitry further includes an entropy coding engine, e.g., a context-adaptive binary arithmetic coding engine or a context-adaptive variable-length coding engine. The entropy coding engine processes a fixed maximum number of syntax elements per coding unit, with unused element slots coded as zero-value symbols. Entropy coding cycle count is independent of the number of non-zero coefficients produced by quantization. Processing circuitry further includes an in-loop filtering pipeline applying, e.g., at least one of a deblocking filter, a sample adaptive offset filter, or an adaptive loop filter, or any combination thereof. Filter strength parameters and filter coefficient values are from the selected encoding parameter set. The in-loop filtering executes in a fixed number of clock cycles per coding tree unit, independent of block boundary characteristics or filter classification results. Unused syntax element positions are encoded as zero-coefficient symbols to maintain a fixed number of pipeline stages per coding unit.

In accordance with some embodiments, processing circuitry executes in K equals 1200 clock cycles identical across all encoding parameter sets per coding tree unit. At a clock frequency of 400 MHz, total expected latency is 1210 clock cycles or approximately 3.03 microseconds per coding tree unit. LDR equals 1.0 for this illustrative implementation. For 4K resolution at a coding tree unit size of 64×64, the per-frame encoding budget is approximately 6.1 milliseconds, which is within a 16.67 millisecond frame period at 60 frames per second.

In certain implementations, when measurement circuitry detects a scene change, e.g., temporal complexity exceeding a configured threshold, selection circuitry selects a parameter set configured for intra-dominant encoding within C equals 2 clock cycles. In some implementations, when the rate control buffer model detects buffer fullness exceeding a configured threshold, selection circuitry selects a parameter set with a higher quantization parameter value to reduce bit production while maintaining the same K clock cycles per coding tree unit. In other implementations, when measurement circuitry detects sustained high temporal complexity indicative of high-motion content, selection circuitry selects a parameter set with increased motion estimation search range weighting while maintaining K clock cycles.

In various embodiments, at least one of the codec standard, the coding tree unit size, the search window range, the number of quality-rate operating points, or the target resolution and frame rate is implementation-dependent, or any combination thereof; encoding parameter sets optionally correspond to different video codec configurations, e.g., at least one of H.264/AVC, H.265/HEVC, H.266/VVC, or AV1, with codec-specific transform types, prediction modes, and entropy coding tables stored as parameter values, and the fixed-topology processing pipeline accommodating different codec configurations through parameter value changes rather than pipeline reconfiguration; encoding parameter sets optionally include region-of-interest encoding parameters specifying spatially varying quantization parameter offsets for designated frame regions; and analogous implementations in adjacent domains, e.g., at least one of video decoding, video transcoding, medical imaging video capture, or screen content encoding for remote desktop applications, or any combination thereof, are also contemplated where the same transform, prediction, and entropy coding pipeline applies across multiple quality-rate parameter sets.

Table 2 below summarizes the illustrative M, C, K, clock frequency, total latency, and LDR values for Examples 1-9, which present system-level implementations across nine eight application domains; Examples 10-17 provide detailed circuit structure descriptions for the same eight domains using the same M, C, K, and clock frequency values as their corresponding system-level examples. In various embodiments, the specific values of M, C, K, and clock frequency are implementation-dependent and may differ from those shown; the values in Table 2 are representative and are provided for purposes of illustration.

TABLE 2

Representative M + C + K Timing Summary Across Domain Examples

| Example | Domain | M | C | K | Clock Frequency MHZ | Total Cycles | Latency (approx.) | LDR |
|---|---|---|---|---|---|---|---|---|
| 1 | Neural Network | 8 | 3 | 1000 | 200 | 1011 | 5.06 μs | 1.0 |
| 2 | Network Security | 4 | 2 | 500 | 250 | 506 | 2.02 μs | 1.0 |
| 3 | Radar | 20 | 2 | 8000 | 500 | 8022 | 16.04 μs | 1.0 |
| 4 | Power Protection | 16 | 2 | 200 | 100 | 218 | 2.18 μs | 1.0 |
| 5 | Robotic Control | 10 | 1 | 250 | 200 | 261 | 1.31 μs | 1.0 |
| 6 | Satellite Modem | 12 | 2 | 4200-5000 | 400 | 4214-5014 | 10.54-12.54 μs | 1.19 |
| 7 | Audio Processing | 6 | 1 | 480 | 100 | 487 | 4.87 μs | 1.0 |
| 8 | Financial Trading | 6 | 1 | 300 | 300 | 307 | 1.02 μs | 1.0 |
| 9 | Video Encoding | 8 | 2 | 1200 | 400 | 1210 | 3.03 μs | 1.0 |

In each example, total cycles equals M+C+K, and latency in microseconds equals total cycles divided by the clock frequency in MHz. The LDR value of 1.0 in Examples 1-5 and Examples 7-9 indicates that K is identical across all parameter sets for those examples, such that total execution time is predetermined for each parameter set and does not vary with runtime condition values, parameter set selection, or input data values.

In Example 6, the LDR value of approximately 1.19 illustrates an embodiment in which different parameter sets have different predetermined values of K. Total latency is predetermined for each parameter set and does not vary with runtime condition values or input data values, but differs between parameter sets. In this example, lower code rates require more decoding computation and thus have higher predetermined values of K.

Other LDR values are contemplated in various embodiments as described herein, including, by way of example and not limitation, LDR values of 1.0, values between approximately 1.0 and approximately 1.5, e.g., approximately 1.05, approximately 1.1, approximately 1.19, approximately 1.25, approximately 1.33, or approximately 1.5, and values greater than 1.5, where the specific LDR value depends on the ratio of maximum to minimum predetermined K values across parameter sets for a given implementation and is not limited to the values shown in the examples herein.

The values of M, C, K, and clock frequency shown in the examples herein are illustrative and are not limiting. M may range from, by way of example and not limitation, 1 clock cycle to hundreds of clock cycles depending on the number and complexity of measurement subcircuits and the measurement techniques employed. C may range from 1 clock cycle for combinational selection logic to tens of clock cycles for pipelined multi-condition evaluation. The specific value of C depends on the number of condition values, the selection topology, and whether the selection circuitry is implemented as combinational logic or as a registered pipeline.

K may range from tens of clock cycles for simple processing functions to tens of thousands of clock cycles or more for complex processing pipelines, with the specific value of K depending on the processing algorithm, the pipeline depth, and the data throughput requirements. Clock frequencies may range from, by way of example and not limitation, tens of MHz for power-constrained implementations to hundreds of MHz or GHz-class frequencies for high-throughput implementations, with the specific clock frequency depending on the implementation technology, e.g., FPGA fabric speed grade or ASIC process node, and the system timing requirements. The total latency M+C+K in clock cycles and in wall-clock time, the LDR value, and the ADPF value are each implementation-dependent and are not limited to the specific values shown in the examples herein, and exemplary ranges are provided herein.

Example 10: Financial Market Data Processing—Measurement and Processing Circuit Structure In some embodiments of the integrated circuit configured for financial market data processing, the measurement circuitry includes a sliding window register array maintaining a configurable number of recent price values, e.g., a window containing 16, 32, 64, or 128 of the most recent price values. A hardware volatility estimator computes a volatility metric from the sliding window register array using, e.g., at least one of the following, or any combination thereof: a variance accumulator that tracks the running sum of squared price differences, a range detector that identifies the maximum and minimum prices within the window, or an exponentially weighted moving average (EWMA) circuit that applies a hardware-implemented decay factor to successive price differences.

In accordance with some embodiments, measurement circuitry further computes condition values from, e.g., at least one of the following, or any combination thereof: a relative strength index (RSI) accumulator, a moving average convergence divergence (MACD) circuit computing the difference between two EWMA outputs at different decay rates, a Bollinger Band circuit computing an upper and lower envelope from a simple moving average and a standard deviation accumulator, a volume-weighted average price (VWAP) running accumulator, a depth-of-market snapshot register capturing a fixed number of price levels from an order book, a quote change rate counter, a wavelet decomposition engine computing multi-resolution representations of price and volume time series, a Fourier transform engine computing spectral representations of price series, a Kalman filter maintaining smoothed state estimates for price and volatility, a realized volatility accumulator computing variance of returns over a rolling window, or a price-trend estimator computing linear regression slope over the sliding window. Each condition value is computed in a fixed number of clock cycles within M.

In some embodiments, measurement circuitry further includes an order book reconstruction engine. The order book reconstruction engine maintains, for each of a plurality of monitored instruments up to a configured maximum instrument count, a sorted price-level array in bounded-latency parameter memory. The engine receives order add, order delete, and order modify messages from the market data normalization pipeline and updates the corresponding price-level array using, e.g., a binary search comparator tree or a sorted shift register. Each insert, delete, and modify operation completes in a fixed number of clock cycles up to a predetermined maximum book depth configured at design time independent of book depth. The engine provides current best-bid, best-ask, and configurable depth-of-market snapshots to downstream measurement circuitry and to the depth-of-market snapshot register within M clock cycles.

In certain implementations, the processing circuitry generates trade setup output data including, e.g., at least one of an instrument identifier, an opportunity score, an entry price region, a profit-taking target level, a protective exit level, or a position size recommendation, or any combination thereof, with each output value computed by fixed-function arithmetic within the K clock cycles.

In keeping with some embodiments, a parameter compilation interface converts user-defined trading strategy specifications into parameter set data loadable into bounded-latency parameter memory. Order flow metrics including, e.g., trade imbalance, large order detection, or price impact estimates, are computed by measurement circuitry and used by selection circuitry to select between aggressiveness levels.

In various embodiments, processing circuitry optionally includes an options trade structure generation pipeline that computes, e.g., at least one of strike selection, expiration selection, spread construction, or Greeks-based position sizing, or any combination thereof, and a risk calculation pipeline that computes position-level, portfolio-level, and correlation-based risk metrics in fixed cycles independent of portfolio composition. In various embodiments, the specific condition value computations, the sliding window depth, the number and types of technical indicators, the market data normalization protocol support, and the specific trading strategy parameter values are implementation-dependent.

Example 11: Radar Processing—Signal Processing Circuit Structure

In some embodiments of the integrated circuit configured for radar data processing, the measurement circuitry includes a noise power estimator. The noise power estimator accumulates signal energy over a noise-only interval, e.g., a range gate interval known to contain no target returns. It computes a noise floor estimate by dividing the accumulated energy by the number of samples in the interval using a hardware divider or a reciprocal lookup table.

In accordance with some embodiments, the processing circuitry includes a pulse compression pipeline implementing, e.g., at least one of matched filtering or stretch processing, or any combination thereof, in a fixed number of pipeline stages, and a Doppler filter bank implemented as a pipelined fast Fourier transform (FFT) engine with a fixed cycle count, e.g., a radix-2, radix-4, or split-radix FFT architecture with log 2(N) butterfly stages for an N-point FFT where N is, by way of illustrative example, 256, 512, 1024, or 4096, with twiddle factor coefficients stored in bounded-latency parameter memory.

In certain implementations, a constant false alarm rate (CFAR) detector is implemented as a sliding window comparator that compares each cell-under-test against a detection threshold derived from the average power of surrounding reference cells, with the reference window size, guard cell count, and threshold scaling factor stored as parameter values within the selected parameter set.

In some embodiments, processing circuitry stores a range-Doppler map in a dual-port memory within the integrated circuit. Pulse compression results for each range gate are written along a first dimension, and Doppler filter results are organized along a second dimension. A two-dimensional CFAR detector compares each cell-under-test against a two-dimensional reference window of neighboring cells in both range and Doppler dimensions. The reference window sizes and guard cell counts in each dimension are stored as parameter values in the selected radar waveform parameter set. The two-dimensional CFAR detection completes in a predetermined number of clock cycles within K, independent of target density within the range-Doppler map.

In keeping with some embodiments, a pulse timing generator produces transmit trigger signals at intervals determined by the pulse repetition frequency from the selected parameter set. The pulse timing generator operates synchronously with processing circuitry. Target track states are maintained in parameter memory, and processing time is independent of the number of active target tracks up to a fixed maximum track capacity.

In various embodiments, multi-mode transitions between search, track, track-while-scan, and ground mapping modes occur within C clock cycles. ECCM waveform selection applies frequency agility patterns and adjusted detection thresholds upon jamming detection. Doppler processing applies a window function, e.g., at least one of a Hamming window, a Hanning window, a Blackman-Harris window, or a Kaiser window, or any combination thereof. Window function coefficients are stored in bounded-latency parameter memory.

In various embodiments, the specific FFT size, the number of pipeline stages, the CFAR detector configuration, the window function type, and the number of radar modes are implementation-dependent. The radar processing pipeline architecture applies to, e.g., weather surveillance, air traffic control, maritime navigation, and automotive radar. The architectural property of deterministic return processing within dwell time allocations applies regardless of the application domain.

Example 12: Wireless Baseband Processing—Decoder and Channel Processing Circuit Structure In some embodiments of the integrated circuit configured for wireless baseband processing, the measurement circuitry includes a channel estimation engine. The channel estimation engine computes channel frequency response estimates from known reference symbols, e.g., cell-specific reference signals (CRS), demodulation reference signals (DMRS), or channel state information reference signals (CSI-RS). Correlation circuitry multiplies received reference symbol samples by conjugate reference sequences stored in hardware registers.

In accordance with some embodiments, the processing circuitry includes at least one of the following, or any combination thereof. An LDPC decoder can be implemented as a layered min-sum decoder with a predetermined maximum number of decoding iterations, e.g., between 5 and 50 iterations. Each iteration includes variable node update circuitry and check node update circuitry operating on a parity check matrix stored in bounded-latency parameter memory. The decoder executes the predetermined maximum number of iterations for every codeword without early termination. Unconverged results are passed through and the decoding cycle count remains fixed. A turbo decoder can be implemented as a max-log-MAP decoder with a predetermined number of half-iterations. A polar decoder can be implemented as a successive cancellation list (SCL) decoder with a predetermined list size.

In certain implementations, the wireless baseband processing circuitry further includes a hybrid automatic repeat request (HARQ) soft-combining engine. The HARQ engine combines soft information from retransmission attempts stored in a HARQ buffer memory. Combining cycle count is fixed and independent of the retransmission count. The processing pipeline accommodates multiple numerologies, e.g., different subcarrier spacings as specified in wireless communication systems. K is sized to accommodate the shortest slot duration among supported numerologies.

In keeping with some embodiments, a multi-layer MIMO precoding engine applies precoding matrices to spatial layers. Cycle count is independent of the spatial layer count up to a fixed maximum. Scheduling grant information is integrated within C clock cycles by selection circuitry, combined with channel condition metrics to select appropriate modulation and coding scheme parameter values. In various embodiments, the specific decoder type, the maximum iteration count, the number of supported numerologies, the HARQ buffer depth, and the maximum spatial layer count are implementation-dependent.

Example 13: Power System Protection—Phasor and Protection Circuit Structure

In some embodiments of the integrated circuit configured for power system protection, the measurement circuitry includes a discrete Fourier transform (DFT) engine. The DFT engine computes fundamental-frequency phasors from sampled voltage and current waveforms, e.g., using a one-cycle or half-cycle DFT window. The DFT engine is implemented as a fixed-coefficient multiply-accumulate pipeline operating at the power system sampling rate and synchronized to a power frequency reference.

In accordance with some embodiments, the processing circuitry includes an impedance calculator that computes apparent impedance from voltage and current phasors using complex division circuitry. A distance comparator compares the computed impedance against zone boundary impedance values stored in the selected parameter set. Zone boundaries represent, e.g., at least one of Zone 1 covering a first percentage of the protected line impedance, Zone 2 covering the protected line plus a margin, or Zone 3 covering a larger reach for backup protection, or any combination thereof.

In certain implementations, the power system protection processing circuitry executes overcurrent, distance, differential, and directional protection functions simultaneously within K clock cycles. A trip decision pipeline evaluates, e.g., at least one of an overcurrent condition, an underfrequency condition, a rate-of-change-of-frequency condition, a negative-sequence current condition, or a differential current condition, or any combination thereof. Each condition is evaluated against threshold values stored in the selected parameter set.

In keeping with some embodiments, a breaker control interface generates trip commands within a deterministic number of clock cycles from fault detection, independent of fault type and parameter set selection. Grid operating states, e.g., normal, islanded, or high distributed generation penetration, are reflected in corresponding parameter sets. In various embodiments, an optional synchrophasor output interface outputs timestamped phasor measurements conforming to synchrophasor measurement specifications. In various embodiments, the specific protection functions, the DFT window type, the number of grid operating states, the zone boundary values, and the trip decision evaluation criteria are implementation-dependent.

Example 14: Robotic Control—Kinematics and Servo Circuit Structure

In some embodiments of the integrated circuit configured for robotic control, the measurement circuitry includes at least one of the following, or any combination thereof: a forward kinematics engine that computes end-effector position from joint encoder readings using a Denavit-Hartenberg parameter table stored in hardware registers, a force-torque measurement pipeline that filters and scales raw force-torque sensor readings using calibration coefficients, or an inertial navigation pipeline that integrates accelerometer and gyroscope readings from an inertial measurement unit (IMU) to compute orientation estimates.

In accordance with some embodiments, the processing circuitry includes a servo control pipeline implementing, e.g., a proportional-integral-derivative (PID) control loop or a state-space controller, in which the control gain parameter values, e.g., proportional gain Kp, integral gain Ki, and derivative gain Kd, or state feedback matrix entries, are stored in the selected parameter set, and the servo control pipeline computes torque commands for each joint actuator at a deterministic rate defined by K clock cycles per control cycle.

In certain implementations, the robotic control processing circuitry further includes a trajectory interpolation engine. The trajectory interpolation engine computes intermediate joint position setpoints between trajectory waypoints using, e.g., at least one of linear interpolation, cubic spline interpolation, or quintic polynomial interpolation, or any combination thereof. Interpolation coefficients are derived from trajectory waypoints stored in the selected parameter set.

A fieldbus interface, e.g., EtherCAT or PROFINET IRT, receives sensor data and transmits actuator commands synchronously with a fieldbus clock according to some embodiments. Multi-axis computation completes within a single K budget. Both a nominal control output and a safety-limited control output are computed simultaneously per cycle. Selection between outputs is based on proximity to safety boundaries. In various embodiments, the specific kinematics model, the number of robot axes, the control law type, the trajectory interpolation method, and the fieldbus protocol are implementation-dependent.

Example 15: Satellite Communication—Carrier Tracking and Decoding Circuit Structure In some embodiments of the integrated circuit configured for satellite communication signal processing, the measurement circuitry includes a carrier tracking loop implemented in hardware, e.g., a Costas loop or a decision-directed phase-locked loop. The carrier tracking loop estimates carrier frequency offset and phase offset from the received signal. Loop bandwidth and damping factor are configured through parameter values in bounded-latency parameter memory.

In accordance with some embodiments, the processing circuitry includes an LDPC decoder configured for satellite communication code rates, e.g., code rates of 1/4, 1/3, 2/5, 1/2, 3/5, 2/3, 3/4, 4/5, 5/6, 8/9, or 9/10 as specified in DVB-S2 or DVB-S2X specifications. The parity check matrix for each code rate is stored as a parameter set in bounded-latency parameter memory. The decoder iterates a predetermined number of times, e.g., between 10 and 50 iterations. K clock cycles encompass all iterations.

In certain implementations, the satellite communication processing circuitry further includes a soft de-mapper. The soft de-mapper computes log-likelihood ratios (LLRs) for each received symbol based on the constellation mapping stored in the selected parameter set. Supported constellations include, e.g., at least one of QPSK, 8PSK, 16APSK, or 32APSK, or any combination thereof. Each constellation configuration has associated ring ratio and phase offset parameter values.

In keeping with some embodiments, Doppler shift rate computation and compensation complete in fixed cycles regardless of Doppler shift magnitude. Rain fade detection from signal strength triggers selection of increased coding protection. Beam handover detection triggers modem parameter reselection. Each of these operations completes within the deterministic timing as described herein. In various embodiments, the specific carrier tracking loop type, the number of supported code rates, the decoder iteration count, the constellation configurations, and the Doppler compensation method are implementation-dependent.

Example 16: Audio Signal Processing—Spectral and Spatial Processing Circuit Structure In some embodiments of the integrated circuit configured for audio signal processing, the measurement circuitry includes a spectral analysis engine. The spectral analysis engine computes a short-time frequency representation of the audio signal using, e.g., a short-time Fourier transform (STFT) implemented as a windowed FFT pipeline. Window length is, for example, 256, 512, or 1024 samples, with an overlap of, for example, 50 percent or 75 percent.

In accordance with some embodiments, the processing circuitry includes at least one of the following, or any combination thereof. A noise suppression engine applies spectral gain values computed from estimated noise and signal spectra. Noise estimation parameter values controlling the adaptation rate and minimum gain floor are stored in the selected parameter set. An acoustic echo cancellation engine implements an adaptive filter, e.g., a frequency-domain normalized least mean squares (NLMS) filter. Filter length and step size parameter values are stored in the selected parameter set. A beamforming engine applies frequency-dependent complex weights to multi-channel audio signals to steer the spatial response toward a target direction. Beamforming weight matrices are stored in the selected parameter set.

In certain implementations, HRTF filtering processes a fixed maximum number of virtual sound sources with source-count-independent timing. Inactive sources are processed at zero or passthrough coefficients. The audio processing circuitry further includes a dynamic range processing pipeline that applies, e.g., at least one of a compressor, a limiter, an expander, or a noise gate, or any combination thereof. Attack time, release time, threshold, ratio, and knee parameter values are stored in the selected parameter set.

In keeping with some embodiments, constant input-to-output audio processing latency is maintained independent of parameter set selection, and multi-channel processing operates with channel-count-independent K through a fixed maximum channel capacity. In various embodiments, the specific FFT window length, the noise suppression algorithm, the echo cancellation filter length, the beamforming weight computation method, the maximum virtual sound source count, and the dynamic range processing configuration are implementation-dependent.

Example 17: Network Packet Processing—Classification and Scheduling Circuit Structure In some embodiments of the integrated circuit configured for network packet processing, the measurement circuitry includes a header parser implemented as a finite state machine. The header parser extracts field values from packet headers at wire speed, e.g., at least one of source and destination MAC addresses, VLAN tags, EtherType, source and destination IP addresses, protocol type, source and destination port numbers, or Differentiated Services Code Point (DSCP) values, or any combination thereof. The parser advances through header fields in a predetermined number of clock cycles constituting M.

In accordance with some embodiments, the processing circuitry includes a ternary content-addressable memory (TCAM) or a hash-based classification engine. The classification engine matches extracted header fields against classification rules stored in the selected parameter set. Each classification rule includes a match field pattern and an associated action, e.g., at least one of the following, or any combination thereof: forwarding to a specified output port, applying a rate limiting token bucket with parameter values specifying bucket depth and fill rate, encapsulating the packet with a tunnel header, modifying header field values for network address translation, or marking the packet with a new DSCP value.

In certain implementations, the network packet processing circuitry further includes a hierarchical scheduling engine with multiple scheduling levels. Cycle count per packet is independent of scheduling depth and of the number of active queues. Processing completes within a TSN guard band as specified by an IEEE 802.1Qbv gate schedule, regardless of which traffic management parameter set is selected. In keeping with some embodiments, per-flow quality-of-service monitoring circuitry computes compliance metrics across a plurality of flows simultaneously within the K clock cycles. Packet replication and elimination circuitry for redundant network paths, e.g., per IEEE 802.1CB frame replication and elimination for reliability (FRER), operates within the same K clock cycles.

In various embodiments, the network packet processing circuitry further includes an encryption or decryption engine implementing, e.g., at least one of an Advanced Encryption Standard (AES) cipher in a block cipher mode, a ChaCha20-Poly1305 authenticated encryption cipher, or a MACsec (IEEE 802.1AE) encryption engine, or any combination thereof. Encryption key material and initialization vectors are stored in the selected parameter set in bounded-latency parameter memory. In various embodiments, the specific header parser fields, the classification engine type, the number of scheduling levels, the encryption algorithm, the TSN guard band configuration, and the packet replication method are implementation-dependent.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An integrated circuit comprising:

measurement circuitry measuring at least one condition value in a first fixed number of clock cycles;

selection circuitry determining processing parameters based on the at least one condition value in a second fixed number of clock cycles, the determining comprising at least one of:

(i) selecting the processing parameters from a plurality of stored parameter sets, (ii) interpolating the processing parameters between two or more of the stored parameter sets, (iii) computing the processing parameters using the at least one condition value, (iv) computing the processing parameters using the at least one condition value and one or more weight values stored in parameter memory, or (v) any combination of (i), (ii), (iii), and (iv);

the selection circuitry operating without instruction fetch, program counter, or stored-program execution;

processing circuitry having fixed topology and processing input data using the processing parameters in a third fixed number of clock cycles, wherein the processing circuitry executes a predetermined sequence of operations having a fixed number of pipeline stages and no data-dependent branches, such that control flow of the processing circuitry is invariant across all parameter sets of the stored parameter sets; and the parameter memory configured to store the plurality of stored parameter sets, the one or more weight values, or both, the parameter memory coupled to the selection circuitry and the processing circuitry.

2. The integrated circuit of claim 1, wherein total execution, measured in clock cycles, from arrival of input data at the measurement circuitry to completion of the processing circuitry for a given parameter set of the stored parameter sets equals the first fixed number plus the second fixed number plus the third fixed number, and wherein the second fixed number and the third fixed number of clock cycles are identical for all of the plurality of stored parameter sets.

3. The integrated circuit of claim 1, wherein total execution, measured in clock cycles, from arrival of input data at the measurement circuitry to completion of the processing circuitry for a given parameter set of the stored parameter sets is bounded by the first fixed number plus the second fixed number plus the third fixed number.

4. The integrated circuit of claim 1, wherein the parameter memory comprises at least one of static random-access memory, block random-access memory, scratchpad memory, or register-file memory, excludes cache memory, and provides identical access latency independent of which parameter set of the stored parameter sets is accessed.

5. The integrated circuit of claim 1, wherein all of the plurality of stored parameter sets are accessible through a unified address space via identical addressing logic, and wherein the processing circuitry accesses the parameter memory for parameters according to a predetermined address sequence having a fixed number of memory accesses per parameter set of the stored parameter sets, independent of input data values and condition values.

6. The integrated circuit of claim 1, wherein transitions between parameter sets of the stored parameter sets occur without partial reconfiguration of programmable logic and without interruption of data processing.

7. The integrated circuit of claim 1, wherein the measurement circuitry, the selection circuitry, the processing circuitry, and the parameter memory are fabricated on a single semiconductor die.

8. The integrated circuit of claim 1, wherein the parameter memory is coupled to the processing circuitry via a dedicated access path isolated from other memory traffic on the integrated circuit.

9. The integrated circuit of claim 1, wherein the parameter memory is coupled to the processing circuitry via a shared access path providing parameter access latency bounded by a predetermined maximum number of clock cycles regardless of contention from other memory consumers.

10. The integrated circuit of claim 1, wherein the selection circuitry selects exactly one of the plurality of stored parameter sets for each input data item.

11. The integrated circuit of claim 1, wherein the selection circuitry comprises a microsequencer executing a fixed sequence from read-only memory to determine the processing parameters.

12. The integrated circuit of claim 1, further comprising a host interface circuit configured to receive the plurality of stored parameter sets from a host computer system and to load the plurality of stored parameter sets into the parameter memory.

13. The integrated circuit of claim 1, wherein the parameter memory excludes cache memory and provides identical access latency independent of which parameter set of the stored parameter sets is accessed, and wherein the measurement circuitry, the selection circuitry, the processing circuitry, and the parameter memory are fabricated on a single semiconductor die.

14. A processing system comprising:

an integrated circuit comprising:

(a) measurement circuitry measuring at least one condition value in a first fixed number of clock cycles;

(b) selection circuitry determining processing parameters based on the at least one condition value in a second fixed number of clock cycles, the determining comprising at least one of:

(i) selecting the processing parameters from a plurality of stored parameter sets, (ii) interpolating the processing parameters between two or more of the stored parameter sets, (iii) computing the processing parameters using the at least one condition value, (iv) computing the processing parameters using the at least one condition value and one or more weight values stored in parameter memory, or (v) any combination of (i), (ii), (iii), and (iv);

(c) processing circuitry having fixed topology and processing input data using the processing parameters in a third fixed number of clock cycles; and (d) the parameter memory configured to store the plurality of stored parameter sets, the one or more weight values, or both, the parameter memory coupled to the selection circuitry and the processing circuitry;

wherein the processing circuitry executes a predetermined sequence of operations having a fixed number of pipeline stages and no data-dependent branches, such that control flow of the processing circuitry is invariant across all parameter sets of the stored parameter sets; and a host computer system coupled to the integrated circuit via a host interface and configured to load the plurality of stored parameter sets, the one or more weight values, or both, into the parameter memory.

15. The processing system of claim 14, wherein the selection circuitry operates without instruction fetch, program counter, or stored-program execution.

16. The processing system of claim 14, wherein the host computer system loads updated parameter sets into the parameter memory while the processing circuitry continues processing input data using previously loaded parameter sets, and wherein the loading does not affect the third fixed number of clock cycles.

17. The processing system of claim 14, further comprising a parameter compilation interface executable on the host computer system, the parameter compilation interface configured to convert user-defined processing protocols into the plurality of stored parameter sets and to load the plurality of stored parameter sets into the parameter memory via the host interface.

18. The processing system of claim 14, wherein the parameter memory of the integrated circuit excludes cache memory and provides identical access latency independent of which parameter set of the stored parameter sets is accessed, and wherein the parameter memory is coupled to the processing circuitry via a dedicated access path isolated from other memory traffic on the integrated circuit.

19. The processing system of claim 14, wherein the selection circuitry operates without instruction fetch, program counter, or stored-program execution, wherein the parameter memory excludes cache memory, and wherein the processing system further comprises a parameter compilation interface executable on the host computer system and configured to convert user-defined processing protocols into the plurality of stored parameter sets.

20. The processing system of claim 14, wherein total execution, measured in clock cycles, from arrival of input data at the measurement circuitry to completion of the processing circuitry for a given parameter set of the stored parameter sets is bounded by the first fixed number plus the second fixed number plus the third fixed number.

21. A programmable integrated circuit comprising programmable logic configured to implement:

measurement circuitry measuring at least one condition value in a first fixed number of clock cycles;

selection circuitry determining processing parameters based on the at least one condition value in a second fixed number of clock cycles, the determining comprising at least one of:

(i) selecting the processing parameters from a plurality of stored parameter sets, (ii) interpolating the processing parameters between two or more of the stored parameter sets, (iii) computing the processing parameters using the at least one condition value, (iv) computing the processing parameters using the at least one condition value and one or more weight values stored in parameter memory, or (v) any combination of (i), (ii), (iii) and (iv);

processing circuitry having fixed topology and processing input data using the processing parameters in a third fixed number of clock cycles, wherein the processing circuitry executes a predetermined sequence of operations having a fixed number of pipeline stages and no data-dependent branches, such that control flow of the processing circuitry is invariant across all parameter sets of the stored parameter sets; and the parameter memory configured to store the plurality of stored parameter sets, the one or more weight values, or both, the parameter memory coupled to the selection circuitry and the processing circuitry.

22. The programmable integrated circuit of claim 21, wherein the selection circuitry operates without instruction fetch, program counter, or stored-program execution.

23. The programmable integrated circuit of claim 21, wherein the selection circuitry determines the processing parameters in a second fixed number of clock cycles.

24. The programmable integrated circuit of claim 21, wherein the parameter memory excludes cache memory and provides identical access latency independent of which parameter set of the stored parameter sets is accessed.

25. The programmable integrated circuit of claim 21, wherein the selection circuitry determines the processing parameters by interpolating between at least two of the plurality of stored parameter sets based on the at least one condition value.

26. The programmable integrated circuit of claim 21, further comprising a host interface circuit configured to receive the plurality of stored parameter sets from a host computer system and to load the plurality of stored parameter sets into the parameter memory.

27. The programmable integrated circuit of claim 21, wherein transitions between parameter sets stored in the parameter memory occur without modification of the programmable logic of the programmable integrated circuit.

28. The programmable integrated circuit of claim 21, wherein total execution, measured in clock cycles, from arrival of input data at the measurement circuitry to completion of the processing circuitry for a given parameter set of the stored parameter sets equals the first fixed number plus a second fixed number of clock cycles plus the third fixed number.

29. The programmable integrated circuit of claim 21, wherein the selection circuitry operates without instruction fetch, program counter, or stored-program execution, wherein the parameter memory excludes cache memory and provides identical access latency independent of which parameter set of the stored parameter sets is accessed, and wherein the programmable integrated circuit further comprises a host interface circuit configured to receive the plurality of stored parameter sets from a host computer system.

30. The programmable integrated circuit of claim 21, wherein total execution, measured in clock cycles, from arrival of input data at the measurement circuitry to completion of the processing circuitry for a given parameter set of the stored parameter sets is bounded by the first fixed number plus the second fixed number plus the third fixed number.

* * * * *